United States Patent
Petty

(10) Patent No.: US 12,060,128 B2
(45) Date of Patent: Aug. 13, 2024

(54) ADJUSTABLE SADDLE

(71) Applicant: Jon A. Petty, St. George, UT (US)

(72) Inventor: Jon A. Petty, St. George, UT (US)

(*) Notice: Subject to any disclaimer, the term of this patent is extended or adjusted under 35 U.S.C. 154(b) by 634 days.

(21) Appl. No.: 17/002,566

(22) Filed: Aug. 25, 2020

(65) Prior Publication Data
US 2020/0385077 A1    Dec. 10, 2020

Related U.S. Application Data

(63) Continuation-in-part of application No. 16/837,644, filed on Apr. 1, 2020, now Pat. No. 11,603,154, and a continuation-in-part of application No. 16/180,982, filed on Nov. 5, 2018, now Pat. No. 10,750,872, which is a continuation-in-part of application No. 15/264,945, filed on Sep. 14, 2016, now Pat. No. 10,118,658.

(60) Provisional application No. 62/827,580, filed on Apr. 1, 2019, provisional application No. 62/218,338, filed on Sep. 14, 2015.

(51) Int. Cl.
*B62J 1/10*    (2006.01)
*B62J 1/00*    (2006.01)
*B62J 1/08*    (2006.01)
*F16H 25/20*   (2006.01)

(52) U.S. Cl.
CPC ............. *B62J 1/10* (2013.01); *B62J 1/005* (2013.01); *B62J 1/08* (2013.01); *F16H 25/20* (2013.01)

(58) Field of Classification Search
CPC ............. B62J 1/10; B62J 1/005; B62J 1/08
USPC ........................................................ 297/201
See application file for complete search history.

(56) References Cited

U.S. PATENT DOCUMENTS

| | | | | |
|---|---|---|---|---|
| 593,331 A | * | 11/1897 | Noirit ............. | B62J 1/005 297/207 |
| 595,434 A | * | 12/1897 | Burge ............. | B62J 1/005 297/201 |

(Continued)

FOREIGN PATENT DOCUMENTS

| DE | 202010005192 U1 | 9/2010 |
|---|---|---|
| SU | 1150145 A1 | 4/1985 |

OTHER PUBLICATIONS

U.S. Appl. No. 10/118,658, filed Nov. 6, 2018, Petty.
International Search Report dated Nov. 18, 2021 for corresponding Intl Appln No. PCT/US2021/045756.

*Primary Examiner* — Robert Canfield
(74) *Attorney, Agent, or Firm* — David Meibos; Maywood IP Law

(57) ABSTRACT

An adjustable saddle may include a mounting frame couplable with a saddle half base and a discrete or analog saddle half adjustment mechanism configured to adjust an orientation of the saddle half base relative to the mounting frame. The discrete saddle half adjustment mechanism may pivotally attach the saddle half base to the mounting frame in at least two different discrete pivot points. The analog saddle half adjustment mechanism may position the saddle half base relative to the mounting frame along a continuous range of pivot points with a high mechanical advantage that prevents migration of the saddle half base over time. The adjustable saddle may also include a slope adjustment mechanism configured to pivotally adjust a slope of the saddle half base relative to a slope adjustment frame of the adjustable saddle.

18 Claims, 78 Drawing Sheets

(56) References Cited

U.S. PATENT DOCUMENTS

| | | | | |
|---|---|---|---|---|
| 603,943 A * | 5/1898 | Clifford | B62J 1/005 | 297/201 |
| 608,682 A * | 8/1898 | Jamieson | B62J 1/005 | 297/201 |
| 619,204 A * | 2/1899 | Moore | B62J 1/005 | 297/201 |
| 622,357 A * | 4/1899 | Hitchcock | B62J 1/005 | 297/202 |
| 629,956 A * | 8/1899 | Craig | B62J 1/005 | 297/201 |
| 635,598 A * | 10/1899 | Rowe | B62J 1/005 | 297/207 |
| 656,854 A * | 8/1900 | Nord | B62J 1/005 | 297/312 |
| 694,875 A * | 3/1902 | Meighan | B62J 1/005 | 297/201 |
| 701,390 A * | 6/1902 | Provost | B62J 1/005 | 297/202 |
| 872,124 A * | 11/1907 | Hammaren | B62J 1/005 | 297/201 |
| 4,387,925 A * | 6/1983 | Barker | B62J 1/08 | 297/215.15 |
| 4,541,668 A * | 9/1985 | Rouw | B62J 1/002 | 297/312 |
| 4,877,286 A * | 10/1989 | Hobson | B62J 1/002 | 297/452.4 |
| 5,123,698 A * | 6/1992 | Hodges | B62J 1/005 | 297/215.16 |
| 5,167,435 A * | 12/1992 | Aldi | B62J 1/06 | 297/312 |
| 5,352,016 A * | 10/1994 | Hobson | B62J 1/10 | 297/201 |
| 5,709,430 A * | 1/1998 | Peters | B62J 1/002 | 297/215.14 |
| 5,823,618 A * | 10/1998 | Fox | B62J 1/005 | 297/202 |
| 6,209,954 B1 * | 4/2001 | Bombardier | B62J 1/005 | 297/214 |
| 6,290,291 B1 * | 9/2001 | Kojima | B62J 1/10 | 297/452.4 |
| 6,402,236 B1 * | 6/2002 | Yates | B62J 1/10 | 297/201 |
| 6,422,647 B1 * | 7/2002 | Turudich | B62J 1/00 | 297/202 |
| 7,178,869 B2 * | 2/2007 | Ljubich | B62J 1/00 | 297/215.15 |
| 7,494,181 B2 * | 2/2009 | Tucker | B62J 1/00 | 297/215.14 |
| 9,738,341 B2 * | 8/2017 | Eldredge | B62J 1/005 | |
| 10,246,154 B2 * | 4/2019 | Eldredge | B62J 1/02 | |
| 10,618,583 B1 * | 4/2020 | Marc | B62J 1/007 | |
| 2002/0096917 A1 * | 7/2002 | Turudich | B62J 1/00 | 297/202 |
| 2003/0038515 A1 * | 2/2003 | Martin | B62J 1/10 | 297/195.1 |
| 2004/0066066 A1 * | 4/2004 | Hobson | B62J 1/10 | 297/201 |
| 2008/0054689 A1 * | 3/2008 | Tucker | B62J 1/005 | 297/201 |
| 2008/0179925 A1 * | 7/2008 | Chuang | B62J 1/005 | 297/214 |
| 2008/0309130 A1 * | 12/2008 | Livne | B62J 1/08 | 297/215.1 |
| 2009/0189421 A1 | 7/2009 | Yu et al. | | |
| 2012/0292959 A1 | 11/2012 | Sajonia | | |
| 2015/0130234 A1 * | 5/2015 | Bailie | B62J 1/18 | 297/214 |
| 2016/0176463 A1 * | 6/2016 | McPherson | B62J 1/08 | 297/215.15 |
| 2017/0274950 A1 * | 9/2017 | Holt | B62J 1/007 | |
| 2019/0069679 A1 | 3/2019 | Petty | | |
| 2020/0079452 A1 * | 3/2020 | Shabsigh | B62J 1/005 | |
| 2022/0111920 A1 * | 4/2022 | Ouyang | B62J 1/005 | |
| 2022/0289325 A1 * | 9/2022 | Petty | B62J 1/005 | |
| 2022/0396326 A1 * | 12/2022 | Colthurst | B62J 1/04 | |
| 2023/0080662 A1 * | 3/2023 | Ouyang | B62J 1/08 | 297/215.13 |

* cited by examiner

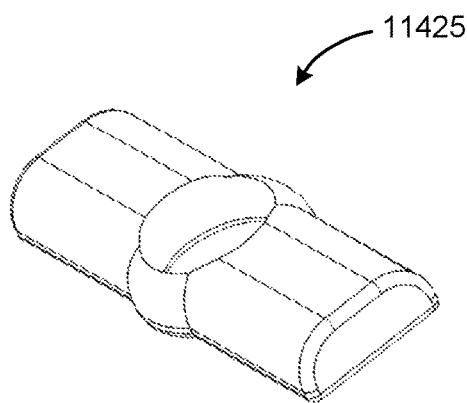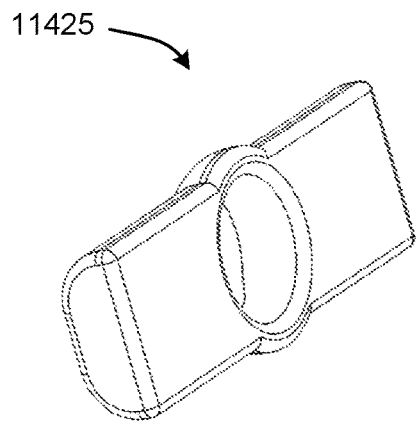
FIG. 58A  FIG. 58B
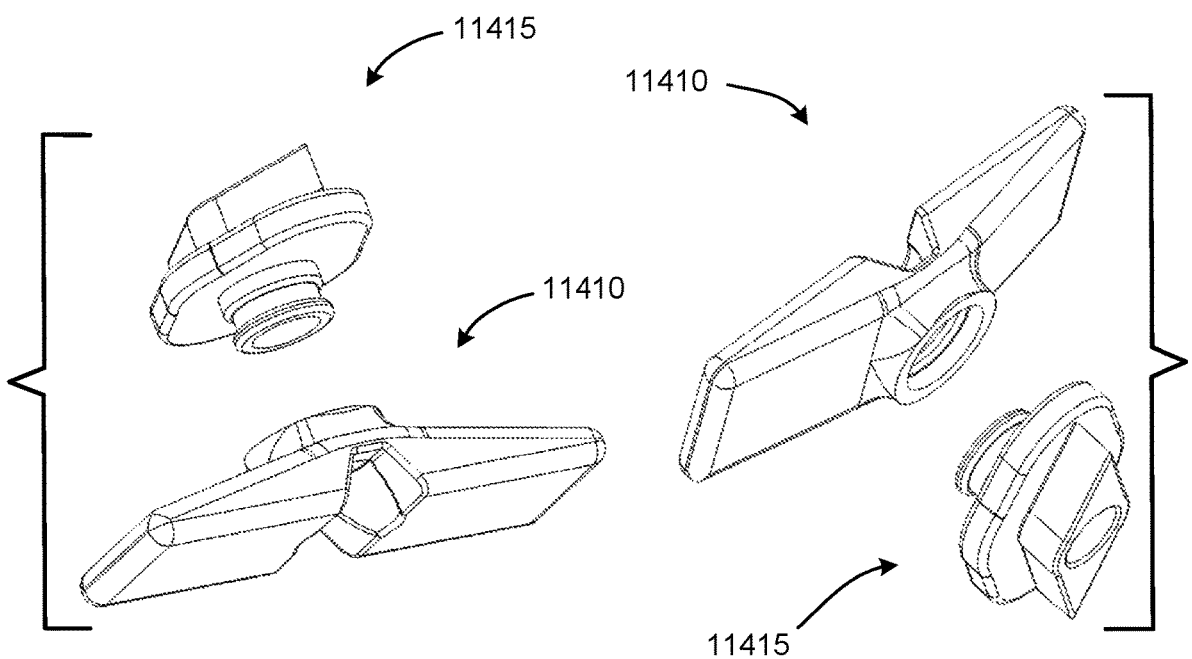
FIG. 59A  FIG. 59B

ADJUSTABLE SADDLE

CROSS-REFERENCE TO RELATED APPLICATIONS

The present application is a continuation-in-part of U.S. patent application Ser. No. 16/837,644, filed on Apr. 1, 2020, entitled "BICYCLE SADDLE ADJUSTMENT SYSTEM AND METHOD," which claims the benefit of U.S. Provisional Patent Application No. 62/827,580, filed on Apr. 1, 2019, entitled "BICYCLE SADDLE ADJUSTMENT SYSTEM AND METHOD". The present application is also a continuation-in-part of U.S. patent application Ser. No. 16/180,982, filed on Nov. 5, 2018, entitled "ADJUSTABLE SADDLE," which issued on Aug. 25, 2020 as U.S. Pat. No. 10,750,872, which is a continuation-in-part of U.S. patent application Ser. No. 15/264,945, filed on Sep. 14, 2016, entitled "ADJUSTABLE SADDLE," which issued on Nov. 6, 2018 as U.S. Pat. No. 10,118,658, which claims the benefit of U.S. Provisional Patent Application No. 62/218,338, filed on Sep. 14, 2015, entitled "ADJUSTABLE SADDLE." Each of the foregoing patent applications is incorporated by reference as though set forth herein in its entirety.

TECHNICAL FIELD

The present disclosure relates to adjustable saddles. More specifically, the present disclosure relates to an adjustable saddle that supports the ischial tuberosities, ischiopubic rami, and nearby regions of those who use the adjustable saddle.

BACKGROUND

Saddle seats may be used in a variety of applications including but not limited to: chairs, sit/stand chairs, stationary exercise equipment, bicycles, scooters, motorcycles, motorized vehicles, and in various other applications where an individual may desire to assume a seated, or at least partially seated, position. Although the adjustable saddle designs disclosed herein are described in the context of bicycle use, it will be understood that these adjustable saddle designs may also be used in any other suitable application where an individual may desire to assume a seated, or at least partially seated, position.

The conventional single platform saddle design is commonly used on bicycles and other equipment throughout the world. These conventional single platform bicycle saddles include a forward protruding horn that exerts pressure on soft tissue, arteries, veins, and associated nerves often resulting in numbness, pain, and/or erectile dysfunction in individuals. Conventional single platform saddles do not provide specific support for the ischial tuberosities, ischiopubic rami, and nearby regions of those who use single platform bicycle saddles. Additionally, conventional single platform saddles do not adjust to variations in the size and shape of ischiopubic rami of different individuals.

Accordingly, adjustable saddle designs that adequately support the ischial tuberosities, ischiopubic rami, and nearby regions of individuals with varying sizes and shapes of ischiopubic rami may result in a more comfortable ride that avoids soft tissue abrasion, numbness, pain, and/or erectile dysfunction.

SUMMARY

In some embodiments, an adjustable saddle for a cycle may include a saddle half base, a mounting frame couplable with the saddle half base, a discrete adjustment mechanism and a slope adjustment mechanism. The saddle half base may include a cushioned seat, a saddle half base front end, and a saddle half base back end. The mounting frame may include a mounting frame front end and a mounting frame back end. The discrete adjustment mechanism may include a front end fastener, a back end fastener, a plurality of front end channels on the mounting frame front end configured to receive the front end fastener at a plurality of discrete front end locations, and a plurality of back end channels on the mounting frame back end configured to receive the back end fastener at a plurality of discrete back end locations. The saddle half base front end may be configured to receive the front end fastener to pivotally attach the saddle half base front end to the mounting frame front end in at least two different pivot points corresponding to the plurality of discrete front end locations. The saddle half base back end may be configured to receive the back end fastener to couple the saddle half base back end to the mounting frame back end. The saddle half base back end may be positionable relative to the mounting frame back end at the plurality of discrete back end locations to allow discrete pivotal attachment of the saddle half base back end to the mounting frame back end. The slope adjustment mechanism may include a mounting frame front end projection comprising a first hinge pin, a mounting frame back end projection comprising a second hinge pin and at least one slope adjustment aperture configured to receive a slope adjustment fastener, and a slope adjustment frame. The slope adjustment frame may include a first aperture configured to receive the first hinge pin, a second aperture configured to receive the second hinge pin, and a third aperture configured to receive the slope adjustment fastener. The slope adjustment mechanism may be configured to pivotally couple the mounting frame to the slope adjustment frame at a plurality of different discrete angles to digitally adjust a slope of the mounting frame relative to the slope adjustment frame.

The discrete adjustment mechanism may include a mounting frame and a saddle half base comprising a cushioned seat. The mounting frame may include a mounting frame front end having a plurality of front end channels configured to receive a front end fastener at a plurality of discrete front end locations, and a mounting frame back end having a plurality of back end channels configured to receive a back end fastener at a plurality of discrete back end locations. The saddle half base may include a saddle half base front end configured to receive the front end fastener to pivotally attach the saddle half base front end to the mounting frame front end in at least two different pivot points corresponding to the plurality of discrete front end locations. The saddle half base may also include a saddle half base back end configured to receive the back end fastener to couple the saddle half base back end to the mounting frame back end. The saddle half base back end may be positionable relative to the mounting frame back end at the plurality of discrete back end locations to allow discrete pivotal attachment of the saddle half base back end to the mounting frame back end. The slope adjustment mechanism may include a mounting frame front end projection having a first hinge pin, a mounting frame back end projection having a second hinge pin and at least one slope adjustment aperture configured to receive a slope adjustment fastener, and a slope adjustment frame. The slope adjustment frame may include a first aperture configured to receive the first hinge pin, a second aperture configured to receive the second hinge pin, and a third aperture configured to receive the slope adjustment fastener. The slope adjustment mechanism may be configured to pivotally couple the mounting frame to the slope adjustment frame at a plurality of different discrete angles to digitally adjust a slope of the mounting frame relative to the slope adjustment frame.

In some embodiments of the adjustable saddle, the plurality of front end channels may include a plurality of longitudinal grooves formed in the mounting frame front end.

In some embodiments of the adjustable saddle, the front end fastener may include a movable front end key, and the plurality of longitudinal grooves may be configured to receive the movable front end key to couple the saddle half base front end to the mounting frame front end at the plurality of discrete front end locations.

In some embodiments of the adjustable saddle, the mounting frame front end may include a transverse slot configured to receive a shaft of the front end fastener.

In some embodiments of the adjustable saddle, the plurality of front end channels may include a plurality of longitudinal slots formed in the mounting frame front end and configured to receive the front end fastener.

In some embodiments of the adjustable saddle, the plurality of back end channels may include a plurality of key slots formed in the mounting frame back end.

In some embodiments of the adjustable saddle, the back end fastener may include a movable back end key, and the plurality of key slots may be configured to receive the movable back end key to couple the saddle half base back end to the mounting frame back end at the plurality of discrete back end locations.

In some embodiments of the adjustable saddle, the saddle half base front end may include a slot with an enlarged opening that is configured to receive a head of the front end fastener.

In other embodiments, an adjustable saddle for a cycle may include a saddle half base comprising a cushioned seat, a mounting frame couplable with the saddle half base, and a saddle half adjustment mechanism configured to adjust an orientation of the saddle half base relative to the mounting frame via pivotal motion of the saddle half base relative to the mounting frame. The saddle half adjustment mechanism may be selected from the group consisting of: a discrete saddle half adjustment mechanism and an analog saddle half adjustment mechanism. The discrete saddle half adjustment mechanism may be configured to pivotally attach the saddle half base to the mounting frame in at least two different discrete pivot points. The analog saddle half adjustment mechanism may be configured to position the saddle half base relative to the mounting frame along a continuous range of pivot points. The analog saddle half adjustment mechanism may also have a mechanical advantage sufficiently high to substantially prevent migration of a selected orientation of the saddle half base relative to the mounting frame in response to use of the adjustable saddle by a user seated on the adjustable saddle.

In some embodiments of the adjustable saddle comprising the analog saddle half adjustment mechanism, the analog saddle half adjustment mechanism may include a worm drive. The worm drive may include a worm screw and a worm fastener. The worm screw may include a worm screw shaft, worm screw threading formed along the worm screw shaft, and a worm screw head. The worm fastener may include a worm fastener shaft, a worm fastener passageway formed through the worm fastener shaft, and worm fastener threading formed within the worm fastener passageway. The worm fastener threading may be configured to receive the worm screw threading, such that, rotation of the worm screw head in a first direction causes the worm fastener to translate along the worm screw shaft away from the worm screw head, and rotation of the worm screw head in a second direction causes the worm fastener to translate along the worm screw shaft toward the worm screw head.

In some embodiments of the adjustable saddle comprising the discrete saddle half adjustment mechanism, the discrete saddle half adjustment mechanism may include a front end fastener receivable in a saddle half base front end of the saddle half base, and a back end fastener receivable in a saddle half base back end of the saddle half base. The discrete saddle half adjustment mechanism may also include a plurality of front end channels formed in a mounting frame front end of the mounting frame. The plurality of front end channels may be configured to receive the front end fastener at a plurality of discrete front end locations to pivotally attach the saddle half base front end to the mounting frame front end in at least two different pivot points corresponding to the plurality of discrete front end locations. The discrete saddle half adjustment mechanism may also include a plurality of back end channels formed in a mounting frame back end of the mounting frame. The plurality of back end channels may be configured to receive the back end fastener at a plurality of discrete back end locations, such that, the saddle half base back end is positionable relative to the mounting frame back end at the plurality of discrete back end locations to allow discrete pivotal attachment of the saddle half base back end to the mounting frame back end.

In some embodiments of the adjustable saddle, the plurality of front end channels may include a plurality of longitudinal grooves formed in the mounting frame front end.

In some embodiments of the adjustable saddle, the front end fastener may include a movable front end key, and the plurality of longitudinal grooves may be configured to receive the movable front end key to couple the saddle half base front end to the mounting frame front end at the plurality of discrete front end locations.

In some embodiments of the adjustable saddle, the mounting frame front end may include a transverse slot configured to receive a shaft of the front end fastener.

In some embodiments of the adjustable saddle, the plurality of front end channels may include a plurality of longitudinal slots formed in the mounting frame front end and configured to receive the front end fastener.

In some embodiments of the adjustable saddle, the plurality of back end channels may include a plurality of key slots formed in the mounting frame back end.

In some embodiments of the adjustable saddle, the back end fastener may include a movable back end key, and the plurality of key slots may be configured to receive the movable back end key to couple the saddle half base back end to the mounting frame back end at the plurality of discrete back end locations.

In yet other embodiments, an adjustable saddle for a cycle may include a saddle half base comprising a cushioned seat, a mounting frame couplable with the saddle half base, a slope adjustment frame, and a slope adjustment mechanism. The slope adjustment mechanism may be configured to pivotally couple the mounting frame to the slope adjustment frame by adjusting a slope of the saddle half base relative to the slope adjustment frame via pivotal motion of the saddle half base relative to the slope adjustment frame about an axis extending along a longitudinal direction of the adjustable saddle.

In some embodiments of the adjustable saddle, the slope adjustment mechanism may comprise a discrete slope adjustment mechanism configured to adjust the slope to any of a plurality of discrete angles. The discrete slope adjustment mechanism may include a mounting frame front end projection having a first hinge pin a mounting frame back end projection having a second hinge pin and at least one slope adjustment aperture configured to receive a slope adjustment fastener, a first aperture configured to receive the first hinge pin, a second aperture configured to receive the second hinge pin, and a third aperture configured to receive the slope adjustment fastener. The discrete slope adjustment mechanism may be configured to pivotally couple the mounting frame to the slope adjustment frame at any of a plurality of different discrete angles to adjust a slope of the saddle half base relative to the slope adjustment frame.

In some embodiments of the adjustable saddle, the slope adjustment mechanism may comprise an analog slope adjustment mechanism configured to adjust the slope along a continuous range of angles. The analog adjustment mechanism may include a mounting frame front end projection having a first hinge pin, a mounting frame back end projection having a second hinge pin and a slope adjustment slot configured to receive a slope adjustment fastener, a first aperture configured to receive the first hinge pin, a second aperture configured to receive the second hinge pin, and a third aperture configured to receive the slope adjustment fastener. The analog slope adjustment mechanism may be configured to pivotally couple the mounting frame to the slope adjustment frame along a continuous range of angles to adjust a slope of the saddle half base relative to the slope adjustment frame.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

FIG. 58A illustrates a top perspective view of the front end key shown in FIG. 56; and FIG. 58B illustrates a bottom perspective view of the front end key;

FIG. 59A illustrates a bottom perspective view of the back end key and quick release member shown in FIG. 56; and FIG. 59B illustrates a top perspective view of the back end key and quick release member;

Figure 1:
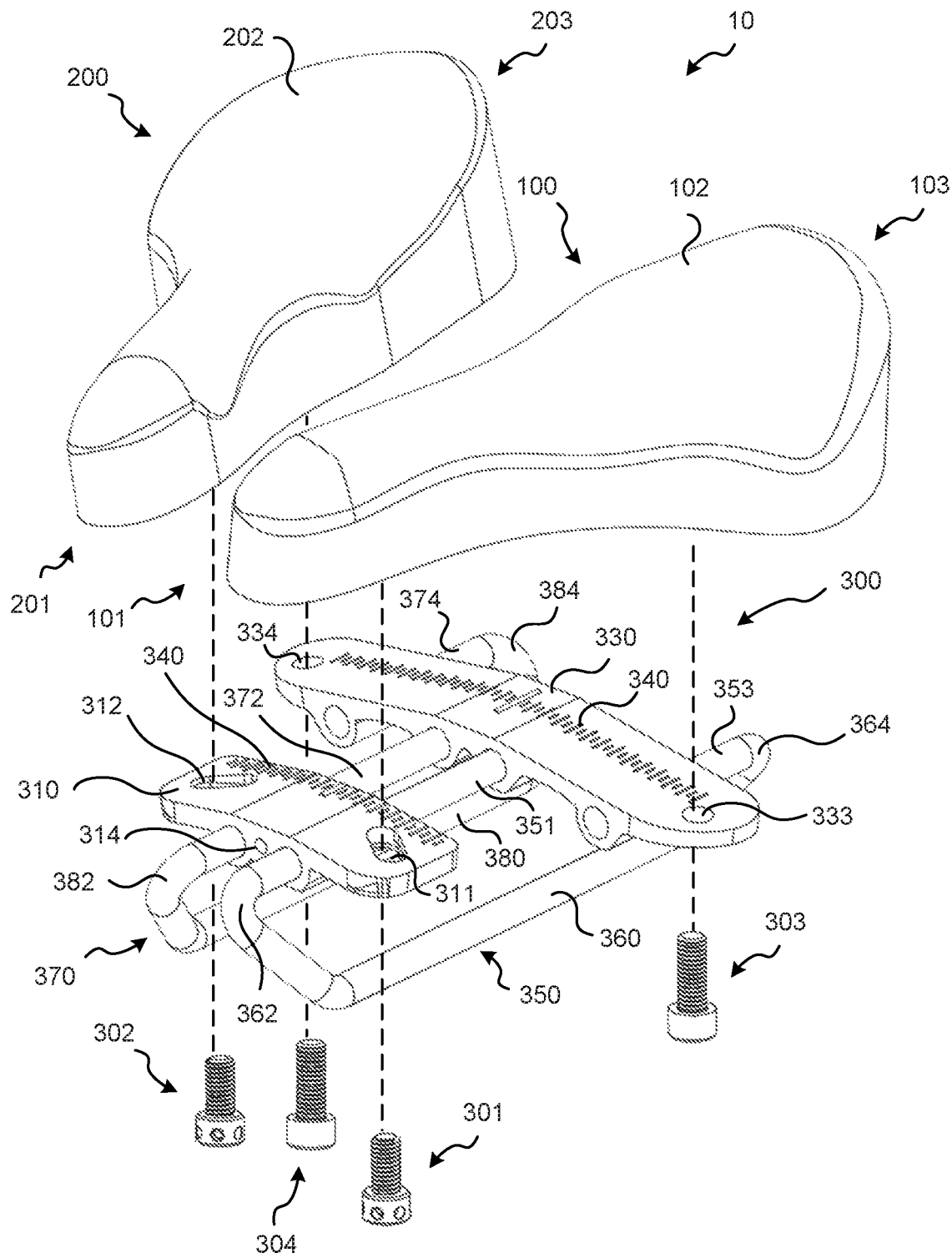
FIG. 1 illustrates an exploded view of an adjustable saddle, according to one embodiment of the present disclosure.

It is to be understood that the drawings are for purposes of illustrating the concepts of the disclosure and may not be drawn to scale. Furthermore, the drawings illustrate exemplary embodiments and do not represent limitations to the scope of the present disclosure.

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus and method, as represented in the Figures, is not intended to limit the scope of the present disclosure, as claimed in this or any other application claiming priority to this application, but is merely representative of exemplary embodiments of the present disclosure.

The adjustable saddles of the present disclosure may provide enhanced support for the ischial tuberosities, ischiopubic rami, and/or nearby regions of individuals. The adjustable saddles may allow an individual to personalize the position of two independently adjustable saddle halves, each saddle half comprising a plurality of surfaces and contours. In this disclosure, the term "half" is used loosely. For example, each of the saddle halves may optionally include more or less than 50% of the surface area that supports the rider. Each saddle half may be pivotally connected at the front end of the adjustable saddle, which may allow for various width adjustments. Each saddle half may be angularly adjustable at the back end of the adjustable saddle to conform to angular variations in male and female ischiopubic rami. Thus, the rider's pelvic bones may ride atop the saddle halves while the soft tissue of the perineum area is untouched between each saddle half. The resulting saddle configuration may prevent problems such as soft tissue abrasions, numbness, pain, and/or erectile dysfunction for men by eliminating pressure and/or compression of the dorsal artery, veins, and nerves. The resulting saddle configuration may also eliminate pressure on women's mons pubis, clitoris, and urethra.

The adjustable saddles of the present disclosure may be used with different riding positions in order to change an angle of the pelvis in relation to the adjustable saddle. For example, given an "upright" riding position, a wider saddle adjustment may be desirable. On the other hand, given a more aggressive riding position (e.g., a "lower," or racing riding position) a narrower saddle adjustment may be more desirable. For upright riding positions, a desired saddle width may be chosen to properly support the sit bones. However, more aggressive riding positions may change the pelvis contact points relative to the saddle such that, as the riding angle becomes more aggressive, the saddle may be narrowed to properly support the pelvic structure. Thus, the front area of the saddle may be selected to be as wide as possible to achieve adequate pelvic support, while being as narrow as possible in order to achieve good pedaling dynamics. In aggressive, or stretched riding positions, the saddle contact point may move from the tip of the sit bones forward along the pubic arch to the pubic bone and, depending on the saddle design, the central perineal area may be used for load bearing for both genders. Women typically have a lower pubic arch which may result in higher pressures when riding in aggressive riding positions with a traditional saddle design. In aggressive riding positions, the manner in which pressure from the pubic bone is distributed to the saddle may be important for comfort and damage prevention to critical nerves and soft tissue. The sit bone and pubic bones tend to come together from their widest points into a "V" shape, such that more aggressive riding positions will generally benefit from a narrower saddle adjustment.

Thus, in some embodiments, adjustable saddles of the present disclosure provide the ability to adjust both the front and rear section of a saddle independently to adapt to a given sit bone width and riding position to achieve maximum comfort. In some embodiments, the adjustable saddles of the present disclosure can be adjusted as wide as possible to achieve pelvic support as well as sufficiently narrow to achieve good pedaling dynamics. For example, in an aggressive triathlon riding position, both the front and rear sections of the adjustable saddle may be adjusted narrowly and angled inward to support the pelvis and pubic bone to minimize soft tissue contact. Conversely, in an upright position, both the front and rear sections can be adjusted wider and angled outward to support the pelvis and sit bones to minimize soft tissue contact. In addition, the rear portion of the saddle may be adjusted to be higher than the front to angle the adjustable saddle downward front-to-back to reduce and/or eliminate pressure on the perineal area and pelvis arch, improving comfort and safety.

To estimate a proper saddle width, a calculation may be used according to a distance between the centers of the sit bones and a typical riding position (e.g., upright, slightly bent, moderate, stretched, road race, etc.). As one non-limiting example, if a sit bone width for a cyclist is 120 mm, a distance may be added to or subtracted from the 120 mm width measurement depending on a desired riding position. In this example, if the rider's preferred riding position is upright, 20 mm may be added to the base 120 mm, yielding a 140 mm saddle width. If the riding style is aggressive, road race, or triathlon, then 20 mm could be deducted for a 100 mm saddle width measurement. The method may be interpreted slightly differently.

FIGS. 1-7B illustrate various views of an adjustable saddle 10 according to one embodiment of the present disclosure. FIG. 1 illustrates an exploded view of the adjustable saddle 10. FIG. 2A shows a perspective view of the adjustable saddle 10 of FIG. 1 in assembled form and FIG. 2B shows a side view of the adjustable saddle 10 connected to a seat post 400. FIGS. 3A-4B illustrate various top views of the adjustable saddle 10 in different exemplary adjustment configurations and FIGS. 5A-7B and 9B illustrates how the adjustable saddle 10 may generally include rigid bases topped with foam padding which may be further covered with seat covers 102, 202 to protect the foam padding from weathering, abrasion, and general wear. In at least one embodiment, the seat covers 102, 202 may also include cords (not shown) and/or other attachment features configured to couple the seat covers to their respective rigid base, as will be discussed in more detail below.

Figure 2A:
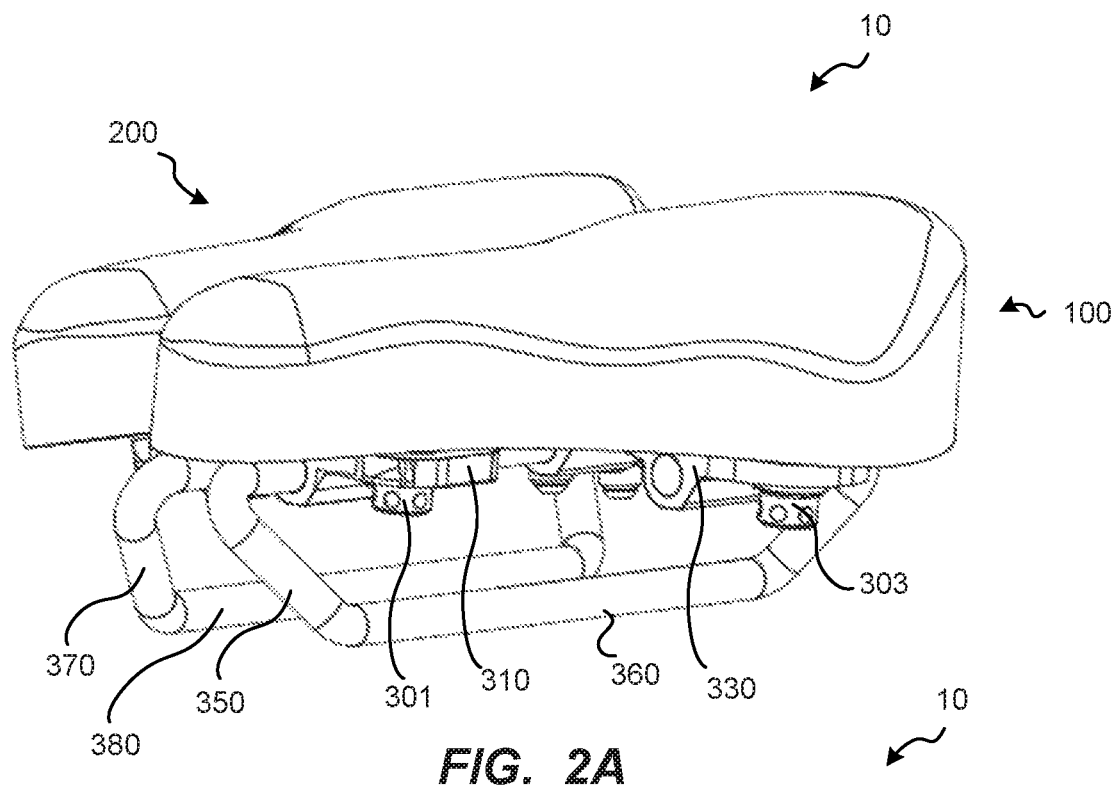
FIG. 2A illustrates a perspective view of the adjustable saddle of FIG. 1 in assembled form.
Figure 2B:
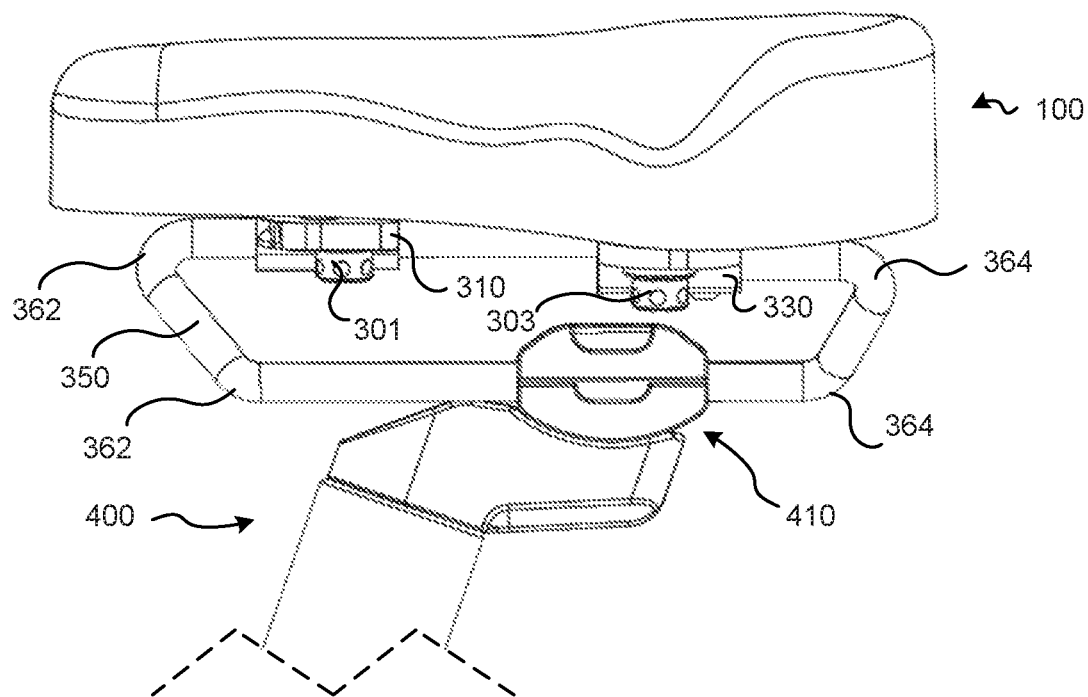
FIG. 2B illustrates a side view of the adjustable saddle of FIG. 2A connected to a seat post.

Continuing generally with FIGS. 1-2B, the adjustable saddle 10 may include a first saddle half 100, a second saddle half 200, and a chassis 300. The first and second saddle halves 100, 200 may be adjustably attached to the chassis 300 via a first fastener 301, a second fastener 302, a third fastener 303, and a fourth fastener 304. The first and second fasteners 301, 302 may also be referred to herein as front fasteners because they attach the front ends 101, 201 of the saddle halves 100, 200 to the chassis 300. Likewise, the third and fourth fasteners 303, 304 may also be referred to herein as rear fasteners because they attach the back ends 103, 203 of the saddle halves 100, 200 to the chassis 300.

The first, second, third, and fourth fasteners 301, 302, 303, 304 may be any suitable fastener style, including but not limited to: threaded screws, bolts, quick release fasteners, and the like. In one embodiment, at least one of the first, second, third, and fourth fasteners 301, 302, 303, 304 may have a cross drilled head to facilitate rotation of the fastener from the side for easier and quicker operation. For example, an individual (not shown) may use a small elongate tool, such as a 2 mm Allen wrench (not shown) to rotate the fastener from the side by inserting one end of the small elongate tool into the cross drilled threaded screws and applying a rotational torque force.

The chassis 300 may generally include a front mounting bracket 310, a rear mounting bracket 330, a first rail 350, and a second rail 370. The front mounting bracket 310 may include a first aperture 311 configured to receive the first fastener 301 to attach the front end 101 of the first saddle half 100 to the front mounting bracket 310, as well as a second aperture 312 configured to receive the second fastener 302 to attach the front end 201 of the second saddle half 200 to the front mounting bracket 310. The front mounting bracket 310 may also include a front attachment aperture 314, as will be described in more detail with reference to FIGS. 7A-9A. Likewise, the rear mounting bracket 330 may include a third aperture 333 configured to receive the third fastener 303 to attach the back end 103 of the first saddle half 100 to the rear mounting bracket 330, as well as a fourth aperture 334 configured to receive the fourth fastener 304 to attach the back end 203 of the second saddle half 200 to the rear mounting bracket 330.

In other embodiments, the front mounting bracket 310 and the rear mounting bracket 330 may be coupled together to form a unified bracket. The unified bracket may include a front mounting bracket, a rear mounting bracket, and an intermediate piece that couples the front mounting bracket and the rear mounting bracket together. In one embodiment, the front mounting bracket, the rear mounting bracket, and the intermediate piece may be integrally formed together as a single unified bracket. However, in other embodiments, the front mounting bracket, the rear mounting bracket, and the intermediate piece may be configured to detachably couple to each other. In this manner, different intermediate pieces with different lengths, widths, and/or shapes may be used to couple the front mounting bracket to the rear mounting bracket to vary the relative distance between the front mounting bracket and the rear mounting bracket. Moreover, the unified bracket may include any number of apertures that are configured to receive any number of corresponding fasteners to mount the saddle halves 100, 200 to the unified bracket.

In at least one embodiment, the first and second apertures 311, 312 may be angled slots that allow pivotal and translational adjustment of the front ends 101, 201 of the saddle halves 100, 200. However, in other embodiments (not shown), the first and second apertures 311, 312 may be circular shaped holes that allow pivotal adjustment of the front ends 101, 201 of the saddle halves 100, 200. The third and fourth apertures 333, 334 may be circular shaped holes that allow pivotal adjustment of the back ends 103, 203 of the saddle halves 100, 200. However, in other embodiments (not shown), the third and fourth apertures 333, 334, may also be angled slots that allow pivotal and translational adjustment of the back ends 103, 203 of the saddle halves 100, 200. In these embodiments, the addition of angled slots may increase the potential range of motion of the saddle halves 100, 200.

In at least one embodiment, the front mounting bracket 310 and/or the rear mounting bracket 330 may include adjustment markings 340. The adjustment markings 340 may generally indicate the degree to which each saddle half 100, 200 is positionally adjusted with respect to the front mounting bracket 310 and/or the rear mounting bracket 330. In the embodiment shown in FIG. 1, the adjustment markings 340 include simple line markings spaced apart at regular intervals. However, in other embodiments (not shown), the adjustment markings 340 may include numbers or other symbols that indicate various information, such as angular or translational displacement of the saddle halves 100, 200 with respect to the front and rear mounting brackets 310, 330, preferred saddle half 100, 200 positions based on riding style, a rider's personal position preference, etc. The adjustment markings 340 may be formed by any known process including, but not limited to: laser etching, stamping, integral formation during molding/casting, and the like.

In addition to adjustment markings 340, the first rail 350 and/or the second rail 370 may also include additional adjustment markings (not shown) to indicate translational displacement of the chassis 300 with respect to a seat post 400, a seat post mounting bracket 410 (see FIG. 2B), and/or to indicate translational displacement of the front and/or rear mounting brackets 310, 330 with respect to the first and second rails 350, 370. The first rail 350 may have a first lower rail portion 360 and the second rail 370 may have a second lower rail portion 380. The seat post mounting bracket 410 may detachably couple to and/or slidably attach to the first lower rail portion 360 and the second lower rail portion 380 of the first and second rails 350, 370.

The first rail 350 may include at least one first upper rail portion 351 and the second rail 370 may include at least one second upper rail portion 372. The front mounting bracket 310 and/or the rear mounting bracket 330 may be slidably attached to the at least one first upper rail portion 351 of the first rail 350 and the at least one second upper rail portion 372 of the second rail 370. The front and rear mounting brackets 310, 330 may also be held in place along the first and second upper rail portions 351, 372 by any suitable method including simple frictional forces, retainer screws, or the like.

In at least one embodiment, the first rail 350 may include the first upper rail portion 351 and a third upper rail portion 353 and the second rail 370 may include the second upper rail portion 372 and a fourth upper rail portion 374. The front mounting bracket 310 and/or the rear mounting bracket 330 may be slidably attached to the first, second, third, and fourth upper rail portions 351, 372, 353, 374. Likewise, the front and rear mounting brackets 310, 330 may be held in place along the first, second, third, and fourth upper rail portions 351, 372, 353, 374 by any suitable method such as frictional forces, retainer screws, and the like. It is also understood that any or all of the upper rail portions 351, 372, 353, 374 or the lower rail portions 360, 380 may be varied in length to adjust the overall length of the chassis 300 to any desired value.

The first and second rails 350, 370 may include one or more front bends 362, 382 and one or more rear bends 364, 384. The one or more front bends 362, 382 and one or more rear bends 364, 384 may be configured to help absorb mechanical shocks to provide a smoother, more comfortable ride. The one or more front bends 362, 382 and the one or more rear bends 364, 384 may be shaped and/or spaced apart in any manner to vary the clearance, height, width, or angle between any of the upper rail portions 351, 372, 353, 374 and the lower rail portions 360, 380. The one or more front bends 362, 382 and the one or more rear bends 364, 384 may also be shaped and/or spaced apart in any manner to vary the height, forward/backward angle, and side-to-side slope of each saddle half 100, 200. The first and second rails 350, 370 may be formed from any suitable material, or combination of materials including, but not limited to: metals, metal alloys, anodized metals and alloys, steel, titanium, composite materials, carbon fiber, plastic materials, Zytel®, rubber materials, and the like.

Figure 3A:
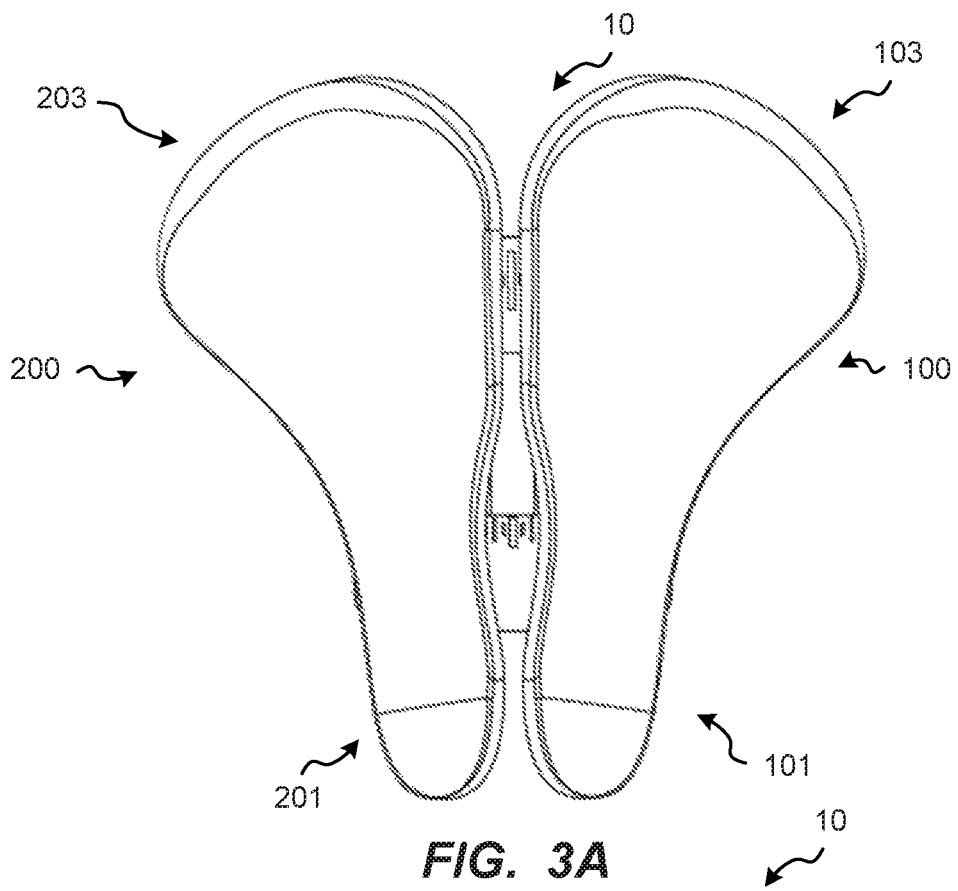
FIGS. 3A-3B show top views of the adjustable saddle of FIG. 2A in various adjustment configurations.
Figure 3B:
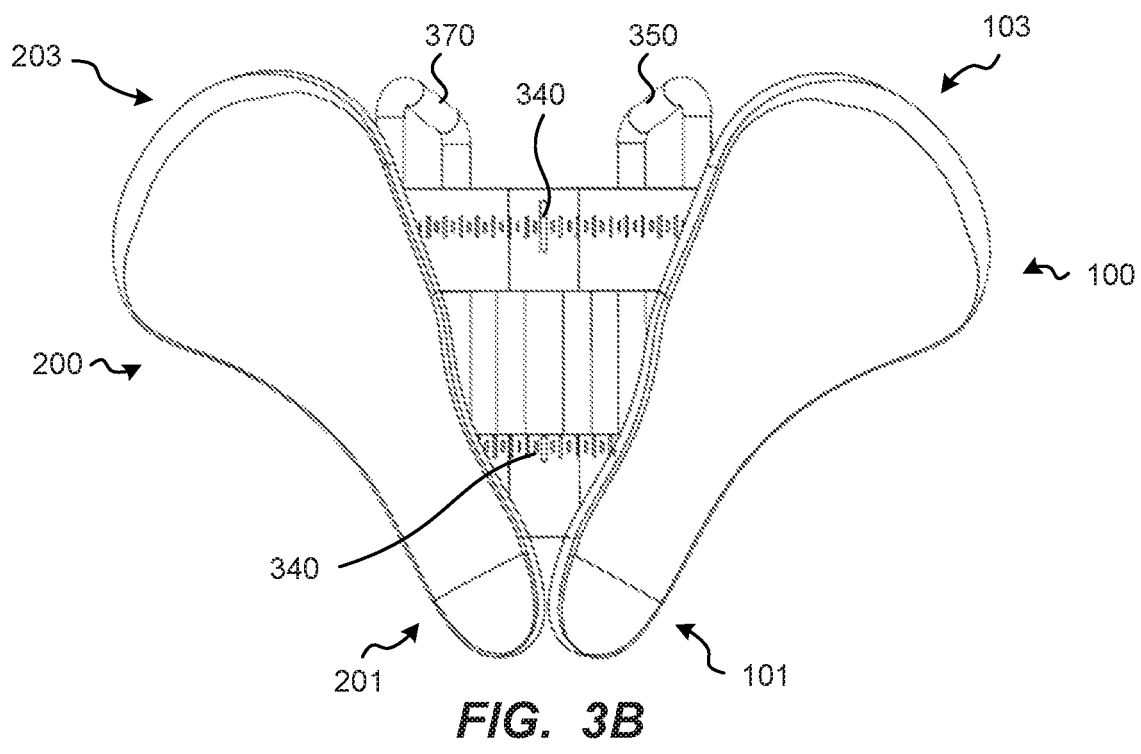
Figure 4A:
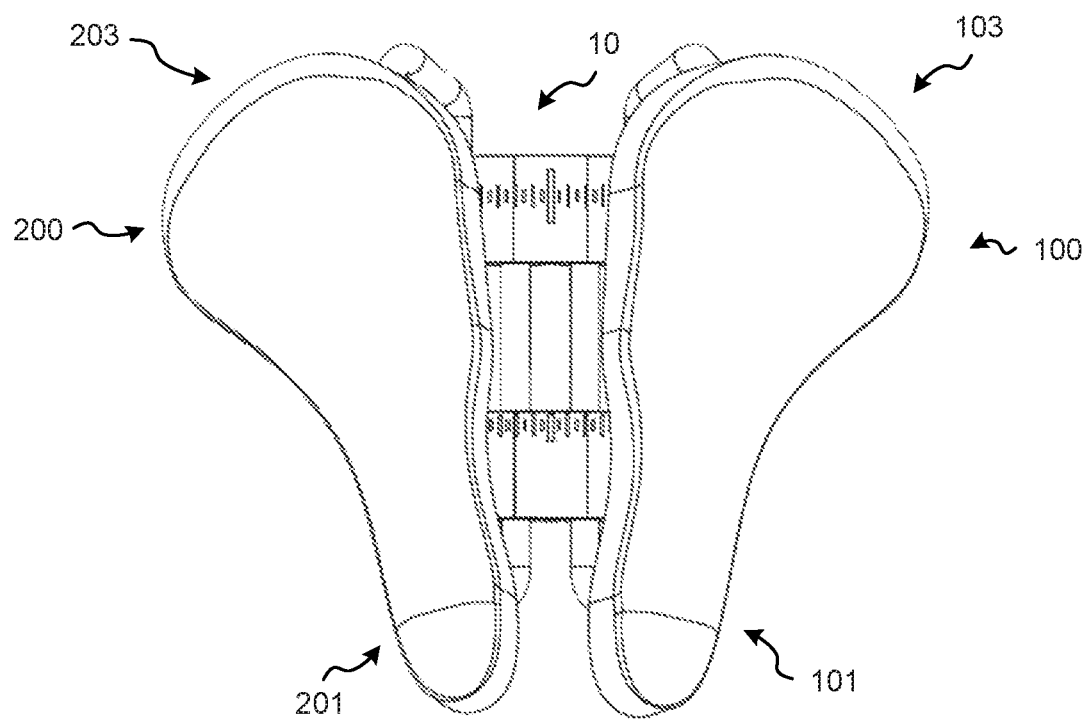
FIGS. 4A-4B show additional top views of the adjustable saddle of FIG. 2A in various adjustment configurations.
Figure 4B:
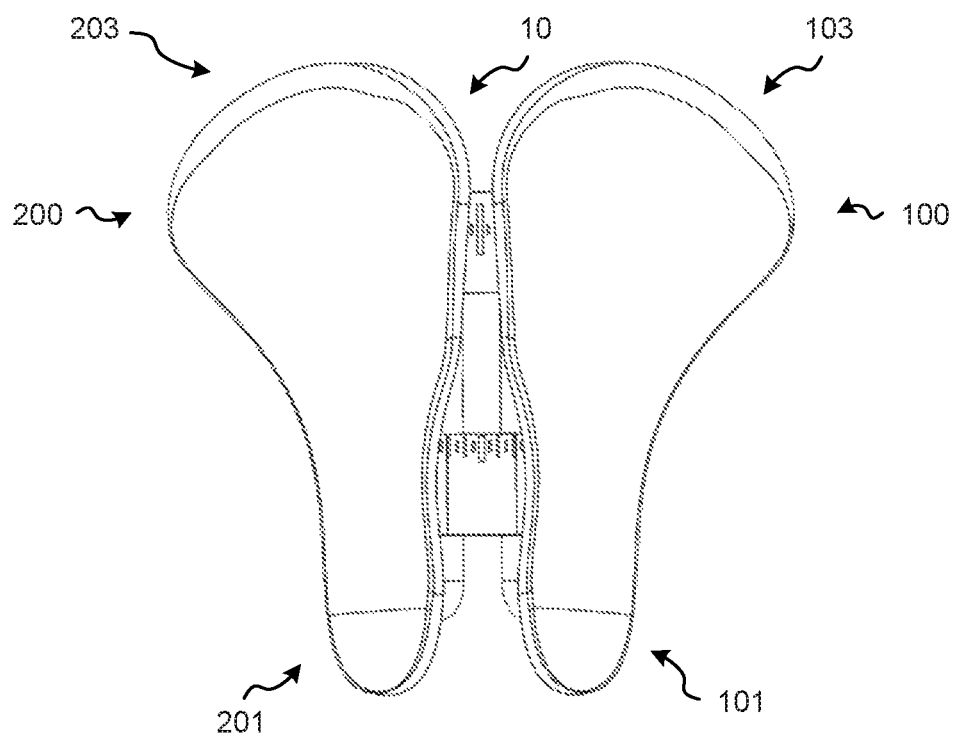
Figure 5A:
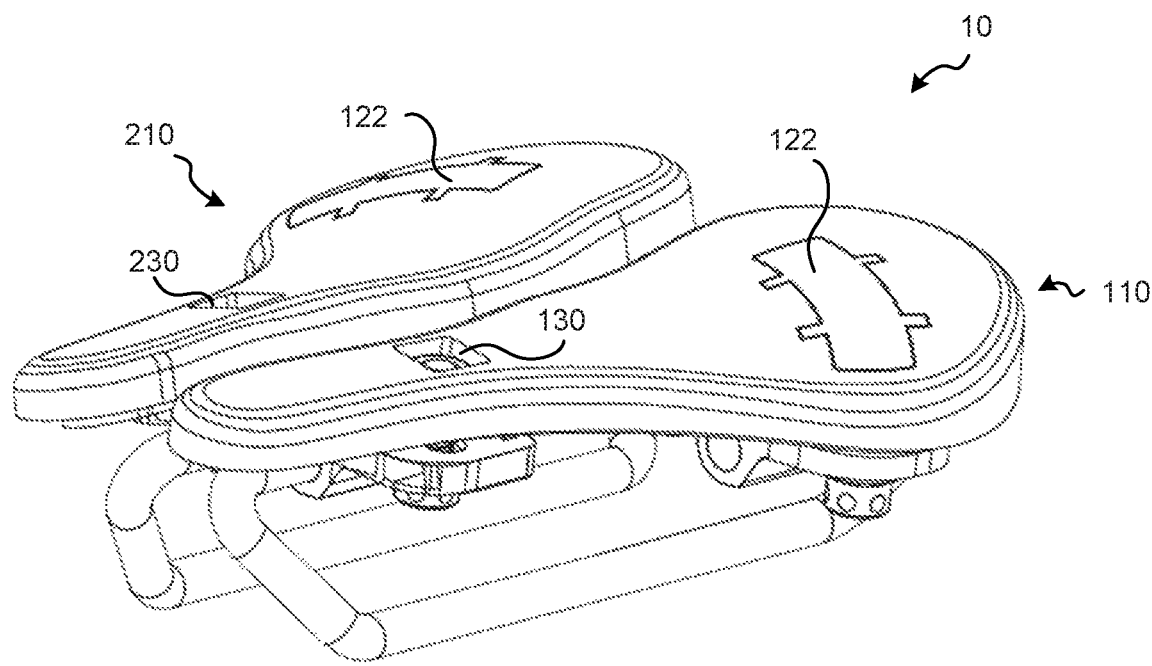
FIG. 5A illustrates a perspective view of the adjustable saddle of FIG. 2A with the foam padding and seat covers removed.
Figure 5B:
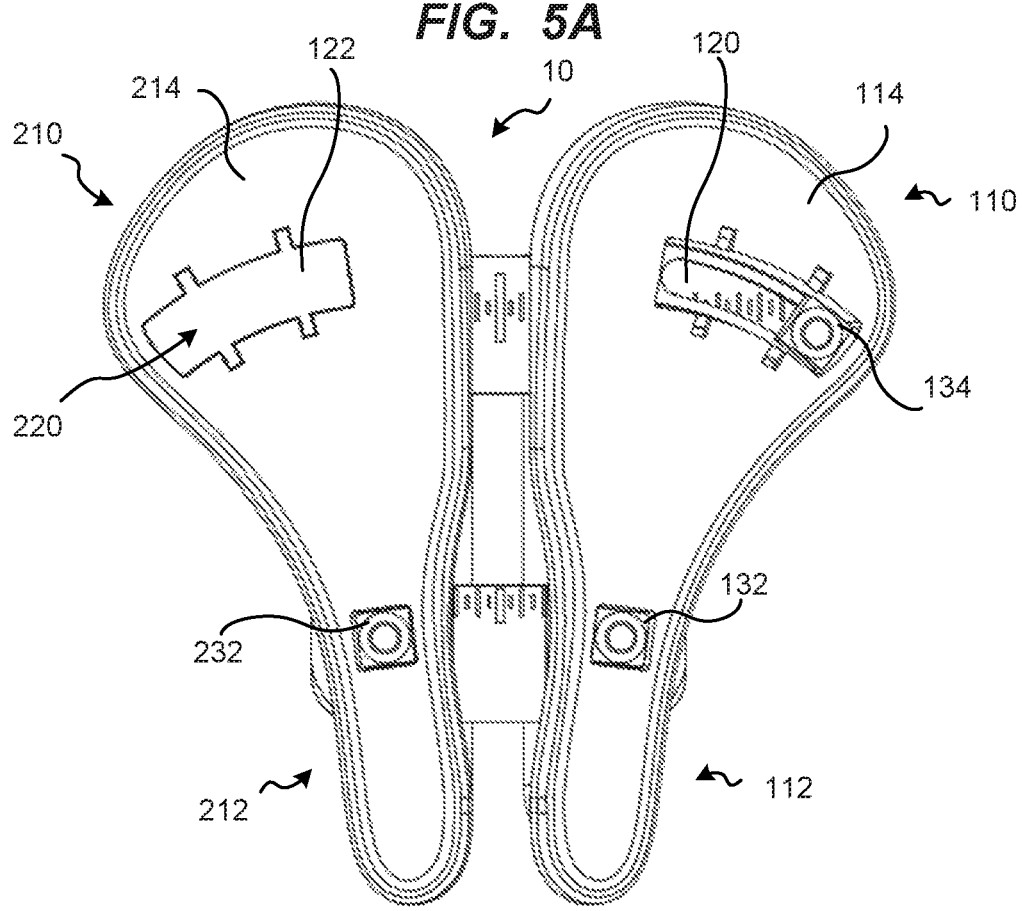
FIG. 5B illustrates a top view of the adjustable saddle of FIG. 5A.

FIGS. 3A-4B illustrate various top views of the adjustable saddle 10 in different exemplary adjustment configurations. FIG. 3A shows the adjustable saddle 10 with the back ends 103, 203 of the saddle halves 100, 200 adjusted close together and the front ends 101, 201 of the saddle halves 100, 200 adjusted close together. FIG. 3B shows the adjustable saddle 10 with the back ends 103, 203 of the saddle halves 100, 200 adjusted far apart from each other and the front ends 101, 201 of the saddle halves 100, 200 adjusted close together. FIG. 4A shows the adjustable saddle 10 with the back ends 103, 203 of the saddle halves 100, 200 adjusted far apart from each other and the front ends 101, 201 of the saddle halves 100, 200 adjusted far apart from each other. FIG. 4B shows the adjustable saddle 10 with the back ends 103, 203 of the saddle halves 100, 200 adjusted close together and the front ends 101, 201 of the saddle halves 100, 200 adjusted far apart from each other. The non-limiting exemplary adjustment configurations shown in FIGS. 3A-4B are for illustration purposes only and it will be understood that the back ends 103, 203 of the saddle halves 100, 200 can assume an infinite number of different positions throughout their adjustment range, and likewise the front ends 101, 201 of the saddle halves 100, 200 can also assume an infinite number of positions throughout their adjustment range. It will also be understood that the size and shape of any of the components of the chassis 300 and the saddle halves 100, 200 may be varied to achieve any saddle half 100, 200 adjustment range/span. For example, the size and shape of the chassis 300 components may be varied to achieve adjustment ranges/spans, including but not limited to: 0-10 cm, 0-15 cm, 0-30 cm, 5-15 cm, 10-20 cm, 15-30 cm, etc.

A wedge tool (not shown) may also be used to help facilitate adjustment of the front ends 101, 201 and the back ends 103, 203 of the saddle halves 100, 200 relative to each other. For example, the wedge tool may have a wedge shape that may be inserted or pressed in between the front ends 101, 201 and/or the back ends 103, 203 of the saddle halves 100, 200. The wedge tool may controllably split apart the saddle halves 100, 200 to achieve a desired spread distance and/or provide one or more reference adjustment angles for the saddle halves 100, 200 during setup of the adjustable saddle 10. In this manner, the wedge tool may be used to help facilitate positional adjustment of the saddle halves 100, 200.

FIGS. 5A-6B show various views of the adjustable saddle 10 with the foam padding and seat covers removed illustrating a first saddle half base 114 and a second saddle half base 214 corresponding to each saddle half 100, 200. The first and second saddle half bases 114, 214 may be formed of one or more rigid materials, including but not limited to: plastics, metals, carbon fiber, Zytel®, composite materials, or the like.

The first and second saddle half bases 114, 214 may include apertures 130, 230 formed in the front ends 112, 212 of the first and second saddle half bases 114, 214. The apertures 130, 230 may be configured to retain and/or couple to suitable retainer nuts placed within the apertures 130, 230. The retainer nuts 132, 232 may be further configured to receive the first and second fasteners 301, 302 by any suitable method, such as complementary threading. In another embodiment (not shown), the apertures 130, 230 formed in the front ends 112, 212 of the first and second saddle half bases 114, 214 may also include angled slots to increase the range of pivotal and/or translational movement of the front ends 112, 212 of the first and second saddle half bases 114, 214.

The first and second saddle half bases 114, 214 may further include a first arcuate adjustment channel 120 and a second arcuate adjustment channel 220 formed in the back ends 110, 210 of the first and second saddle half bases 114, 214. The first arcuate adjustment channel 120 may be configured to receive the third fastener 303 therein. The first saddle half base 114 may be slidably positionable relative to the third fastener 303 positioned within the first arcuate adjustment channel 120 to allow pivotal attachment of the back end 110 of the first saddle half base 114 relative to the rear mounting bracket 330. Likewise, the second arcuate adjustment channel 220 may be configured to receive the fourth fastener 304 therein. The second saddle half base 214 may be slidably positionable relative to the fourth fastener 304 positioned within the second arcuate adjustment channel 220 to allow pivotal attachment of the back end 210 of the second saddle half base 214 to the rear mounting bracket 330.

The first and second arcuate adjustment channels 120, 220 may be configured to retain and/or couple to suitable retainer nuts 134 placed within the arcuate adjustment channels 120, 220. The retainer nuts 134 may be further configured to receive the third and fourth fasteners 303, 304 by any suitable method, such as complementary threading. The first and second arcuate adjustment channels 120, 220 may also be covered with inserts 122 to support and protect foam padding placed on top of the first and second saddle half bases 114, 214.

Figure 6A:
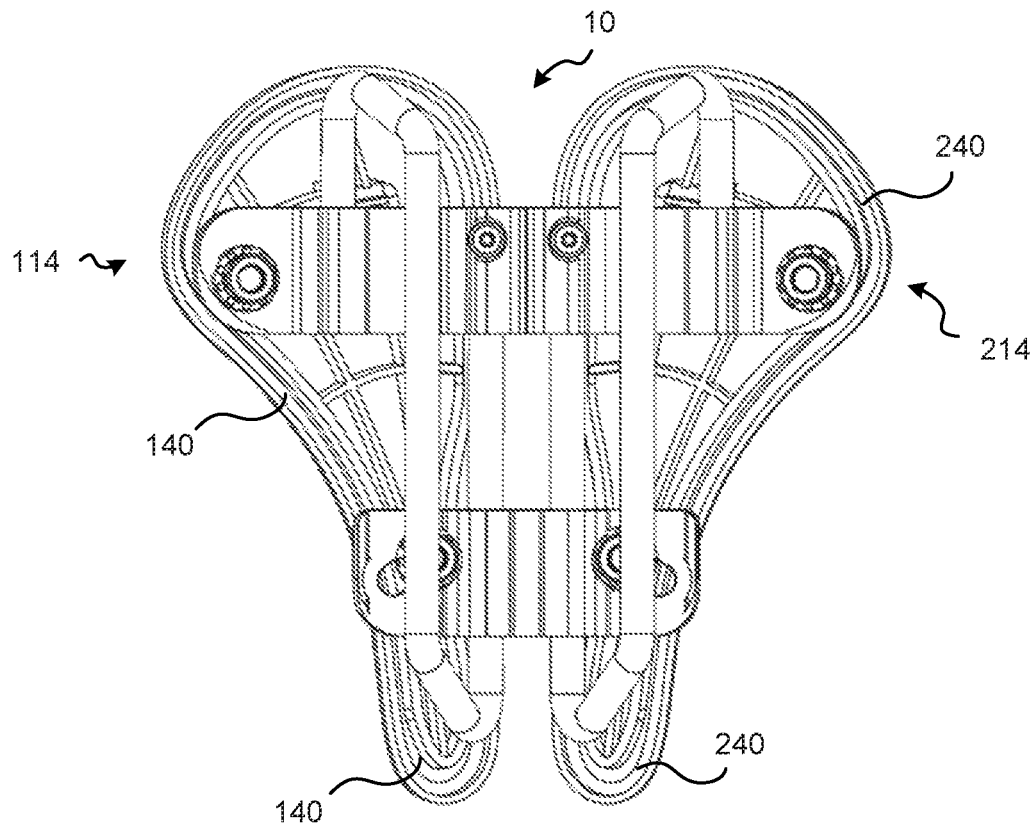
FIG. 6A illustrates a bottom view of the adjustable saddle of FIG. 5A.

FIG. 6A illustrates a bottom view of the adjustable saddle 10 without seat covers or foam padding. The first and second saddle half bases 114, 214 may include grooves 140, 240 formed around the bottom edge of each saddle half base 114, 214 that may be configured to facilitate coupling of the seat covers 102, 202 and/or their cords (not shown) to the first and second saddle half bases 114, 214 to help hold the seat covers 102, 202 in place.

Figure 6B:
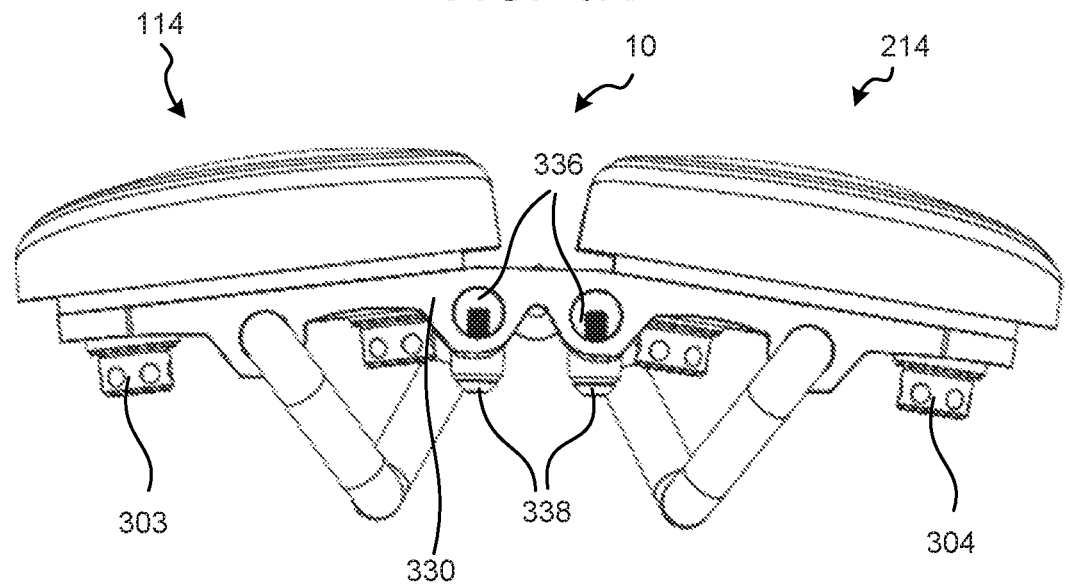
FIG. 6B illustrates a back view of the adjustable saddle of FIG. 5A.

FIG. 6B illustrates a back view of the adjustable saddle 10 without seat covers or foam padding. The rear mounting bracket 330 may include one or more rear attachment apertures 336 configured to receive one or more attachment accessories. The rear mounting bracket 330 may also include one or more attachment fasteners 338 to couple the one or more attachment accessories to the rear mounting bracket 330 and/or couple the rear mounting bracket 330 to the first and second rails 350, 370.

Figure 7A:
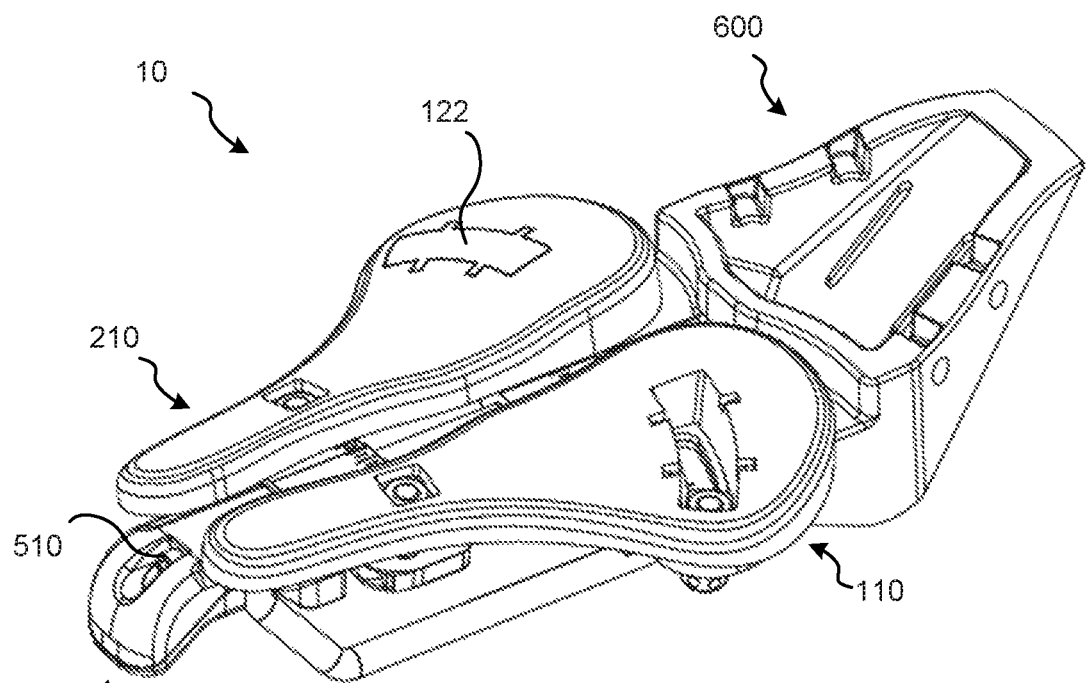
FIG. 7A illustrates a perspective view of the adjustable saddle of FIG. 5A with modular nose and rear wing piece attachments.
Figure 7B:
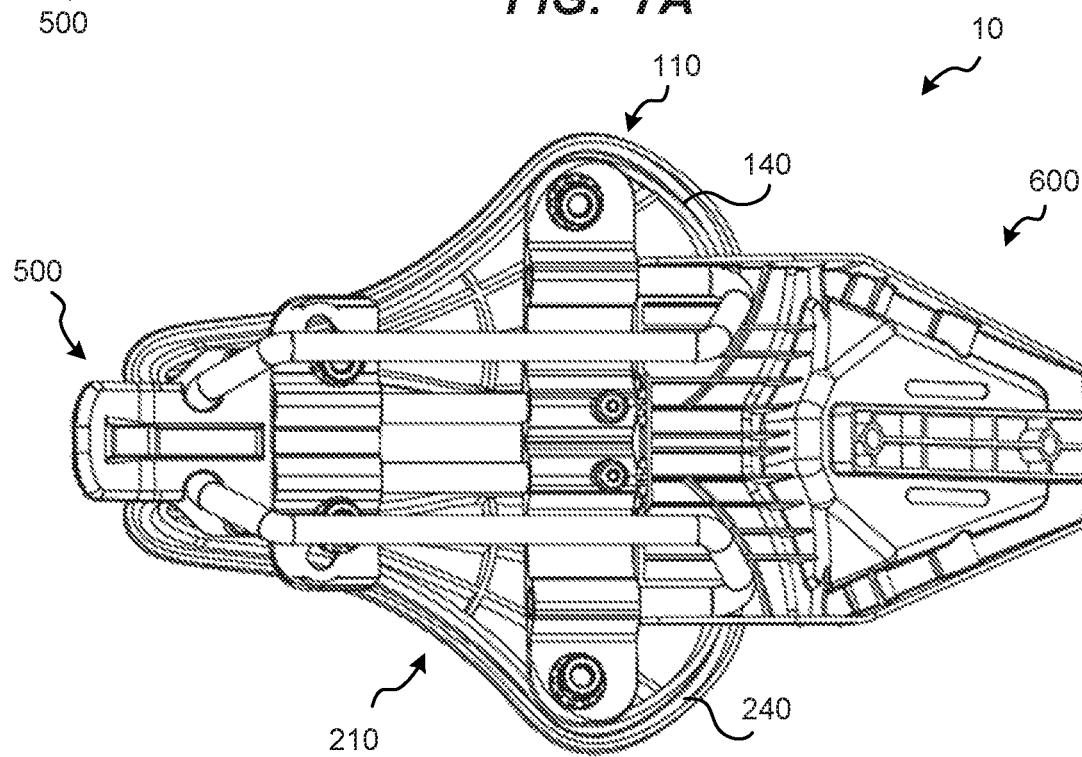
FIG. 7B illustrates a bottom view of the adjustable saddle of FIG. 7A.
Figure 8A:
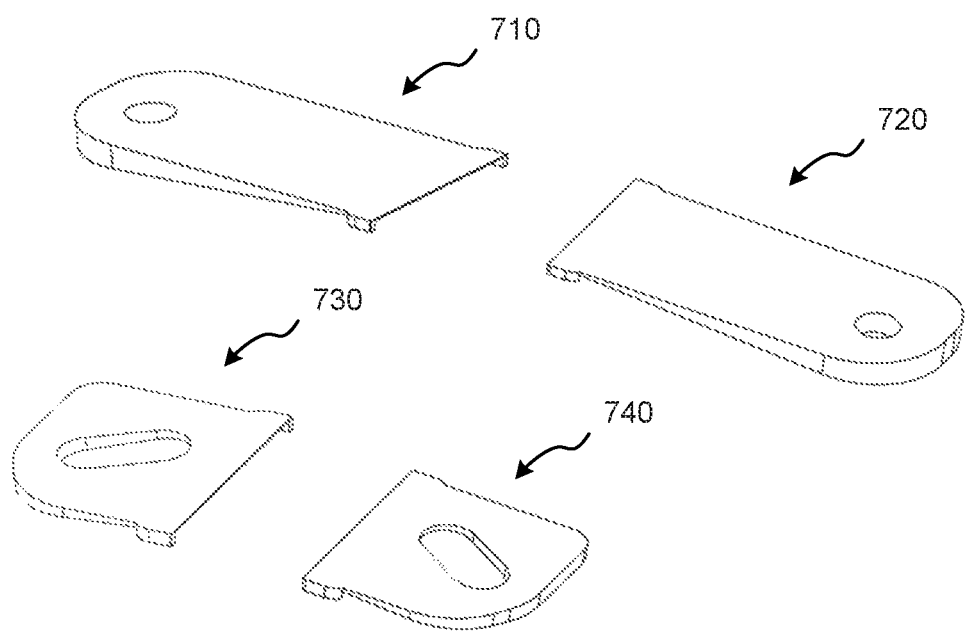
FIG. 8A illustrates a perspective view of example adjustment shims, according to one embodiment of the present disclosure.
Figure 8B:
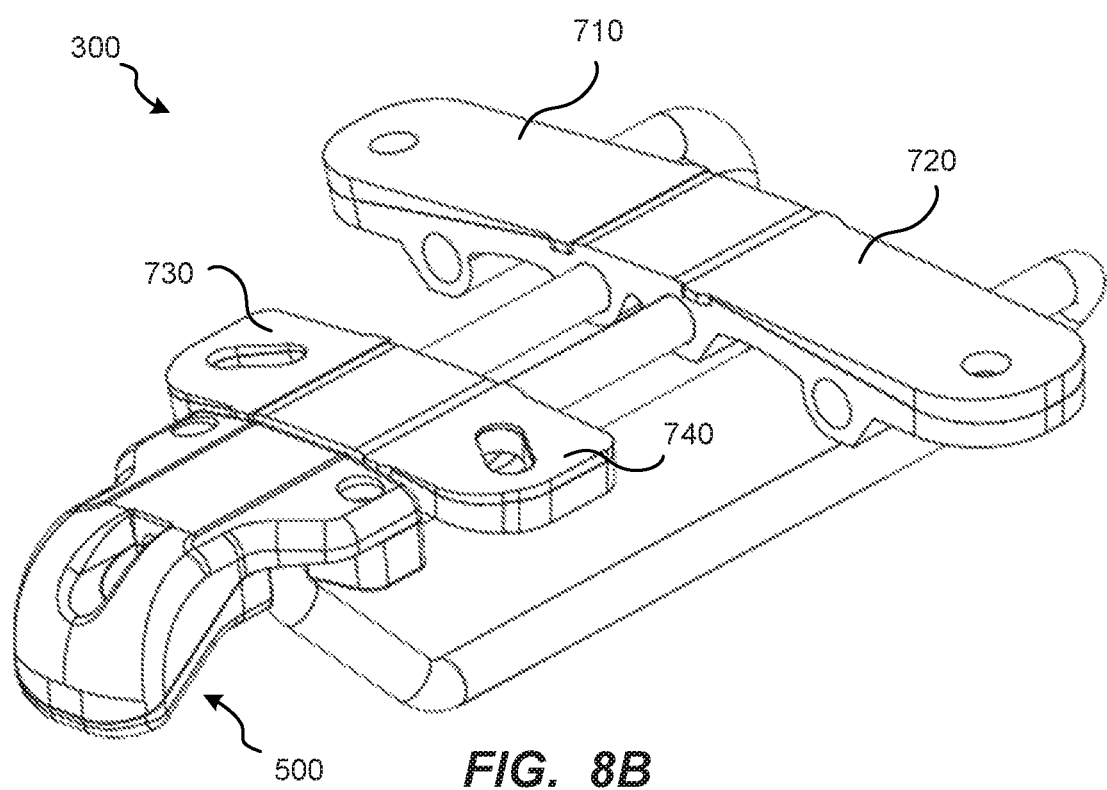
FIG. 8B illustrates a perspective view of a chassis coupled to the adjustment shims of FIG. 8A.

FIGS. 7A and 7B illustrate various views of the adjustable saddle 10 with a modular nose piece 500 attached to the front mounting bracket 310 and a rear tailpiece 600 attached to the rear mounting bracket 330. The modular nose piece 500 may act as a transition hook to hold a bike on a rail and/or facilitate transitions between different triathlon events. The modular nose piece 500 may be attached to the front mounting bracket 310 via a nose attachment screw 510 that may be threaded into the front attachment aperture 314 of the front mounting bracket 310 (see FIG. 1). The rear tailpiece 600 may include various mounting brackets for additional attachments, including but not limited to: water bottle brackets, water bottle cages, $CO_2$ cartridges, toolkits, spare parts, and the like.

FIGS. 8A-9A illustrate various adjustment shims 710, 720, 730, 740 that may be used in conjunction with any adjustable saddle of the present disclosure to adjust a height, slope, flatness, and/or angle of each saddle half base 114, 214. For example, at least one adjustment shim 710, 720, 730, 740 may be placed between at least one of the front and rear mounting brackets 310, 330 and at least one of the first and second saddle half bases 114, 214 to adjust the height, slope, flatness, and/or angle associated with the at least one of the first and second saddle half bases 114, 214. In this manner, adjustment shims 710, 720, 730, 740 of varying angles may be used to adjust the side-to-side angle, or "flatness," of each saddle half base 114, 214. The adjustment shims 710, 720, 730, 740 may remain installed on the adjustable saddle to raise the front or the back of the adjustable saddle in place of, or in addition to, the use of a seat post mount to raise the front or the back of the adjustable saddle. The length of any fasteners used to fasten the saddle half bases 114, 214 to the chassis may also be adjusted to accommodate a particular thickness of a given adjustment shim 710, 720, 730, 740. In at least one embodiment, adjustable screws (not shown) may also be utilized to provide additional angle adjustments between each saddle half base 114, 214 and the front and/or rear mounting brackets 310, 330 that each saddle half base 114, 214 rests on.

Moreover, any number or combination of adjustment shims 710, 720, 730, 740 may be used in any desired configuration to individually adjust the height, forward/backward angle, flatness, and side-to-side slope of each saddle half base 114, 214. In this manner, an individual may achieve any desired height, forward/backward angle, flatness, and side-to-side slope for each saddle half base 114, 214 and thereby achieve complete customization of a given adjustable saddle. Moreover, the width, length, slope, flatness, and shape of the front and rear mounting brackets 310, 330 themselves may also be varied to individually adjust the height, forward/backward angle, flatness, and side-to-side slope of each saddle half base 114, 214.

Figure 9A:
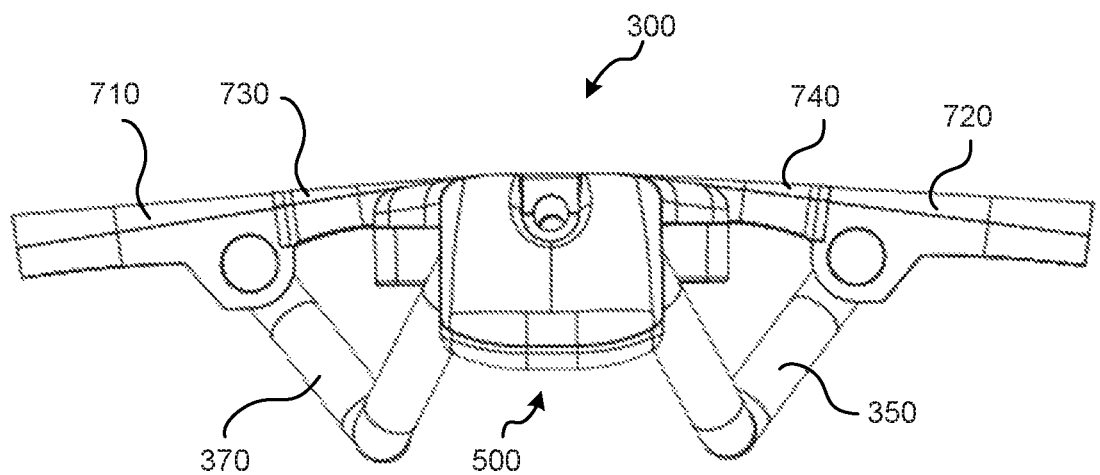
FIG. 9A illustrates a front view of the chassis of FIG. 8B.
Figure 9B:
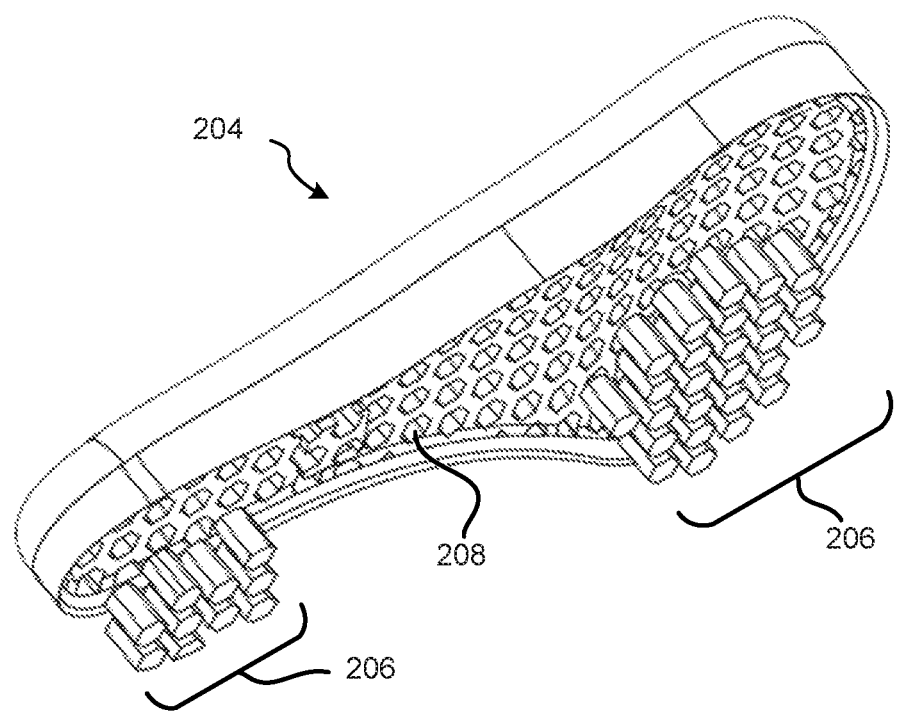
FIG. 9B illustrates a perspective view of example foam padding, according to one embodiment of the present disclosure.

FIG. 9B illustrates foam padding 204, as one non-limiting example, that may be used with any adjustable saddle of the present disclosure. The foam padding 204 material may be made to specification to achieve any desired firmness or softness. The foam padding 204 may also be varied in shape and thickness. In the embodiment shown in FIG. 9B, the foam padding 204 may include a plurality of honeycomb shaped apertures 208 and corresponding honeycomb shaped foam plugs 206. The firmness of the foam padding 204 may be fine-tuned by inserting the honeycomb shaped foam plugs 206 into the honeycomb shaped apertures 208 to achieve extra firmness in selected areas. This may allow a rider to fine tune the foam padding 204 based on advanced pressure mapping techniques to achieve a customized firmness/softness profile, avoid "hot-spots," and reduce weight by only utilizing the honeycomb shaped foam plugs 206 where they are needed.

In other embodiments (not shown), the foam padding 204 may include any suitable shape of foam plugs and/or apertures including, but not be limited to: square, rectangular, round, circular, triangular, oval, hexagonal, octagonal, block, box, spherical, cylindrical, pyramidal, trapezoidal, and the like.

It will be understood that the adjustable saddles described herein may be completely modular in nature. Thus, any of the individual parts, components, or accessories described herein may be available in a number of different colors, sizes, shapes, materials, etc., and may be mixed and matched in many different combinations to suit a particular preference. For example, differently shaped saddle half bases 114, 214 (not shown) may include a higher surface on their the back ends 110, 210 to accommodate individuals with medical conditions or individual who prefer a higher back surface to help keep their sit bones from sliding backward in the adjustable saddle 10 as they ride. In some embodiments, kits may be sold to entities (e.g., bike shops) which may include a plurality of different parts, components, and accessories of various different colors, sizes, shapes, materials, etc. The entity may utilize the components in the kit to build customized adjustable saddles according to the preferences of a given individual. Moreover, each saddle half 100, 200 may be quickly removed and swapped out for a different saddle while the chassis 300 remains mounted to the seat post 400. This allows the individual to quickly install new saddle halves with different colors, sizes, shapes, materials, etc.

Figure 10:
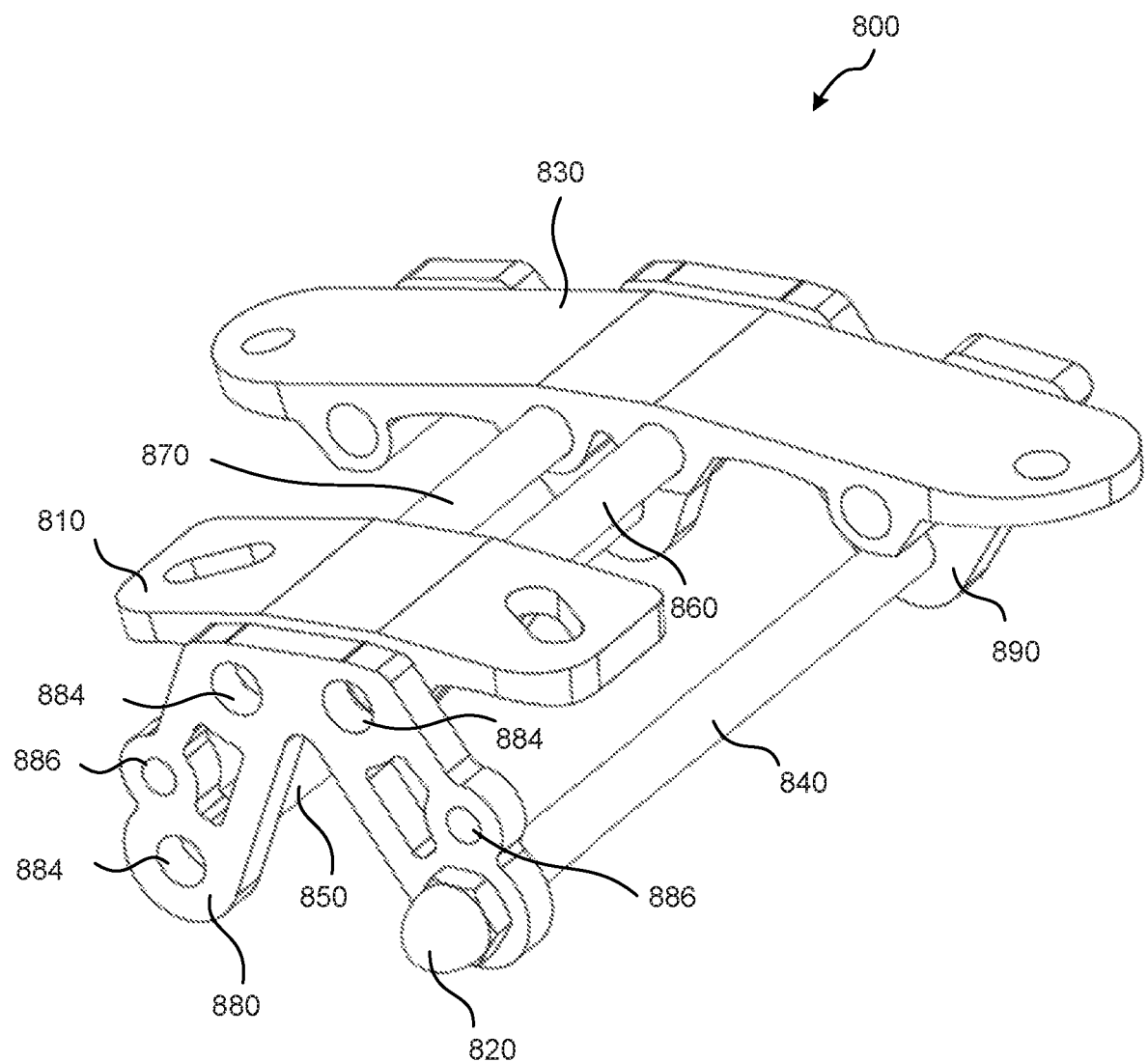
FIG. 10 illustrates a perspective view of a chassis, according to another embodiment of the present disclosure.
Figure 11A:
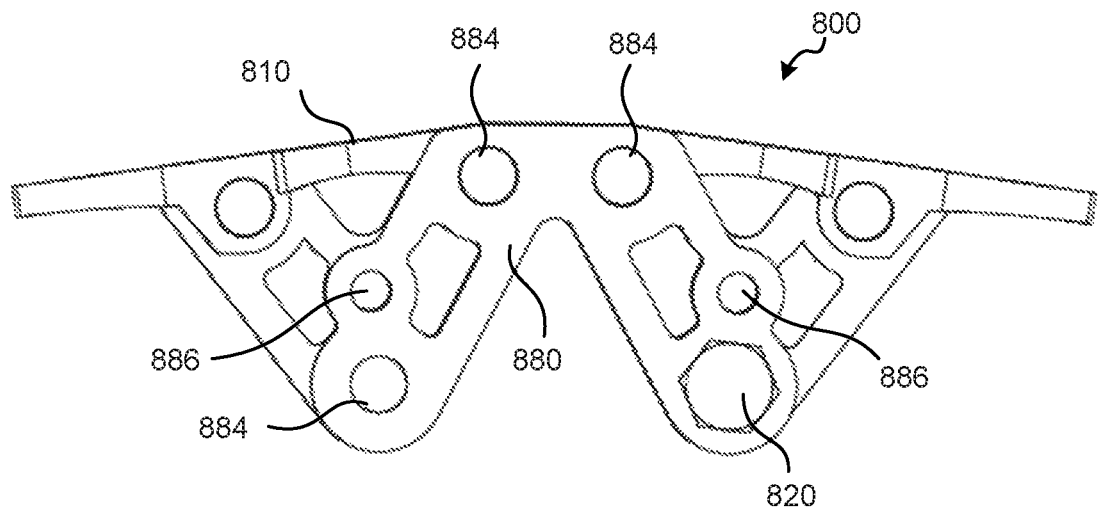
FIG. 11A illustrates a front view of the chassis of FIG. 10.
Figure 11B:
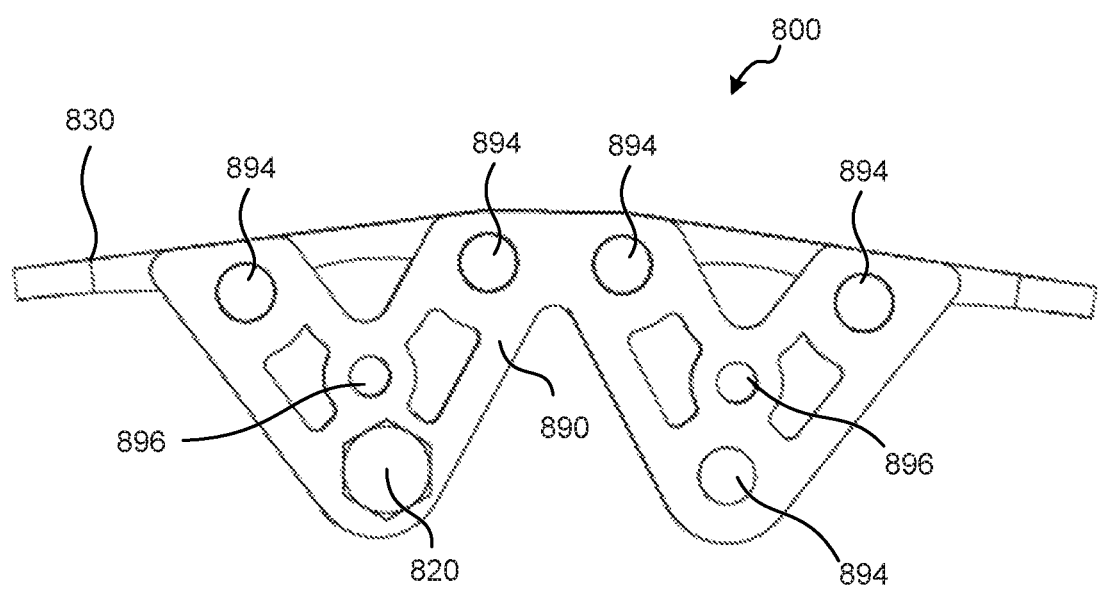
FIG. 11B illustrates a back view of the chassis of FIG. 10.

FIGS. 10-11B illustrate various views of a chassis 800, according to another embodiment of the present disclosure. The chassis 800 may generally include a front mounting bracket 810, a rear mounting bracket 830, a first lower rail 840, a second lower rail 850, a first upper rail 860, a second upper rail 870, a front rail bracket 880, and a back rail bracket 890. The front mounting bracket 810 and/or the rear mounting bracket 830 may be slidably attached to the first and second upper rails 860, 870 and/or held in place along the first and second upper rails 860, 870 by any suitable method such as frictional forces, retainer screws, and the like.

The first and second upper and lower rails 840, 850, 860, 870, front and back rail brackets 880, 890, and front and rear mounting brackets 810, 830 may be formed from any suitable material, or combination of materials including, but not limited to: metals, metal alloys, anodized metals and alloys, steel, titanium, composite materials, carbon fiber, plastic materials, Zytel®, rubber materials, and the like.

In the embodiment shown in FIGS. 10-11B, the first and second upper rails 860, 870 and the first and second lower rails 840, 850 may generally be straight and have cylindrical shapes. However, in other embodiments the first and second upper and lower rails 840, 850, 860, 870 may be curved and/or have non-cylindrical shapes. Any or all of the first and second upper and lower rails 840, 850, 860, 870 may be varied in length to adjust the overall length of the chassis 800 to achieve any desired value. Moreover, the first and second upper and lower rails 840, 850, 860, 870 may be spaced apart from each other and/or angled with respect to each other in any manner to vary the height, forward/backward angle, and side-to-side slope of each saddle half.

The first and second upper and lower rails 840, 850, 860, 870 may be coupled to the front and back rail brackets 880, 890 by any suitable means including, but not limited to: integral formation, adhesive bonding (e.g., epoxy adhesives), detachable fasteners, quick release fasteners, and the like. In the embodiment shown in FIGS. 10-11B, the first and second upper and lower rails 840, 850, 860, 870 may be detachably coupled to the front and back rail brackets 880, 890 by one or more fasteners 820. In at least one embodiment, the one or more fasteners 820 may be mechanically threaded nuts that engage complementary threading that is coupled to, or formed on, the ends of the first and second upper and lower rails 840, 850, 860, 870 and which protrudes through one or more front rail apertures 884 formed in the front rail bracket 880 and one or more back rail apertures 894 formed in the back rail bracket 890.

The front rail bracket 880 may also include additional apertures, such as front mounting apertures 886. Likewise, the back rail bracket 890 may also include additional apertures, such as back mounting apertures 896. The front and back mounting apertures 886, 896 may be configured to receive one or more attachment accessories, as previously described herein.

The one or more front and back rail apertures 884, 894 may be spaced apart from each other and/or angled with respect to each other in any manner to vary the height, forward/backward angle, and side-to-side slope of each saddle half and/or individually vary the height, forward/backward angle, and side-to-side angle of each of each of the first and second upper and lower rails 840, 850, 860, 870.

Figure 12:
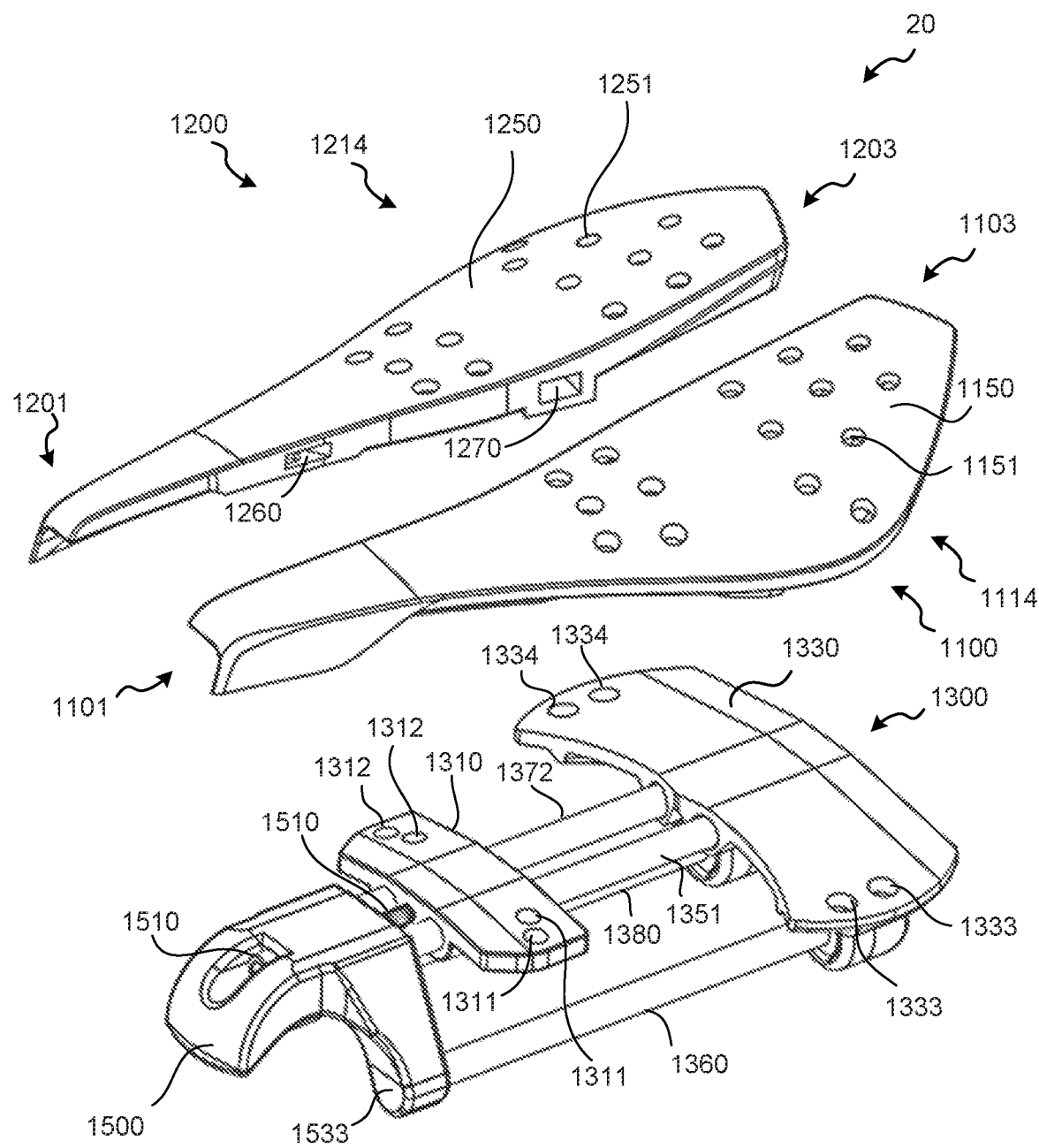
FIG. 12 illustrates an exploded view of an adjustable saddle including a chassis and two saddle half bases, according to another embodiment of the present disclosure.

FIG. 12 illustrates an exploded view of an adjustable saddle 20, according to another embodiment of the present disclosure. The adjustable saddle 20 may generally include a first saddle half 1100 including a first saddle half base 1114, a second saddle half 1200 including a second saddle half base 1214, and a chassis 1300. The first and second saddle half bases 1114, 1214 may be further covered in foam padding (not shown) and the foam padding may also be further covered with suitable seat covers (not shown) to help protect the foam padding from weathering, abrasion, and general wear. In at least one embodiment, the foam padding may be coupled to the first and second saddle half bases 1114, 1214 with a suitable adhesive and the seat covers may also be coupled to the foam padding with a suitable adhesive, as will be discussed in more detail below.

The first and second saddle half bases 1114, 1214 may be adjustably attached to the chassis 1300 via a first fastener, a second fastener, a third fastener, and a fourth fastener (not shown) in similar fashion to the adjustable saddle 10 shown in FIG. 1 and discussed previously. The first and second fasteners may be referred to as front fasteners that are configured to attach the front ends 1101, 1201 of the saddle halves 1100, 1200 to the chassis 1300. Likewise, the third and fourth fasteners may be referred to as rear fasteners configured to attach the back ends 1103, 1203 of the saddle halves 1100, 1200 to the chassis 1300.

Figure 13A:
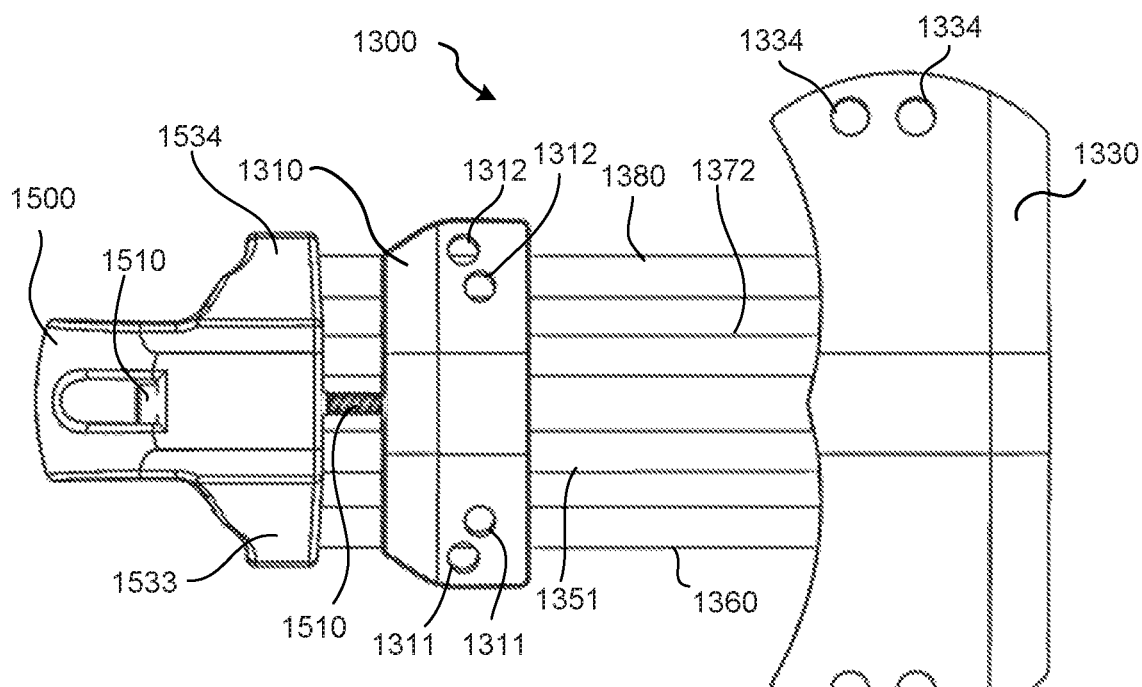
FIG. 13A illustrates a top view of the chassis shown in FIG. 12.
Figure 13B:
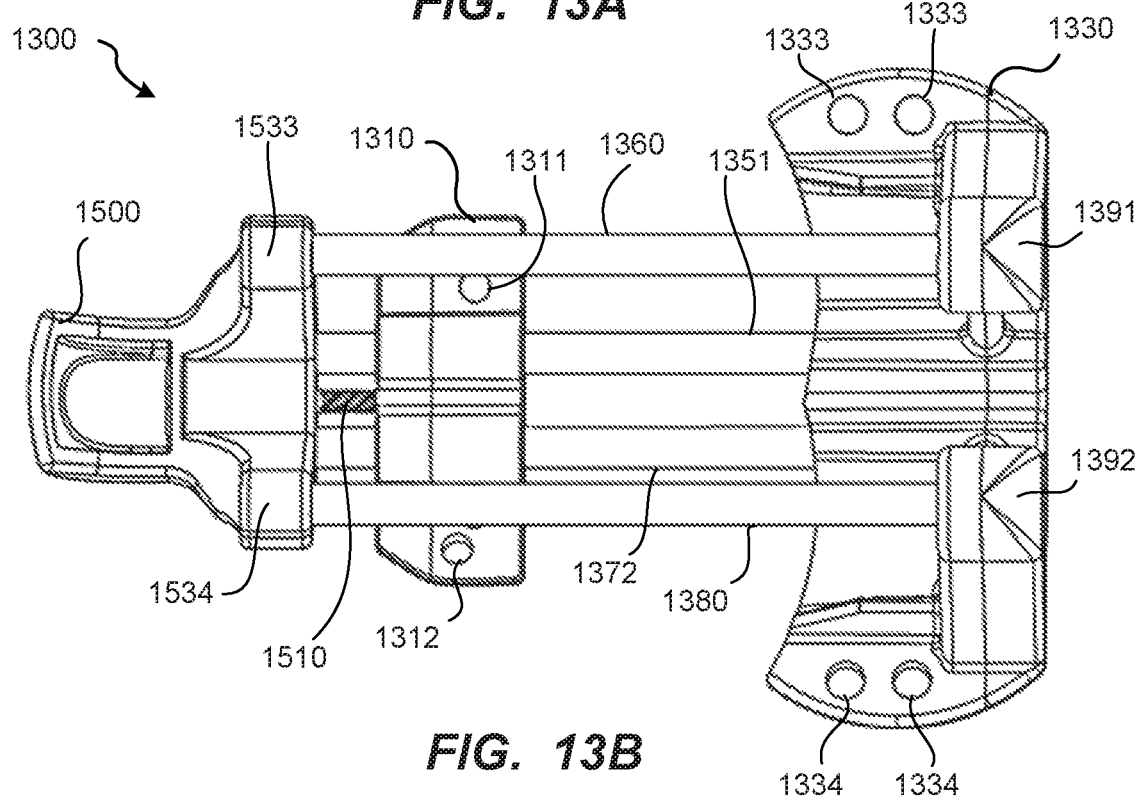
FIG. 13B illustrates a bottom view of the chassis shown in FIG. 12.
Figure 13C:
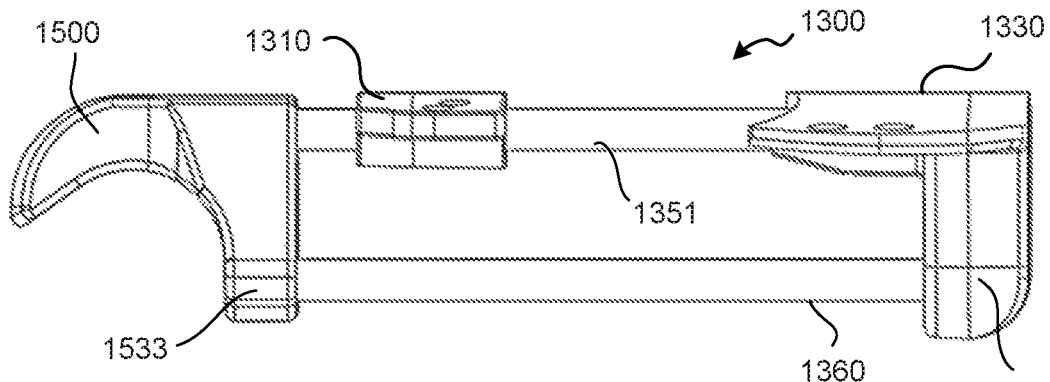
FIG. 13C illustrates a side view of the chassis shown in FIG. 12.

FIGS. 13A-13C illustrate various views of the chassis 1300 shown in FIG. 12. The chassis 1300 may generally include a nose piece 1500, a nose piece adjustment screw 1510, a front mounting bracket 1310, a rear mounting bracket 1330, a first lower rail 1360, a second lower rail 1380, a first upper rail 1351, and a second upper rail 1372.

The nose piece 1500, nose piece adjustment screw 1510, front mounting bracket 1310, rear mounting bracket 1330, first lower rail 1360, second lower rail 1380, first upper rail 1351, and second upper rail 1372 may be formed from any suitable material, or combination of materials including, but not limited to: metals, metal alloys, anodized metals and alloys, steel, titanium, composite materials, carbon fiber, plastic materials, Zytel®, rubber materials, and the like.

In at least one embodiment, the first and second upper and lower rails 1351, 1360, 1372, 1380 may generally be straight and have cylindrical shapes. However, in other embodiments (not shown) the first and second upper and lower rails 1351, 1360, 1372, 1380 may be curved and/or have non-cylindrical shapes. Any or all of the first and second upper and lower rails 1351, 1360, 1372, 1380 may be varied in length to adjust the overall length of the chassis 1300 to achieve any desired value. Moreover, the first and second upper and lower rails 1351, 1360, 1372, 1380 may be spaced apart from each other and/or angled with respect to each other in any manner to vary the height, forward/backward angle, and side-to-side slope of each saddle half. The first and second upper and lower rails 1351, 1360, 1372, 1380 may be coupled to the nose piece 1500 and the rear mounting bracket 1330 by any suitable means including, but not limited to: friction fit, integral formation, adhesive bonding (e.g., epoxy adhesives), detachable fasteners, quick release fasteners, and the like.

The front mounting bracket 1310 may include first apertures 1311 configured to receive the first fastener (not shown) to attach the front end 1101 of the first saddle half 1100 to the front mounting bracket 1310, as well as second apertures 1312 configured to receive the second fastener (not shown) to attach the front end 1201 of the second saddle half 1200 to the front mounting bracket 1310. Likewise, the rear mounting bracket 1330 may include third apertures 1333 configured to receive the third fastener (not shown) to attach the back end 1103 of the first saddle half 1100 to the rear mounting bracket 1330, as well as fourth apertures 1334 configured to receive the fourth fastener (not shown) to attach the back end 1203 of the second saddle half 1200 to the rear mounting bracket 1330.

The front mounting bracket 1310 may be slidably adjustable along the length of the first upper rail 1351 and the second upper rail 1372. This may be accomplished by turning the nose piece adjustment screw 1510 clockwise and/or counter-clockwise to adjust the translational position of the front mounting bracket 1310 relative to the rear mounting bracket 1330 along the lengths of the first upper rail 1351 and the second upper rail 1372. In this manner, any distance between the front mounting bracket 1310 and the rear mounting bracket 1330 may be achieved. However, in other embodiments (not shown), the nose piece 1500 and front mounting bracket 1310 may be integrated together in a single piece such that the front mounting bracket 1310 may not be configured to move relative to the nose piece 1500. Moreover, in other embodiments (not shown), the nose piece 1500, the front mounting bracket 1310, and/or the rear mounting bracket 1330 may be integrally formed together as a single unified bracket.

In the embodiment shown in FIGS. 12-13C, the first and second apertures 1311, 1312 may be angled relative to each other to allow pivotal and/or translational adjustment of the front ends 1101, 1201 of the saddle halves 1100, 1200. However, it will be understood that in other embodiments contemplated herein, the first and second apertures 1311, 1312 may not be angled relative to each other and any number of first and second apertures 1311, 1312 may be used. Likewise, in the embodiment shown in FIGS. 12-13C, the third and fourth apertures 1333, 1334 may or may not be angled relative to each other to allow pivotal and/or translational adjustment of the back ends 1103, 1203 of the saddle halves 1100, 1200. Furthermore, in yet other embodiments (not shown), the third and fourth apertures 1333, 1334, may also comprise angled slots to allow pivotal and translational adjustment of the back ends 1103, 1203 of the saddle halves 1100, 1200 to increase the potential range of motion of the saddle halves 1100, 1200.

Figure 14A:
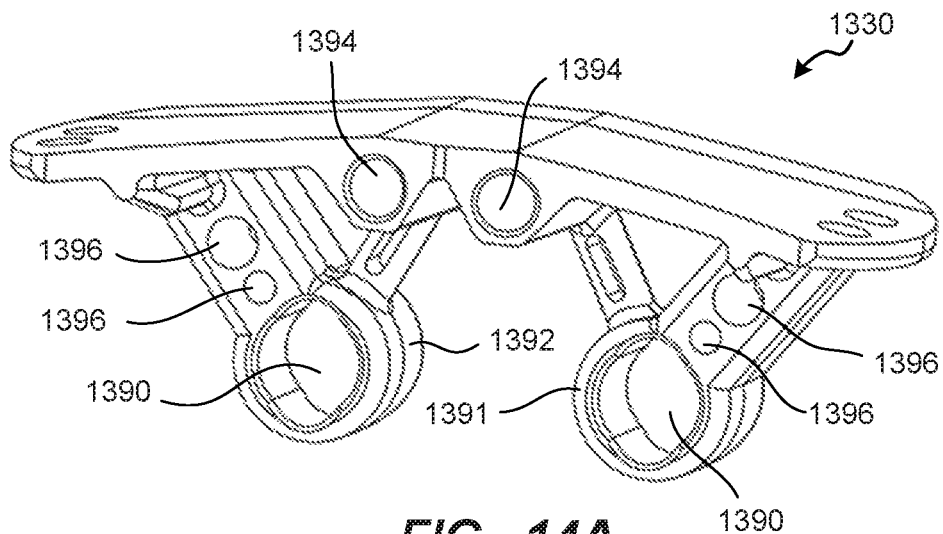
FIG. 14A illustrates a perspective front view of an example rear mounting bracket that may be used with the chassis shown in FIGS. 13A-13C.
Figure 14B:
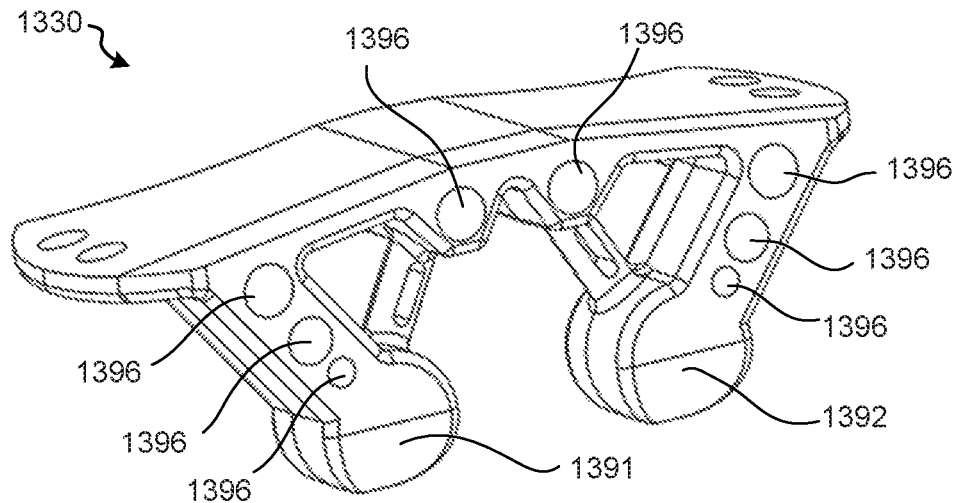
FIG. 14B illustrates a perspective rear view of the rear mounting bracket shown in FIG. 14A.

FIGS. 14A and 14B illustrate isometric front and back views of the rear mounting bracket 1330. The rear mounting bracket 1330 may include upper rail apertures 1394 configured to receive the first and second upper rails 1351, 1372 there in, as well as a first lower rail housing 1391 and a second lower rail housing 1392.

Figure 15:
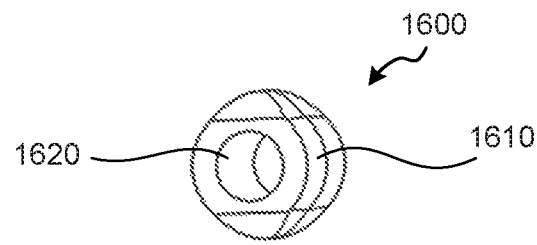
FIG. 15 illustrates a perspective view of an example flexible member that may be used with the rear mounting bracket shown in FIGS. 14A and 14B.

In at least one embodiment, each of the first lower rail housing 1391 and the second lower rail housing 1392 may further include flexible member chambers 1390 each configured to receive a first flexible member 1600 and a second flexible member 1600 therein (see FIG. 15). The flexible members 1600 may include an outer surface 1610 configured to engage an inner surface of the first or second lower rail housings 1391, 1392 as well as an aperture 1620 configured to engage one of the first and second lower rails 1360, 1380 therein. In at least one embodiment, the flexible members 1600 may be made of a flexible material (e.g., thermoplastic elastomer) which may provide shock absorption characteristics to the adjustable saddle 20, isolate the adjustable saddle 20 from road vibrations, and/or provide a "side-to-side" pivot motion of the adjustable saddle 20 as the rider pedals the bicycle. However, it will be understood that in other embodiments, the flexible members 1600 may also be made of rigid materials, so as to preclude shock absorption, isolation from road vibrations, and/or a "side-to-side" pivot/rocking motion as the rider pedals the bicycle. It will also be understood that the flexible members 1600 may be made of any material suitable to achieve a desired degree of resilience in order to fine tune the amount of "side-to-side" pivot/rocking motion and/or shock absorption properties imparted to the adjustable saddle, based on a durometer property of the material. This rocking movement allows a cyclist to perform a physiologically correct pedaling motion. As the pelvis has the freedom to move with the natural pedaling motion, discomfort or pain in the back, hips and pelvis may be reduced and pedaling may be more natural and comfortable. The rocking motion may adapt for differences in hip flexibility and skeletal geometry for a given rider. This dynamic saddle design may also compensate for discrepancies such as different leg lengths. The rocking motion may also allow for continuous change and variation in sitting positions reducing pain and discomfort. This dynamic motion may also help the spinal discs of the rider to align providing a more symmetrical load.

The rear mounting bracket 1330 may also include one or more rear attachment apertures 1396 configured to receive one or more attachment accessories, as discussed previously. In this manner, one or more rear tailpieces may be provided with various different styles of mounting brackets for additional attachments, including but not limited to: water bottle brackets, water bottle cages, $CO_2$ cartridges, toolkits, spare parts, and the like. The rear mounting bracket 1330 may also include one or more attachment fasteners (not shown) to help couple the one or more attachment accessories to the rear mounting bracket 1330 and/or help couple the rear mounting bracket 1330 to the first upper rail 1351 and the second upper rail 1372.

Figure 16A:
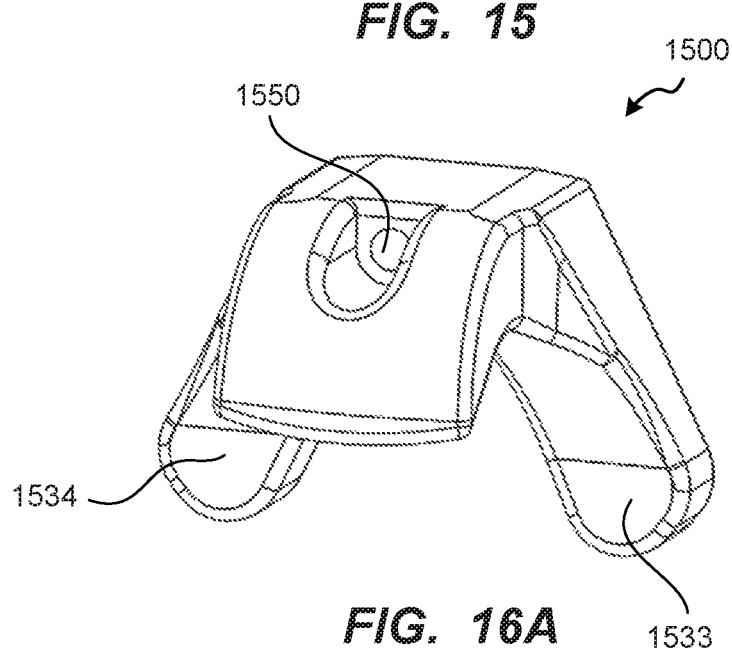
FIG. 16A illustrates a perspective front view of an example front mounting bracket that may be used with the chassis shown in FIGS. 13A-13C.
Figure 16B:
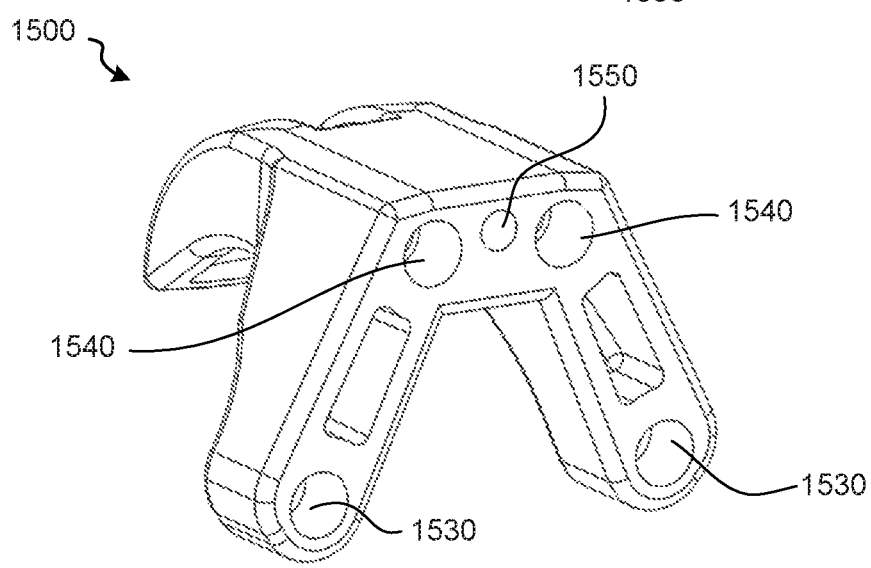
FIG. 16B illustrates a perspective rear view of the front mounting bracket shown in FIG. 16A.

FIGS. 16A and 16B illustrate isometric front and rear views of the nose piece 1500. The nose piece 1500 may be shaped to act as a transition hook to hold a bike on a rail and/or facilitate transitions between different triathlon events. As can be seen in FIGS. 12-13C, the nose piece 1500 may be attached to the front mounting bracket 1310 via a nose piece adjustment screw 1510 which may pass through an attachment aperture 1550 formed in the front mounting bracket 1310. The nose piece 1500 may also include upper rail apertures 1540 configured to receive the first and second upper rails 1351, 1372 therein, as well as a third lower rail housing 1533 and a second lower rail housing 1534 with lower rail apertures 1530 formed therein and configured to receive the first and second lower rails 1360, 1380. In at least one embodiment (not shown), the third lower rail housing 1533 and the second lower rail housing 1534 may also be configured to house flexible members to further provide shock absorption characteristics to the adjustable saddle 20, isolate the adjustable saddle 20 from road vibrations, and/or provide a "side-to-side" pivot motion of the adjustable saddle 20 as the rider pedals the bicycle.

Figure 17:
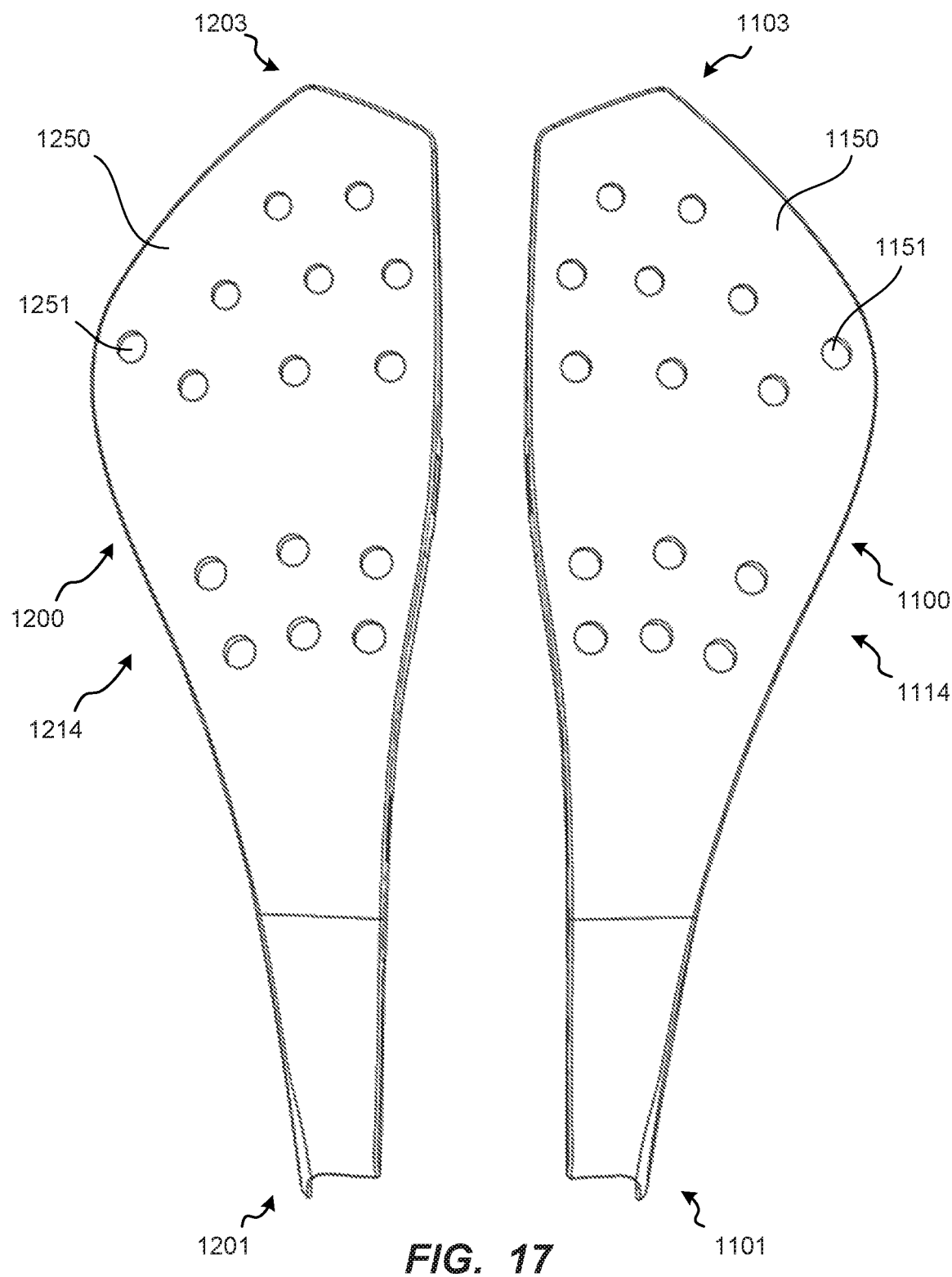
FIG. 17 illustrates a top view of the saddle half bases shown in FIG. 12.
Figure 18:
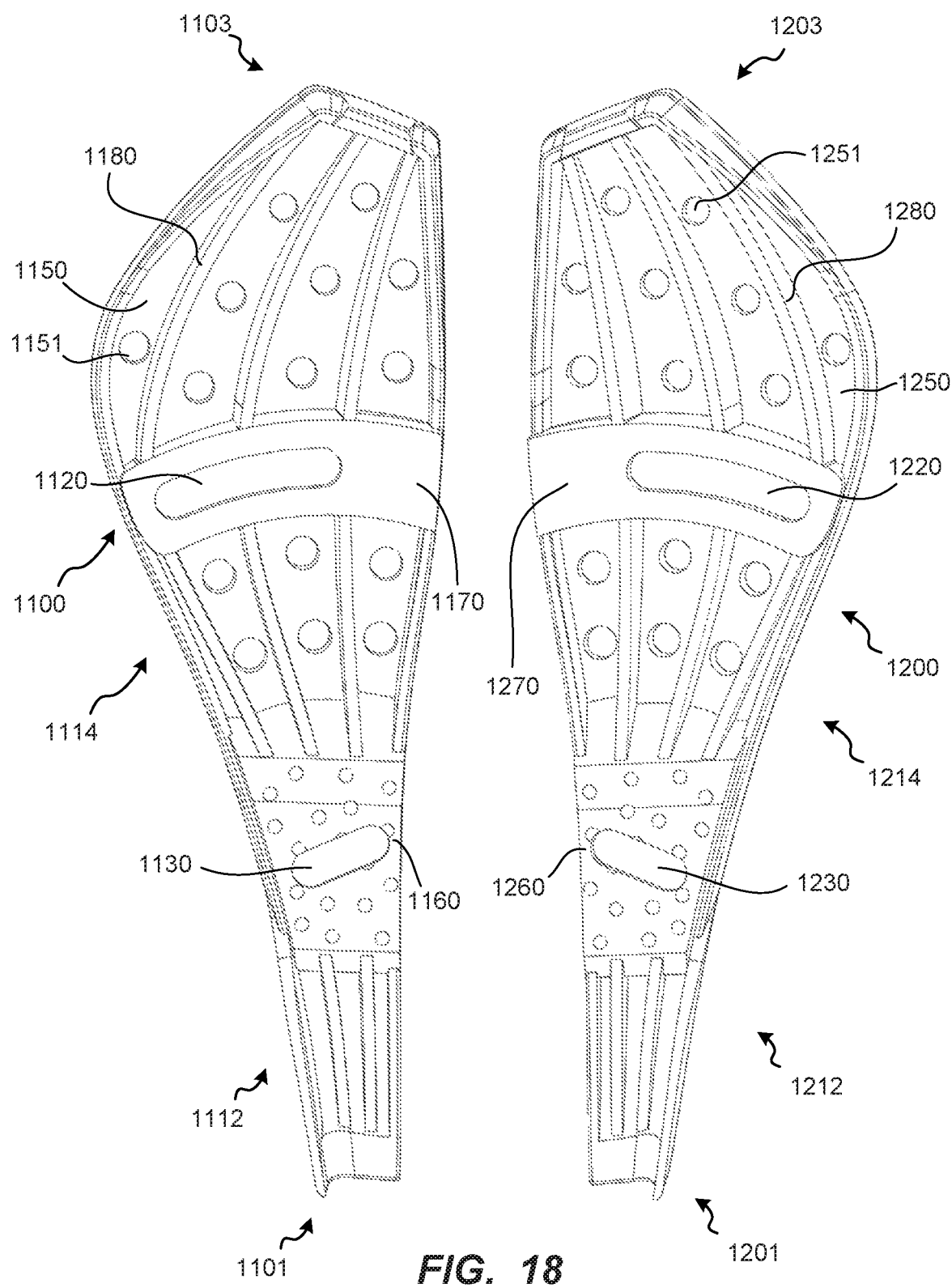
FIG. 18 illustrates a bottom view of the saddle half bases shown in FIG. 12.

FIGS. 17 and 18 show top and bottom views of the first saddle half base 1114 and the second saddle half base 1214, corresponding to each saddle half 1100, 1200, with foam padding and seat covers removed. The first and second saddle half bases 1114, 1214 may be formed of one or more rigid materials, including but not limited to: plastics, metals, carbon fiber, Zytel®, composite materials, or the like.

The first and second saddle half bases 1114, 1214 may include a first aperture 1130 and a second aperture 1230 formed in the front ends 1112, 1212 of the first and second saddle half bases 1114, 1214. In at least one embodiment, the first and second apertures 1130, 1230 may be angled slots allowing pivotal and/or translational adjustment of the front ends 1101, 1201 of the saddle halves 1100, 1200 relative to the front mounting bracket 1310. The apertures 1130, 1230 may include front retainer housings 1160, 1260 configured to retain and/or couple to suitable retainer nuts (not shown) that may be placed within the front retainer housings 1160, 1260. The retainer nuts may be configured to receive the first and second fasteners through the first and second apertures 1130, 1230 and couple to the first and second fasteners by any suitable method, such as complementary threading.

The first and second saddle half bases 1114, 1214 may further include a first arcuate adjustment channel 1120 and a second arcuate adjustment channel 1220 formed in the back ends of the first and second saddle half bases 1114, 1214. The first arcuate adjustment channel 1120 may be configured to receive the third fastener and the second arcuate adjustment channel 1220 may be configured to receive the fourth fastener. The first saddle half base 1114 may be slidably positionable relative to the third fastener positioned within the first arcuate adjustment channel 1120 to allow pivotal attachment of the back end of the first saddle half base 1114 relative to the rear mounting bracket 1330. Likewise, the second saddle half base 1214 may be slidably positionable relative to the fourth fastener positioned within the second arcuate adjustment channel 1220 to allow pivotal attachment of the back end 210 of the second saddle half base 1214 relative to the rear mounting bracket 1330. The first and second arcuate adjustment channels 1120, 1220 include rear retainer housings 1170, 1270 which may be configured to retain and/or couple to suitable retainer nuts (not shown) placed within the rear retainer housings 1170, 1270. The retainer nuts may be configured to receive the third and fourth fasteners through the first and second arcuate adjustment channels 1120, 1220 and couple to the third and fourth fasteners by any suitable method, such as complementary threading.

The first and second saddle half bases 1114, 1214 may include a plurality of longitudinal ribs 1180, 1280 that are configured to provide rigid support for the rider's weight. The first and second saddle half bases 1114, 1214 may also include a first skin 1150 and a second skin 1250 that cover the plurality of longitudinal ribs 1180, 1280. In at least one embodiment, the first and second skins 1150, 1250 may be made of a rigid material (e.g., plastic) and may be removably couplable to the plurality of longitudinal ribs 1180, 1280. For example, the first and second skins 1150, 1250 may be removably couplable to the plurality of longitudinal ribs 1180, 1280 via one or more snap features (not shown) that are configured to couple the first and second skins 1150, 1250 to the first and second saddle half bases 1114, 1214. However, in other embodiments, the first and second skins 1150, 1250 may be integrally formed with and/or coupled to the plurality of longitudinal ribs 1180, 1280. The first and second skins 1150, 1250 may also include one or more apertures 1151, 1251 formed in the surfaces of the first and second skins 1150, 1250. A first foam padding and a second padding (not shown) may also be coupled to the first and second skins 1150, 1250 respectively by any suitable means (e.g., adhesive). Moreover, the first foam padding and the second padding foam padding may be further covered by a first seat cover and a second seat cover. In this manner, the rider may easily and quickly customize his or her adjustable saddle 20 by simply removing the first and second skins 1150, 1250 with their corresponding foam paddings and seat covers and then replacing them with different first and second skins 1150, 1250 of their choice. This allows the rider to select an adjustable saddle configuration with first and second skins 1150, 1250 that can have any color, size, shape, material, etc.

Figure 19A:
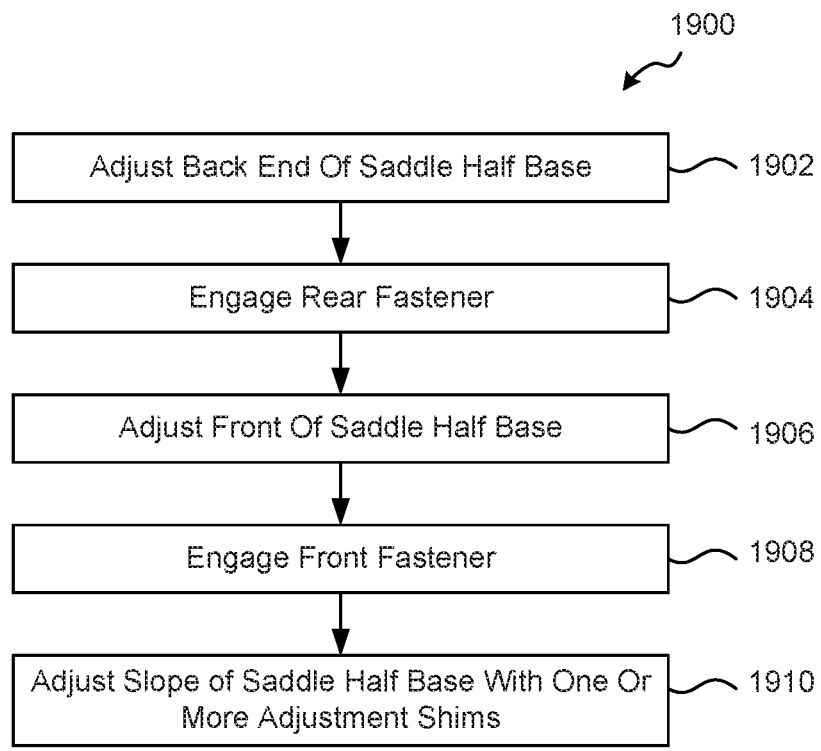
FIG. 19A is a flowchart illustrating a method of adjusting the adjustable saddles of the present disclosure.

FIG. 19A illustrates a flowchart of a method 1900 by which adjustable saddles of the present disclosure may be adjusted. The method 1900 may begin with a step 1902 in which a back end of a saddle half base may be adjusted. In this step, a back end of at least one saddle half base may be slidably, translationally, and/or pivotally positioned relative to a rear mounting bracket. The at least one saddle half base may have a back end with an arcuate adjustment channel formed therein which may be configured to receive a rear fastener. Additionally, in at least one embodiment, the rear mounting bracket may include multiple apertures configured to receive the rear fastener. In this manner, the back end of the at least one saddle half base may be attached to the rear mounting bracket at different locations along the rear mounting bracket to positionally translate the least one saddle half base relative to the rear mounting bracket.

Once the back end of the at least one saddle half base has been adjusted to a desired position, the method 1900 may proceed to a step 1904 in which the rear fastener may be engaged to prevent the back end of the at least one saddle half base from moving relative to the rear mounting bracket.

Once the back end of the at least one saddle half base has been adjusted and fastened in place, the method 1900 may proceed to a step 1906 in which a front end of the at least one saddle half base may be adjusted. In this step, the front end of the at least one saddle half base may be slidably, translationally, and/or pivotally positioned relative to a front mounting bracket. In at least one embodiment, the front mounting bracket may include at least one angled slot formed therein configured to receive a front fastener. In other embodiments, the front mounting bracket may include multiple apertures formed therein and configured to receive the front fastener and the at least one saddle half base may include at least one angled slot formed therein configured to receive the front fastener.

Once the front end of the at least one saddle half base has been adjusted to a desired position, the method 1900 may proceed to a step 1908 in which the front fastener may be engaged to prevent the front end of the at least one saddle half base from sliding relative to the front mounting bracket.

Alternatively, or in addition thereto, the method 1900 may include a step 1910 in which a height, angle, side-to side flatness, and/or front-to-back slope of the at least one saddle half base may be adjusted with one or more adjustment shims. The one or more adjustment shims may be used in conjunction with a chassis of the adjustable saddle to adjust the height, angle, side-to side flatness, and/or front-to-back slope of the at least one saddle half base. For example, at least one adjustment shim may be placed between at least one of the front and rear mounting brackets and the at least one saddle half base to adjust the height, angle, side-to side flatness, and/or front-to-back slope of the at least one saddle half base. In this step, any number or combination of adjustment shims may be used in any desired configuration to individually adjust the height, angle, side-to side flatness, and/or front-to-back slope of the at least one saddle half base.

Figure 19B:
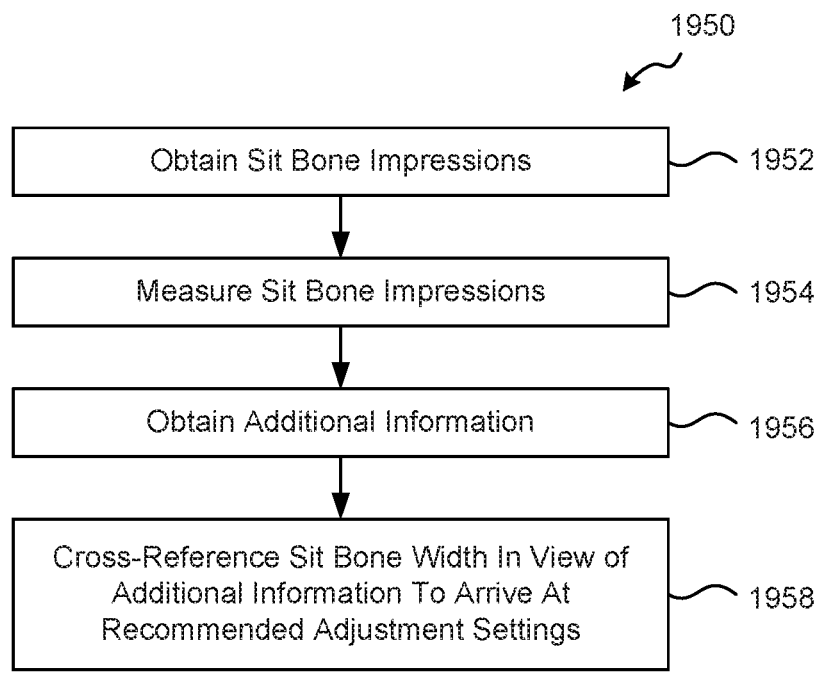
FIG. 19B is a flowchart illustrating a method of obtaining recommended adjustment settings for an individual.

FIG. 19B illustrates a flowchart of a method 1950 by which recommended adjustment settings for an individual may be obtained to facilitate an adjustment process. The method 1950 may begin with a step 1952 in which sit bone impressions may be obtained for an individual. The sit bone impressions may be obtained by seating the individual on top of a compressible material to form the sit bone impressions. In at least one embodiment, the compressible material may comprise compressible corrugated cardboard that is configured to form the sit bone impressions.

Once the sit bone impressions have been formed, the method 1950 may proceed to a step 1954 in which sit bone measurements may be obtained from the sit bone impressions. The sit bone impressions may be measured to obtain an approximate sit bone width for the individual.

Once the approximate sit bone measurements have been obtained from the sit bone impressions, the method may proceed to a step 1956 in which additional information from the individual may be obtained for use as additional input in formulating recommended adjustment settings for the individual. The additional information may include any relevant information including but not limited to: a preferred riding position of the individual (e.g., upright vs. race position, and/or every riding position in between), different bike applications (e.g., road bike, triathlon bike, mountain bike, police bike applications, etc.), a specific morphology or medical condition of the individual, a gender of the individual, and the like.

Once the additional information is obtained from the individual, the method 1950 may proceed to a step 1958 in which recommended adjustment settings may be obtained by cross-referencing the individuals approximate sit bone width, in view of the additional information obtained from the individual, to arrive at recommended adjustment settings for the individual.

Figure 20:
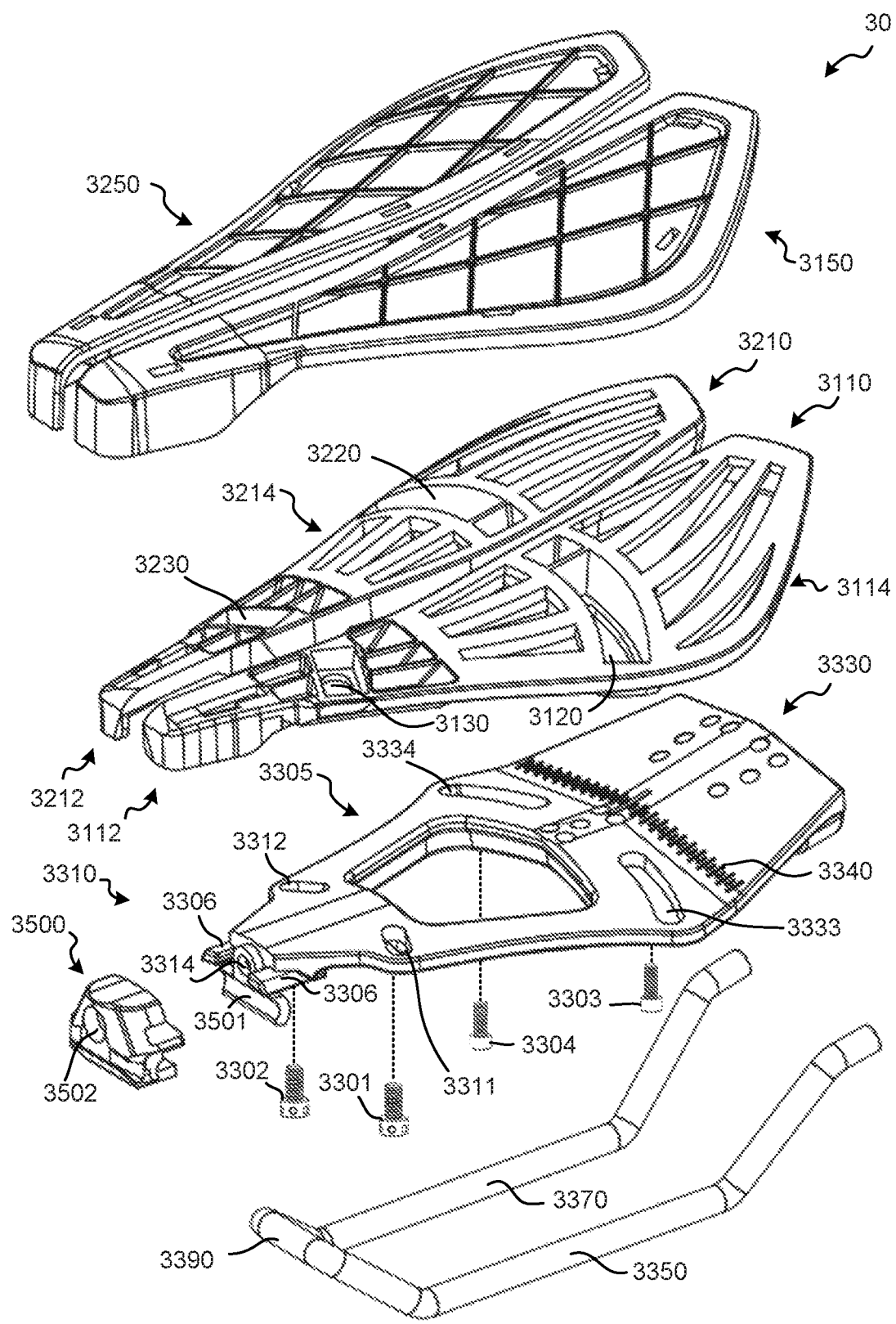
FIG. 20 illustrates an exploded view of an adjustable saddle, according to another embodiment of the present disclosure.
Figure 21:
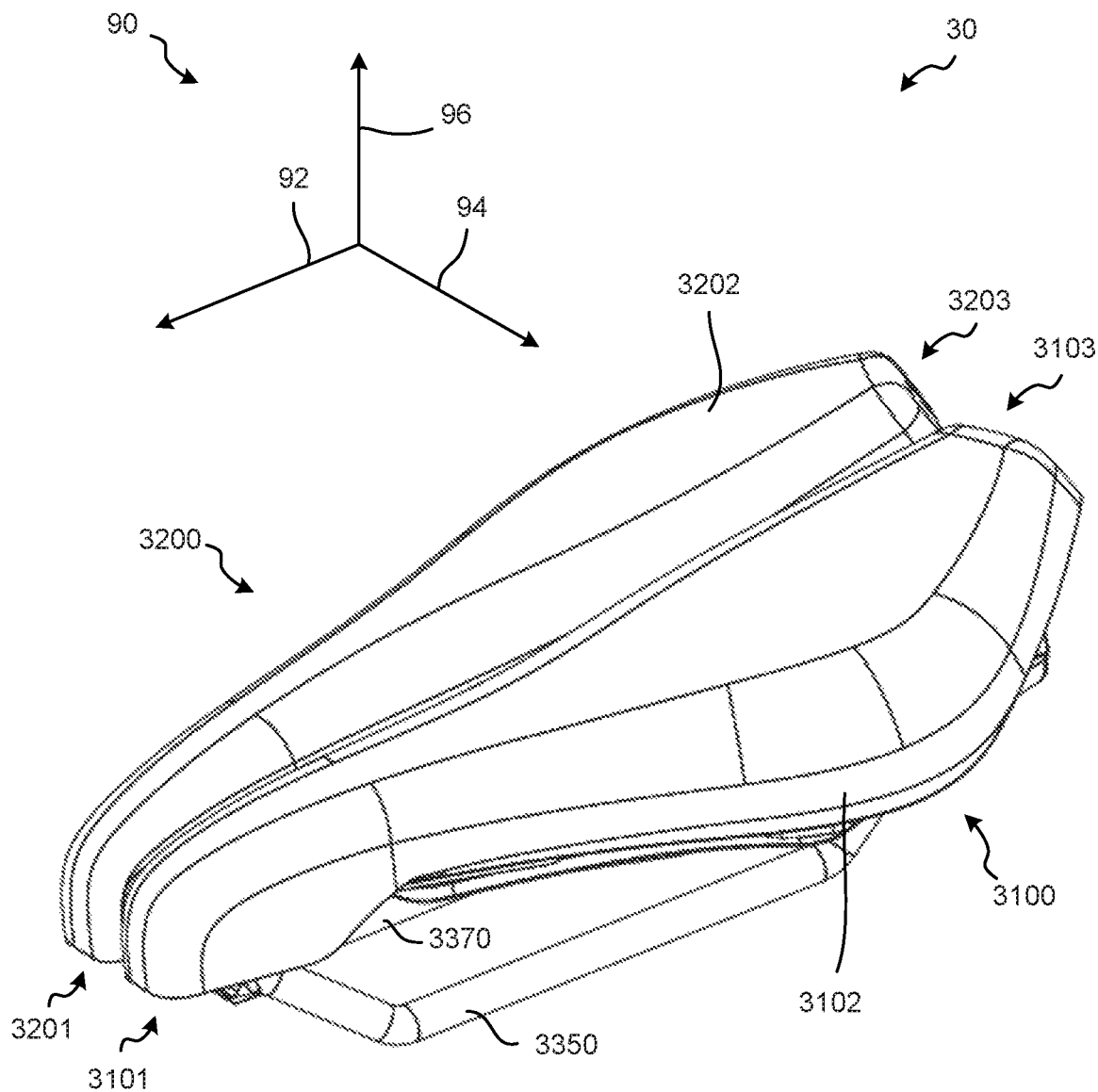
FIG. 21 illustrates a perspective view of the adjustable saddle of FIG. 20 in assembled form with seat covers.
Figure 22A:
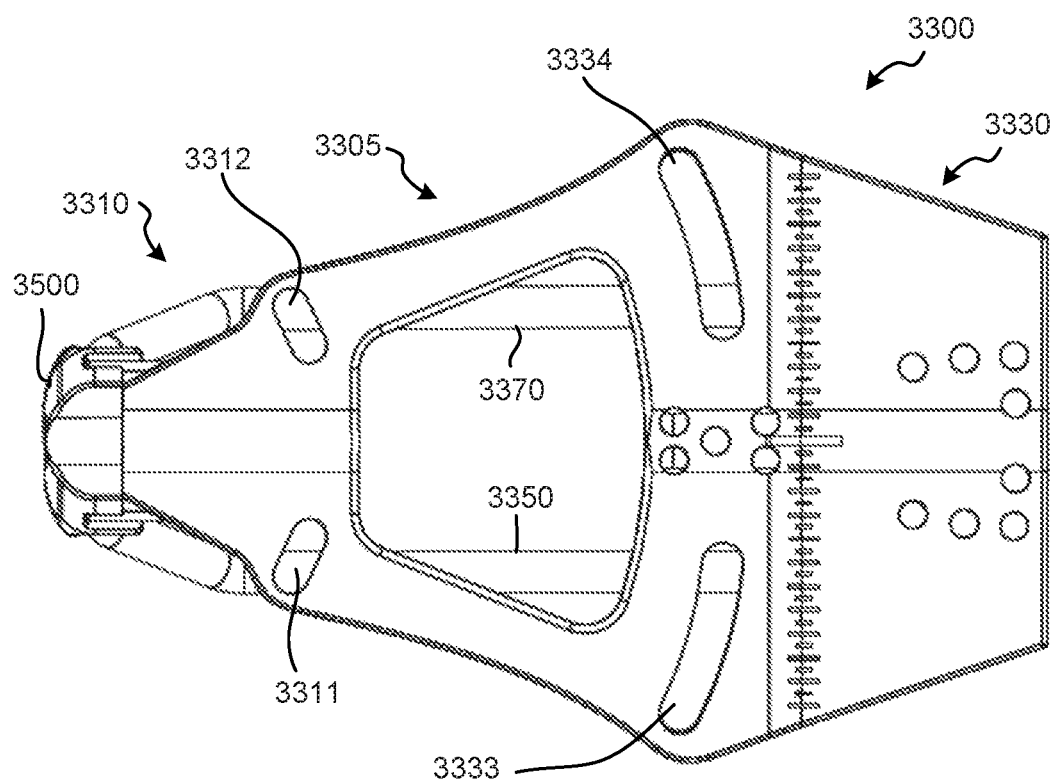
FIG. 22A illustrates a top view of the assembled chassis for the adjustable saddle shown in FIG. 20.
Figure 22B:
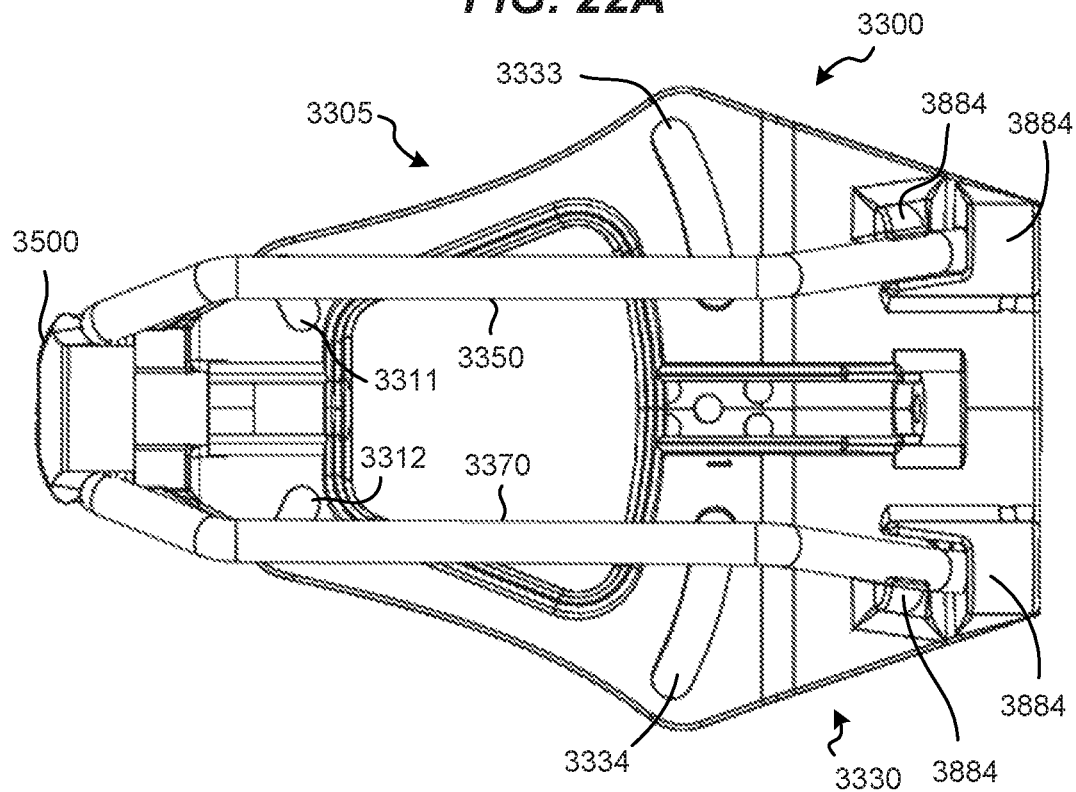
FIG. 22B illustrates a bottom view of the chassis.
Figure 22C:
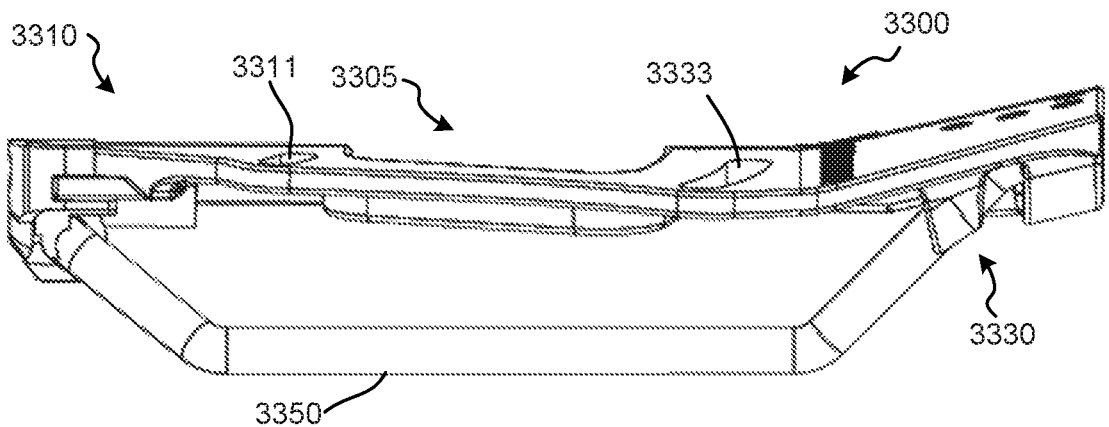
FIG. 22C illustrates a side view of the chassis.
Figure 22D:
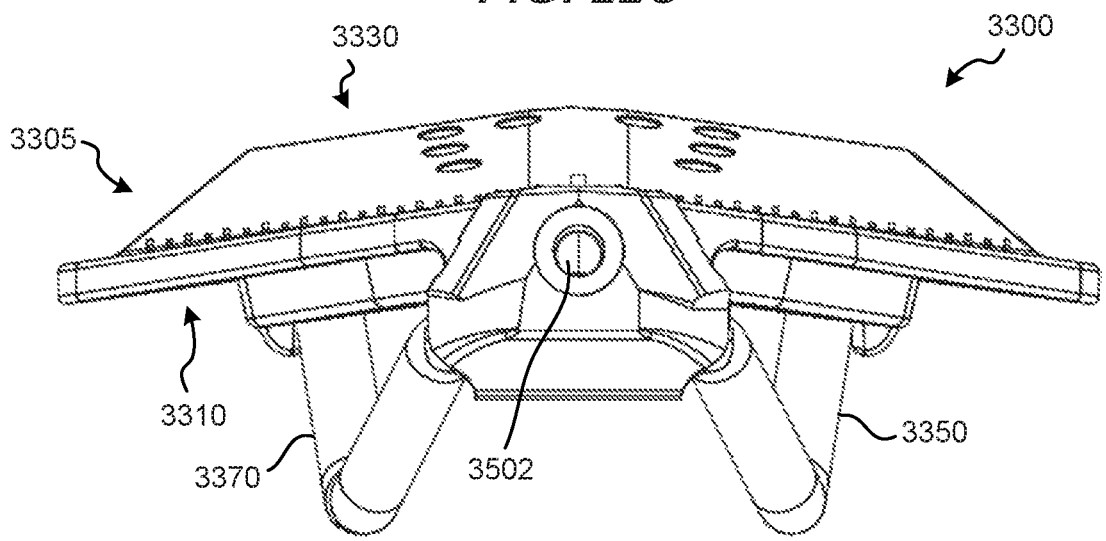
FIG. 22D illustrates a front view of the chassis.
Figure 22E:
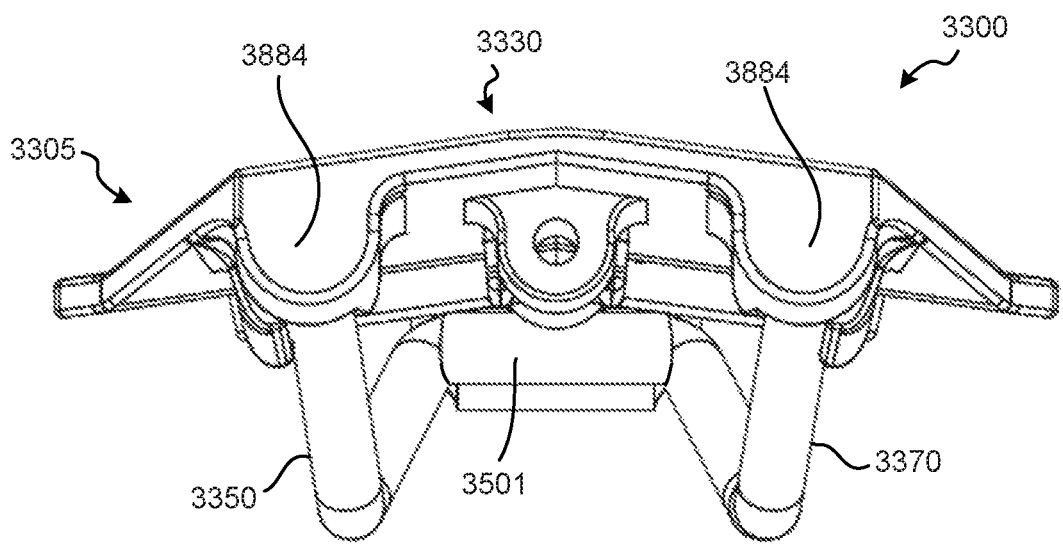
FIG. 22E illustrates a rear view of the chassis.
Figure 23A:
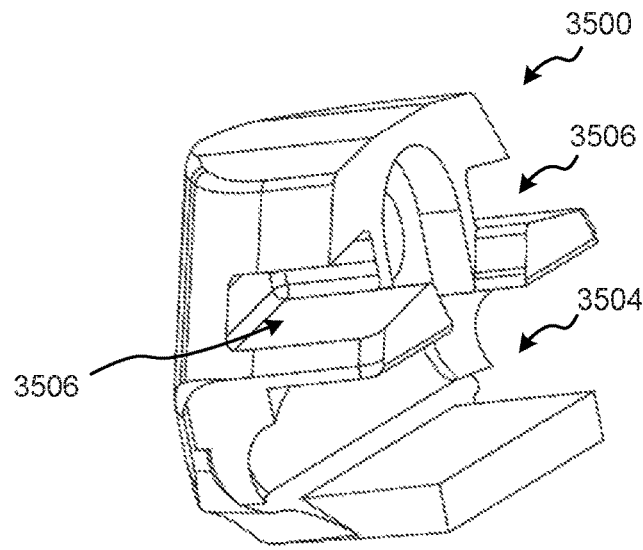
FIG. 23A illustrates a perspective view of the front rail bracket shown in FIG. 20.
Figure 23B:
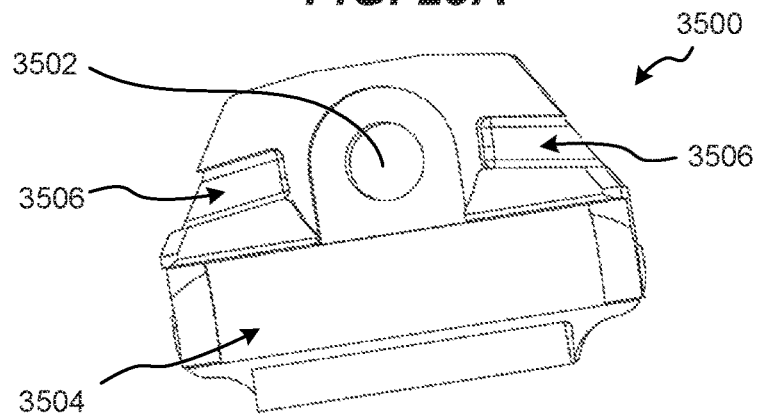
FIG. 23B illustrates a rear perspective view of the front rail bracket.
Figure 23C:
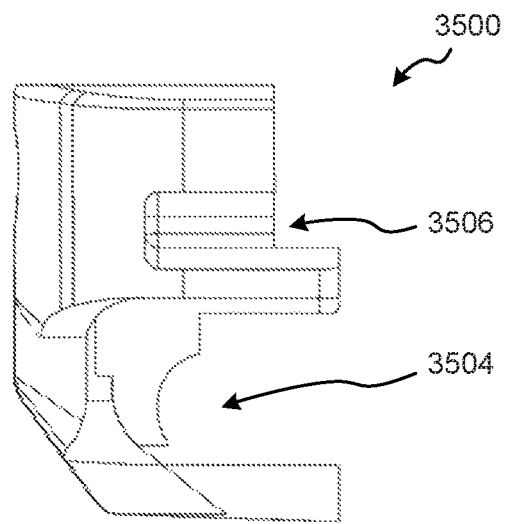
FIG. 23C illustrates a side view of the front rail bracket.
Figure 24:
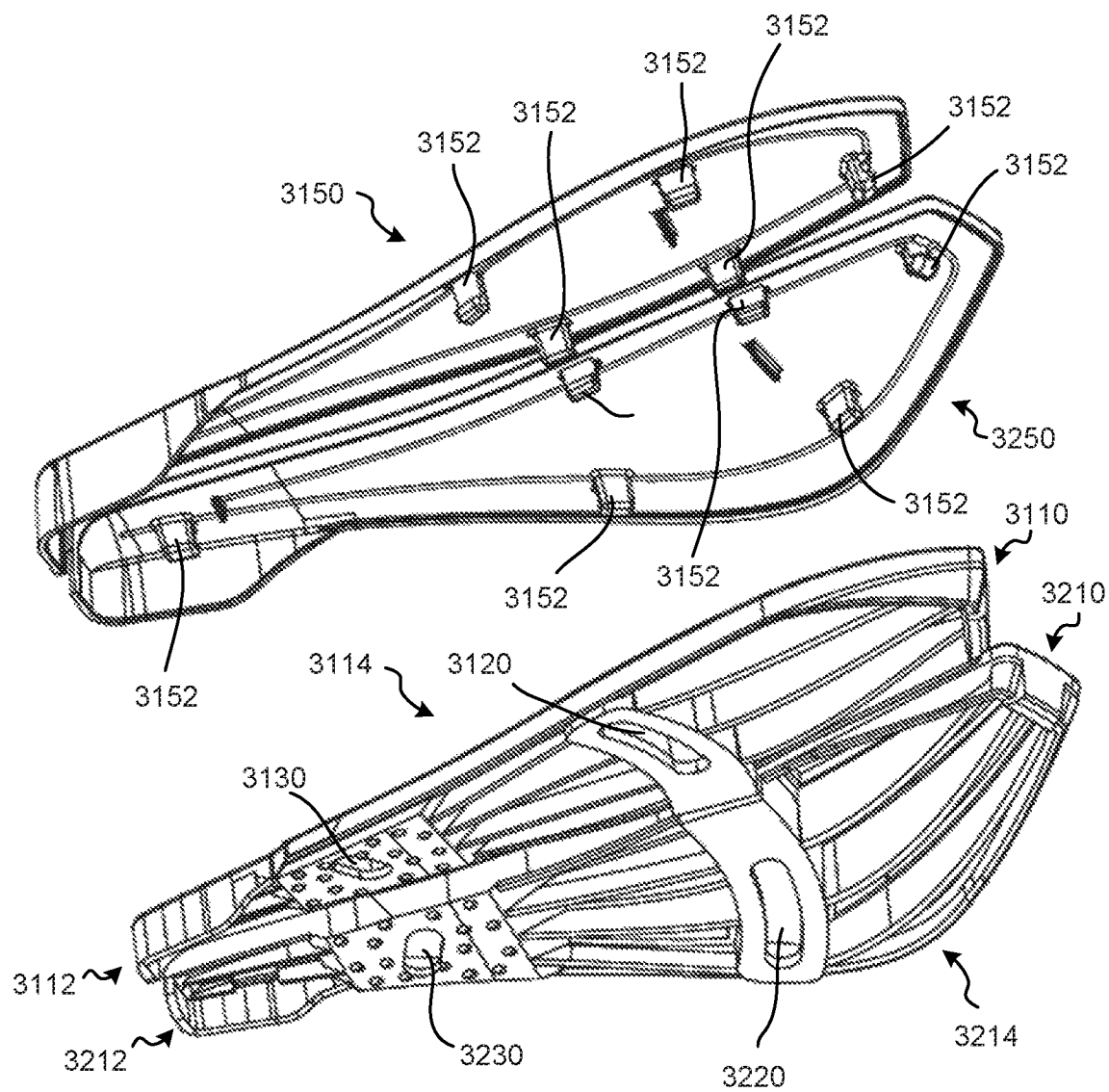
FIG. 24 illustrates a partial exploded view of the adjustable saddle of FIG. 20 with the two skins above the two saddle half bases prior to assembly.
Figure 25:
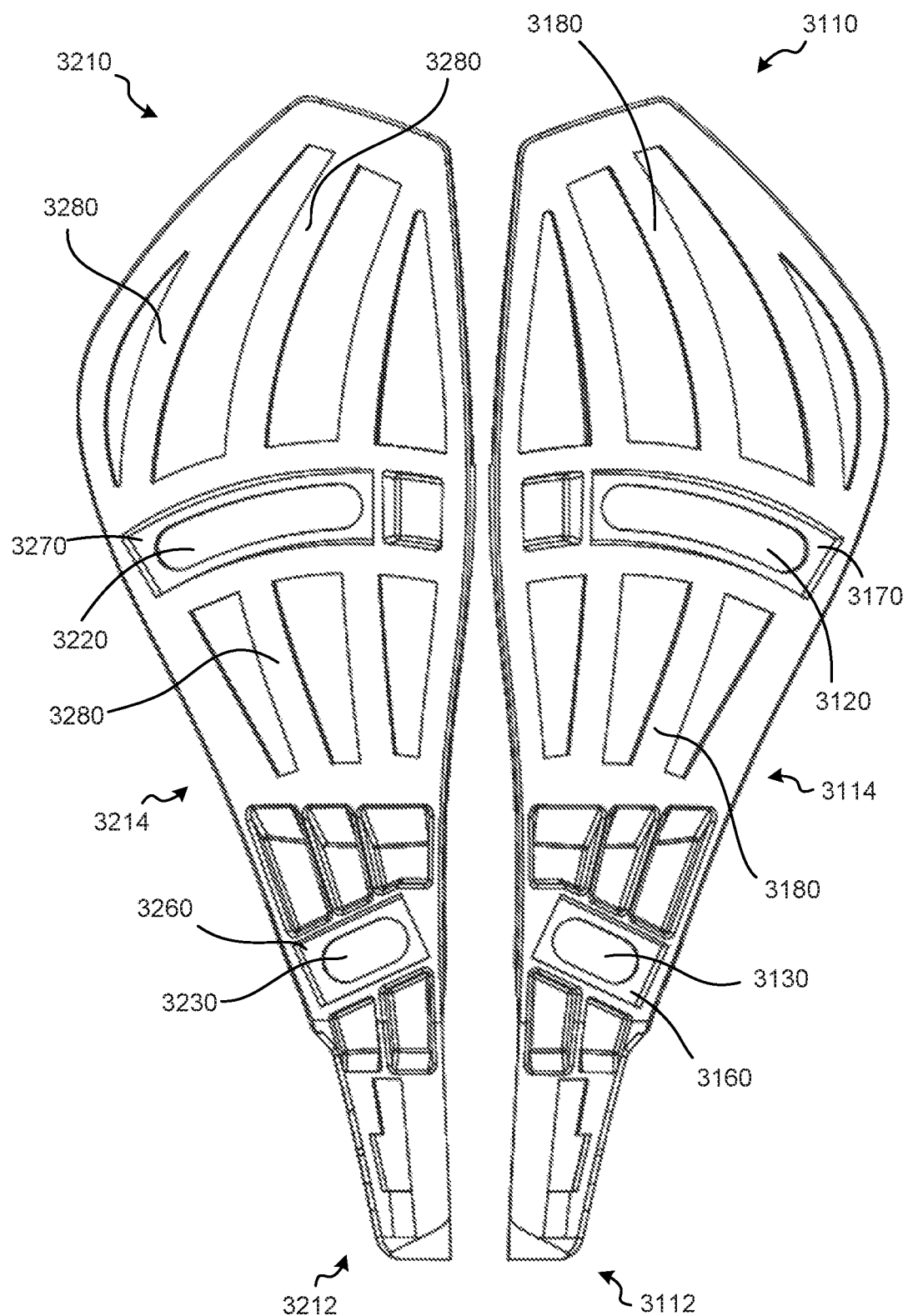
FIG. 25 illustrates a top view of the saddle half bases shown in FIG. 20.
Figure 26:
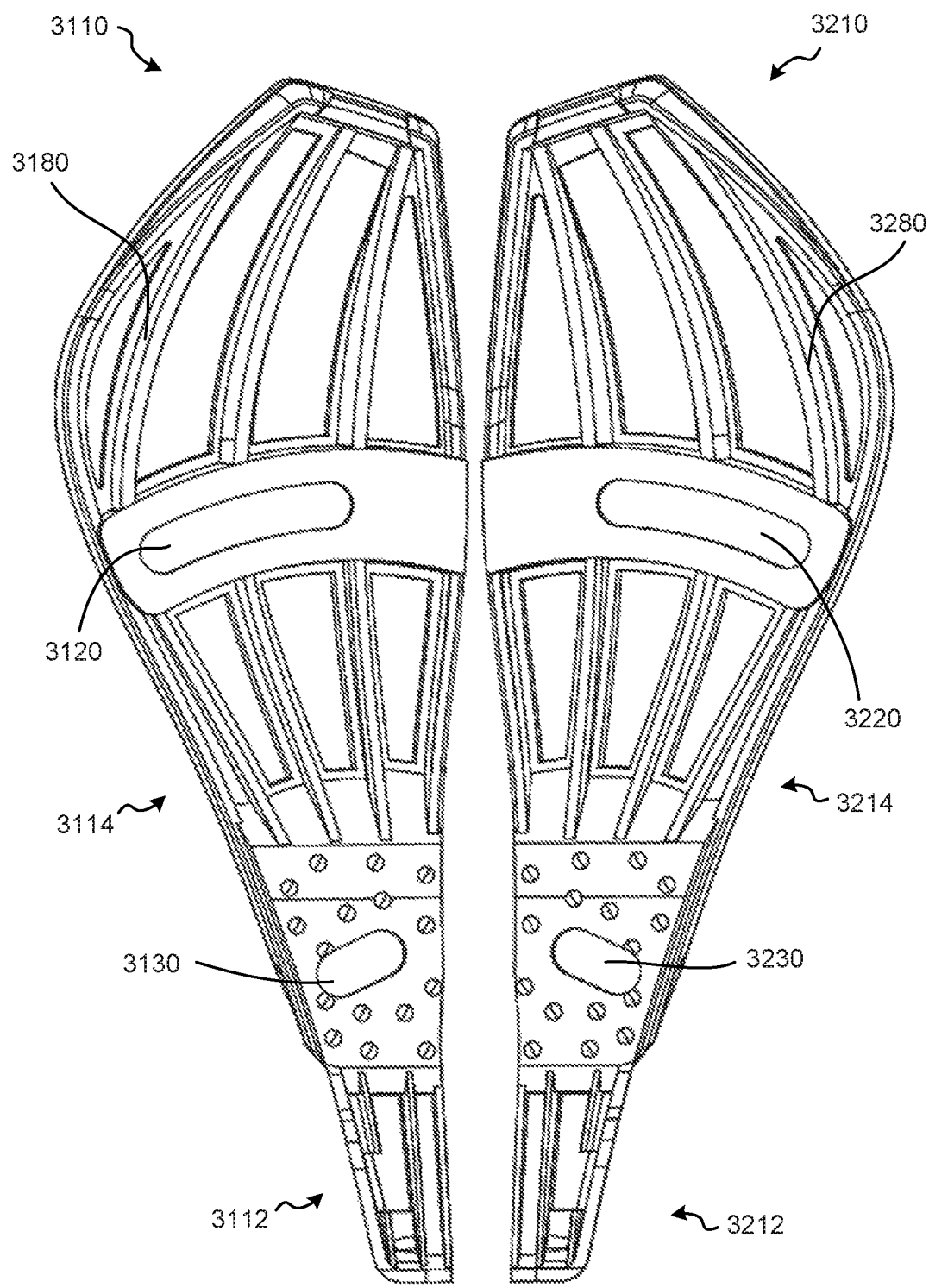
FIG. 26 illustrates a bottom view of the saddle half bases shown in FIG. 20.

FIGS. 20-26 illustrate various views of an adjustable saddle 30, according to another embodiment of the present disclosure. The adjustable saddle 30 may incorporate, or omit, any feature that is described in connection with other adjustable saddles presented herein. FIG. 20 illustrates an exploded view of the adjustable saddle 30 and FIG. 21 shows a perspective view of the adjustable saddle 30 in assembled form with foam padding and seat covers 3102, 3202 to protect the foam padding from weathering, abrasion, and general wear. FIGS. 22A-E illustrate various views of the chassis 3300 of the adjustable saddle 30 and FIGS. 23A-C illustrate various views of the front rail bracket 3500 for the adjustable saddle 30. FIG. 24 illustrates first and second skins 3150, 3250 above two saddle half bases 3114, 3214 of the adjustable saddle 30, prior to being assembled together, and FIGS. 25 and 26 show top and bottom views of the saddle half bases 3114, 3214.

The adjustable saddle 30 may generally include a first saddle half 3100, a second saddle half 3200, and the chassis 3300. The first and second saddle halves 3100, 3200 may be adjustably attached to the chassis 3300 via a first front end fastener 3301, a second front end fastener 3302, a first back end fastener 3303, and a second back end fastener 3304. The first and second front end fasteners 3301, 3302 may attach the front ends 3101, 3201 of the saddle halves 3100, 3200 to the chassis 3300. Likewise, the first and second back end fasteners 3303, 3304 may attach the back ends 3103, 3203 of the saddle halves 3100, 3200 to the chassis 3300.

The first and second front and back end fasteners 3301, 3302, 3303, 3304 may be any suitable fastener style, including but not limited to: threaded screws, bolts, nuts, quick release fasteners, and the like. In one embodiment, at least one of the first and second front and back end fasteners 3301, 3302, 3303, 3304 may have a cross drilled head to facilitate rotation of the fastener from the side for easier and quicker operation. For example, an individual may use a small elongate tool, such as a 2 mm Allen wrench (not shown), to rotate the fastener from the side by inserting one end of the small elongate tool into the cross drilled threaded screws and applying a rotational torque force.

The chassis 3300 may generally include a mounting frame 3305 having a mounting frame front end 3310 and a mounting frame back end 3330, a front rail bracket 3500, a first rail 3350, and a second rail 3370. The mounting frame front end 3310 may include a first mounting frame front end track 3311 configured to receive the first front end fastener 3301 to attach the front end 3101 of the first saddle half 3100 to the mounting frame front end 3310, as well as a second mounting frame front end track 3312 configured to receive the second front end fastener 3302 to attach the front end 3201 of the second saddle half 3200 to the mounting frame front end 3310. As used herein, a "track" is defined broadly to include any aperture, structure, or shape that may be formed in or on the mounting frame 3305 (and/or the first and second saddle half bases 3114, 3214) that may serve to guide a fastener along the track. Moreover, it will also be understood that any track for any adjustable saddle embodiment disclosed herein may be substituted for a simple hole or aperture that may not be configured to guide a fastener along the simple hole or aperture. The mounting frame front end 3310 may also include a front attachment aperture 3314 for coupling the front rail bracket 3500 to the mounting frame front end 3310. Likewise, the mounting frame back end 3330 may include a first mounting frame back end track 3333 configured to receive the first back end fastener 3303 to attach the back end 3103 of the first saddle half 3100 to the mounting frame back end 3330, as well as a second mounting frame back end track 3334 configured to receive the second back end fastener 3304 to attach the back end 3203 of the second saddle half 3200 to the mounting frame back end 3330.

Referring to FIG. 21, the adjustable saddle 30 may generally be described in relation to reference frame 90, having a longitudinal direction 92, a lateral direction 94, and a transverse direction 96. In at least one embodiment, the first and second mounting frame front end tracks 3311, 3312 may be angled non-parallel to the lateral direction 94 and extend along a rectilinear path, allowing pivotal and/or translational adjustment of the front ends 3101, 3201 of the saddle halves 3100, 3200 relative to the mounting frame front end 3310.

The mounting frame 3305 may include adjustment markings 3340. The adjustment markings 3340 may generally indicate the degree to which each saddle half 3100, 3200 is positionally adjusted with respect to the mounting frame front end 3310 and/or the mounting frame back end 3330. In the embodiment shown in FIG. 20, the adjustment markings 3340 include simple line markings spaced apart at regular intervals. However, in other embodiments (not shown), the adjustment markings 3340 may include numbers or other symbols that indicate various information, such as angular or translational displacement of the saddle halves 3100, 3200 with respect to the mounting frame front and back ends 3310, 3330, preferred saddle half 3100, 3200 positions based on riding style, a rider's personal position preference, etc. The adjustment markings 3340 may be formed by any known process including, but not limited to: laser etching, stamping, integral formation during molding/casting, and the like. In addition to adjustment markings 3340, the first rail 3350 and/or the second rail 3370 may also include additional adjustment markings (not shown) to indicate translational displacement of the chassis 3300 with respect to a seat post, or a seat post mounting bracket.

The first and second rails 3350, 3370 may be coupled to each other via a front rail portion 3390, as best seen in FIG. 20. The mounting frame 3305 may be coupled to the first and second rails 3350, 3370 at the mounting frame back end 3330 via one or more rail retaining features 3884, as best seen in FIG. 22B The mounting frame 3305 may also be coupled to the front rail portion 3390 via the front rail bracket 3500. In some embodiments, the front rail bracket 3500 may be formed as a discrete component configured to releasably couple the mounting frame front end 3310 to the front rail portion 3390. In other embodiments, the front rail bracket 3500 may be formed as a discrete component configured to releasably couple the mounting frame front end 3310 to the front rail portion 3390 in conjunction with a lock member 3501. In yet other embodiments, the front rail bracket 3500 may be integrally formed with the mounting frame 3305 and configured to releasably couple the mounting frame front end 3310 to the front rail portion 3390. In still other embodiments, the front rail bracket 3500 may be integrally formed with the mounting frame 3305 and configured to fixedly couple the mounting frame front end 3310 to the front rail portion 3390.

FIGS. 23A-C illustrate perspective views and a side view of a discrete front rail bracket 3500, according to one embodiment of the present disclosure. The front rail bracket 3500 may include a front rail bracket aperture 3502 configured to receive a suitable fastener (not shown) to couple the front rail bracket 3500 to the mounting frame front end 3310 in conjunction with the front attachment aperture 3314. The front rail bracket 3500 may also include a front rail portion recess 3504 configured to receive the front rail portion 3390 and one or more mounting frame recesses 3506 configured to receive one or more mounting frame projections 3306 to couple the mounting frame front end 3310 to the front rail portion 3390.

FIGS. 25 and 26 show top and bottom views of the first saddle half base 3114 and the second saddle half base 3214 (corresponding to each saddle half 3100, 3200), with seat covers, foam padding, and skins removed. The first and second saddle half bases 3114, 3214 may be formed of one or more rigid materials, including but not limited to: plastics, metals, carbon fiber, Zytel®, composite materials, or the like.

The first and second saddle half bases 3114, 3214 may include a first saddle half base front end track 3130 formed in the first saddle half base front end 3112, and a second saddle half base front end track 3230 formed in the second saddle half base front end 3212. In at least one embodiment, the first and second saddle half base front end tracks 3130, 3230 may be angled non-parallel to the lateral direction 94 and extend along a rectilinear path, allowing pivotal and/or translational adjustment of the front ends 3101, 3201 of the saddle halves 3100, 3200 relative to the mounting frame front end 3310. In this manner, the first and second saddle half base front ends 3112, 3212 may pivotally attach to the mounting frame front end 3310 at any of a plurality of different pivot points located along the first mounting frame front end track 3311 and/or the first saddle half base front end track 3130, as well as the second mounting frame front end track 3312 and/or the second saddle half base front end track 3230. Thus, the first front end fastener 3301 is movable along the first mounting frame front end track 3311 and/or the first saddle half base front end track 3130 to couple the first saddle half base front end 3112 to the mounting frame front end 3310 at any of a plurality of different pivot points. Likewise, the second front end fastener 3302 is movable along the second mounting frame front end track 3312 and/or the second saddle half base front end track 3230 to couple the second saddle half base front end 3212 to the mounting frame front end 3310 at any of a plurality of different pivot points.

In at least one embodiment, the first and second saddle half base front end tracks 3130, 3230 may also include front retainer housings 3160, 3260 configured to retain suitable retainer nuts (not shown) that may be placed within the front retainer housings 3160, 3260. These retainer nuts may be configured to couple with the first and second front end fasteners 3301, 3302 through the first and second saddle half front end tracks 3130, 3230.

The first and second saddle half bases 3114, 3214 may also include a first saddle half base back end track 3120 formed in the first saddle half base back end 3110, and a second saddle half base back end track 3220 formed in the second saddle half base back end 3210. In at least one embodiment, the first and second saddle half base back end tracks 3120, 3220 (as well as the first and second mounting frame back end tracks 3333, 3334) may extend along an arcuate path, allowing pivotal and/or translational adjustment of the back ends 3103, 3203 of the saddle halves 3100, 3200 relative to the mounting frame back end 3330. In this manner, the first and second saddle half base back ends 3110, 3210 may pivotally attach to the mounting frame back end 3330 at any of a plurality of different pivot points located along the first mounting frame back end track 3333 and/or the first saddle half base back end track 3120, as well as the second mounting frame back end track 3334 and/or the second saddle half base back end track 3220. Thus, the first back end fastener 3303 is movable along the first mounting frame back end track 3333 and/or the first saddle half base back end track 3120 to couple the first saddle half base back end 3110 to the mounting frame back end 3330 at any of a plurality of different pivot points. Likewise, the second back end fastener 3304 is movable along the second mounting frame back end track 3334 and/or the second saddle half base back end track 3220 to couple the second saddle half base back end 3210 to the mounting frame back end 3330 at any of a plurality of different pivot points.

In at least one embodiment, the first and second saddle half base back end tracks 3120, 3220 may also include back retainer housings 3170, 3270 configured to retain suitable retainer nuts (not shown) that may be placed within the back retainer housings 3170, 3270. These retainer nuts may be configured to couple with the first and second mounting frame back end fasteners 3301, 3302 through the first and second saddle half back end tracks 3130, 3230.

The first and second saddle half bases 3114, 3214 may also include a plurality of longitudinal ribs 3180, 3280 configured to provide rigid support for the rider's weight. The first and second saddle half bases 3114, 3214 may releasably couple to the first skin 3150 and the second skin 3250 via the plurality of longitudinal ribs 3180, 3280. In at least one embodiment, the first and second skins 3150, 3250 may be made of a rigid material (e.g., plastic) and may be removably couplable to the plurality of longitudinal ribs 3180, 3280 via one or more snap features 3152 (see FIG. 24) configured to couple the first and second skins 3150, 3250 to the first and second saddle half bases 3114, 3214. However, in other embodiments, the first and second skins 3150, 3250 may be integrally formed with and/or coupled to the plurality of longitudinal ribs 3180, 3280 via other suitable fasteners (e.g., screws, bolt, etc.). A first foam padding and a second foam padding may also be coupled to the first and second skins 3150, 3250 respectively by any suitable means (e.g., adhesive, fasteners, etc.).

With reference to FIG. 21, the first foam padding may be covered by a first seat cover 3102, and the second padding foam padding may be covered by a second seat cover 3202. In this manner, a rider may easily and quickly customize his or her adjustable saddle 30 by simply removing the first and second skins 3150, 3250 (with their attached foam paddings and seat covers) and replacing them with different first and second skins 3150, 3250. This allows the rider to select an adjustable saddle 30 configuration with first and second skins 3150, 3250 that can have any desired color, size, shape, material, characteristic, etc.

As previously noted with reference to FIGS. 8A-9A, the various adjustment shims 710, 720, 730, 740 illustrated may be used in conjunction with any adjustable saddle of the present disclosure to adjust a height, slope, flatness, and/or angle of each saddle half base. For example, one or more adjustment shims 710, 720, 730, 740 may be configured to be placed between the mounting frame 3305 and at least one of the first saddle half base 3114 and the second saddle half base 3214 to rotate the saddle half base about at least one of the longitudinal direction 92, the lateral direction 94, and the transverse direction 96, in order to adjust at least one slope associated with the saddle half base.

Figure 27:
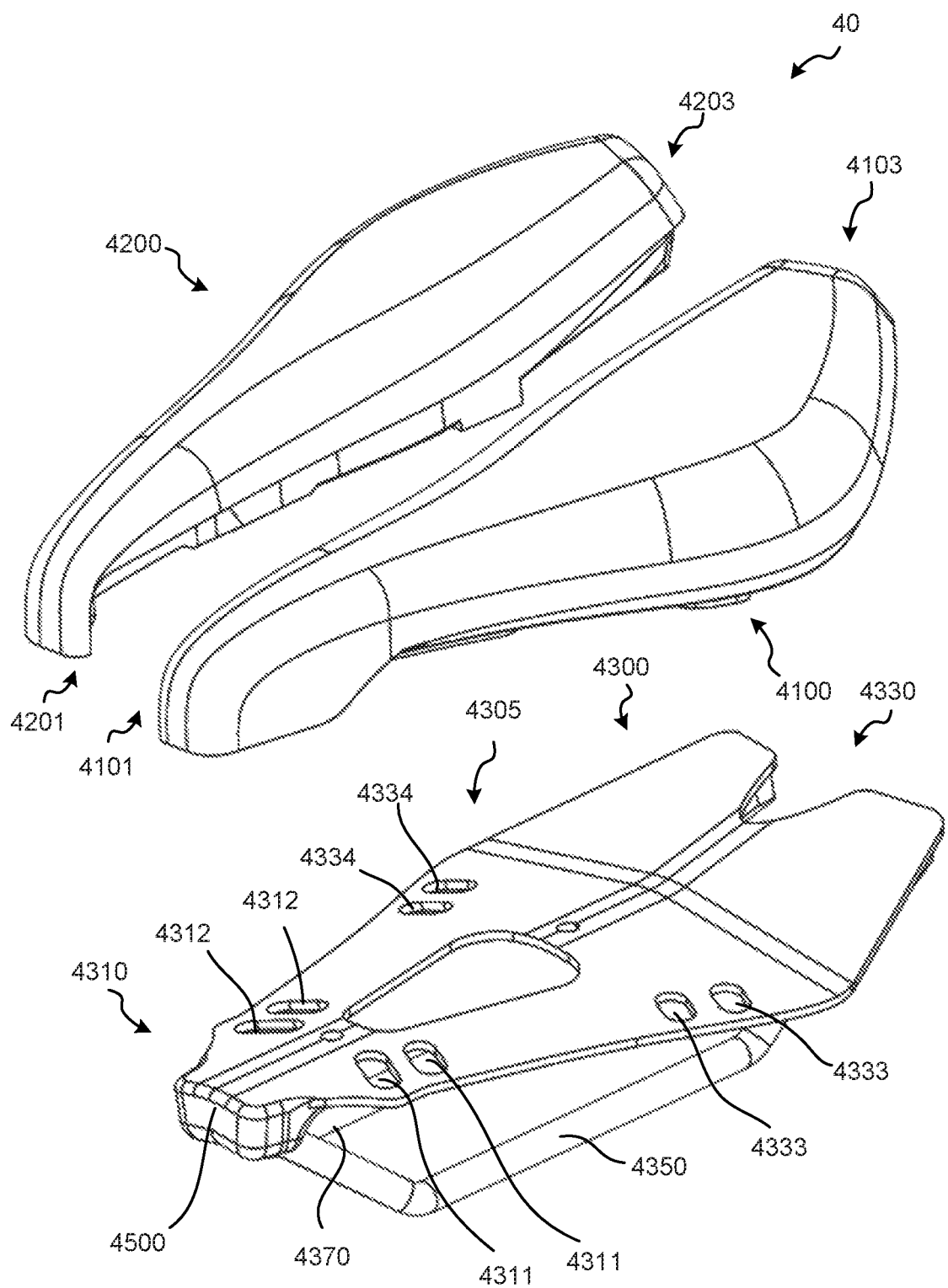
FIG. 27 illustrates a partial exploded view of an adjustable saddle, according to another embodiment of the present disclosure.
Figure 28A:
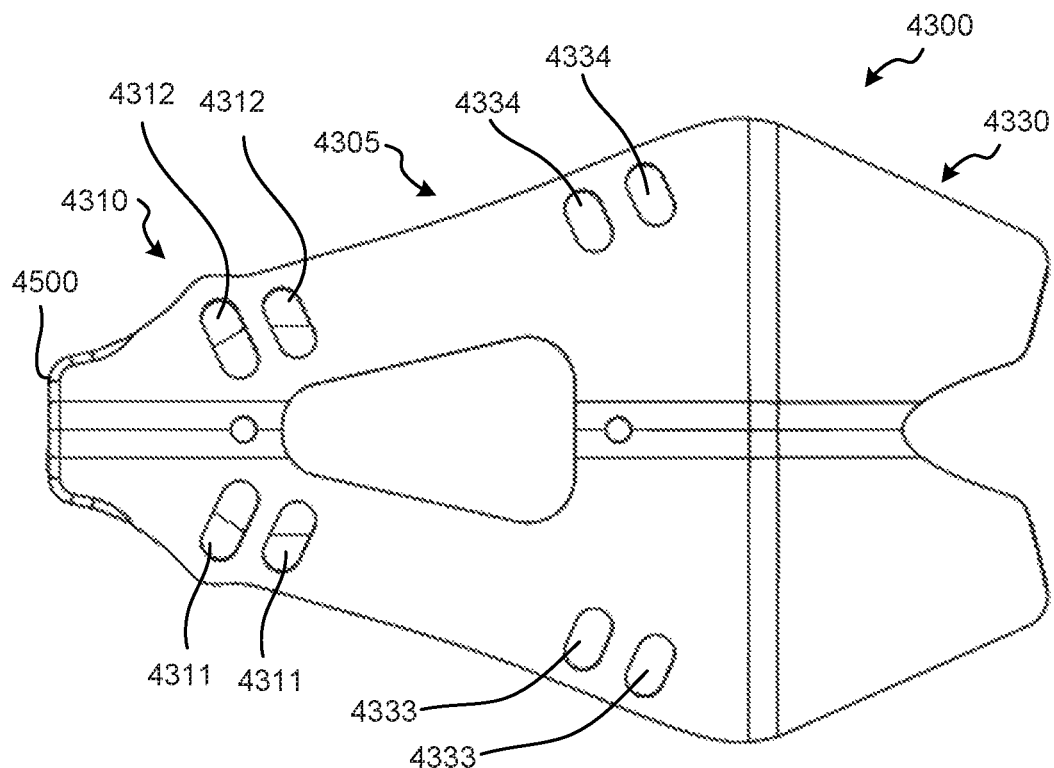
FIG. 28A illustrates a top view of the assembled chassis for the adjustable saddle shown in FIG. 27.
Figure 28B:
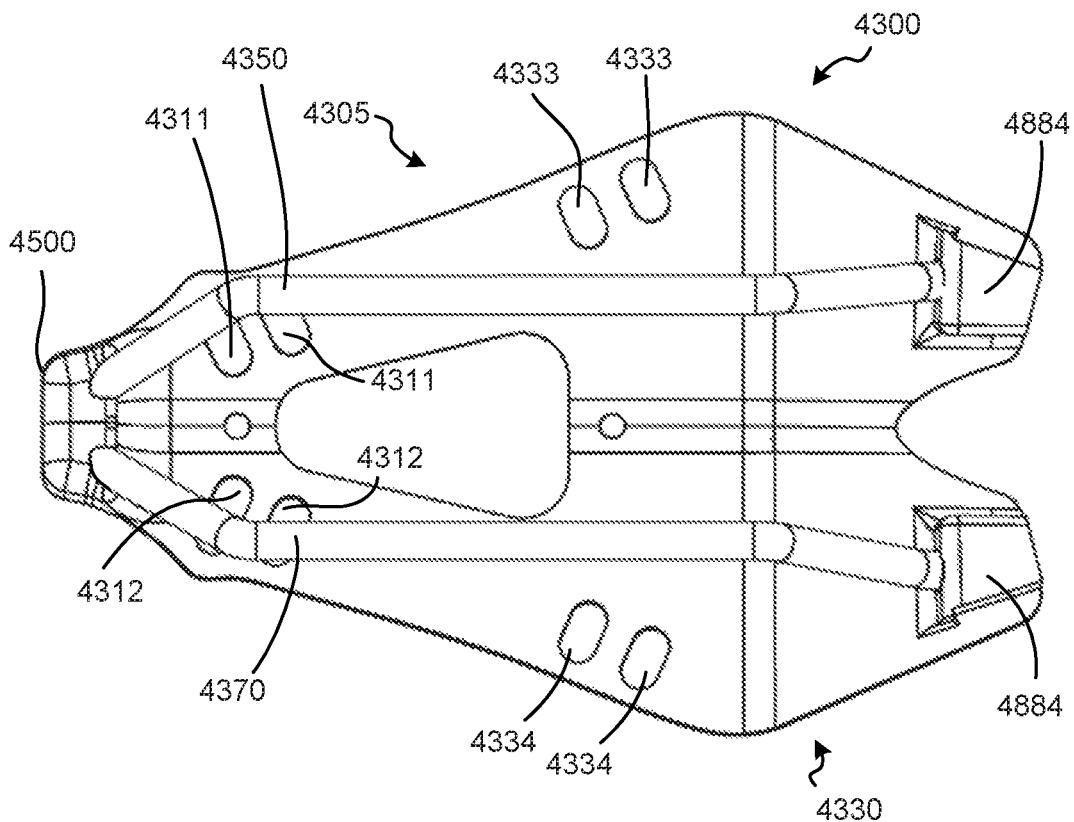
FIG. 28B illustrates a bottom view of the chassis.
Figure 28C:
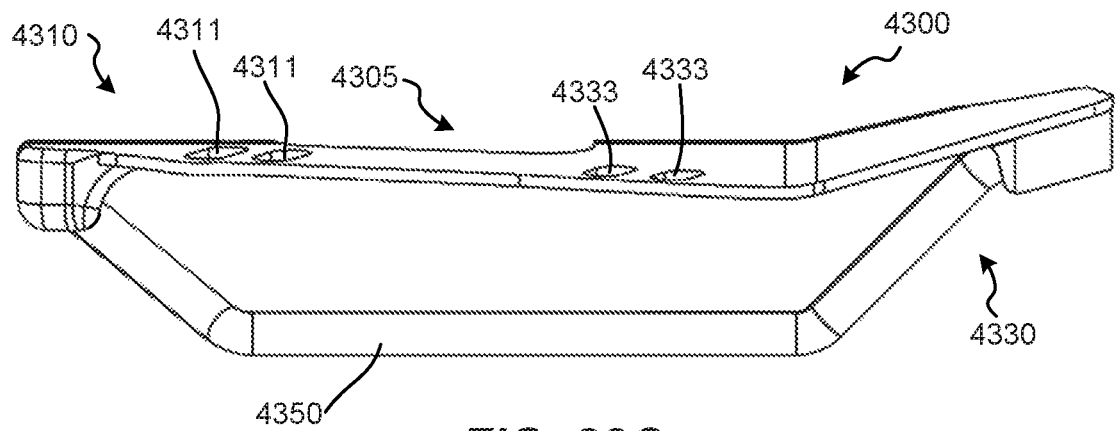
FIG. 28C illustrates a side view of the chassis.
Figure 28D:
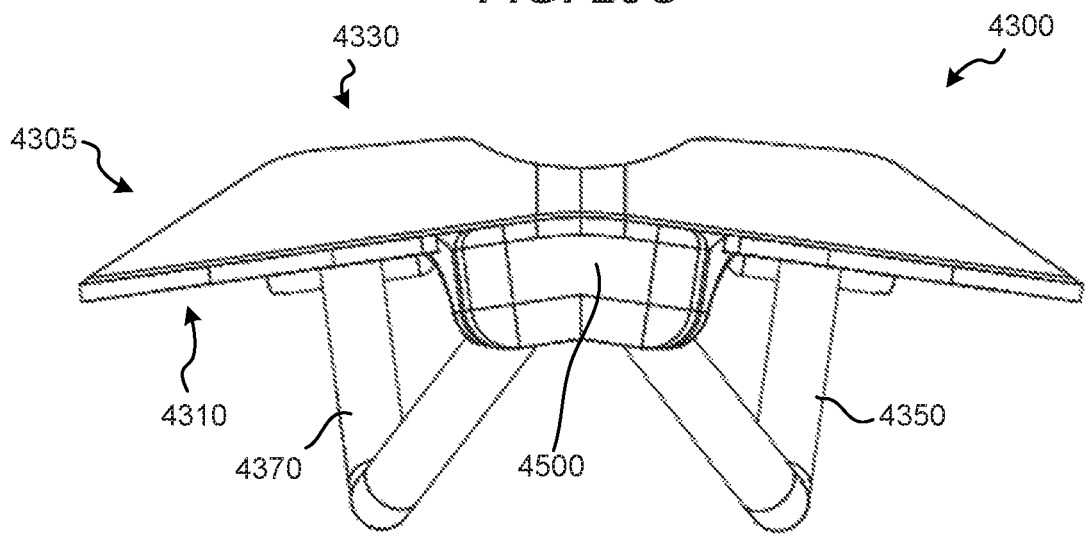
FIG. 28D illustrates a front view of the chassis.
Figure 28E:
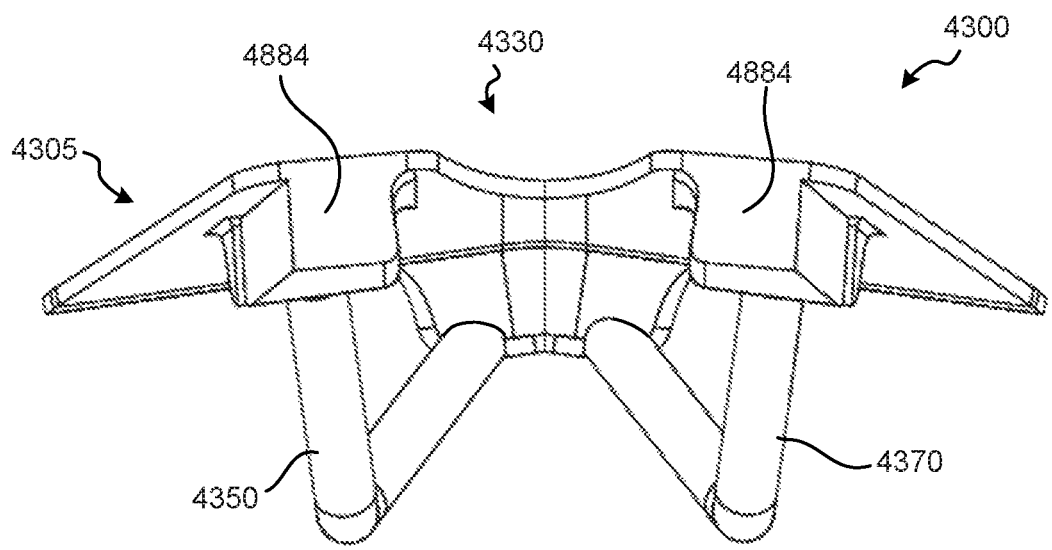
FIG. 28E illustrates a rear view of the chassis.

FIGS. 27-28E illustrate various views of an adjustable saddle 40, according to another embodiment of the present disclosure. The adjustable saddle 40 may incorporate, or omit, any feature that is described in connection with other adjustable saddles presented herein. FIG. 27 illustrates a partial exploded view of the adjustable saddle 40. FIGS. 28A-E illustrate various views of a chassis 4300 of the adjustable saddle 40. The adjustable saddle 40 may generally include a first saddle half 4100, a second saddle half 4200, and a chassis 4300. The first and second saddle halves 4100, 4200 may be adjustably attached to the chassis 4300 via front end and back end fasteners (not shown), as described in other embodiments.

The chassis 4300 may generally include a mounting frame 4305 having a mounting frame front end 4310, a mounting frame back end 4330, a front rail bracket 4500, a first rail 4350, and a second rail 4370. The first and second rails 4350, 4370 may be coupled to each other via a front rail portion (not shown). The mounting frame 4305 may be coupled to the first and second rails 4350, 4370 at the mounting frame back end 4330 via one or more rail retaining features 4884, as can be seen in FIG. 28B. The front rail bracket 4500 may be integrally formed with the mounting frame front end 4310 and may be releasably coupled, and/or fixedly coupled, to the first and second rails 4350, 4370.

The mounting frame front end 4310 may include a first plurality of mounting frame front end tracks 4311 configured to receive first front end fasteners (not shown) to attach the front end 4101 of the first saddle half 4100 to the mounting frame front end 4310, as well as a second plurality of mounting frame front end tracks 4312 configured to receive second front end fasteners (not shown) to attach the front end 4201 of the second saddle half 4200 to the mounting frame front end 4310. Likewise, the mounting frame back end 4330 may include a first plurality of mounting frame back end tracks 4333 configured to receive first back end fasteners (not shown) to attach the back end 4103 of the first saddle half 4100 to the mounting frame back end 4330, as well as a second plurality of mounting frame back end tracks 4334 configured to receive second back end fasteners (not shown) to attach the back end 4203 of the second saddle half 4200 to the mounting frame back end 4330.

In the embodiment shown in FIGS. 27-28E, the first and second plurality of mounting frame front and back end tracks 4311, 4312, 4333, 4334 may be angled non-parallel to the lateral direction 94 (as shown in FIG. 21) and extend along a rectilinear path allowing for pivotal and/or translational adjustment of the front ends 4101, 4201 of the saddle halves 4100, 4200 relative to the mounting frame front end 4310. Moreover, a length along the rectilinear path of at least one of the first and second plurality of mounting frame front and back end tracks 4311, 4312, 4333, 4334 may be greater than a length along the rectilinear path of one or more of the other first and second plurality of mounting frame front and back end tracks 4311, 4312, 4333, 4334.

Figure 29:
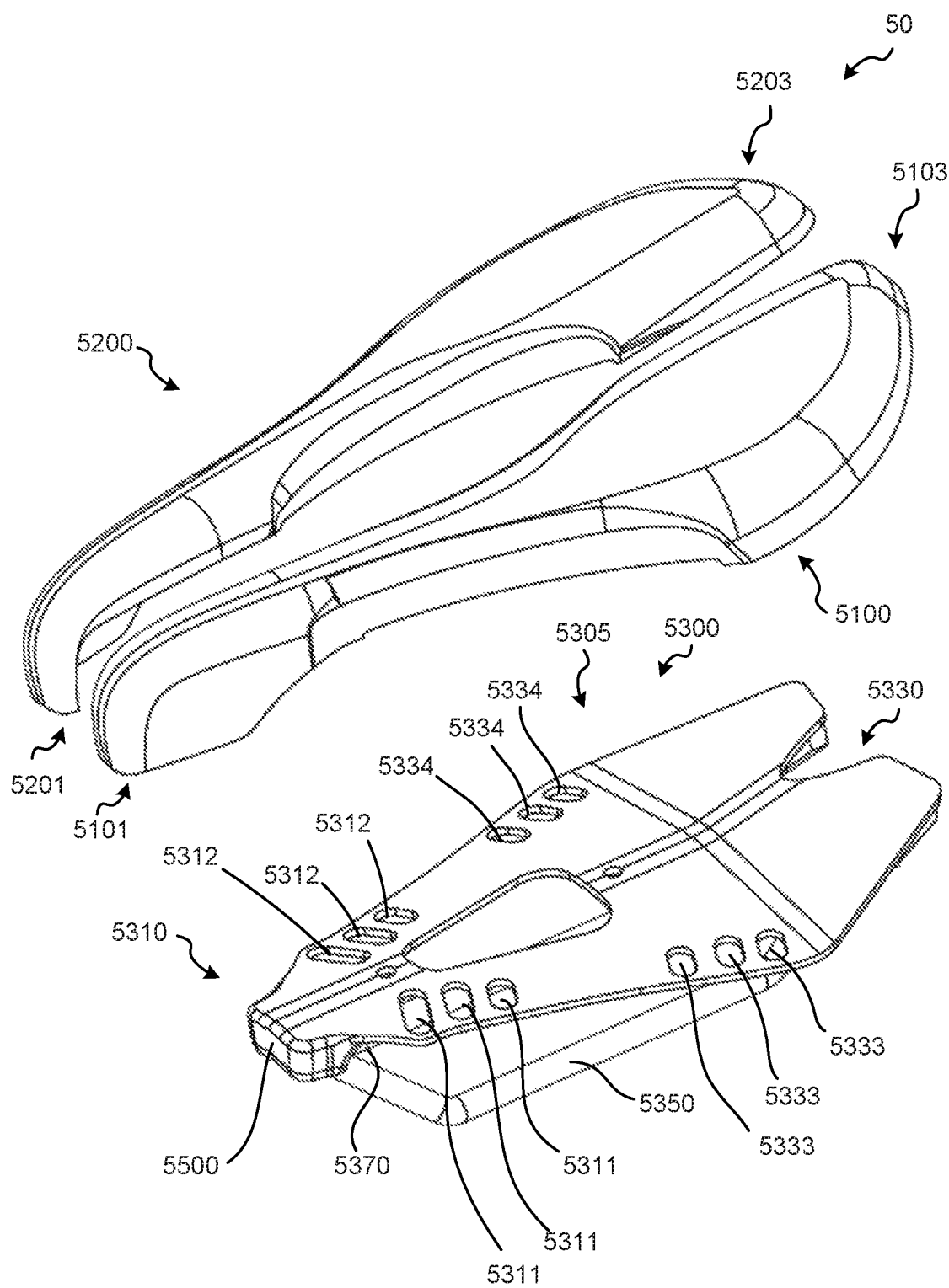
FIG. 29 illustrates a partial exploded view of an adjustable saddle, according to another embodiment of the present disclosure.
Figure 30A:
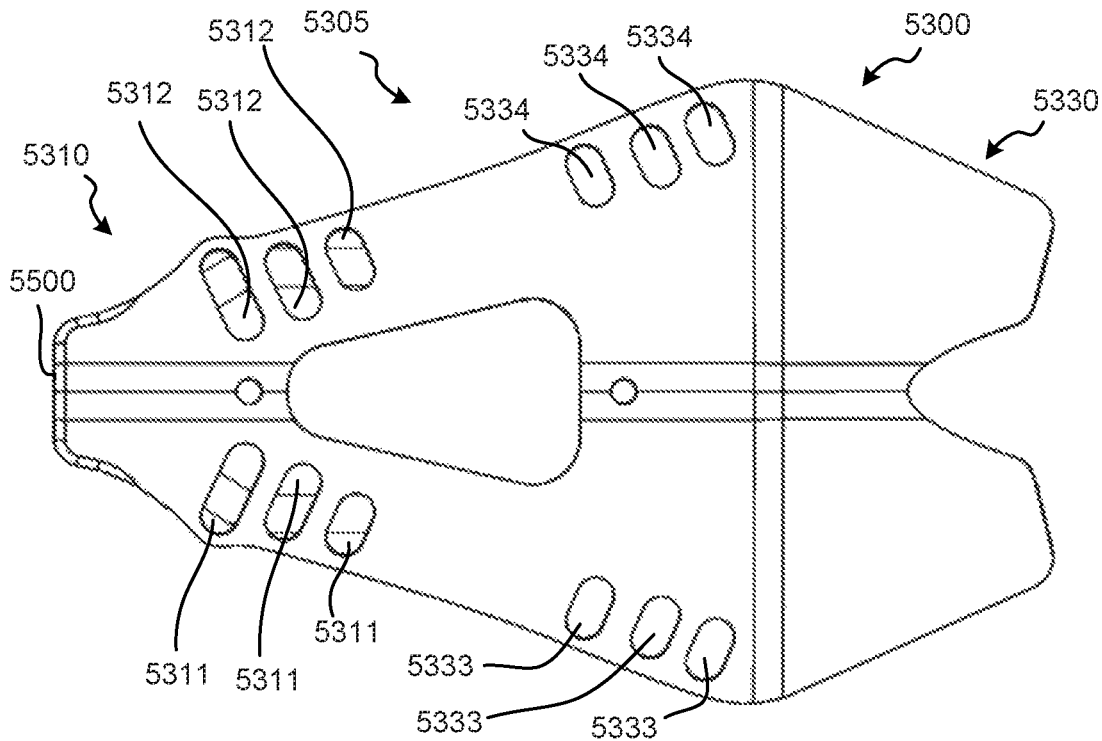
FIG. 30A illustrates a top view of the assembled chassis for the adjustable saddle shown in FIG. 29.
Figure 30B:
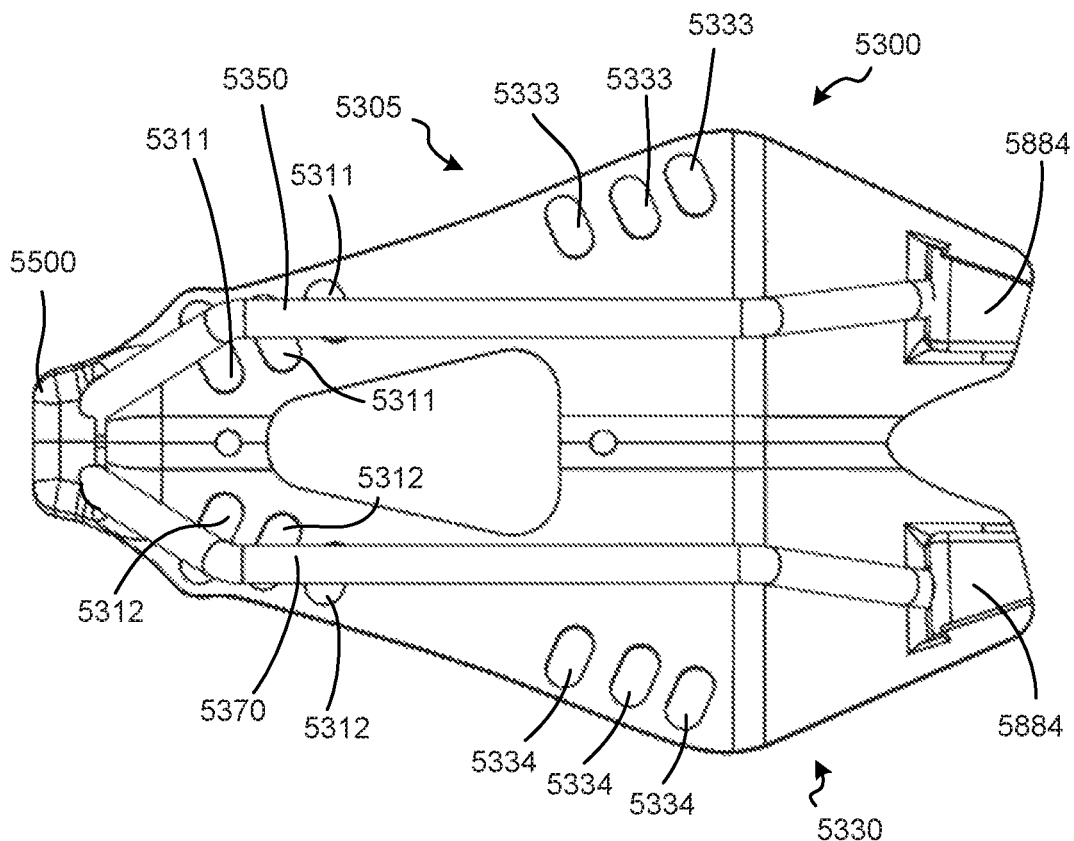
FIG. 30B illustrates a bottom view of the chassis.
Figure 30C:
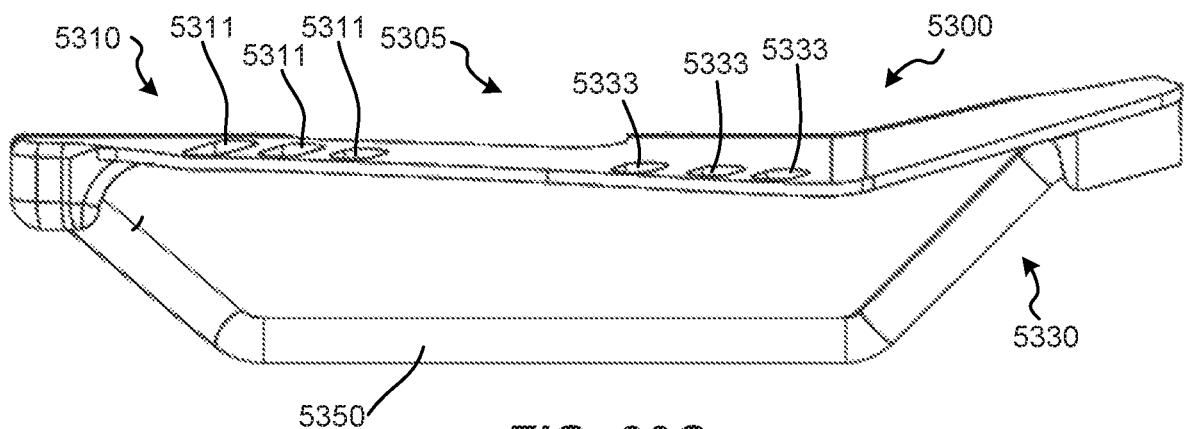
FIG. 30C illustrates a side view of the chassis.
Figure 30D:
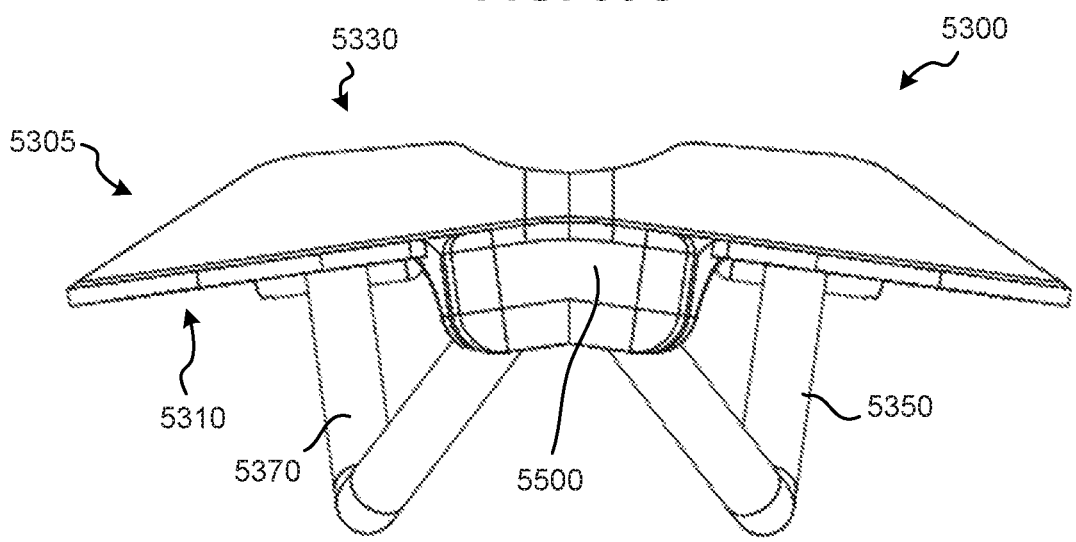
FIG. 30D illustrates a front view of the chassis.
Figure 30E:
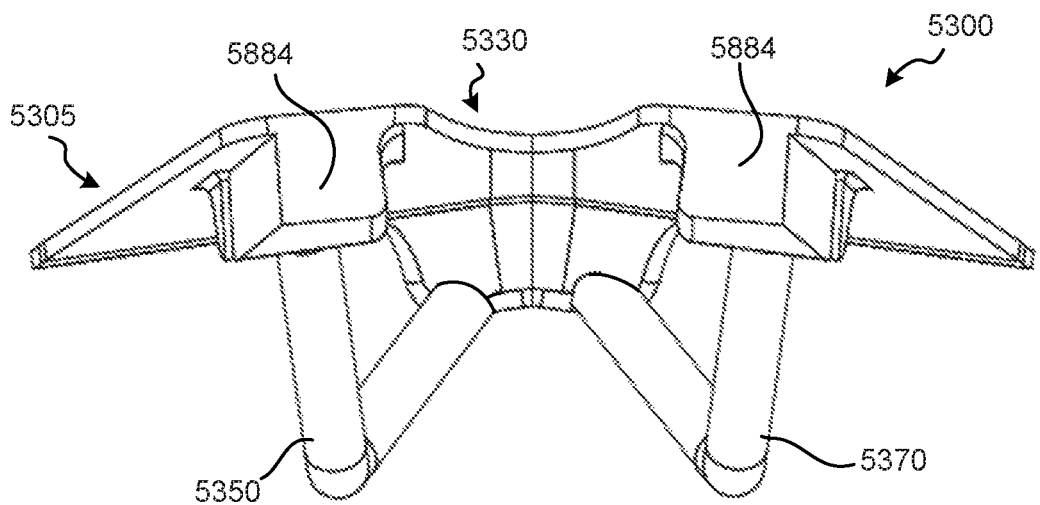
FIG. 30E illustrates a rear view of the chassis.

FIGS. 29-30E illustrate various views of an adjustable saddle 50, according to another embodiment of the present disclosure. The adjustable saddle 50 may incorporate, or omit, any feature that is described in connection with other adjustable saddles presented herein. FIG. 29 illustrates a partial exploded view of the adjustable saddle 50. FIGS. 30A-E illustrate various views of a chassis 5300 of the adjustable saddle 50. The adjustable saddle 50 may generally include a first saddle half 5100, a second saddle half 5200, and a chassis 5300. The first and second saddle halves 5100, 5200 may be adjustably attached to the chassis 5300 via front end and back end fasteners (not shown), as described in other embodiments.

The chassis 5300 may generally include a mounting frame 5305 having a mounting frame front end 5310, a mounting frame back end 5330, a front rail bracket 5500, a first rail 5350, and a second rail 5370. The first and second rails 5350, 5370 may be coupled to each other via a front rail portion (not shown). The mounting frame 5305 may be coupled to the first and second rails 5350, 5370 at the mounting frame back end 5330 via one or more rail retaining features 5884, as shown in FIG. 30B. The front rail bracket 5500 may be integrally formed with the mounting frame front end 5310 and may be releasably coupled, and/or fixedly coupled, to the first and second rails 5350, 5370.

The mounting frame front end 5310 may include a first plurality of mounting frame front end tracks 5311 configured to receive first front end fasteners (not shown) to attach the front end 5101 of the first saddle half 5100 to the mounting frame front end 5310, as well as a second plurality of mounting frame front end tracks 5312 configured to receive second front end fasteners (not shown) to attach the front end 5201 of the second saddle half 5200 to the mounting frame front end 5310. Likewise, the mounting frame back end 5330 may include a first plurality of mounting frame back end tracks 5333 configured to receive first back end fasteners (not shown) to attach the back end 5103 of the first saddle half 5100 to the mounting frame back end 5330, as well as a second plurality of mounting frame back end tracks 5334 configured to receive second back end fasteners (not shown) to attach the back end 5203 of the second saddle half 5200 to the mounting frame back end 5330.

In the embodiment shown in FIGS. 29-30E, the first and second plurality of mounting frame front and back end tracks 5311, 5312, 5333, 5334 may be angled non-parallel to the lateral direction 94 (as shown in FIG. 21) and extend along a rectilinear path allowing for pivotal and/or translational adjustment of the front ends 5101, 5201 of the saddle halves 5100, 5200 relative to the mounting frame front end 5310. Moreover, a length along the rectilinear path of at least one of the first and second plurality of mounting frame front and back end tracks 5311, 5312, 5333, 5334 may be greater than a length along the rectilinear path of one or more of the first and second plurality of mounting frame front and back end tracks 5311, 5312, 5333, 5334.

Figure 31:
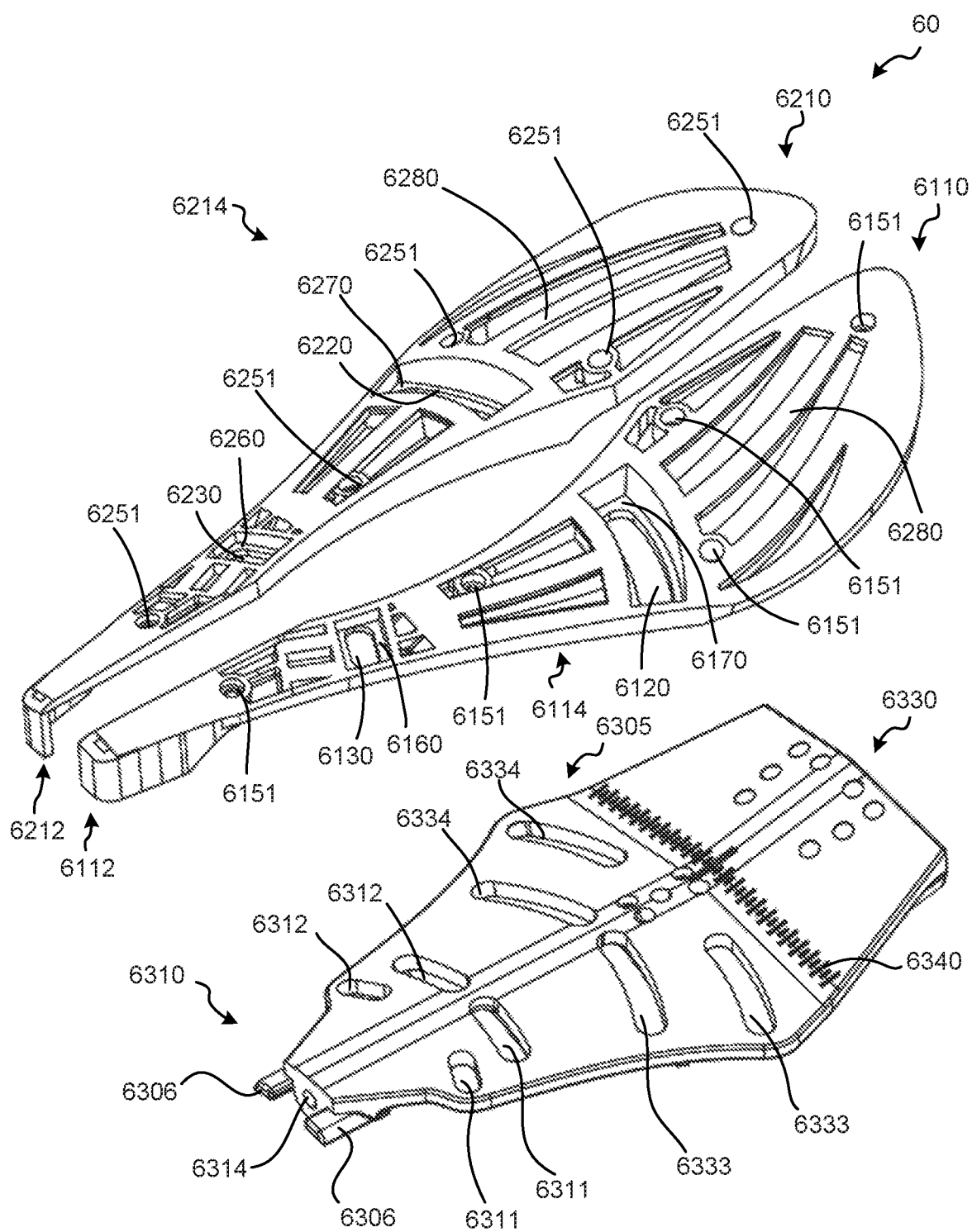
FIG. 31 illustrates a partial exploded view of an adjustable saddle, according to another embodiment of the present disclosure.
Figure 32A:
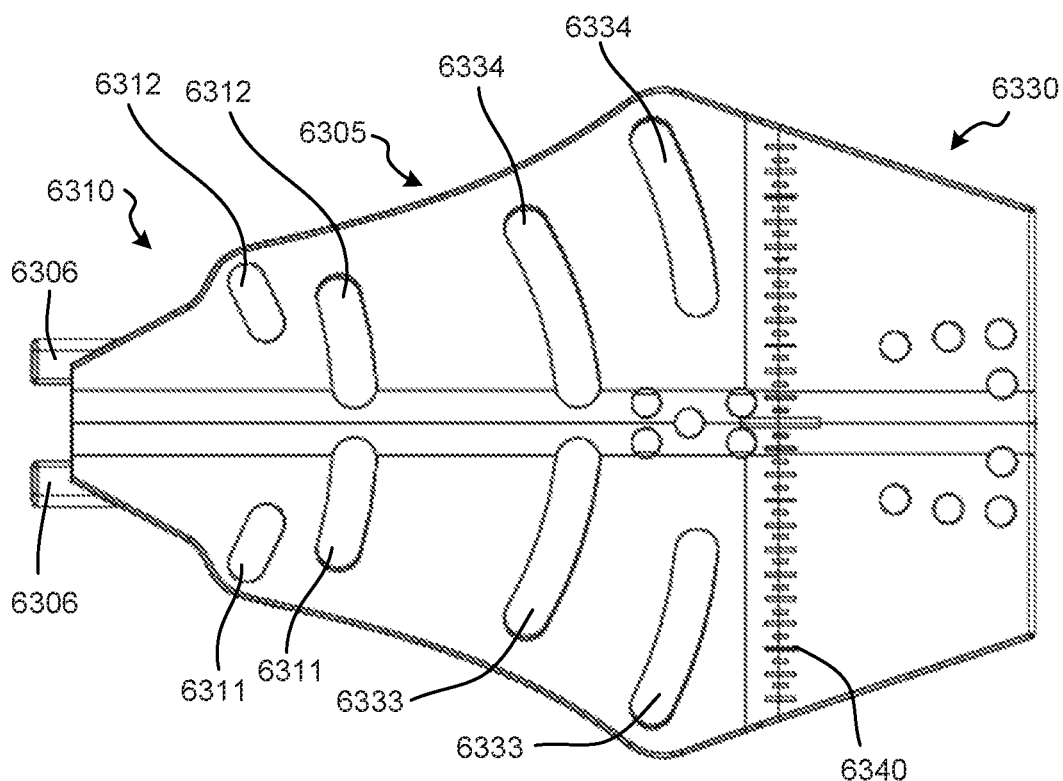
FIG. 32A illustrates a top view of the assembled chassis for the adjustable saddle shown in FIG. 31.
Figure 32B:
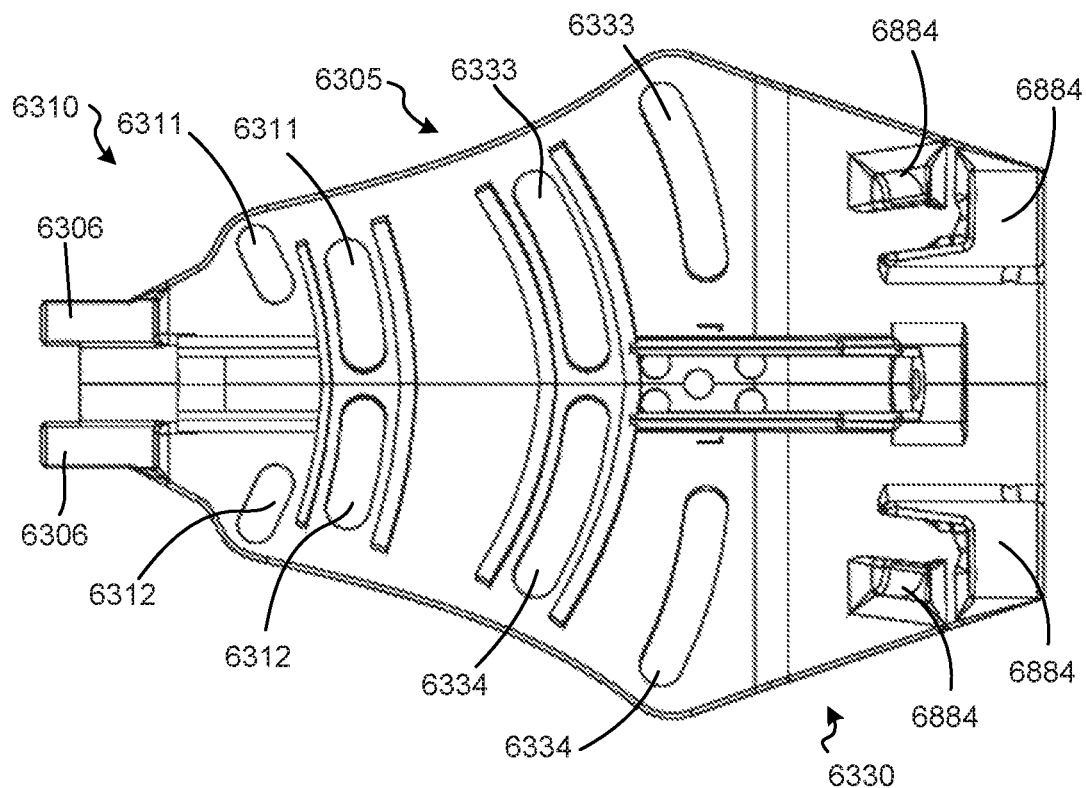
FIG. 32B illustrates a bottom view of the chassis.
Figure 32C:
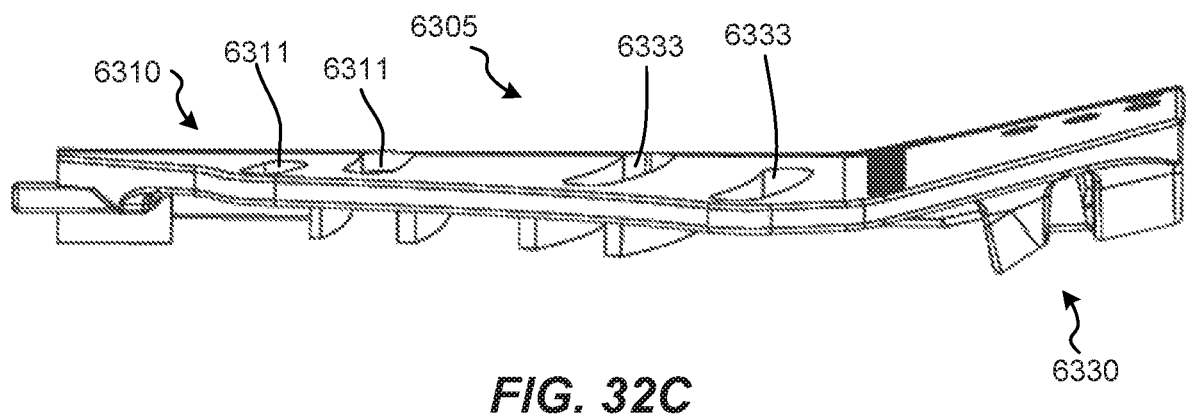
FIG. 32C illustrates a side view of the chassis.
Figure 32D:
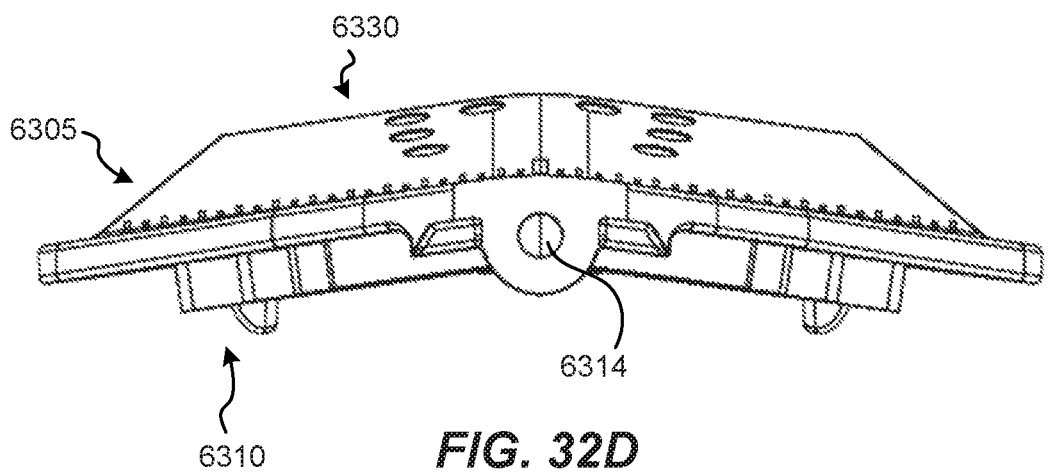
FIG. 32D illustrates a front view of the chassis.
Figure 32E:
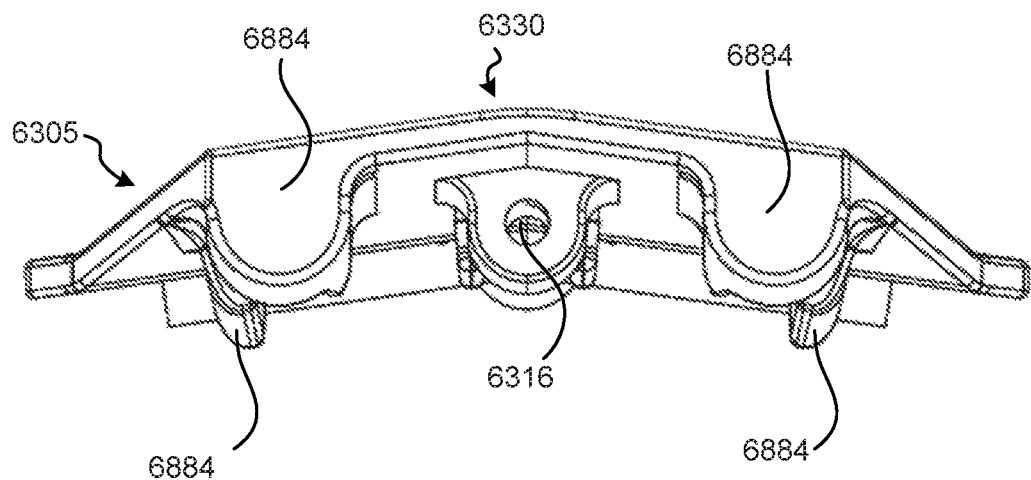
FIG. 32E illustrates a rear view of the chassis.
Figure 33:
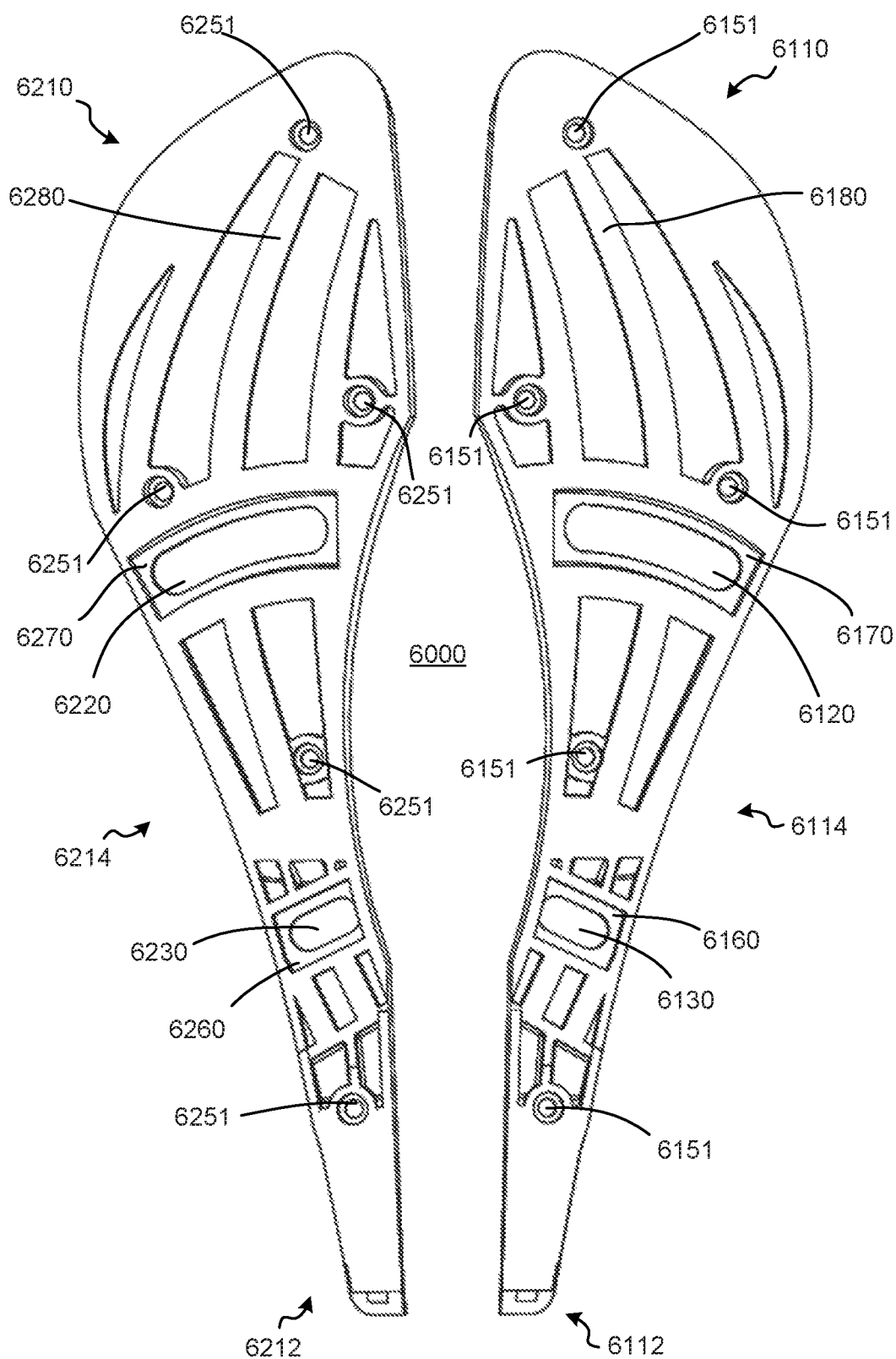
FIG. 33 illustrates a top view of the saddle half bases shown in FIG. 31.
Figure 34:
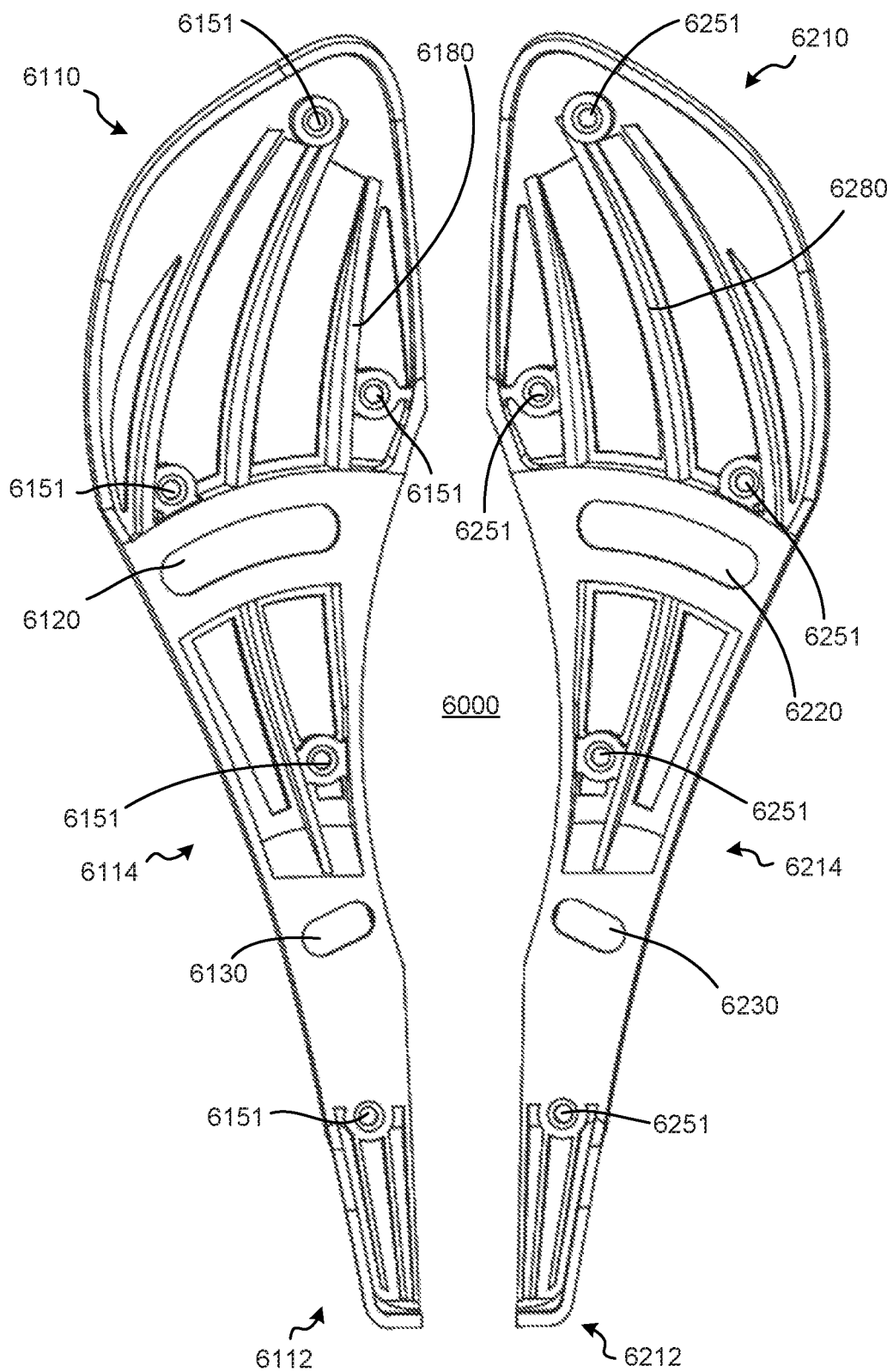
FIG. 34 illustrates a bottom view of the saddle half bases shown in FIG. 31.

FIGS. 31-34 illustrate various views of an adjustable saddle 60, according to another embodiment of the present disclosure. The adjustable saddle 60 may incorporate, or omit, any feature described in connection with other adjustable saddles presented herein. FIG. 31 illustrates a partial exploded view of the adjustable saddle 60. FIGS. 32A-E illustrate various views of a mounting frame 6305 of the adjustable saddle 60, and FIGS. 33 and 34 illustrate top and bottom views of first and second saddle half bases 6114, 6214 of the adjustable saddle 60. The first and second saddle half bases 6114, 6214 may be adjustably attached to the mounting frame 6305 via front end and back end fasteners (not shown), as described in other embodiments.

Similar to other embodiments disclosed herein, the mounting frame 6305 may have a mounting frame front end 6310, a mounting frame back end 6330, a plurality of adjustment markings 6340, mounting frame projections 6306, a front attachment aperture 6314, and a rear attachment aperture 6316. The mounting frame 6305 may also be coupled to first and second rails (not shown) at the mounting frame back end 6330 via one or more rail retaining features 6884 (see FIG. 32B), and coupled to the first and second rails at the mounting frame front end 6310 via a suitable front rail bracket (not shown).

The mounting frame front end 6310 may include a first plurality of mounting frame front end tracks 6311 configured to receive first front end fasteners (not shown) to attach the first saddle half base front end 6112 to the mounting frame front end 6310, as well as a second plurality of mounting frame front end tracks 6312 configured to receive second front end fasteners (not shown) to attach the second saddle half base front end 6212 to the mounting frame front end 6310. Likewise, the mounting frame back end 6330 may include a first plurality of mounting frame back end tracks 6333 configured to receive first back end fasteners (not shown) to attach the first saddle half back end 6110 to the mounting frame back end 6330, as well as a second plurality of mounting frame back end tracks 6334 configured to receive second back end fasteners (not shown) to attach the second saddle half back end 6210 to the mounting frame back end 6330.

In the embodiment shown in FIGS. 31-34, at least one of the first and second plurality of mounting frame front and back end tracks 6311, 6312, 6333, 6334 may be angled non-parallel to the lateral direction 94 (as shown in FIG. 21) and extend along a rectilinear path, or an arcuate path, allowing for pivotal and/or translational adjustment of the saddle half base front and back ends 6112, 6212, 6110, 6210 relative to the mounting frame front end 6310 and the mounting frame back end 6330. Moreover, a length along either the rectilinear path, or along the arcuate path, of at least one of the first and second plurality of mounting frame front and back end tracks 6311, 6312, 6333, 6334 may be greater than a length along the rectilinear path, or along the arcuate path, of one or more of the other first and second plurality of mounting frame front and back end tracks 6311, 6312, 6333, 6334.

FIGS. 33 and 34 show top and bottom views of the first saddle half base 6114 and the second saddle half base 6214. The first and second saddle half bases 6114, 6214 may define an intermediate open space 6000 between the first and second saddle half bases 6114, 6214. The first and second saddle half bases 6114, 6214 may include a first saddle half base front end track 6130 formed in the first saddle half base front end 6112, and a second saddle half base front end track 6230 formed in the second saddle half base front end 6212. In at least one embodiment, the first and second saddle half base front end tracks 6130, 6230 may be angled non-parallel to the lateral direction 94 and extend along a rectilinear path, or an arcuate path, allowing pivotal and/or translational adjustment of the saddle half base front ends 6112, 6212 relative to the mounting frame front end 6310. In this manner, the first and second saddle half base front ends 6112, 6212 may pivotally attach to the mounting frame front end 6310 at any of a plurality of different pivot points located along the first plurality of mounting frame front end tracks 6311 and/or the first saddle half base front end track 6130, as well as the second plurality of mounting frame front end tracks 6312 and/or the second saddle half base front end track 6230. Thus, the first front end fastener (not shown) is movable along the first mounting frame front end track 6311 and/or the first saddle half base front end track 6130 to couple the first saddle half base front end 6112 to the mounting frame front end 6310 at any of a plurality of different pivot points. Likewise, the second front end fastener (not shown) is movable along the second mounting frame front end track 6312 and/or the second saddle half base front end track 6230 to couple the second saddle half base front end 6212 to the mounting frame front end 6310 at any of a plurality of different pivot points.

In at least one embodiment, the first and second saddle half base front end tracks 6130, 6230 may also include front retainer housings 6160, 6260 configured to retain suitable retainer nuts (not shown) that may be placed within the front retainer housings 6160, 6260. These retainer nuts may be configured to couple with the first and second front end fasteners (not shown) through the first and second saddle half front end tracks 6130, 6230.

The first and second saddle half bases 6114, 6214 may also include a first saddle half base back end track 6120 formed in the first saddle half base back end 6110, and a second saddle half base back end track 6220 formed in the second saddle half base back end 6210. The first and second saddle half base back end tracks 6120, 6220 may extend along an arcuate path, or a rectilinear path, allowing pivotal and/or translational adjustment of the first and second saddle half base back ends 6110, 6210 relative to the mounting frame back end 6330. In this manner, the first and second saddle half base back ends 6110, 6210 may pivotally attach to the mounting frame back end 6330 at any of a plurality of different pivot points located along the first plurality of mounting frame back end tracks 6333 and/or the first saddle half base back end track 6120, as well as the second plurality of mounting frame back end track 6334 and/or the second saddle half base back end track 6220. Thus, the first back end fastener (not shown) is movable along the first plurality of mounting frame back end tracks 6333 and/or the first saddle half base back end track 6120 to couple the first saddle half base back end 6110 to the mounting frame back end 6330 at any of a plurality of different pivot points. Likewise, the second back end fastener (not shown) is movable along the second plurality of mounting frame back end tracks 6334 and/or the second saddle half base back end track 6220 to couple the second saddle half base back end 6210 to the mounting frame back end 6330 at any of a plurality of different pivot points.

In at least one embodiment, the first and second saddle half base back end tracks 6120, 6220 may also include back retainer housings 6170, 6270 configured to retain suitable retainer nuts (not shown) that may be placed within the back retainer housings 6170, 6270. These retainer nuts may be configured to couple with the first and second mounting frame back end fasteners (not shown) through the first and second saddle half back end tracks 6130, 6230.

The first and second saddle half bases 6114, 6214 may include a plurality of longitudinal ribs 6180, 6280 configured to provide rigid support for the rider's weight. The first and second saddle half bases 6114, 6214 may releasably couple to first and second skins (not shown) via suitable fasteners, such as screws (not shown), placed through fastener apertures 6151, 6251, in order to couple the first and second skins to the first and second saddle half bases 6114, 6214. However, in other embodiments, the first and second skins 3150, 3250 may be integrally formed with and/or coupled to the plurality of longitudinal ribs 6180, 6280 via any other method known in the art.

Figure 35:
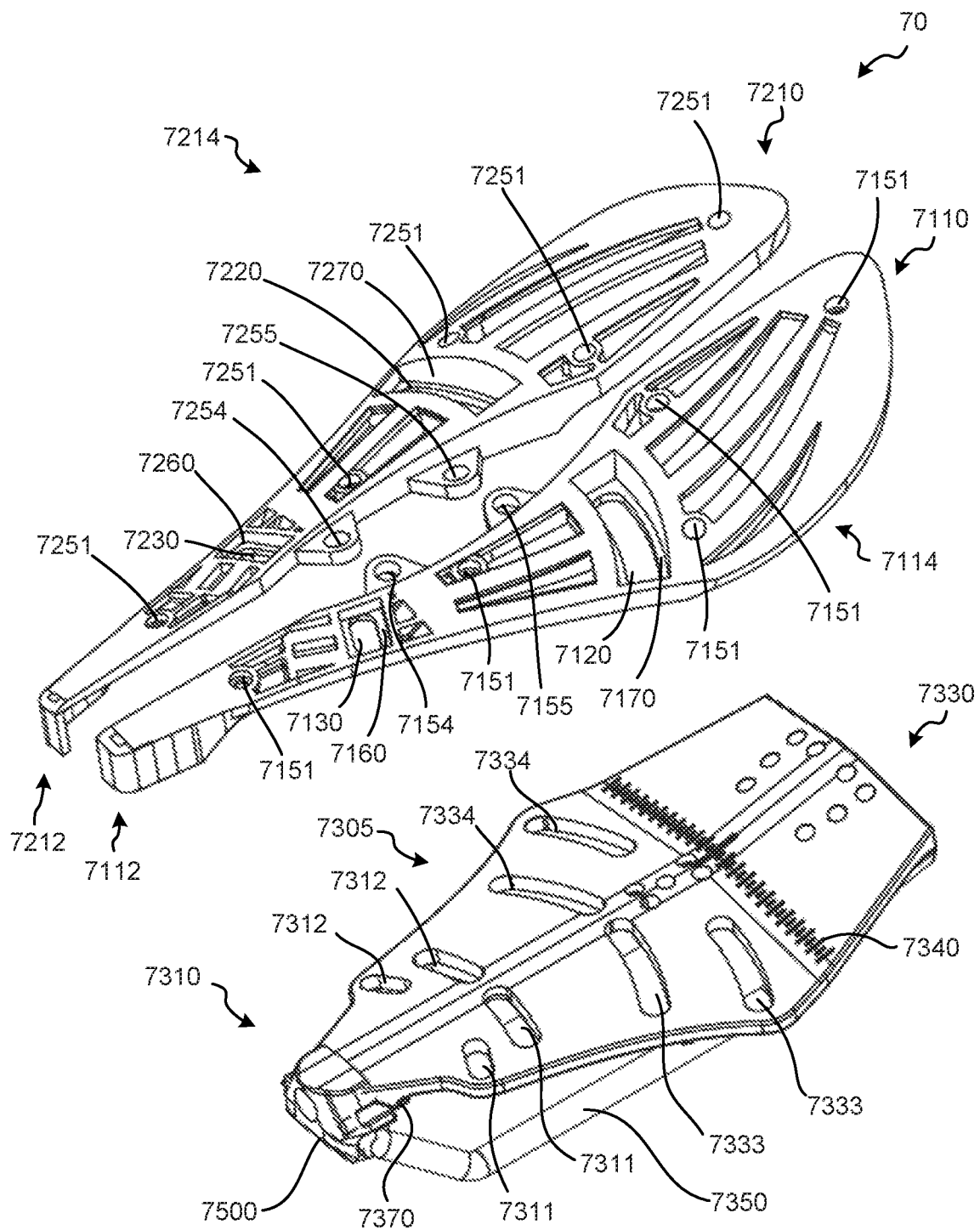
FIG. 35 illustrates a partial exploded view of an adjustable saddle, according to another embodiment of the present disclosure.
Figure 36:
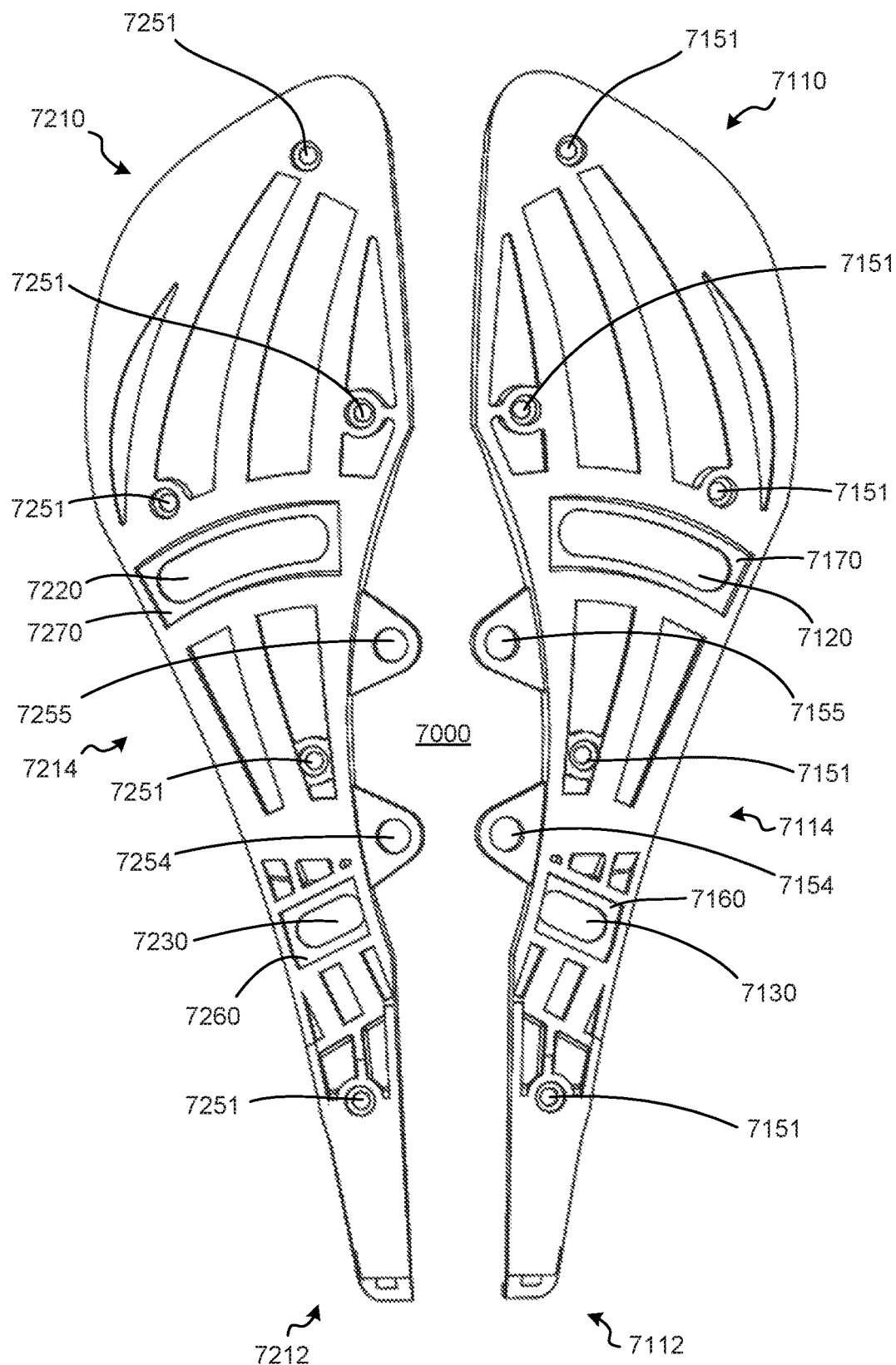
FIG. 36 illustrates a top view of the saddle half bases shown in FIG. 35.
Figure 37:
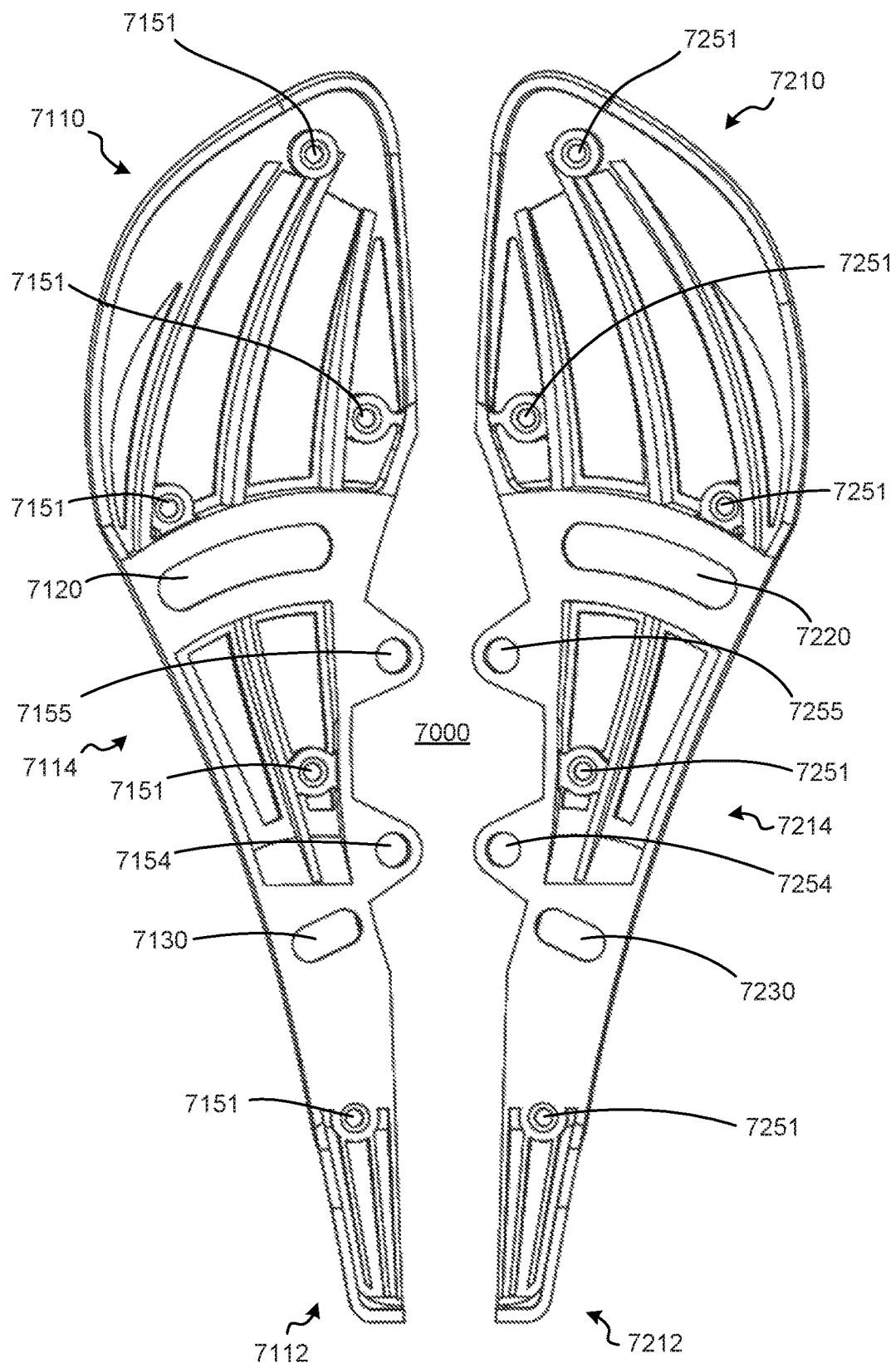
FIG. 37 illustrates a bottom view of the saddle half bases shown in FIG. 35.

FIGS. 35-37 illustrate various views of an adjustable saddle 70, according to another embodiment of the present disclosure. The adjustable saddle 70 may incorporate, or omit, any feature described in connection with other adjustable saddles presented herein. FIG. 35 illustrates a partial exploded view of the adjustable saddle 70 and FIGS. 36 and 37 illustrate top and bottom views of first and second saddle half bases 7114, 7214 of the adjustable saddle 70. The first and second saddle half bases 7114, 7214 may be adjustably attached to the mounting frame 7305 via front end and back end fasteners (not shown), as described in other embodiments.

Similar to other embodiments disclosed herein, the mounting frame 7305 may have a mounting frame front end 7310, a mounting frame back end 7330, and a plurality of adjustment markings 7340. The mounting frame 7305 may be coupled to a first rail 7350 and a second rail 7370 at the mounting frame back end 7330 via one or more rail retaining features (not shown), and coupled to the first and second rails 7350, 7370 at the mounting frame front end 7310 via a front rail bracket 7500, as previously discussed.

The mounting frame front end 7310 may include a first plurality of mounting frame front end tracks 7311 configured to receive first front end fasteners (not shown) to attach the first saddle half base front end 7112 to the mounting frame front end 7310, as well as a second plurality of mounting frame front end tracks 7312 configured to receive second front end fasteners (not shown) to attach the second saddle half base front end 7212 to the mounting frame front end

7310. Likewise, the mounting frame back end 7330 may include a first plurality of mounting frame back end tracks 7333 configured to receive first back end fasteners (not shown) to attach the first saddle half back end 7110 to the mounting frame back end 7330, as well as a second plurality of mounting frame back end tracks 7334 configured to receive second back end fasteners (not shown) to attach the second saddle half back end 7210 to the mounting frame back end 7330.

In the embodiment shown in FIGS. 35-37, at least one of the first and second plurality of mounting frame front and back end tracks 7311, 7312, 7333, 7334 may be angled non-parallel to the lateral direction 94 (as shown in FIG. 21) and extend along a rectilinear path, or an arcuate path, allowing for pivotal and/or translational adjustment of the saddle half base front and back ends 7112, 7212, 7110, 7210 relative to the mounting frame front and back ends 7310, 7330. Moreover, a length along either the rectilinear path, or along the arcuate path, of at least one of the first and second plurality of mounting frame front and back end tracks 7311, 7312, 7333, 7334 may be greater than a length along the rectilinear path, or along the arcuate path, of one or more of the other first and second plurality of mounting frame front and back end tracks 7311, 7312, 7333, 7334.

FIGS. 36 and 37 show top and bottom views of the first saddle half base 7114 and the second saddle half base 7214. The first and second saddle half bases 7114, 7214 may define an intermediate open space 7000 between the first and second saddle half bases 7114, 7214.

The first saddle half base front end 7112 may include a first saddle half base front end mounting tab 7154 and a first saddle half base back end mounting tab 7155. The second saddle half base front end 7212 may also include a second saddle half base front end mounting tab 7254 and a second saddle half base back end mounting tab 7255. Each of the first and second saddle half base front and back end mounting tabs 7154, 7155, 7254, 7255 may project into the intermediate open space 7000 formed between the first and second saddle half bases 7114, 7214, to receive a suitable fastener (not shown) to couple the first and second saddle half bases 7114, 7214 to the mounting frame 7305. In this manner, each of the first and second saddle half base front and back end mounting tabs 7154, 7155, 7254, 7255 (and their associated fastener) may be accessible to the rider via the intermediate open space 7000 when the adjustable saddle 70 is fully assembled. This may allow a rider to adjust the adjustable saddle 70 in a more quick/efficient manner.

The first and second saddle half bases 7114, 7214 may also include a first saddle half base front end track 7130 formed in the first saddle half base front end 7112, and a second saddle half base front end track 7230 formed in the second saddle half base front end 7212. In at least one embodiment, the first and second saddle half base front end tracks 7130, 7230 may be angled non-parallel to the lateral direction 94 and extend along a rectilinear path, or an arcuate path, allowing pivotal and/or translational adjustment of the saddle half base front ends 7112, 7212 relative to the mounting frame front end 7310. In this manner, the first and second saddle half base front ends 7112, 7212 may pivotally attach to the mounting frame front end 7310 at any of a plurality of different pivot points located along the first plurality of mounting frame front end tracks 7311 and/or the first saddle half base front end track 7130, as well as the second plurality of mounting frame front end tracks 7312 and/or the second saddle half base front end track 7230.

In at least one embodiment, the first and second saddle half base front end tracks 7130, 7230 may also include front retainer housings 7160, 7260 configured to retain suitable retainer nuts (not shown) that may be placed within the front retainer housings 7160, 7260. These retainer nuts may be configured to couple with the first and second front end fasteners (not shown) through the first and second saddle half front end tracks 7130, 7230.

The first and second saddle half bases 7114, 7214 may also include a first saddle half base back end track 7120 formed in the first saddle half base back end 7110, and a second saddle half base back end track 7220 formed in the second saddle half base back end 7210. The first and second saddle half base back end tracks 7120, 7220 may extend along an arcuate path, allowing pivotal and/or translational adjustment of the first and second saddle half base back ends 7110, 7210 relative to the mounting frame back end 7330. In this manner, the first and second saddle half base back ends 7110, 7210 may pivotally attach to the mounting frame back end 7330 at any of a plurality of different pivot points located along the first plurality of mounting frame back end tracks 7333 and/or the first saddle half base back end track 7120, as well as the second plurality of mounting frame back end track 7334 and/or the second saddle half base back end track 7220.

In at least one embodiment, the first and second saddle half base back end tracks 7120, 7220 may also include back retainer housings 7170, 7270 configured to retain suitable retainer nuts (not shown) that may be placed within the back retainer housings 7170, 7270. These retainer nuts may be configured to couple with the first and second mounting frame back end fasteners (not shown) through the first and second saddle half back end tracks 7130, 7230.

The first and second saddle half bases 7114, 7214 may also include a plurality of longitudinal ribs configured to provide rigid support for the rider's weight, as previously discussed. The first and second saddle half bases 7114, 7214 may releasably couple to first and second skins (not shown) via suitable fasteners, such as screws (not shown), placed through fastener apertures 7151, 7251, in order to couple the first and second skins to the first and second saddle half bases 7114, 7214. However, in other embodiments, the first and second skins 3150, 3250 may be integrally formed with and/or coupled to the plurality of longitudinal ribs via any other method known in the art.

Figure 38:
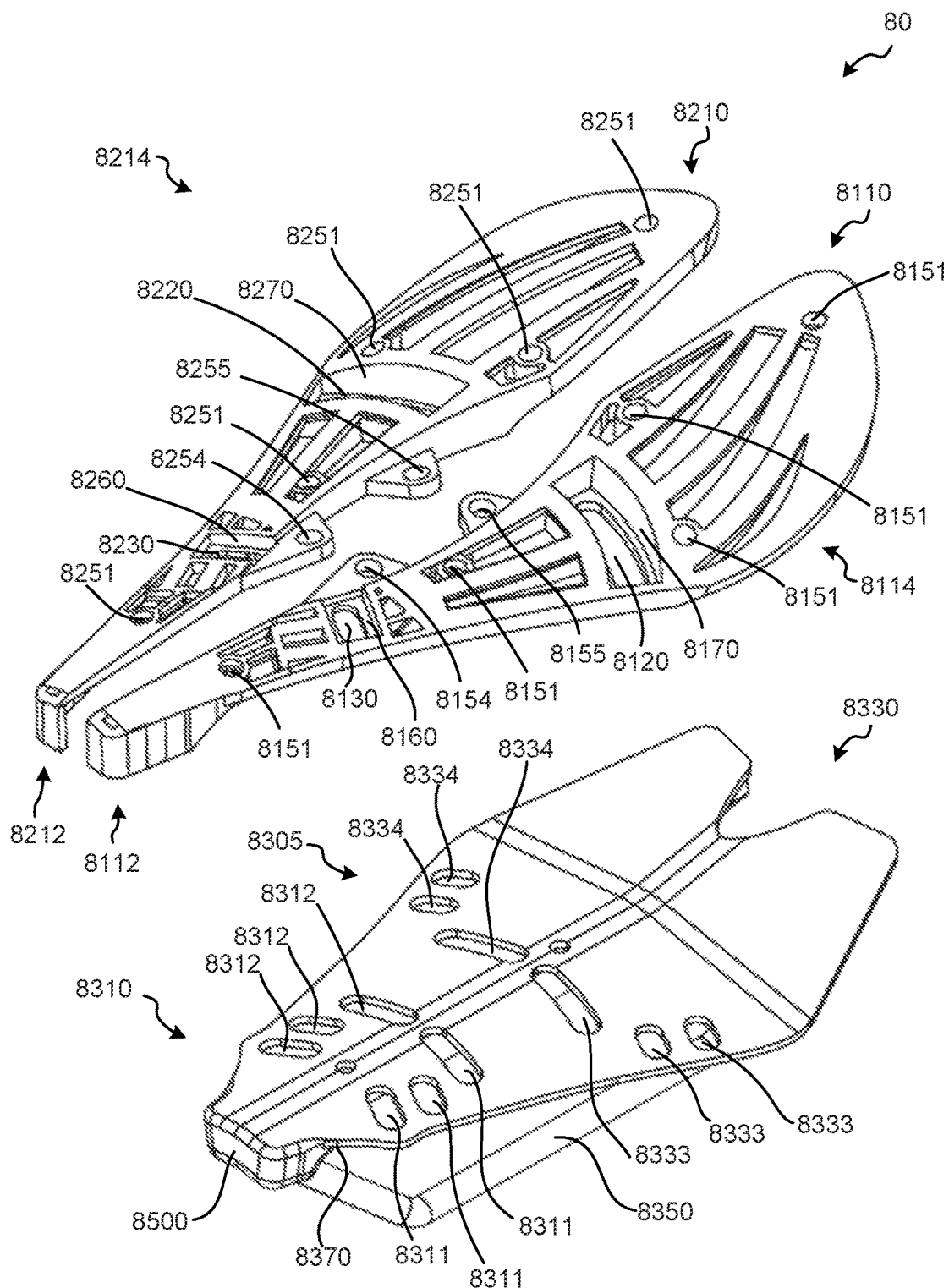
FIG. 38 illustrates a partial exploded view of an adjustable saddle, according to another embodiment of the present disclosure.
Figure 39A:
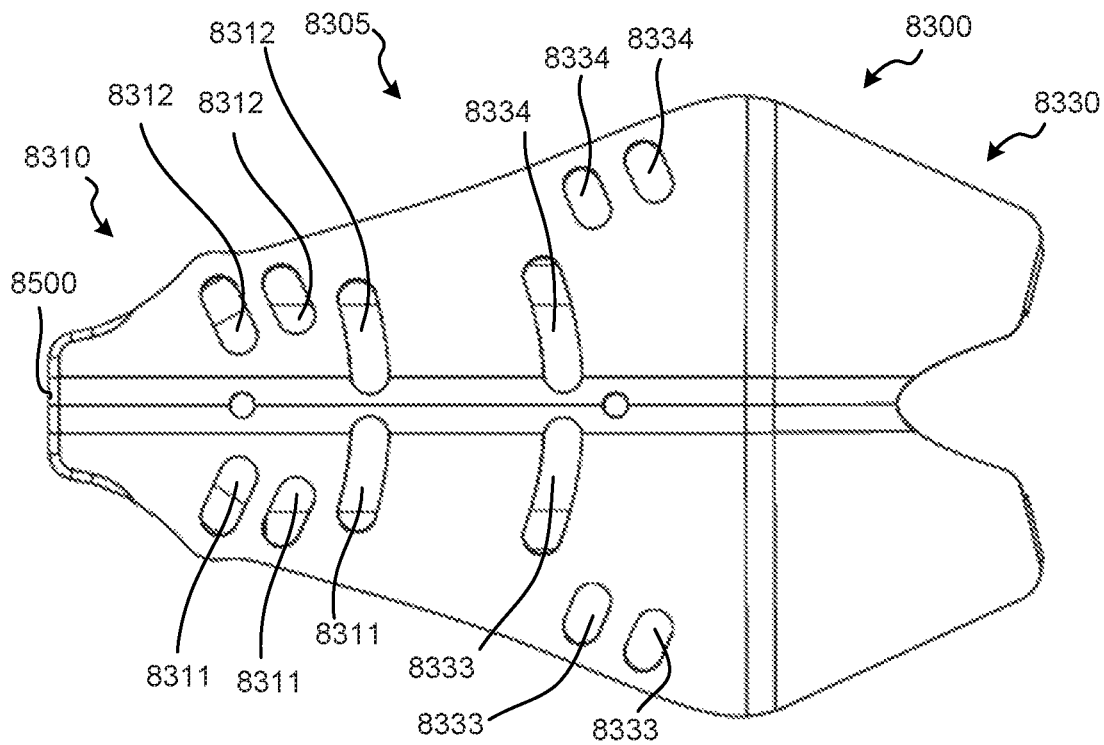
FIG. 39A illustrates a top view of the assembled chassis for the adjustable saddle shown in FIG. 38.
Figure 39B:
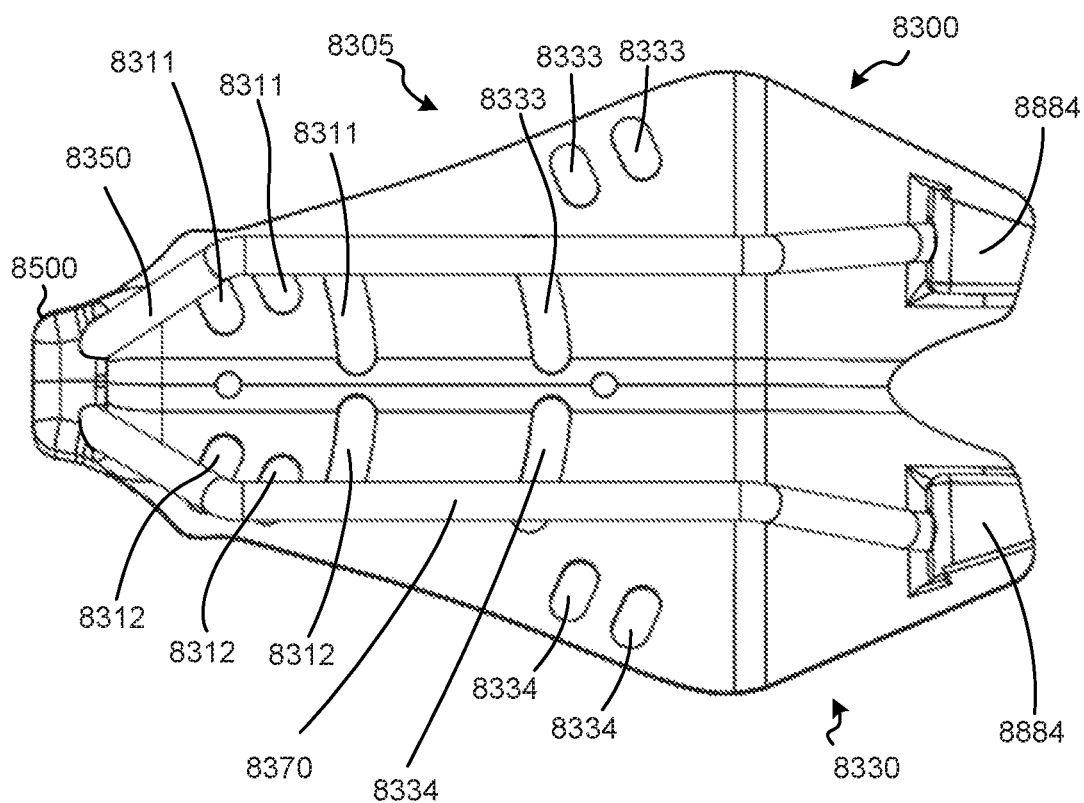
FIG. 39B illustrates a bottom view of the chassis.
Figure 39C:
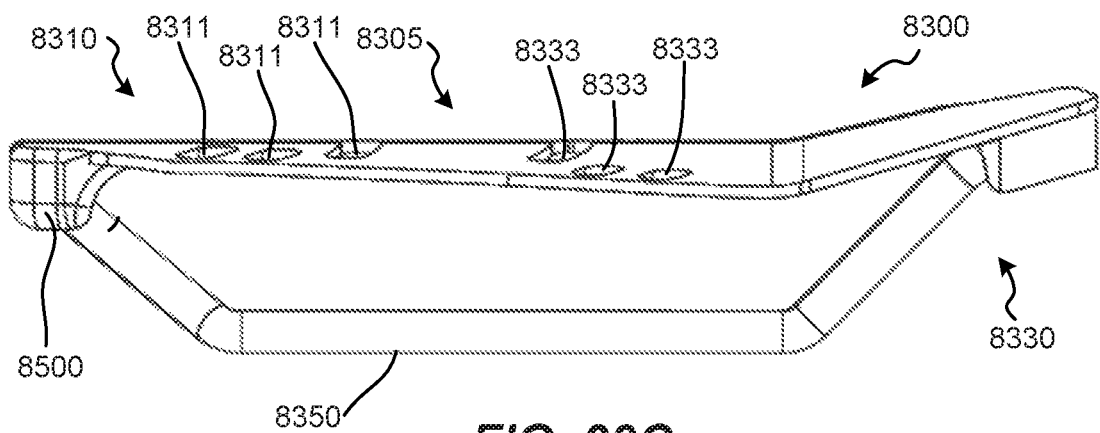
FIG. 39C illustrates a side view of the chassis.
Figure 39D:
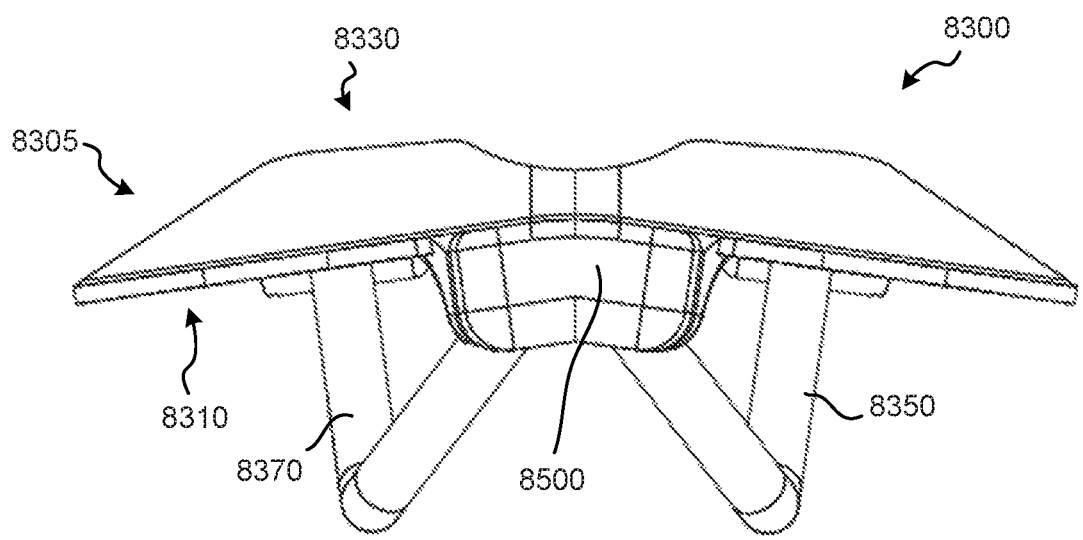
FIG. 39D illustrates a front view of the chassis.
Figure 39E:
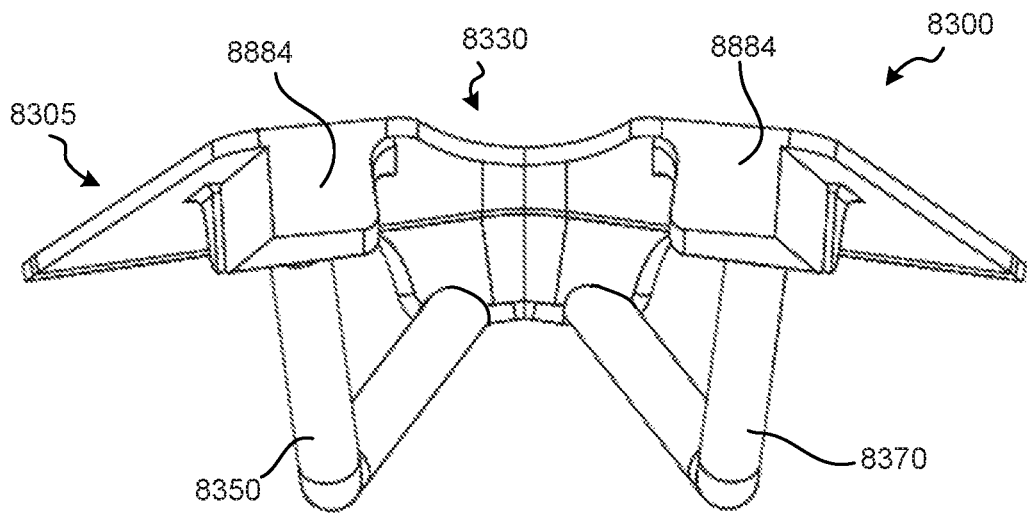
FIG. 39E illustrates a rear view of the chassis.

FIGS. 38-39E illustrate various views of an adjustable saddle 80, according to another embodiment of the present disclosure. The adjustable saddle 80 may incorporate, or omit, any feature described in connection with other adjustable saddles presented herein. FIG. 38 illustrates a partial exploded view of the adjustable saddle 80. FIGS. 39A-E illustrate various views of a chassis 8300 of the adjustable saddle 80. The first and second saddle half bases 8114, 8214 may be adjustably attached to the mounting frame 8305 via front end and back end fasteners (not shown), as described in other embodiments.

Similar to other embodiments disclosed herein, the mounting frame 8305 may have a mounting frame front end 8310 and a mounting frame back end 8330. The mounting frame 8305 may be coupled to a first rail 8350 and a second rail 8370 at the mounting frame back end 8330 via one or more rail retaining features 8884 (see FIG. 39B), and coupled to the first and second rails 8350, 8370 at the mounting frame front end 8310 via a front rail bracket 8500, as previously discussed.

The mounting frame front end 8310 may include a first plurality of mounting frame front end tracks 8311 configured to receive first front end fasteners (not shown) to attach the first saddle half base front end 8112 to the mounting frame front end 8310, as well as a second plurality of mounting frame front end tracks 8312 configured to receive second front end fasteners (not shown) to attach the second saddle half base front end 8212 to the mounting frame front end 8310. Likewise, the mounting frame back end 8330 may include a first plurality of mounting frame back end tracks 8333 configured to receive first back end fasteners (not shown) to attach the first saddle half back end 8110 to the mounting frame back end 8330, as well as a second plurality of mounting frame back end tracks 8334 configured to receive second back end fasteners (not shown) to attach the second saddle half back end 8210 to the mounting frame back end 8330.

In the embodiment shown in FIGS. 38-39E, at least one of the first and second plurality of mounting frame front and back end tracks 8311, 8312, 8333, 8334 may be angled non-parallel to the lateral direction 94 (see FIG. 21) and extend along a rectilinear path, or an arcuate path, allowing for pivotal and/or translational adjustment of the saddle half base front and back ends 8112, 8212, 8110, 8210 relative to the mounting frame front and back ends 8310, 8330. Moreover, a length along either the rectilinear path, or along the arcuate path, of at least one of the first and second plurality of mounting frame front and back end tracks 8311, 8312, 8333, 8334 may be greater than a length along the rectilinear path, or along the arcuate path, of one or more of the other first and second plurality of mounting frame front and back end tracks 8311, 8312, 8333, 8334.

The first and second saddle half bases 8114, 8214 may also define an intermediate open space between the first and second saddle half bases 8114, 8214. The first saddle half base front end 8112 may include a first saddle half base front end mounting tab 8154 and a first saddle half base back end mounting tab 8155. The second saddle half base front end 8212 may also include a second saddle half base front end mounting tab 8254 and a second saddle half base back end mounting tab 8255. Each of the first and second saddle half base front and back end mounting tabs 8154, 8155, 8254, 8255 may project into the intermediate open space formed between the first and second saddle half bases 8114, 8214, and receive a suitable fastener (not shown) to couple the first and second saddle half bases 8114, 8214 to the mounting frame 8305. In this manner, each of the first and second saddle half base front and back end mounting tabs 8154, 8155, 8254, 8255 (and their associated fastener) may be accessible to the rider via the intermediate open space when the adjustable saddle 80 is fully assembled. This may allow a rider to adjust the adjustable saddle 80 in a more quick/efficient manner.

The first and second saddle half bases 8114, 8214 may also include a first saddle half base front end track 8130 formed in the first saddle half base front end 8112, and a second saddle half base front end track 8230 formed in the second saddle half base front end 8212. In at least one embodiment, the first and second saddle half base front end tracks 8130, 8230 may be angled non-parallel to the lateral direction 94 and extend along a rectilinear path, or an arcuate path, allowing pivotal and/or translational adjustment of the saddle half base front ends 8112, 8212 relative to the mounting frame front end 8310. In this manner, the first and second saddle half base front ends 8112, 8212 may pivotally attach to the mounting frame front end 8310 at any of a plurality of different pivot points located along the first plurality of mounting frame front end tracks 8311 and/or the first saddle half base front end track 8130, as well as the second plurality of mounting frame front end tracks 8312 and/or the second saddle half base front end track 8230.

In at least one embodiment, the first and second saddle half base front end tracks 8130, 8230 may also include front retainer housings 8160, 8260 configured to retain suitable retainer nuts (not shown) that may be placed within the front retainer housings 8160, 8260. These retainer nuts may be configured to couple with the first and second front end fasteners (not shown) through the first and second saddle half front end tracks 8130, 8230.

The first and second saddle half bases 8114, 8214 may also include a first saddle half base back end track 8120 formed in the first saddle half base back end 8110, and a second saddle half base back end track 8220 formed in the second saddle half base back end 8210. The first and second saddle half base back end tracks 8120, 8220 may extend along an arcuate path, allowing pivotal and/or translational adjustment of the first and second saddle half base back ends 8110, 8210 relative to the mounting frame back end 8330. In this manner, the first and second saddle half base back ends 8110, 8210 may pivotally attach to the mounting frame back end 8330 at any of a plurality of different pivot points located along the first plurality of mounting frame back end tracks 8333 and/or the first saddle half base back end track 8120, as well as the second plurality of mounting frame back end track 8334 and/or the second saddle half base back end track 8220.

In at least one embodiment, the first and second saddle half base back end tracks 8120, 8220 may also include back retainer housings 8170, 8270 configured to retain suitable retainer nuts (not shown) that may be placed within the back retainer housings 8170, 8270. These retainer nuts may be configured to couple with the first and second mounting frame back end fasteners (not shown) through the first and second saddle half back end tracks 8130, 8230.

The first and second saddle half bases 8114, 8214 may also include a plurality of longitudinal ribs configured to provide rigid support for the rider's weight. The first and second saddle half bases 8114, 8214 may releasably couple to first and second skins (not shown) via suitable fasteners, such as screws (not shown), placed through a first plurality of fastener apertures 8151 and a second plurality of fastener apertures 8251, in order to couple the first and second skins to the first and second saddle half bases 8114, 8214. However, in other embodiments, the first and second skins 3150, 3250 may be integrally formed with and/or coupled to the plurality of longitudinal ribs via any other method known in the art.

Figure 40:
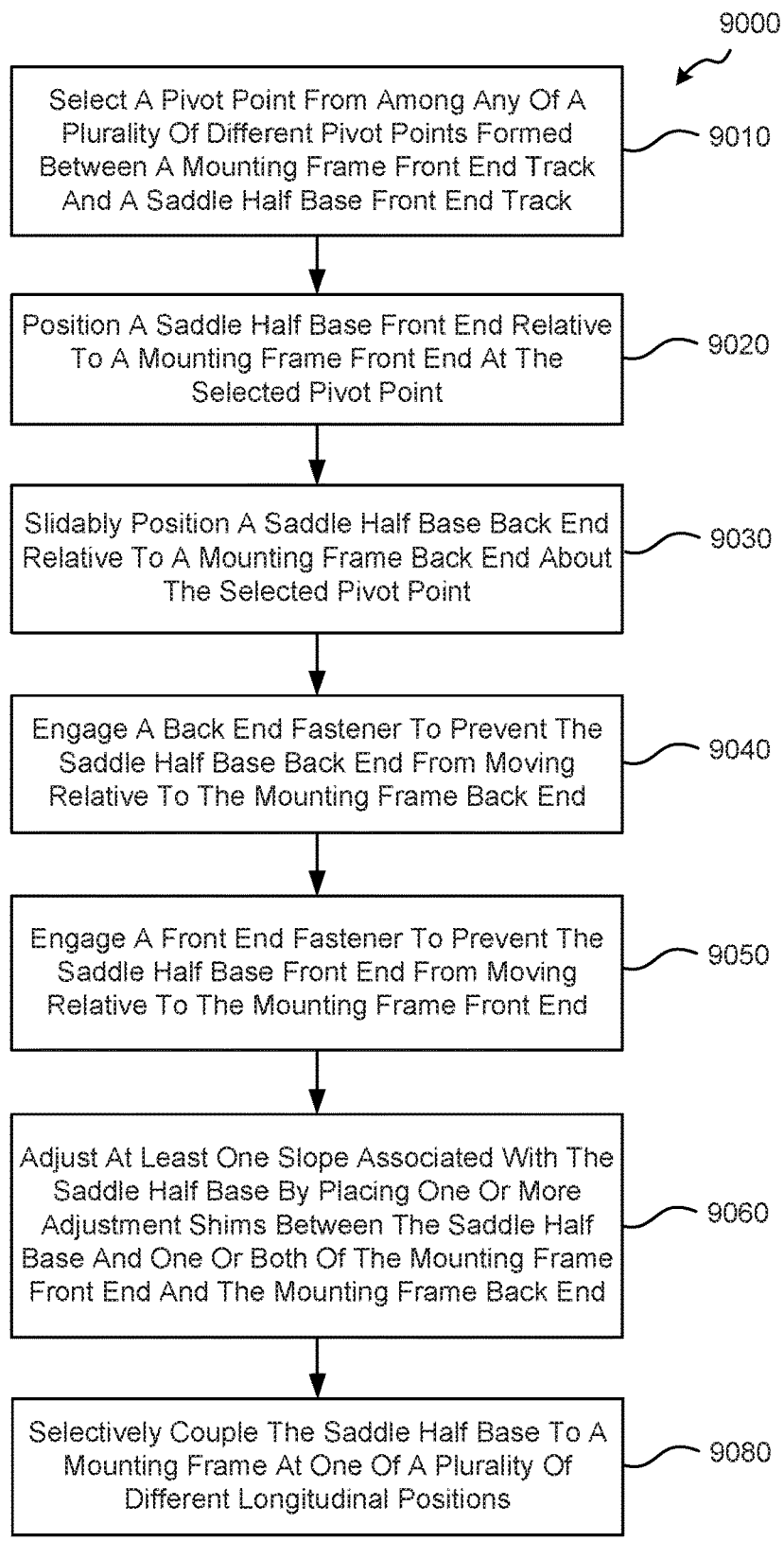
FIG. 40 is a flowchart illustrating a method of positioning the adjustable saddles of the present disclosure.

FIG. 40 illustrates a flowchart of a method 9000 by which adjustable saddles of the present disclosure may be adjusted. For ease of explanation, the method 9000 will be explained with reference to the adjustable saddle 30 shown if FIGS. 20-26. However, it will be understood that the method 9000 may apply to any of the adjustable saddles disclosed in the present disclosure.

The method 9000 may begin with a step 9010 in which a saddle half base 3114 may be adjusted. In this step, a pivot point may be selected from among any of a plurality of different pivot points that are formed between a mounting frame front end track 3311 and a saddle half base front end track 3130 when the mounting frame front end track 3311 and the saddle half base front end track 3130 are brought into close proximity with each other and/or are aligned with each other. A front end fastener 3301 may also be placed through the mounting frame front end track 3311 and the saddle half base front end track 3130 to loosely hold the mounting frame front end track 3311 and the saddle half base front end track 3130 together in alignment.

Once a pivot point has been selected, the method 9000 may proceed to a step 9020 in which a saddle half base front end 3112 may be positioned relative to a mounting frame front end 3310 the at the selected pivot point. At this point, the user may partially tighten the front end fastener 3301 to maintain the selected pivot point position.

Once the saddle half base front end 3112 has been positioned at the selected pivot point, the method 9000 may proceed to a step 9030 in which a saddle half base back end 3110 may be slidably positioned relative to a mounting frame back end 3330 about the selected pivot point. A back end fastener 3303 may also be placed through the mounting frame back end track 3333 and the saddle half base back end track 3120 to loosely couple the mounting frame back end track 3333 and the saddle half base back end track 3120 in alignment during positioning of the saddle half base back end 3110 relative to the mounting frame back end 3330.

Once the saddle half base back end 3110 has been positioned at a desired location, the method 9000 may proceed to a step 9040 in which the back end fastener 3303 may be engaged to prevent the saddle half base back end 3110 from moving relative to the mounting frame back end 3330.

Once the back end fastener 3303 has been engaged, the method 9000 may proceed to a step 9050 in which the front end fastener 3301 may be engaged to prevent the saddle half base front end 3112 from moving relative to the mounting frame front end 3310.

Alternatively, or in addition thereto, the method 9000 may include a step 9060 in which at least one slope associated with the saddle half base 3114 may be adjusted with one or more adjustment shims 710, 720, 730, 740 (see FIG. 8A) by placing the one or more adjustment shims 710, 720, 730, 740 between the saddle half base 3114 and one or both of the mounting frame front end 3310 and the mounting frame back end 3330. In this manner, the saddle half base 3114 may be rotated about at least one of the longitudinal direction 92, the lateral direction 94, and the transverse direction 96 (see FIG. 21), to adjust the at least one slope associated with the saddle half base 3114.

Alternatively, or in addition thereto, the method 9000 may include a step 9080 in which the saddle half base 3114 may be selectively coupled to the mounting frame 3305 at a plurality of different longitudinal positions relative to the mounting frame 3305, for at least some embodiments of the present disclosure. For example, with reference to the adjustable saddle embodiments illustrated in FIGS. 12, 27, 29, 31, 35, and 38, a plurality of different sets of apertures, slots, channels, and/or tracks may be formed in the mounting frames and/or the saddle half bases for these adjustable saddle embodiments. In these embodiments, it is possible to select from among the plurality of different sets of apertures, slots, channels, tracks, etc., in order to selectively couple the saddle half base to the mounting frame at a plurality of different longitudinal positions relative to the mounting frame.

For example, in at least some embodiments (e.g., see FIGS. 29 and 38) the saddle half base may be selectively coupled to the mounting frame in at least one of: a first longitudinal position via the first mounting frame front end track, the second mounting frame front end track, the first mounting frame back end track, and the second mounting frame back end track; a second longitudinal position via the third mounting frame front end track, the fourth mounting frame front end track, the third mounting frame back end track, and the fourth mounting frame back end track; and a third longitudinal position via the fifth mounting frame front end track, the sixth mounting frame front end track, the fifth mounting frame back end track, and the sixth mounting frame back end track. Likewise, analogous configurations exist for other adjustable saddle embodiments disclosed herein (e.g., see FIGS. 12, 27, 31, 35, etc.).

FIGS. 41-48B illustrate various views of an adjustable saddle 10000 for a cycle, according to another embodiment of the present disclosure.

As used herein, the term "cycle" includes any saddle seat that may be used in a variety of applications including but not limited to: chairs, sit/stand chairs, stationary exercise equipment, bicycles, scooters, motorcycles, motorized vehicles, as well as in various other applications where an individual may desire to assume a seated, or at least partially seated, position. The terms "about" and "substantially," when applied to a numerical term, relate to a range of minus 20% to plus 20% of the numerical term, unless otherwise specifically defined herein.

Figure 41:
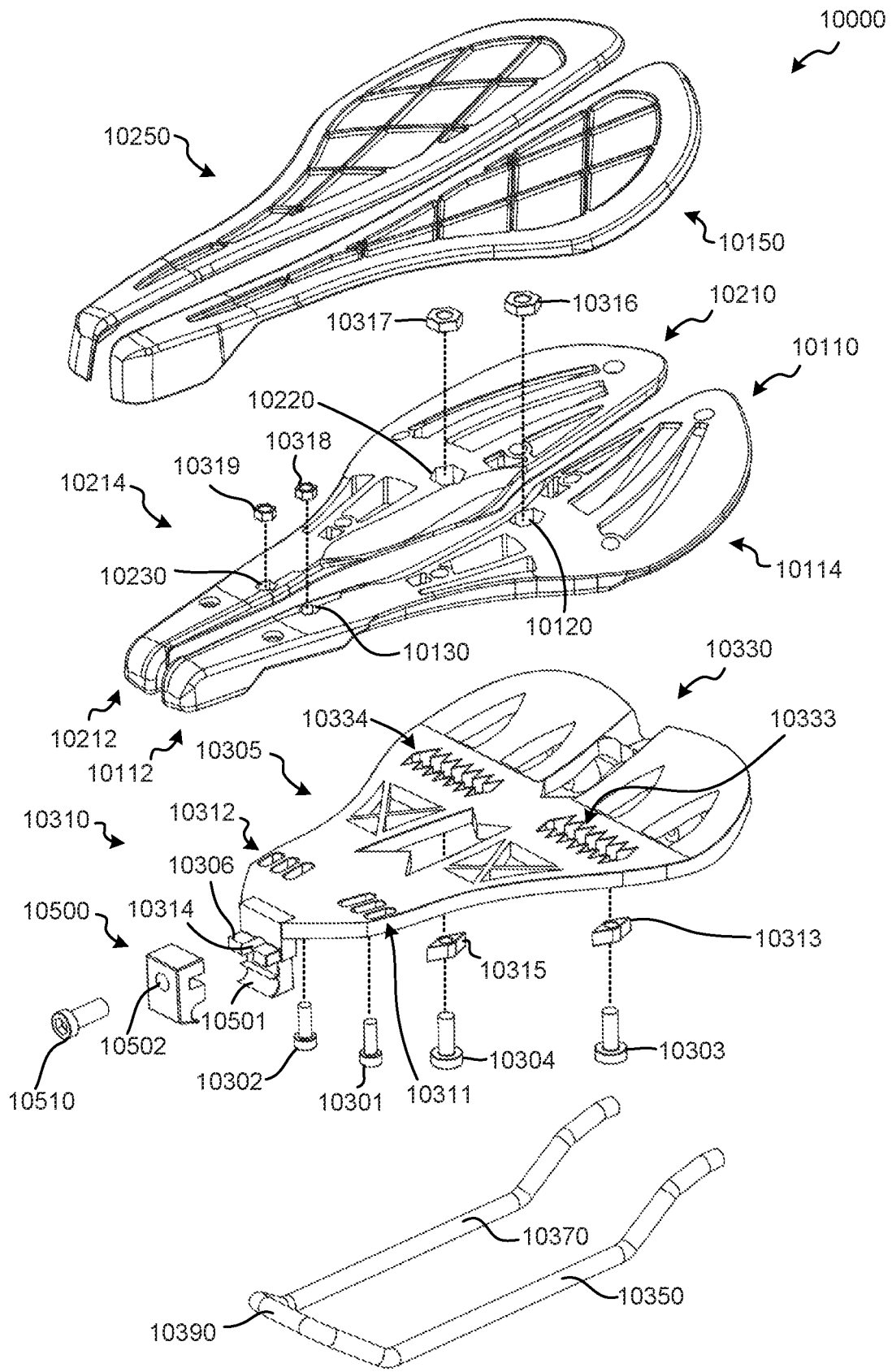
FIG. 41 illustrates an exploded view of an adjustable saddle, according to another embodiment of the present disclosure.
Figure 42:
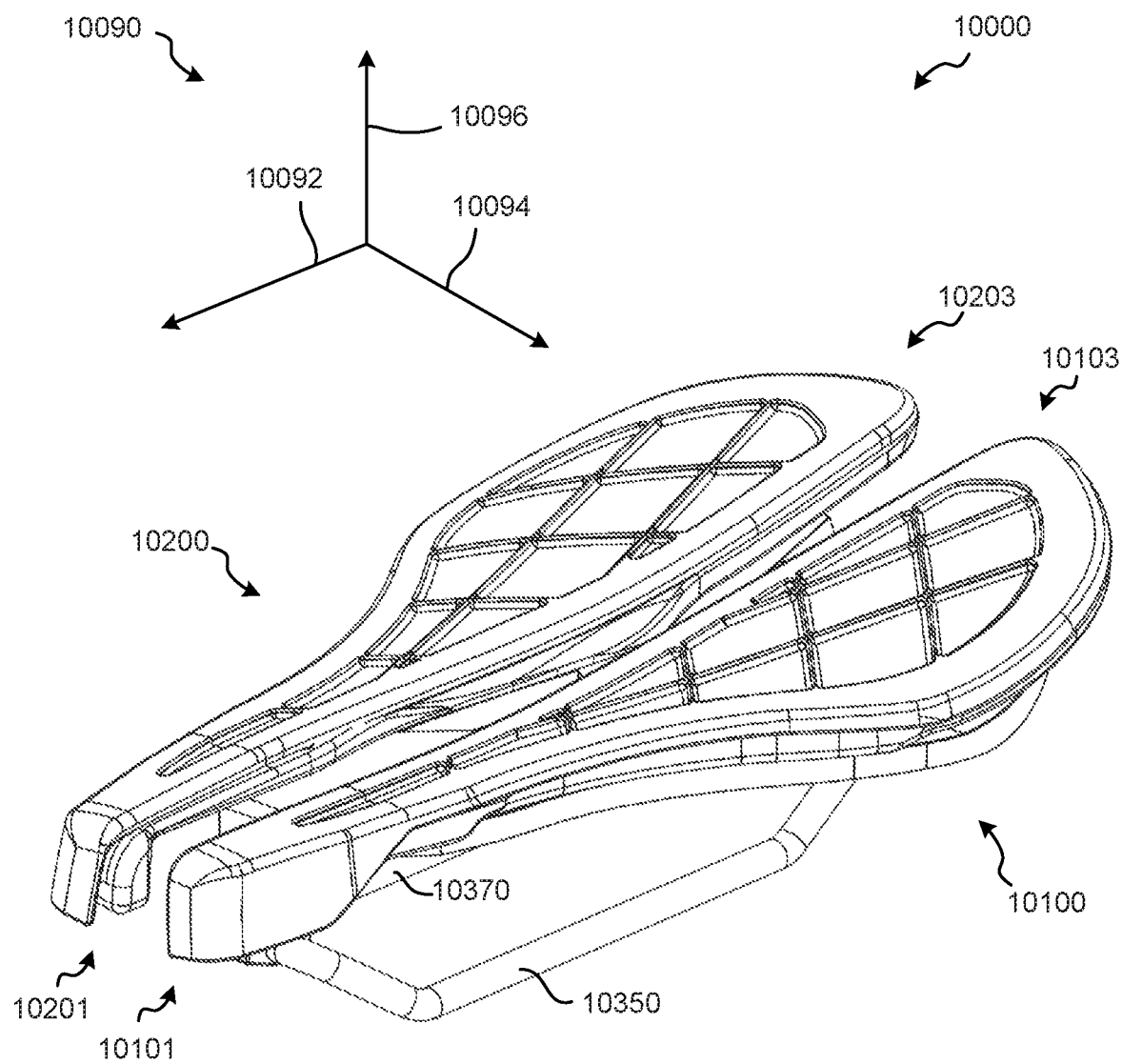
FIG. 42 illustrates a perspective view of the adjustable saddle of FIG. 41 in assembled form.
Figure 44A:
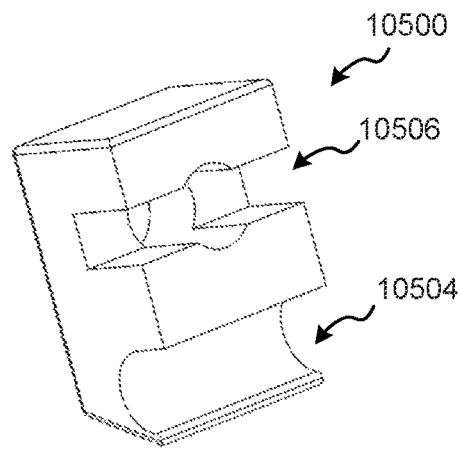
FIG. 44A illustrates a perspective view of the front rail bracket shown in FIG. 41.
Figure 44B:
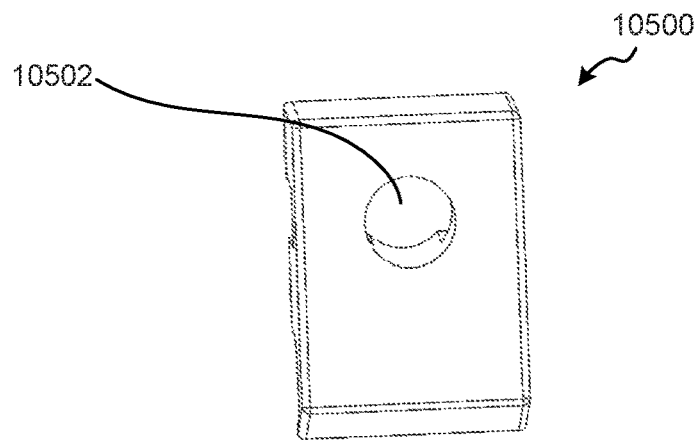
FIG. 44B illustrates a rear perspective view of the front rail bracket.
Figure 44C:
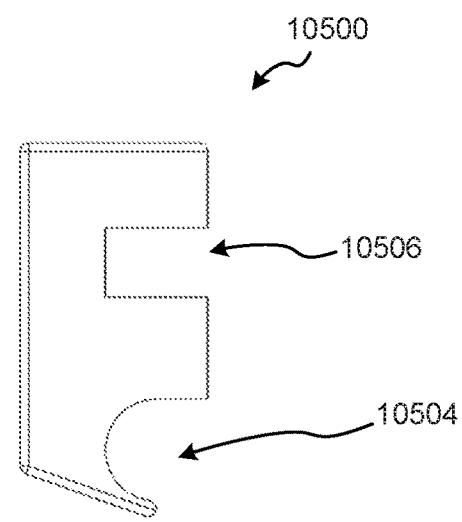
FIG. 44C illustrates a side view of the front rail bracket.
Figure 45:
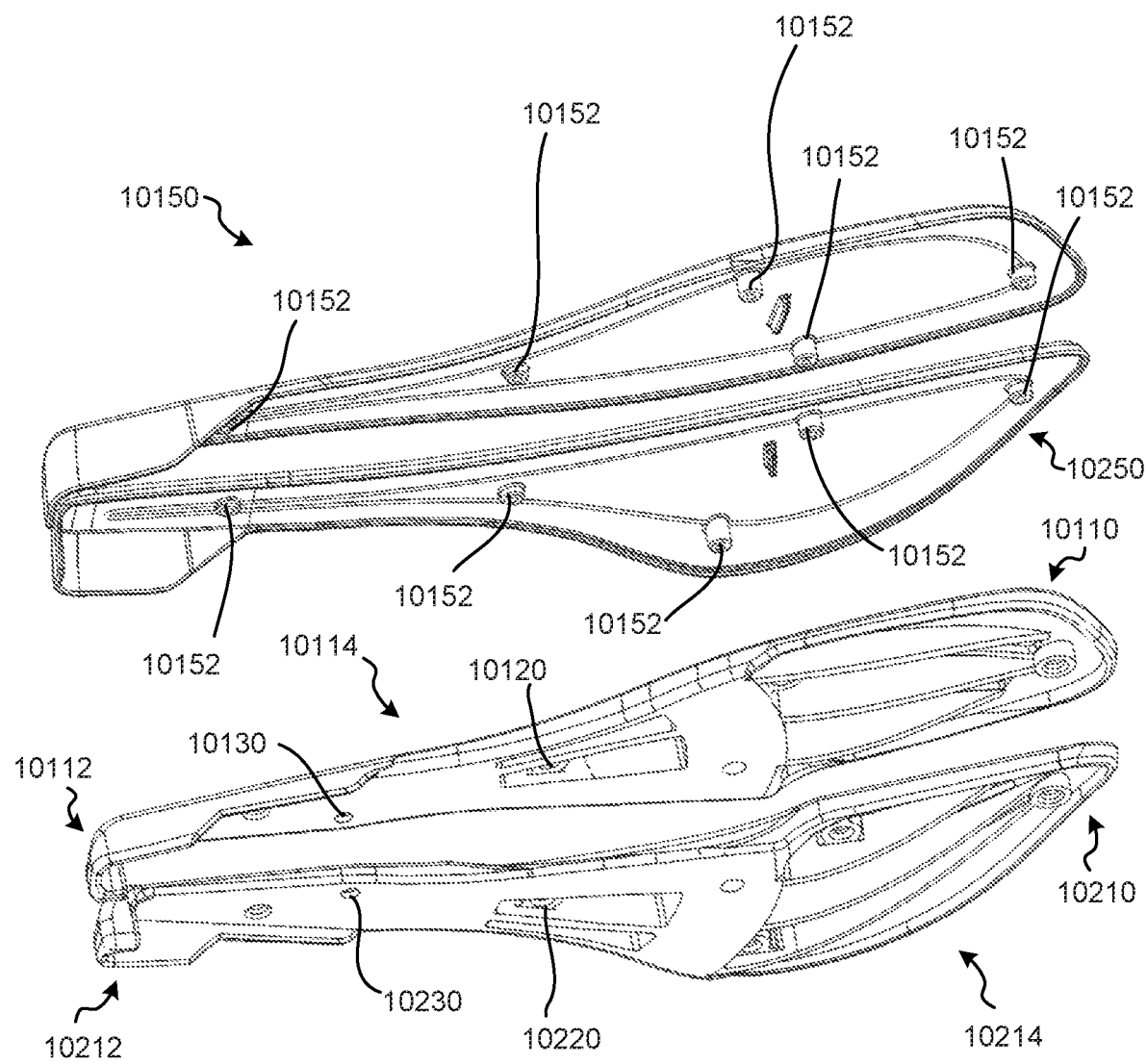
FIG. 45 illustrates a partial exploded view of the adjustable saddle of FIG. 41 with the two skins above the two saddle half bases prior to assembly.
Figure 46:
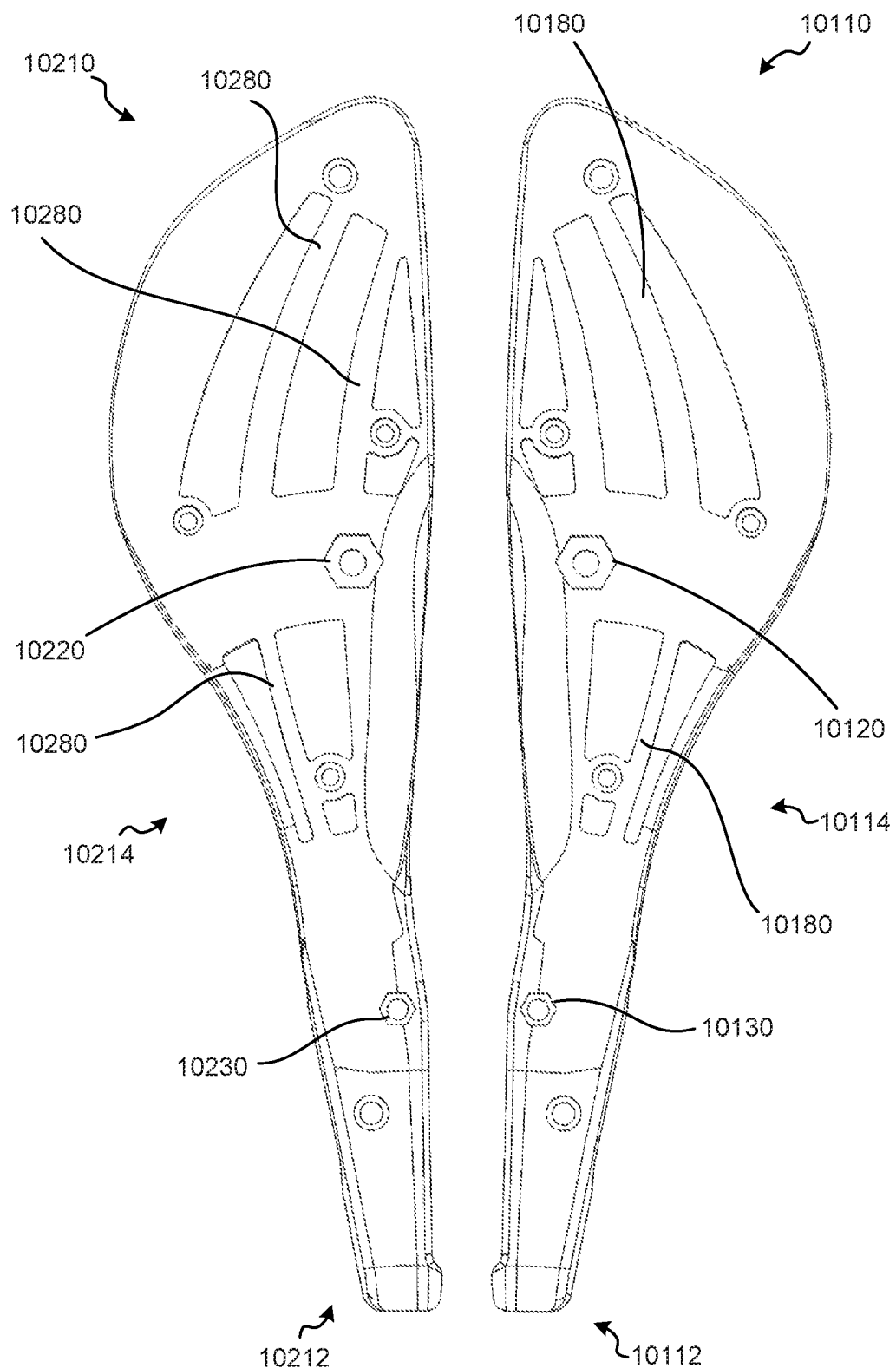
FIG. 46 illustrates a top view of the saddle half bases shown in FIG. 41.
Figure 47:
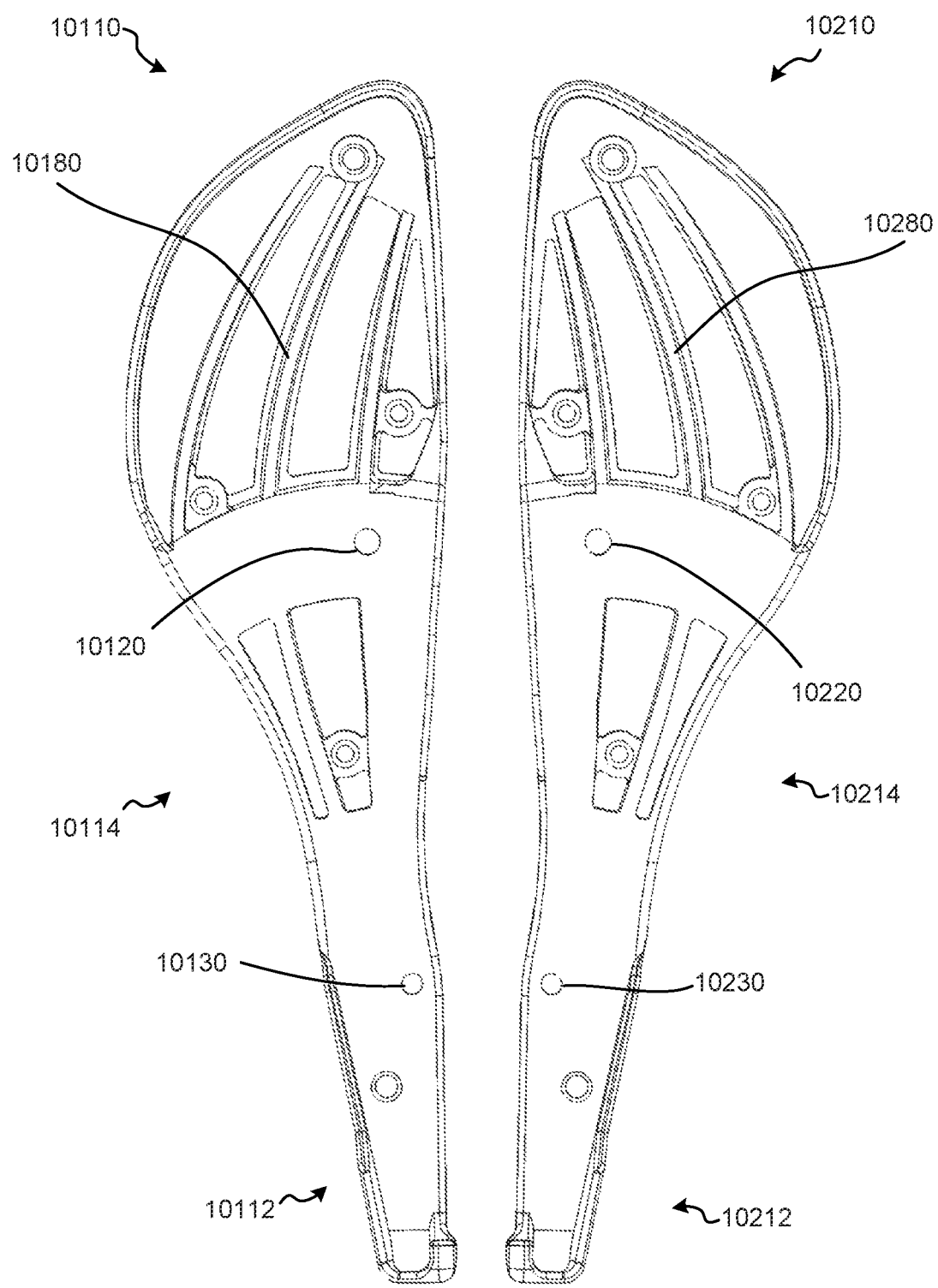
FIG. 47 illustrates a bottom view of the saddle half bases shown in FIG. 41.
Figure 48A:
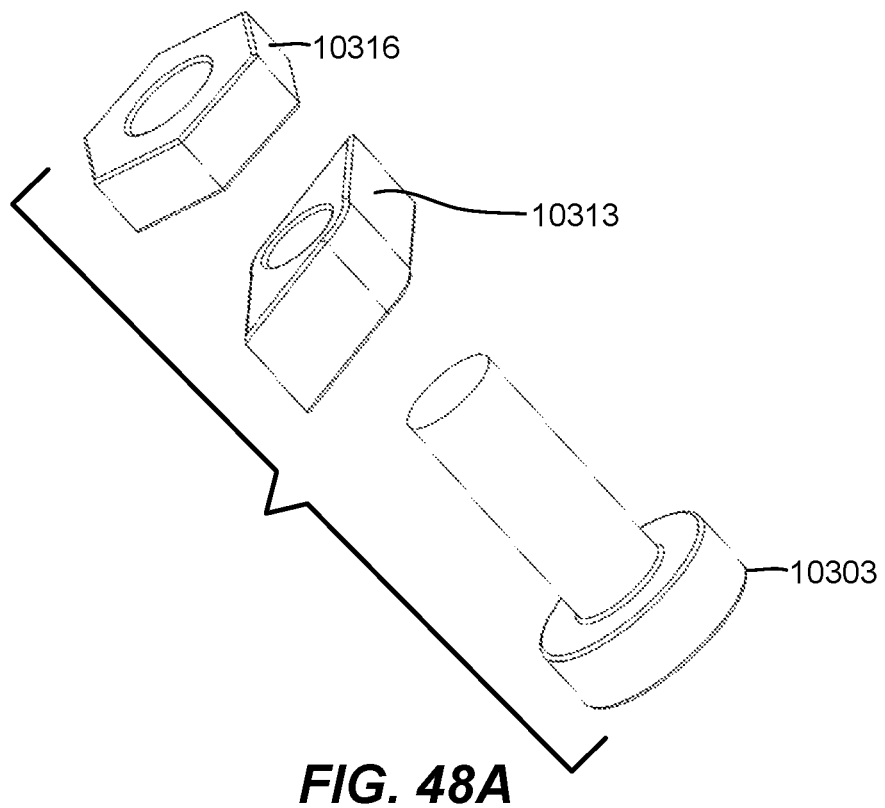
FIG. 48A illustrates a perspective view of a back end fastener assembly from FIG. 41.
Figure 48B:
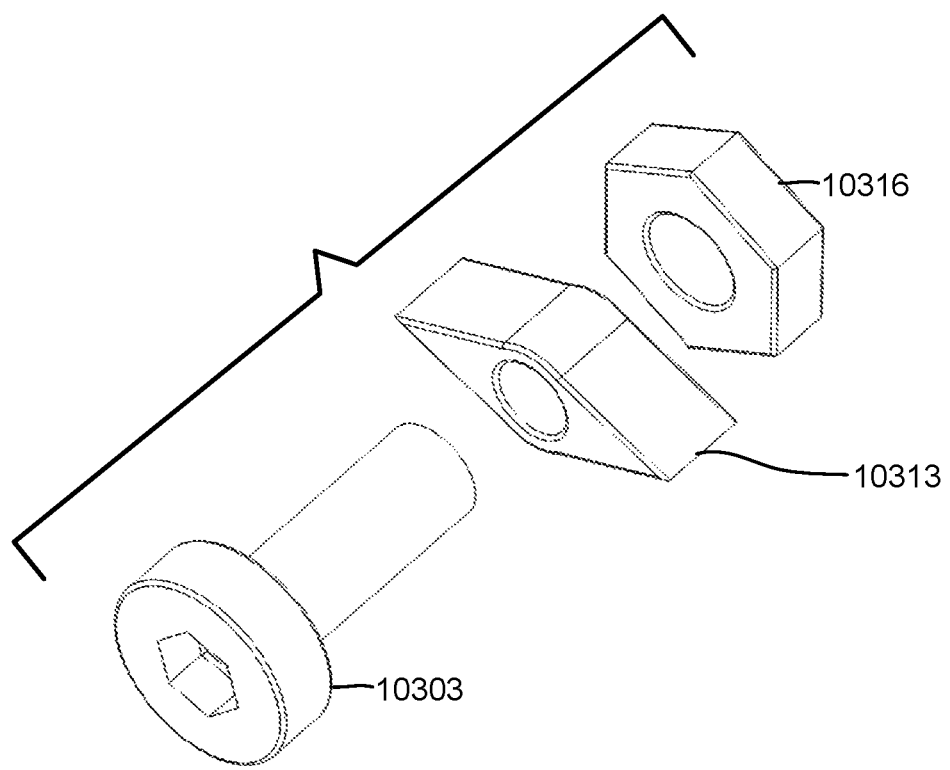
FIG. 48B illustrates another perspective view of the back end fastener assembly.

FIG. 41 illustrates an exploded view of the adjustable saddle 10000 and FIG. 42 shows a perspective view of the adjustable saddle 10000 in assembled form. FIGS. 43A-E illustrate various views of a chassis 10300 of the adjustable saddle 10000 and FIGS. 44A-C illustrate various views of a front rail bracket 10500 of the adjustable saddle 10000. FIG. 45 illustrates first and second skins 10150, 10250 above two saddle half bases 10114, 10214 of the adjustable saddle 10000, prior to being assembled together. FIGS. 46 and 47 show top and bottom views of the saddle half bases 10114, 10214 and FIGS. 48A-B illustrate perspective views of a back end fastener assembly shown in FIG. 41. The adjustable saddle 10000 may incorporate, or omit, any feature that is described in connection with other adjustable saddles presented herein.

The adjustable saddle 10000 may generally include a first saddle half 10100, a second saddle half 10200, and the chassis 10300. The first and second saddle halves may be adjustably attached to the chassis 10300 via a first front end fastener 10301, a second front end fastener 10302, a first back end fastener 10303, and a second back end fastener 10304. The first and second front end fasteners 10301, 10302 may attach the front ends 10101, 10201 of the saddle halves 10100, 10200 to the chassis 10300. Likewise, the first and second back end fasteners 10303, 10304 may attach the back ends 10103, 10203 of the saddle halves 10100, 10200 to the chassis 10300.

The first and second front and back end fasteners 10301, 10302, 10303, 10304 may comprise any suitable fastener style, including but not limited to: threaded screws, bolts, nuts, quick release fasteners, and the like.

In some embodiments, at least one of the first and second front and back end fasteners 10301, 10302, 10303, 10304 may include a cross drilled head to facilitate rotation of the fastener from the side for easier and quicker operation. For example, an individual may use a small elongate tool to rotate the fastener from the side by inserting one end of the small elongate tool into the cross drilled head and applying a rotational torque force.

In some embodiments, at least one of the first and second front and back end fasteners 10301, 10302, 10303, 10304 may form part of a front or back end fastener assembly.

FIG. 41 illustrates example first and second back end fastener assemblies comprising: (1) the first back end fastener 10303, a first movable back end key 10313, and a first back end nut 10316 (see also FIGS. 48A-B); and (2) the second back end fastener 10304, a second movable back end key 10315, and a second back end nut 10317.

FIG. 41 also illustrates simple first and second front end fastener assemblies comprising: (1) the first front end fastener 10301 and a first front end nut 10318; and (2) the second front end fastener 10302 and a second front end nut 10319.

However, it will be understood that any of the fasteners and/or fastener assemblies described herein may be utilized in combination with any of the adjustable saddle embodiments of the present disclosure at any location on the adjustable saddle.

The first and second front and back end nuts 10316, 10317, 10318, 10319 can each be received within corresponding nut retainer housings 10120, 10130, 10220, 10230 formed in the first and second saddle half bases 10114, 10214, as can be seen in FIG. 41.

The chassis 10300 may generally include a mounting frame 10305 having a mounting frame front end 10310 and a mounting frame back end 10330, a front rail bracket 10500, a first rail 10350, and a second rail 10370. The mounting frame front end 10310 may include a front attachment aperture 10314 for coupling the front rail bracket 10500 to the mounting frame front end 10310 via a front rail bracket fastener 10510.

In some embodiments, the mounting frame front end 10310 may include a first plurality of front end channels 10311 configured to receive the first front end fastener 10301 to attach the front end 10101 of the first saddle half 10100 to the mounting frame front end 10310, and a second plurality of front end channels 10312 configured to receive the second front end fastener 10302 to attach the front end 10201 of the second saddle half 10200 to the mounting frame front end 10310.

As used herein, a "channel" is defined broadly to include any aperture, hole, slot, groove, structure, or shape that may be formed in, on, or through the mounting frame (and/or the first and second saddle half bases) that may serve to receive any fastener for coupling a saddle half base to the mounting frame.

Referring to FIG. 42, the adjustable saddle 10000 may generally be described in relation to reference frame 10090, having a longitudinal direction 10092, a lateral direction 10094, and a transverse direction 10096.

In some embodiments, the first and second plurality of front end channels 10311, 10312 may comprise a plurality of longitudinal slots formed through the mounting frame front end 10310 and configured to receive the first and second front end fasteners 10301, 10302.

In some embodiments, the first and second plurality of front end channels 10311, 10312 may be substantially parallel to the longitudinal direction 10092 and extend along rectilinear paths, allowing pivotal and/or translational adjustment of the front ends 10101, 10201 of the saddle halves 10100, 10200 relative to the mounting frame front end 10310.

In some embodiments, the first and second plurality of front end channels 10311, 10312 may be angled non-parallel to the longitudinal direction 10092 and/or the lateral direction 10094 and extend along rectilinear paths, allowing pivotal and/or translational adjustment of the front ends 10101, 10201 of the saddle halves 10100, 10200 relative to the mounting frame front end 10310.

In some embodiments, the first and second plurality of front end channels 10311, 10312 may be configured to pivotally attach each of the first and second saddle half base front ends 10112, 10212 to the mounting frame front end 10310 in at least two different pivot points corresponding to a plurality of discrete front end locations defined by the first and second plurality of front end channels 10311, 10312.

However, it will be understood that the first and second plurality of front end channels 10311, 10312 may comprise any of the holes, slots, grooves, structures, shapes, etc., described herein for receiving any number of suitable fasteners for coupling a saddle half base to the mounting frame 10305. Moreover, the first and second plurality of front end channels 10311, 10312 may include any number of front end channels, including a single front end channel.

The mounting frame back end 10330 may also include a first plurality of back end channels 10333 configured to receive the first back end fastener 10303 to attach the back end 10103 of the first saddle half 10100 to the mounting frame back end 10330, and a second plurality of back end channels 10334 configured to receive the second back end fastener 10304 to attach the back end 10203 of the second saddle half 10200 to the mounting frame back end 10330.

In some embodiments, the first and second plurality of back end channels 10333, 10334 may comprise a plurality of key slots formed in the mounting frame back end 10330 and shaped to receive the first and second movable back end keys 10313, 10315.

In some embodiments, the first and second plurality of back end channels 10333, 10334 and the first and second movable back end keys 10313, 10315 may comprise complementary diamond or parallelogram shapes, such that the first and second movable back end keys 10313, 10315 may each fit within one of the first and second plurality of back end channels 10333, 10334 to couple the back ends of the first and second saddle half bases 10114, 10214 to the mounting frame 10305.

However, it will be understood that the first and second plurality of back end channels 10333, 10334 and the first and second movable back end keys 10313, 10315 may comprise any suitable shape including, but not limited to: circles, ovals, squares, rectangles, triangles, pentagons, hexagons, octagons, crescents, stars, chevrons, etc.

In some embodiments, the first and second plurality of back end channels 10333, 10334 may be arranged in succession along a rectilinear path that may be substantially parallel to the lateral direction 10094, allowing pivotal and/or translational adjustment of the back ends 10103, 10203 of the saddle halves 10100, 10200 relative to the mounting frame back end 10330.

In some embodiments, the first and second plurality of back end channels 10333, 10334 may be arranged in succession along a rectilinear path that may be angled non-parallel to the longitudinal direction 10092 and/or the lateral direction 10094, allowing pivotal and/or translational adjustment of the back ends 10103, 10203 of the saddle halves 10100, 10200 relative to the mounting frame back end 10330.

In some embodiments, the first and second plurality of back end channels 10333, 10334 may be arranged in succession along an arcuate path, allowing pivotal and/or translational adjustment of the back ends 10103, 10203 of the saddle halves 10100, 10200 relative to the mounting frame back end 10330.

In some embodiments, the first and second plurality of front and back end channels 10311, 10312, 10333, 10334 may together comprise a saddle half adjustment mechanism configured to adjust an orientation of the first and second saddle half bases 10114, 10214 relative to the mounting frame 10305 via pivotal motion of the first and second saddle half bases 10114, 10214 relative to the mounting frame 10305.

In some embodiments, the saddle half adjustment mechanism may comprise a discrete adjustment mechanism with the first and second plurality of front end channels 10311, 10312 configured to receive the first and second front end fasteners 10301, 10302 at a plurality of discrete front end locations, and the first and second plurality of back end channels 10333, 10334 configured to receive the first and second back end fasteners 10303, 10304 at a plurality of discrete back end locations. In this manner, the first and second saddle half base front ends 10112, 10212 can receive the first and second front end fasteners 10301, 10302 to pivotally attach the first and second saddle half base front ends 10112, 10212 to the mounting frame front end 10310 in at least two different pivot points corresponding to the plurality of discrete front end locations. Likewise, the first and second saddle half base back ends 10110, 10210 can receive the first and second back end fasteners 10303, 10304 to position the first and second saddle half base back ends 10110, 10210 relative to the mounting frame back end 10330 at the plurality of discrete back end locations to allow discrete pivotal attachment of the first and second saddle half base back ends 10110, 10210 to the mounting frame back end 10330.

Figure 43A:
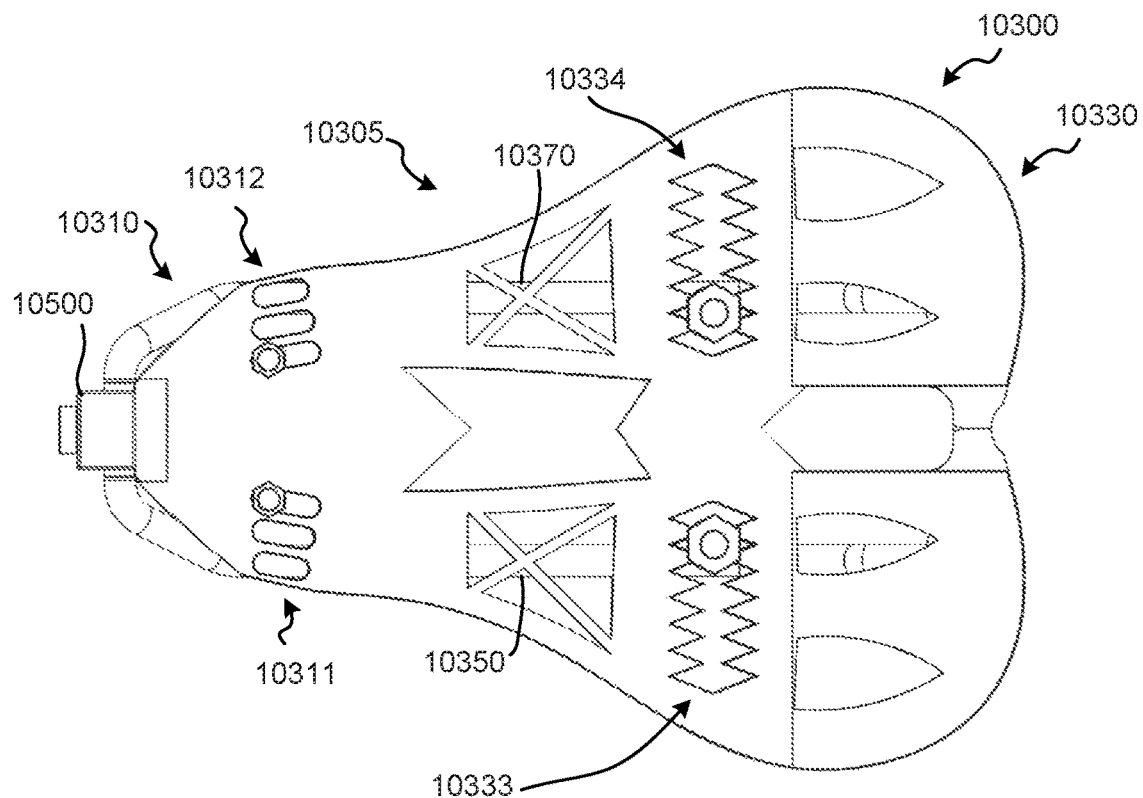
FIG. 43A illustrates a top view of the assembled chassis for the adjustable saddle shown in FIG. 41.
Figure 43B:
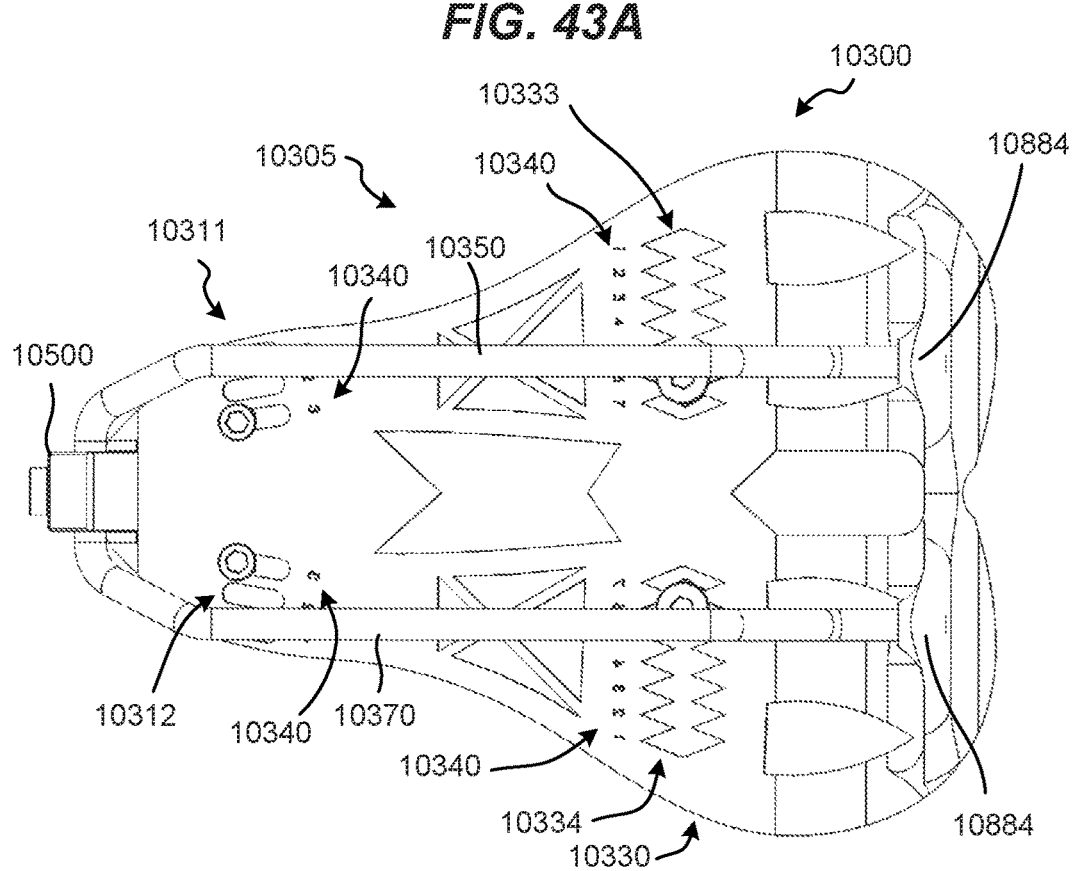
FIG. 43B illustrates a bottom view of the chassis.
Figure 43C:
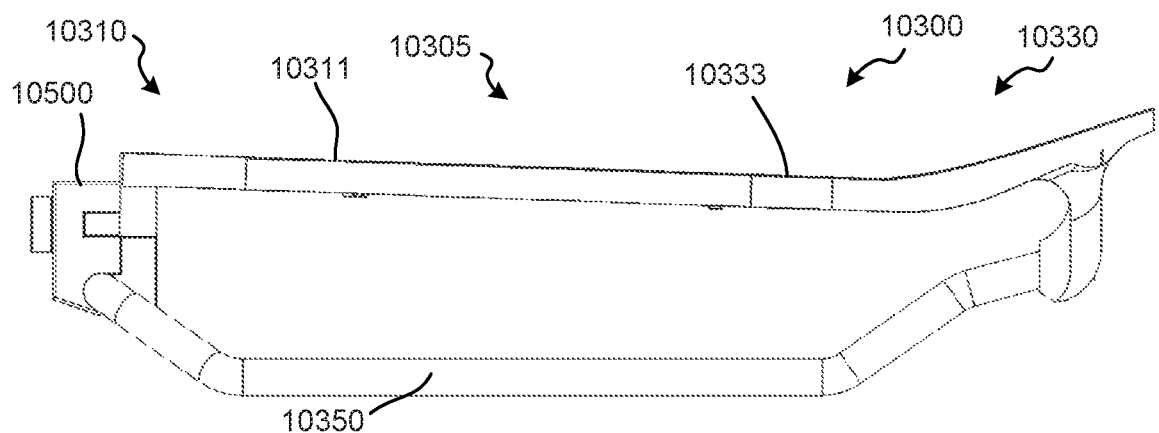
FIG. 43C illustrates a side view of the chassis.
Figure 43D:
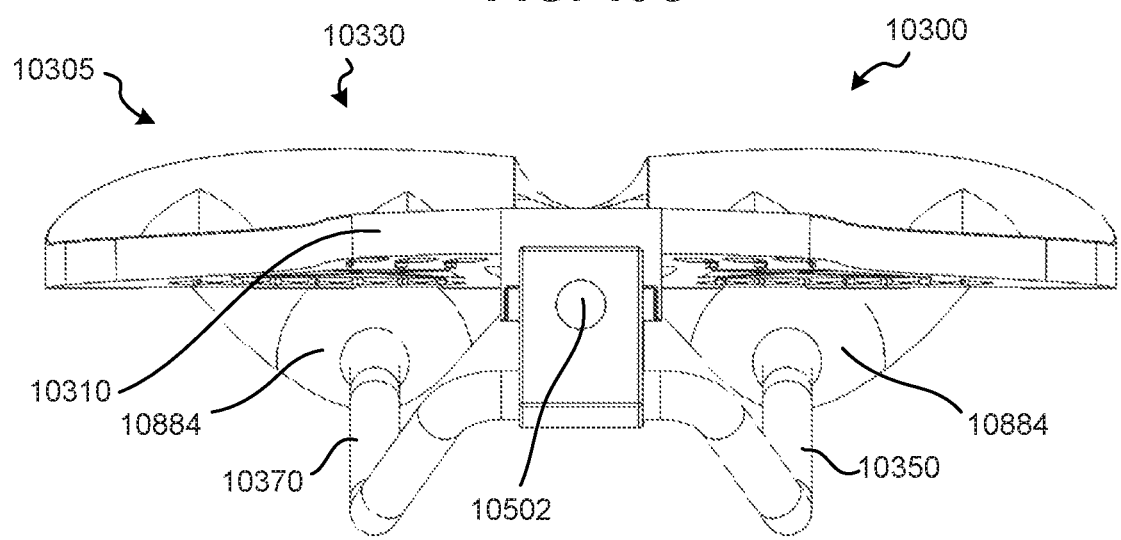
FIG. 43D illustrates a front view of the chassis.
Figure 43E:
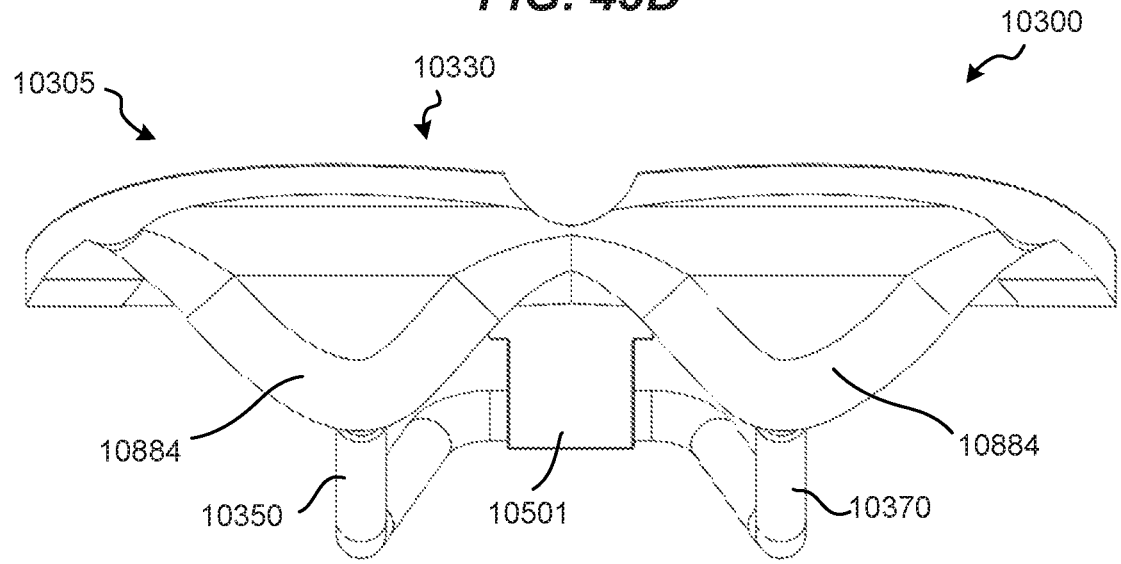
FIG. 43E illustrates a rear view of the chassis.

Referring to FIG. 43B, the mounting frame 10305 may also include adjustment markings 10340. The adjustment markings 10340 may generally indicate the degree to which each saddle half base is positionally adjusted with respect to the mounting frame front end 10310 and/or the mounting frame back end 10330. In the embodiment shown in FIG. 43B, the adjustment markings 10340 include numbering spaced apart at regular intervals. However, in other embodiments (not shown) the adjustment markings 10340 may include simple line markings or other symbols that indicate various information, such as angular or translational displacement of the saddle halves 10100, 10200 with respect to the mounting frame front end 10310 and the mounting frame back end 10330, preferred saddle half positions based on riding style, a rider's personal position preference, etc. The adjustment markings 10340 may be formed by any known process including, but not limited to: laser etching, stamping, integral formation during molding/casting, and the like. In addition to adjustment markings 10340, the first rail 10350 and/or the second rail 10370 may also include additional adjustment markings (not shown) to indicate translational displacement of the chassis 10300 with respect to a seat post and/or a seat post mounting bracket (not shown).

Referring to FIG. 41, the first and second rails 10350, 10370 may be coupled to each other via a front rail portion 10390. The mounting frame 10305 may be coupled to the first and second rails 10350, 10370 at the mounting frame back end 10330 via one or more rail retaining features 10884 (e.g., see FIGS. 43B, 43D, and 43E). The mounting frame 10305 may also be coupled to the front rail portion 10390 via the front rail bracket 10500, as shown in FIG. 41.

In some embodiments, the front rail bracket 10500 may be formed as a discrete component configured to releasably couple the mounting frame front end 10310 to the front rail portion 10390.

In some embodiments, the front rail bracket 10500 may be formed as a discrete component configured to releasably couple the mounting frame front end 10310 to the front rail portion 10390 in conjunction with a lock member 10501.

In some embodiments, the front rail bracket 10500 may be integrally formed with the mounting frame 10305 and configured to releasably couple the mounting frame front end 10310 to the front rail portion 10390.

In some embodiments, the front rail bracket 10500 may be integrally formed with the mounting frame 10305 and configured to fixedly couple the mounting frame front end 10310 to the front rail portion 10390.

FIGS. 44A-C illustrate perspective views and a side view of a front rail bracket 10500 that is discrete, according to some embodiments of the present disclosure. The front rail bracket 10500 may include a front rail bracket aperture 10502 configured to receive the front rail bracket fastener 10510 (e.g., see FIG. 41) to couple the front rail bracket 10500 to the mounting frame front end 10310 in conjunction with the front attachment aperture 10314. The front rail bracket 10500 may also include a front rail portion recess 10504 configured to receive the front rail portion 10390 and one or more mounting frame recesses 10506 configured to receive one or more mounting frame projections 10306 to couple the mounting frame front end 10310 to the front rail portion 10390.

FIGS. 46 and 47 show top and bottom views of the first saddle half base 10114 and the second saddle half base 10214 of the adjustable saddle 10000. The first and second saddle half bases 10114, 10214, as well as any other component described herein, may be formed of one or more rigid materials, including but not limited to: plastics, metals, carbon fiber, Zytel®, composite materials, or the like. Moreover, the mounting frame 10305, as well as any other component described herein, may be formed of one or more semi-rigid or flexible materials, such as rubber, in order to provide shock absorption and/or comfort for the rider.

In some embodiments, the first and second saddle half bases 10114, 10214 may include nut retainer housings 10120, 10130, 10220, 10230 formed in the first and second saddle half bases 10114, 10214 and configured to receive the first and second front and back end nuts 10316, 10317, 10318, 10319 (e.g., see FIG. 41).

The first and second saddle half bases 10114, 10214 may also include a plurality of longitudinal ribs 10180, 10280 configured to provide rigid support for the rider's weight.

In some embodiments, the first and second saddle half bases 10114, 10214 may releasably couple with the first and second skins 10150, 10250 via the plurality of longitudinal ribs 10180, 10280.

In some embodiments, the first and second skins 10150, 10250 may be made of a rigid material (e.g., plastic) and may be removably couplable to the plurality of longitudinal ribs 10180, 10280 via one or more fasteners (not shown) received through a plurality of apertures 10152 formed in the skins first and second skins 10150, 10250 (e.g., see FIG. 45) to couple the first and second skins 10150, 10250 to the first and second saddle half bases 10114, 10214.

However, in some embodiments the first and second skins 10150, 10250 may be integrally formed with and/or coupled to the plurality of longitudinal ribs 10180, 10280 via other suitable means (e.g., snap features, adhesive, etc.).

Foam padding (not shown) may also be coupled to the first and second skins 10150, 10250 respectively by any suitable means (e.g., via adhesives, fasteners, etc.). For example, in the embodiment shown in FIG. 45, the plurality of apertures 10152 may be utilized with suitable fasteners to couple the first and second skins 10150, 10250 to the foam padding. The foam padding may also be covered by a seat covers (not shown). In this manner, a rider may easily and quickly customize his or her adjustable saddle 10000 by simply removing the first and second skins 10150, 10250 (with their attached foam paddings and seat covers) and replacing them with different first and second skins 10150, 10250. This allows the rider to select an adjustable saddle 10000 configuration with first and second skins 10150, 10250 that can have any desired color, size, shape, material, characteristic, etc.

Figure 49:
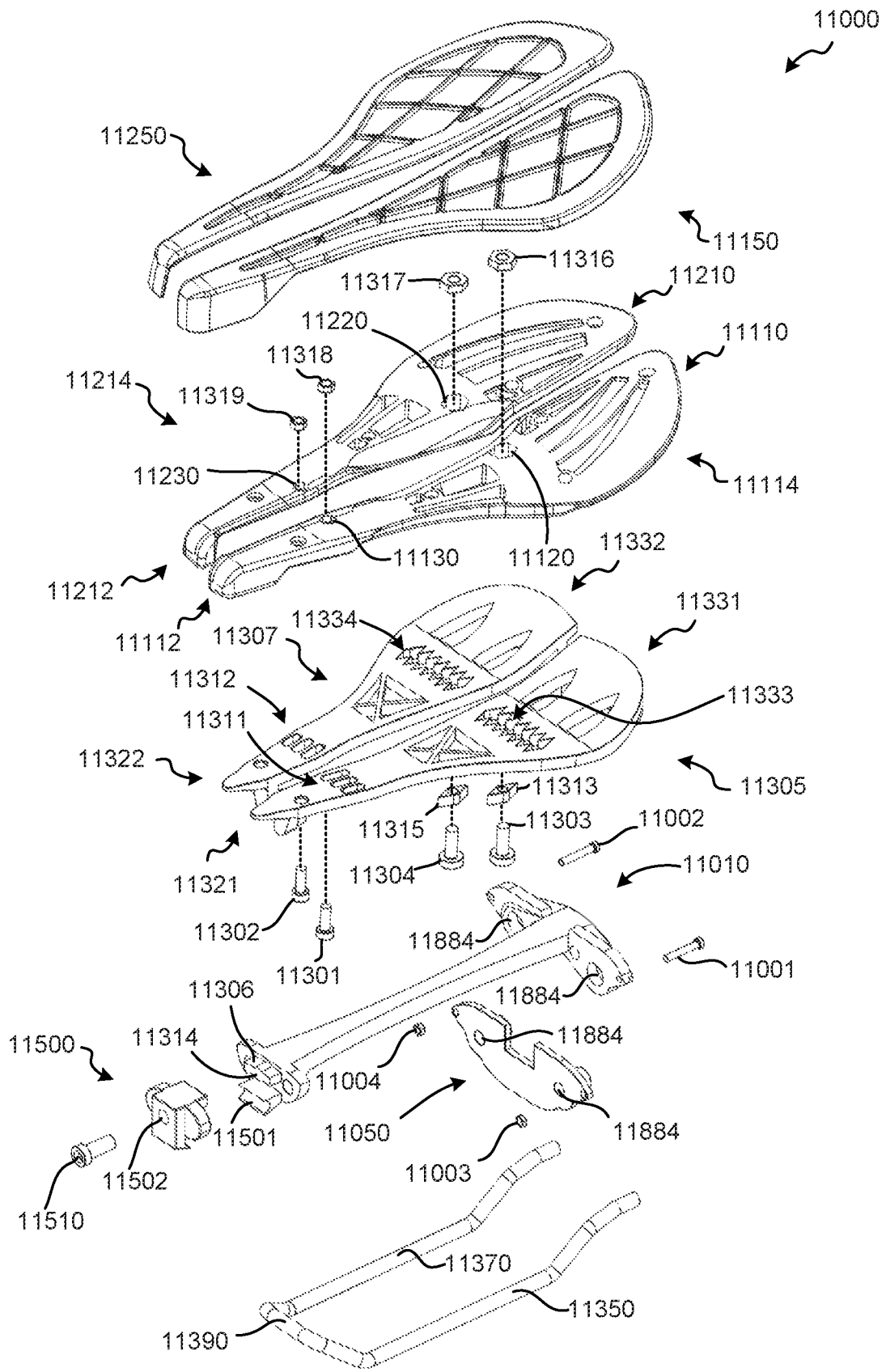
FIG. 49 illustrates an exploded view of an adjustable saddle, according to another embodiment of the present disclosure.
Figure 50:
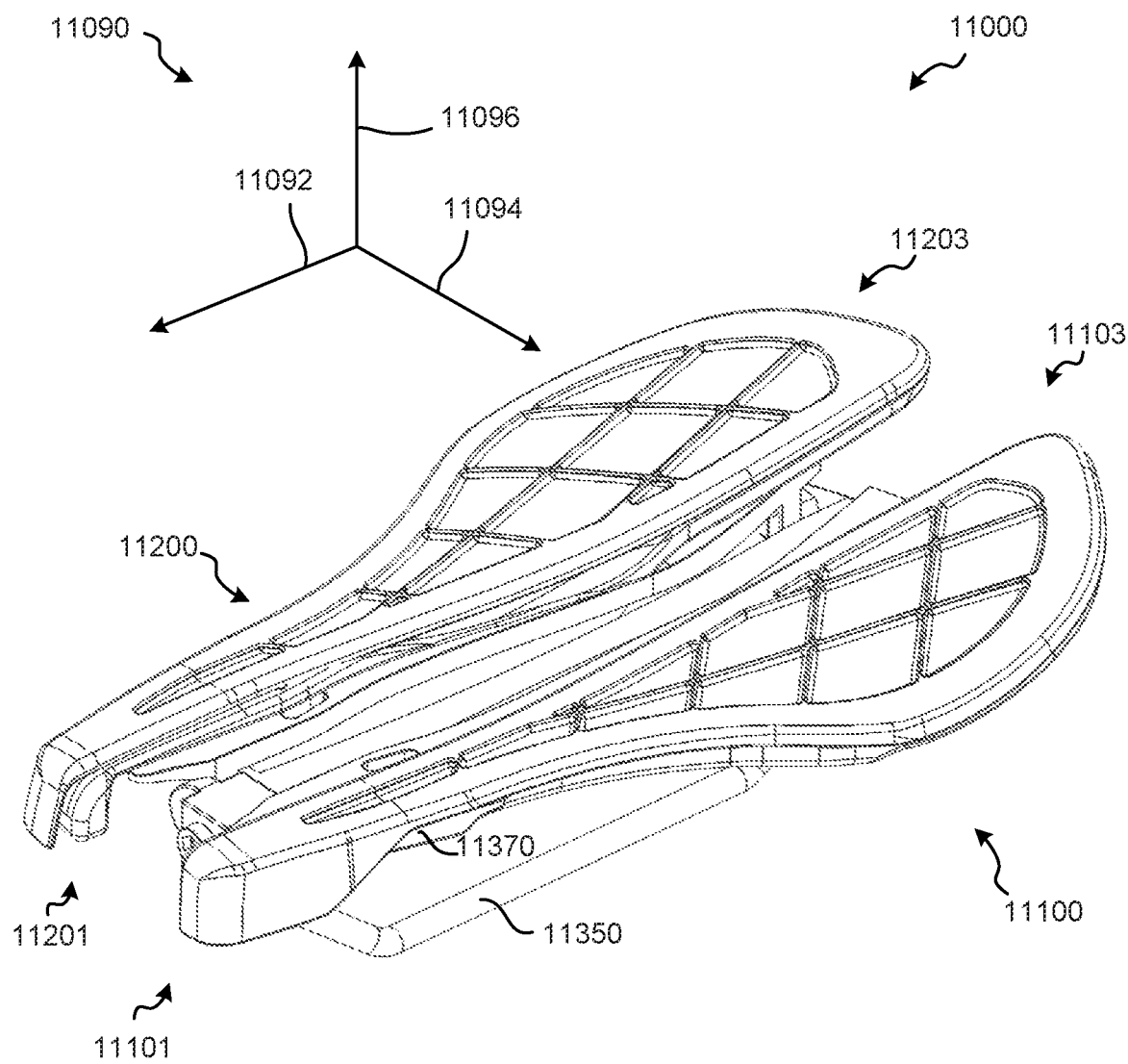
FIG. 50 illustrates a perspective view of the adjustable saddle of FIG. 49 in assembled form.
Figure 51A:
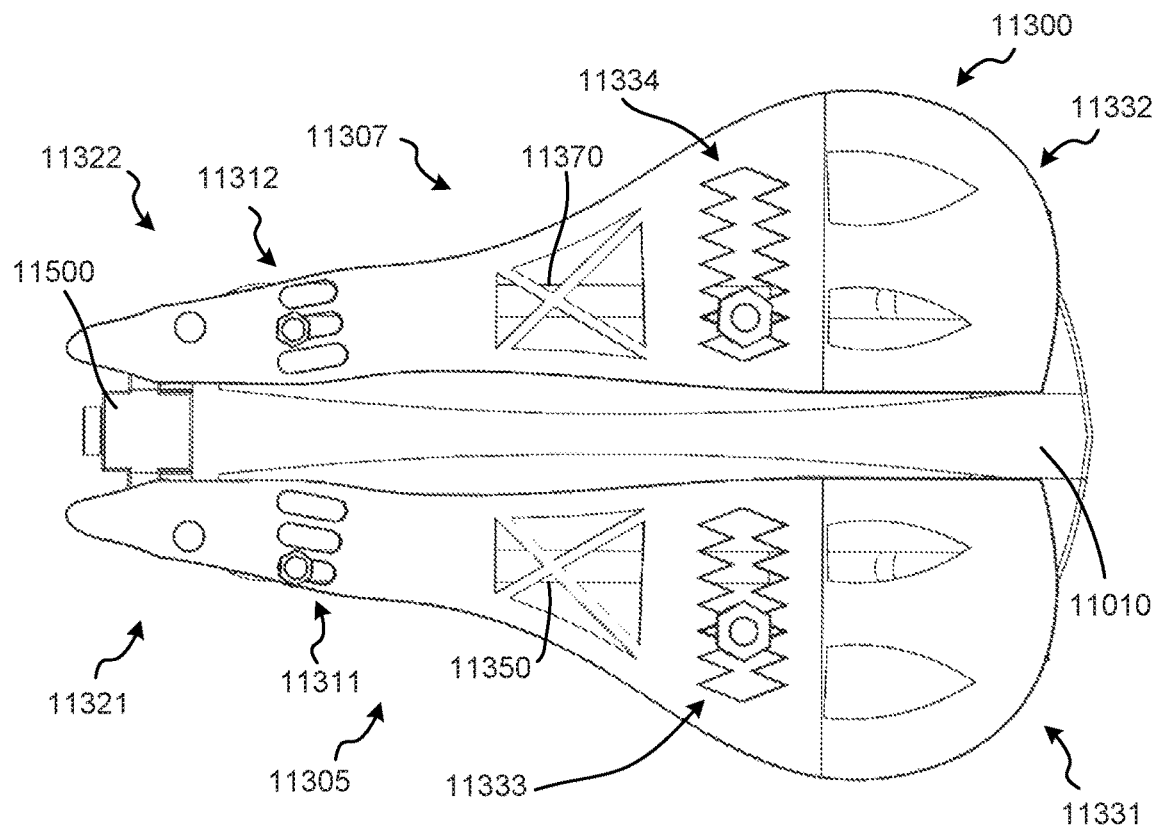
FIG. 51A illustrates a top view of the assembled chassis for the adjustable saddle shown in FIG. 49.
Figure 51B:
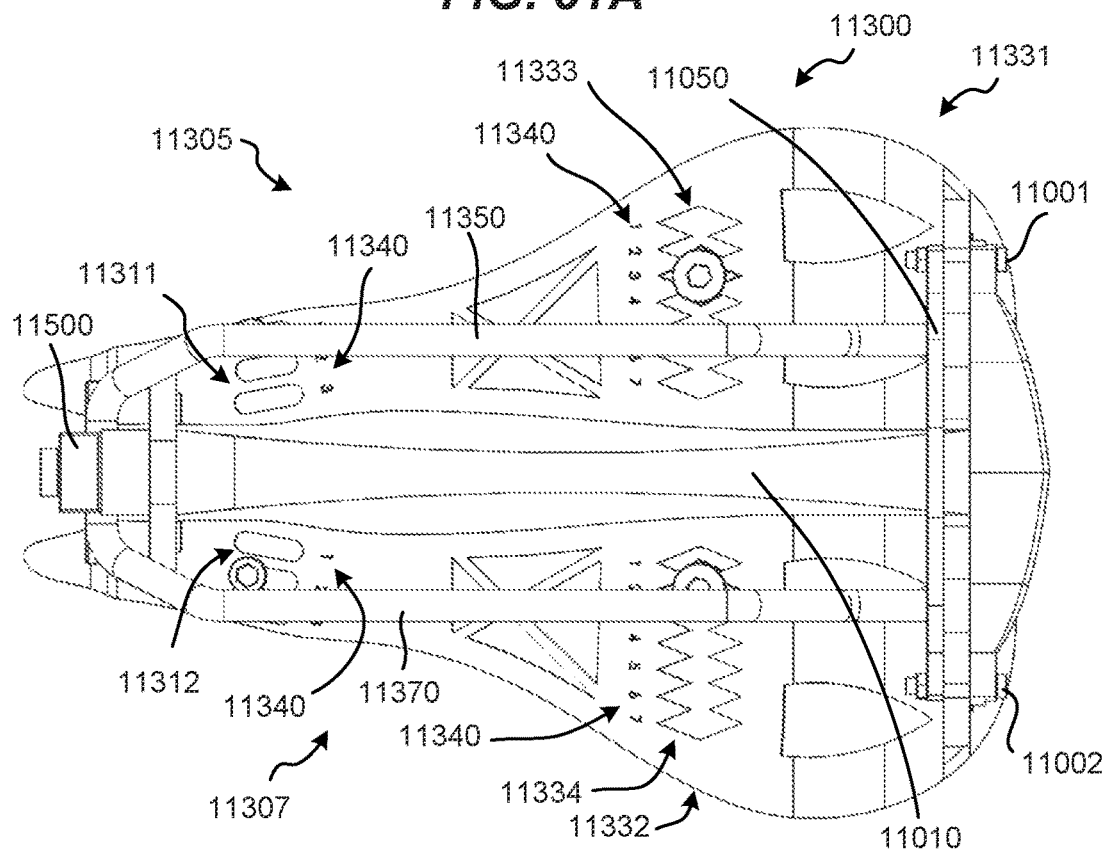
FIG. 51B illustrates a bottom view of the chassis.
Figure 51C:
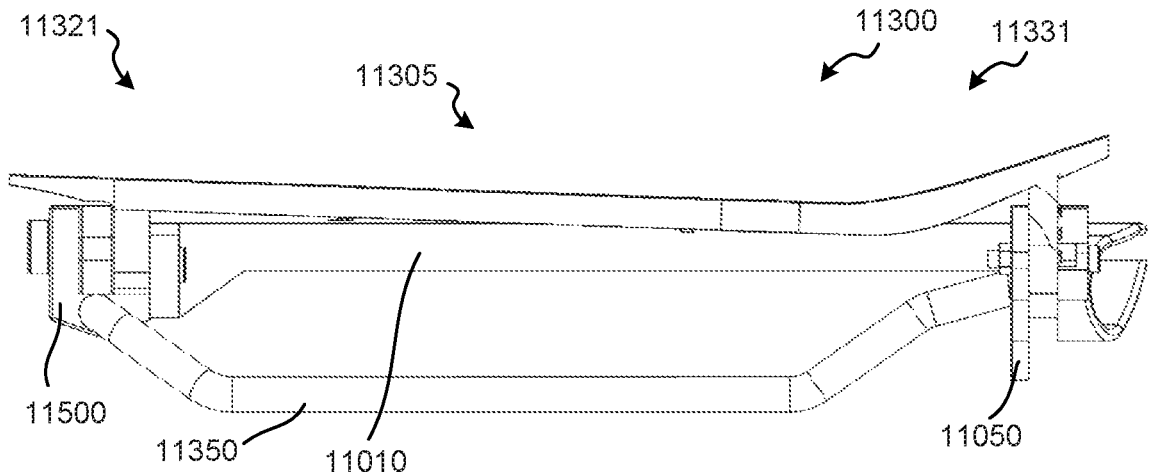
FIG. 51C illustrates a side view of the chassis.
Figure 51D:
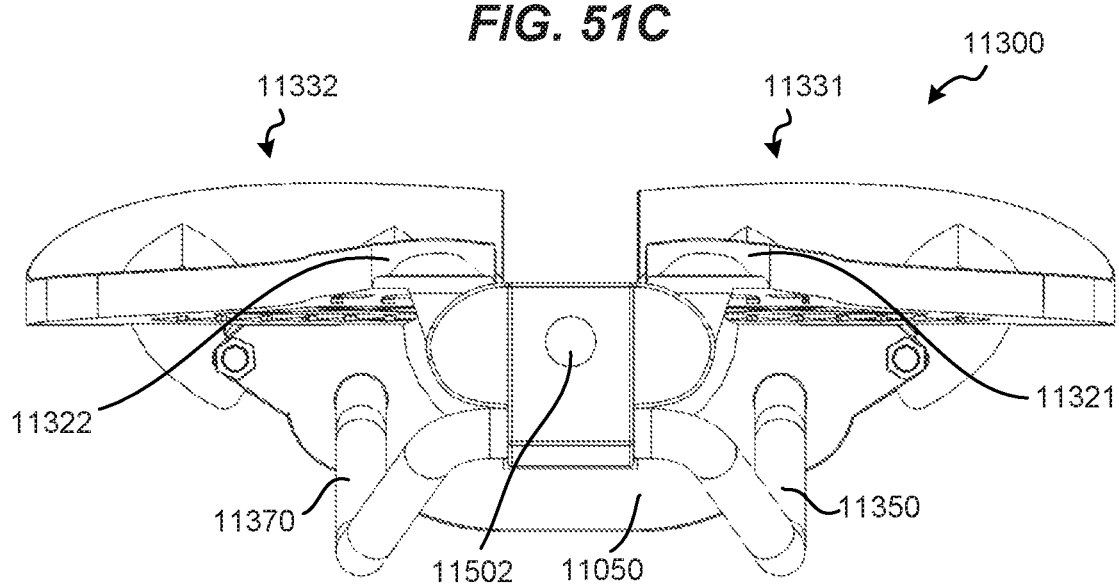
FIG. 51D illustrates a front view of the chassis.
Figure 51E:
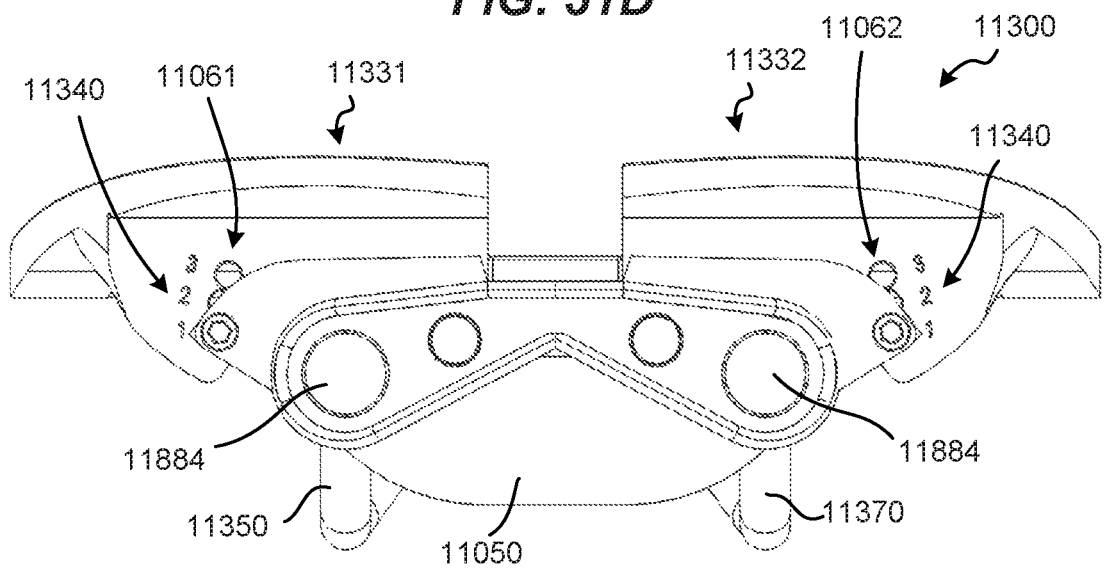
FIG. 51E illustrates a rear view of the chassis.
Figure 53A:
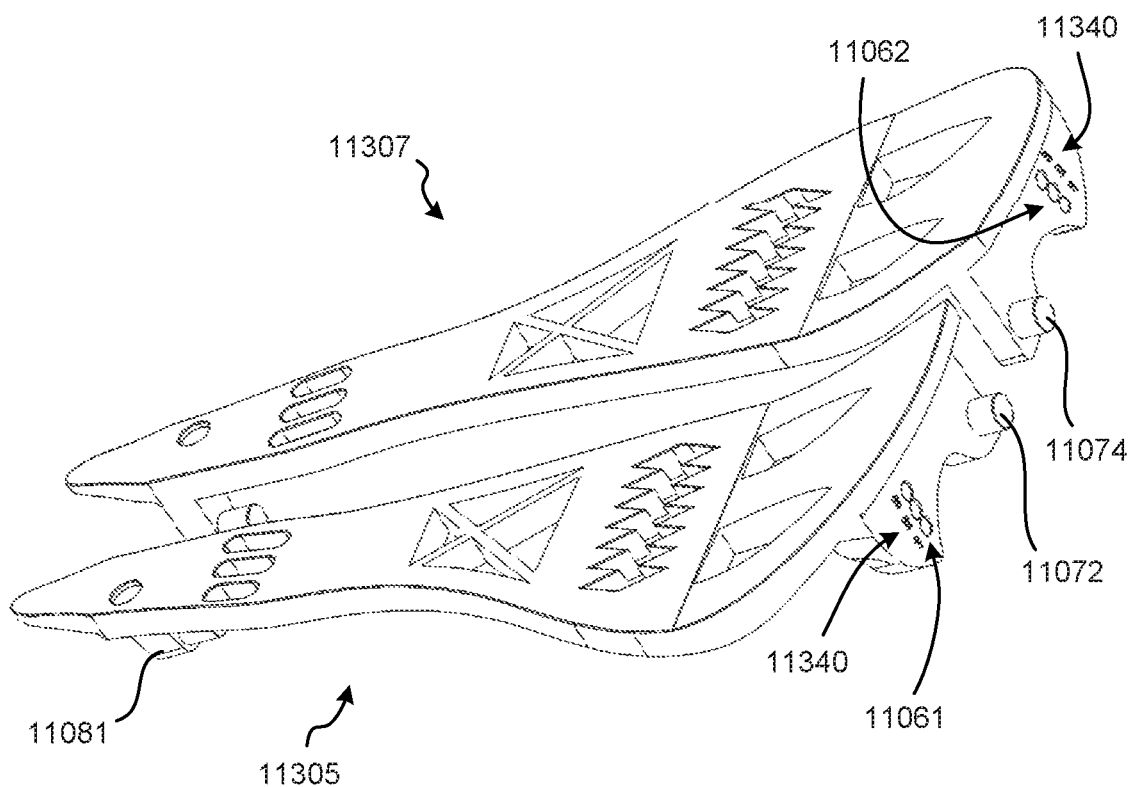
FIG. 53A illustrates a top perspective view of the mounting frames shown in FIG. 49.
Figure 53B:
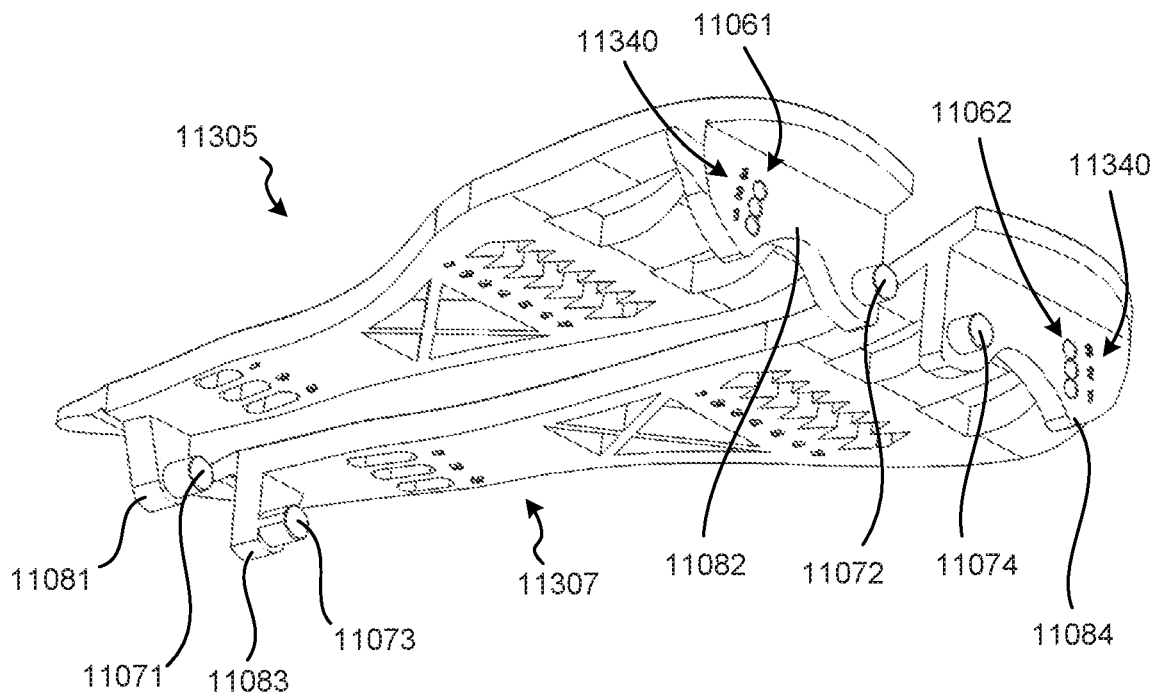
FIG. 53B illustrates a bottom perspective view of the mounting frames shown in FIG. 49.
Figure 54A:
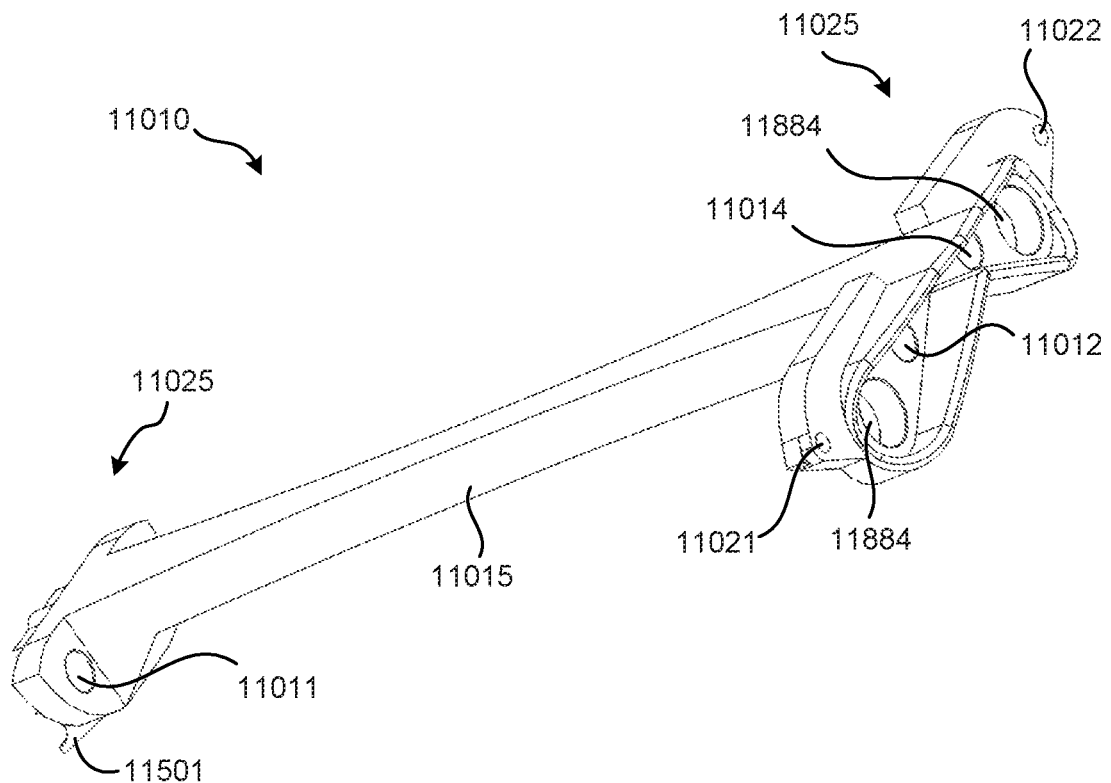
FIG. 54A illustrates a rear perspective view of the slope adjustment frame shown in FIG. 49.
Figure 54B:
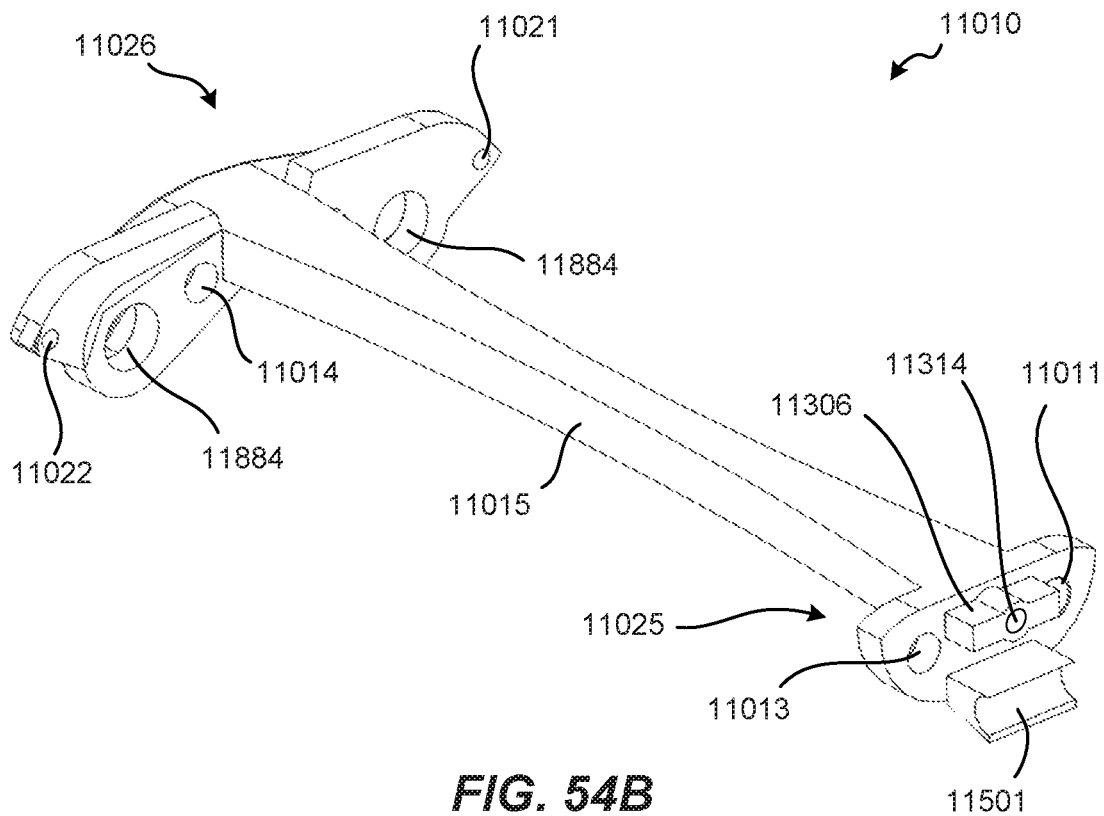
FIG. 54B illustrates a front perspective view of the slope adjustment frame.
Figure 54C:
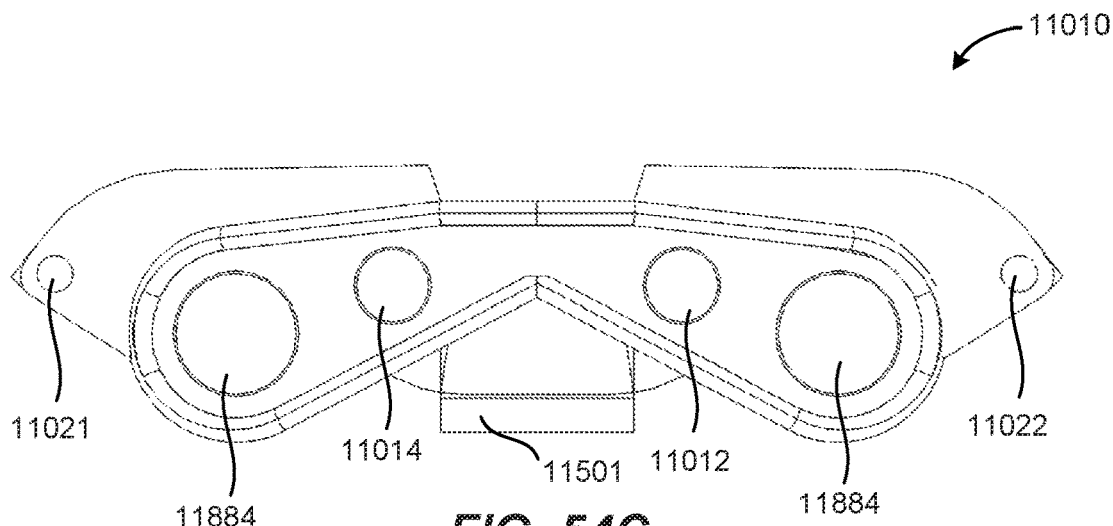
FIG. 54C illustrates a rear view of the slope adjustment frame.
Figure 54D:
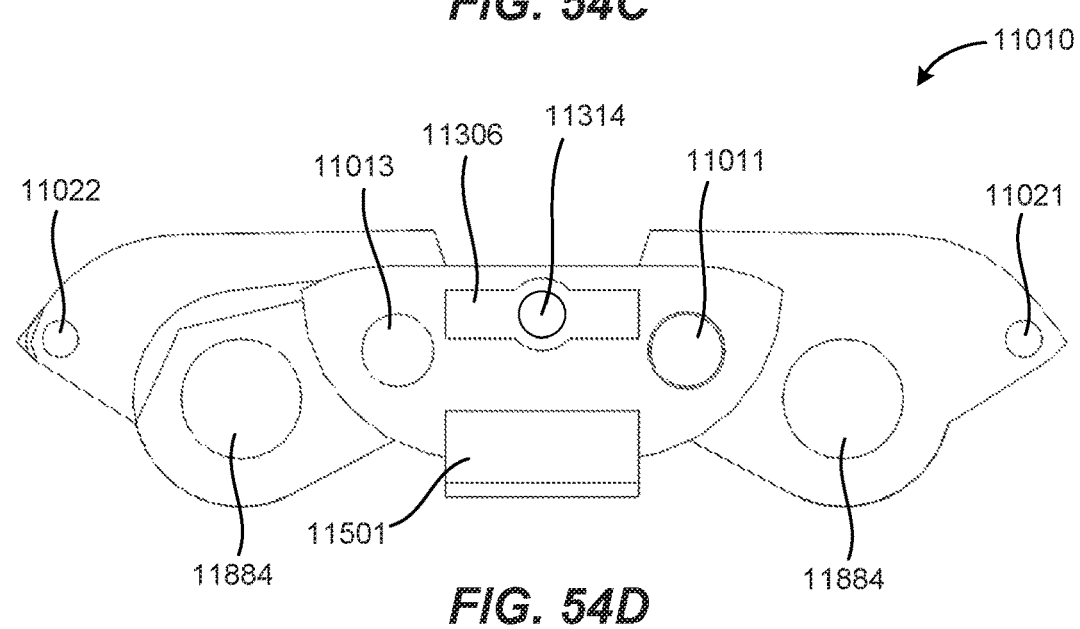
FIG. 54D illustrates a front view of the slope adjustment frame.
Figure 54E:
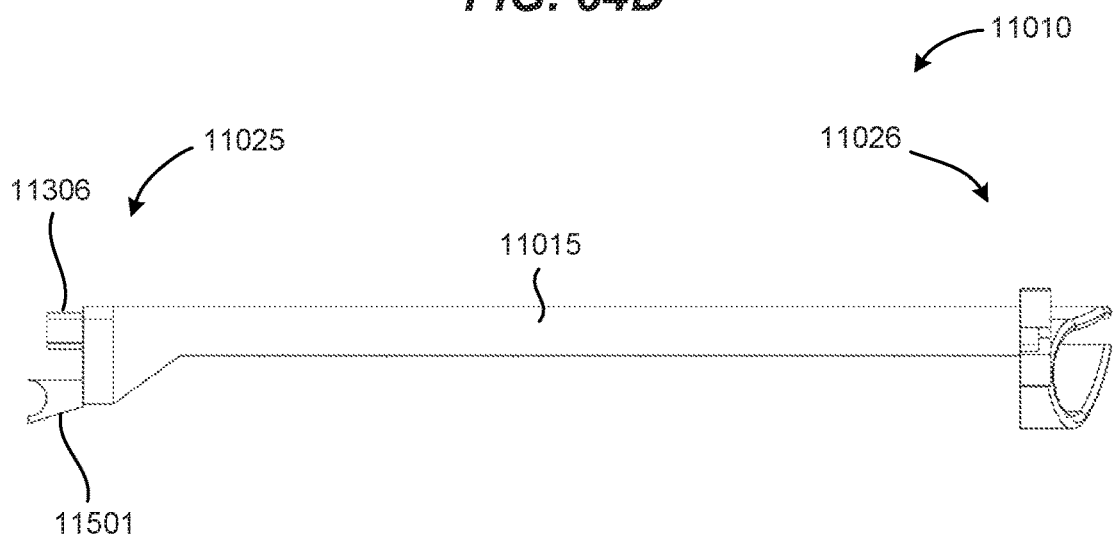
FIG. 54E illustrates a right side view of the slope adjustment frame.
Figure 54F:
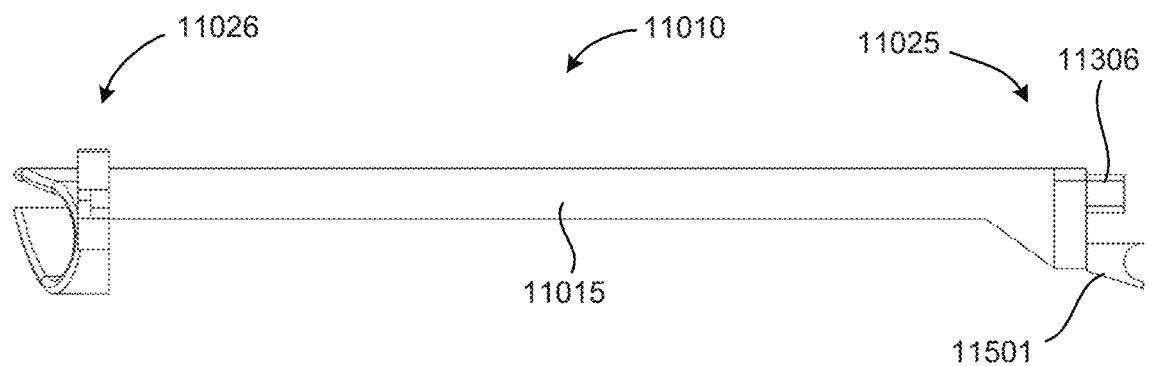
FIG. 54F illustrates a left side view of the slope adjustment frame.
Figure 54G:
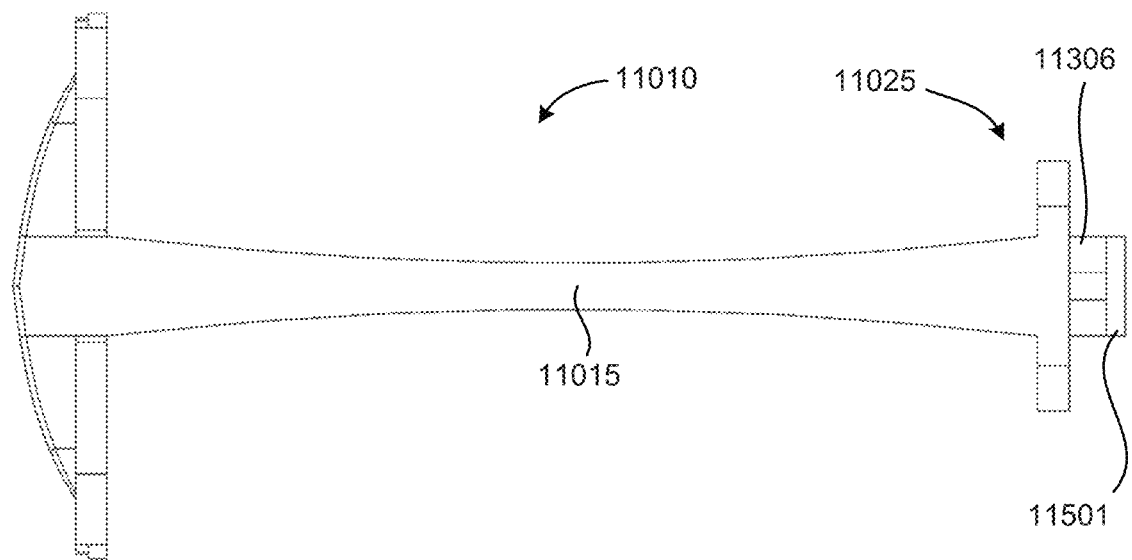
FIG. 54G illustrates a top view of the slope adjustment frame.
Figure 54H:
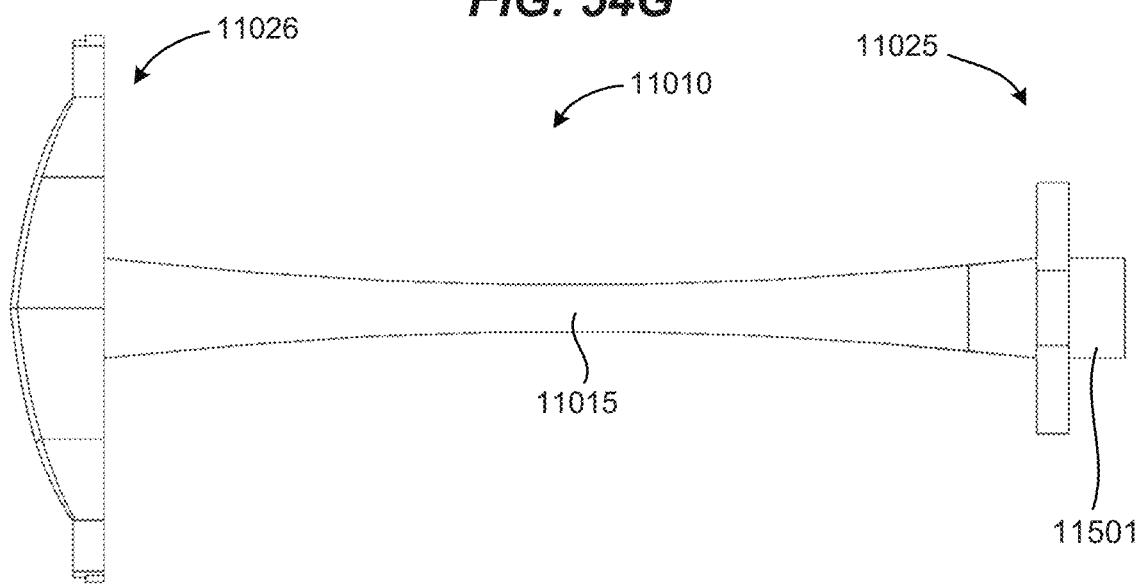
FIG. 54H illustrates a bottom view of the slope adjustment frame.
Figure 55A:
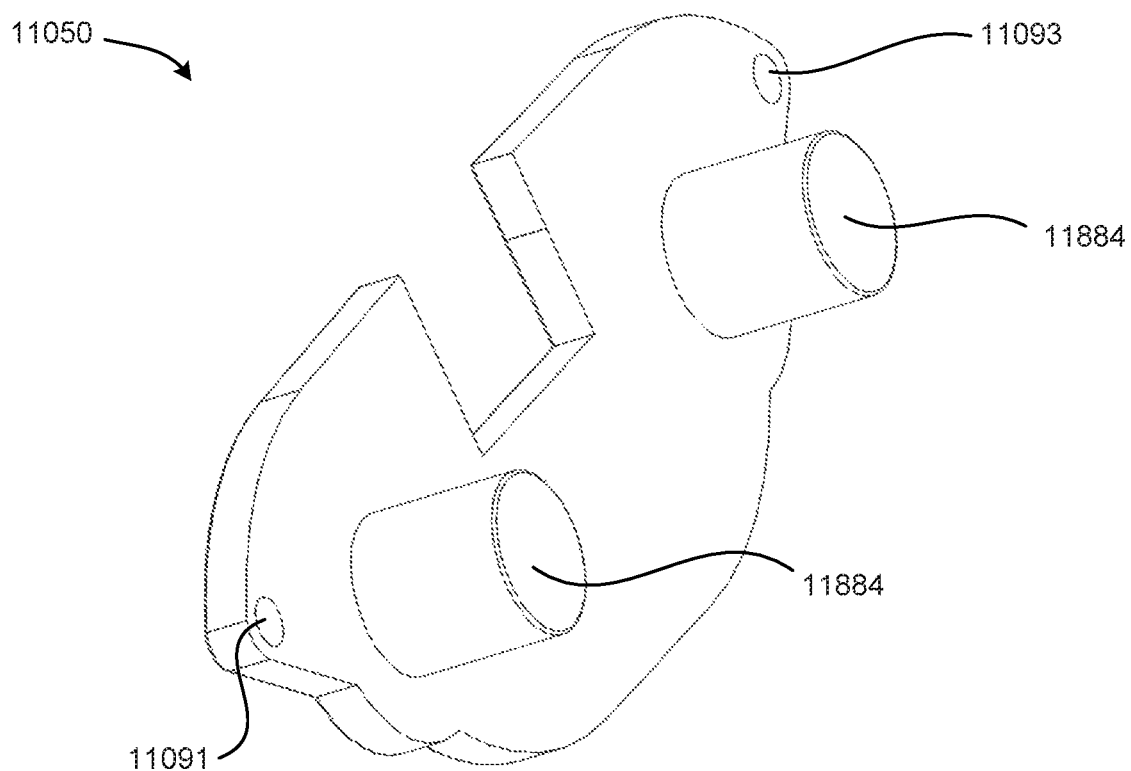
FIG. 55A illustrates a rear perspective view of the slope frame bracket shown in FIG. 49.
Figure 55B:
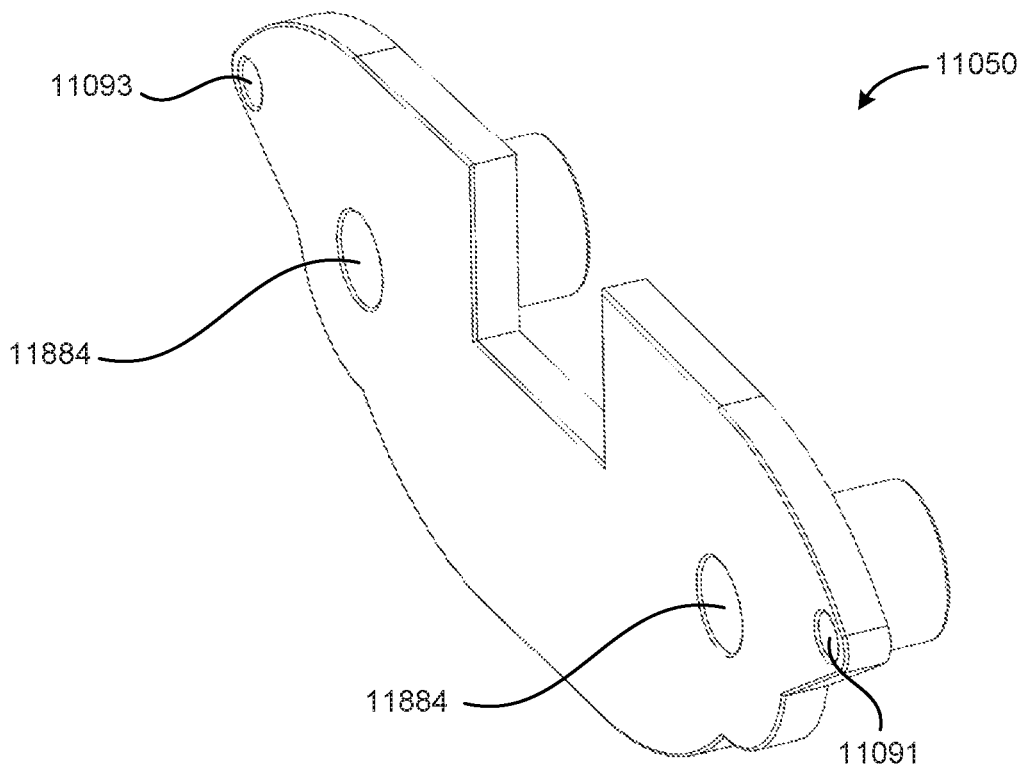
FIG. 55B illustrates a front perspective view of the slope frame bracket.

FIGS. 49-55B illustrate various views of an adjustable saddle 11000, according to another embodiment of the present disclosure. Specifically, FIG. 49 illustrates an exploded view of the adjustable saddle 11000; FIG. 50 shows a perspective view of the adjustable saddle 11000 in assembled form; FIGS. 51A-E illustrate various views of a chassis 11300 of the adjustable saddle 11000; FIGS. 53A-B illustrate perspective views of first and second mounting frames 11305, 11307 of the adjustable saddle 11000; FIGS. 54A-H illustrates various views of a slope adjustment frame 11010 of the adjustable saddle 11000; and FIGS. 55A-B illustrate perspective views of a slope frame bracket 11050 of the adjustable saddle 11000. The adjustable saddle 11000 may incorporate, or omit, any feature that is described in connection with other adjustable saddles presented herein.

The adjustable saddle 11000 may generally include a first saddle half 11100, a second saddle half 11200, and the chassis 11300. The first and second saddle halves 11100, 11200 may be adjustably attached to the chassis 11300 via a first front end fastener 11301, a second front end fastener 11302, a first back end fastener 11303, and a second back end fastener 11304. The first and second front end fasteners 11301, 11302 may attach the front ends 11101, 11201 of the saddle halves 11100, 11200 to the chassis 11300. Likewise, the first and second back end fasteners 11303, 11304 may attach the back ends 11103, 11203 of the saddle halves 11100, 11200 to the chassis 11300.

The first and second front and back end fasteners 11301, 11302, 11303, 11304 may comprise any suitable fastener style, including but not limited to: threaded screws, bolts, nuts, quick release fasteners, and the like.

In some embodiments, at least one of the first and second front and back end fasteners 11301, 11302, 11303, 11304 may include a cross drilled head (not shown) to facilitate rotation of the fastener from the side for easier and quicker operation. For example, an individual may use a small elongate tool to rotate the fastener from the side by inserting one end of the small elongate tool into a hole of the cross drilled fastener head and applying a rotational torque force.

In some embodiments, at least one of the first and second front and back end fasteners 11301, 11302, 11303, 11304 may form part of a front or back end fastener assembly.

FIG. 49 illustrates first and second back end fastener assemblies comprising: (1) the first back end fastener 11303, a first movable back end key 11313, and a first back end nut 11316; and (2) the second back end fastener 11304, a second movable back end key 11315, and a second back end nut 11317.

FIG. 49 also illustrates first and second front end fastener assemblies comprising: (1) the first front end fastener 11301 and a first front end nut 11318; and (2) the second front end fastener 11302 and a second front end nut 11319.

However, it will be understood that any of the fasteners and/or fastener assemblies described herein may be utilized in any combination, and at any location, with any of the adjustable saddles of the present disclosure.

The first and second front and back end nuts 11316, 11317, 11318, 11319 can each be received within corresponding retainer housings 11120, 11130, 11220, 11230 formed in the first and second saddle half bases 11114, 11214.

In some embodiments, the first and second saddle half bases 11114, 11214 may releasably couple with the first and second skins 11150, 11250, as previously discussed.

The chassis 11300 may generally include a first mounting frame 11305 having a first mounting frame front end 11321 and a first mounting frame back end 11331, and a second mounting frame 11307 having a second mounting frame front end 11322 and a second mounting frame back end 11332. The chassis 11300 may also include a front rail bracket 11500, a first rail 11350, a second rail 11370, a slope adjustment frame 11010, and a slope frame bracket 11050.

Referring to FIGS. 54A-H, the slope adjustment frame 11010 may generally include a slope frame rail 11015, a slope frame rear bracket 11026, and a slope frame front bracket 11025. The slope frame rear bracket 11026 may include first and second slope adjustment fastener apertures 11021, 11022, first and second back end apertures 11012, 11014, and one or more rail retaining features 11884. The slope frame front bracket 11025 may also include first and second front end hinge apertures 11011, 11013, a front attachment aperture 11314, one or more slope adjustment frame projections 11306, and a lock member 11501.

Referring to FIGS. 55A-B, the slope frame bracket 11050 may include first and second slope frame bracket apertures 11091, 11093 and one or more rail retaining features 11884.

Assembly of the chassis 11300 will now be described with reference to FIGS. 49-55B. The slope adjustment frame 11010 may include the front attachment aperture 11314 for coupling the front rail bracket 11500 to the slope adjustment frame 11010 with the front rail bracket fastener 11510. The front rail portion 11390 may be coupled between the lock member 11501 of the slope adjustment frame 11010 and the front rail portion recess 11504 of the front rail bracket 11500 as the front rail bracket 11500 is attached to the slope adjustment frame 11010. The distal ends of the first and second rails 11350, 11370 may be received through/within the one or more rail retaining features 11884 of the slope frame bracket 11050 and the slope adjustment frame 11010 to couple the first and second rails 11350, 11370 to the slope adjustment frame 11010 and the slope frame bracket 11050. The first and second mounting frame back end projections 11082, 11084 (FIG. 53B) may be inserted between the slope frame bracket 11050 (FIGS. 55A-B) and the slope frame rear bracket 11026 (FIG. 54B) during assembly with the first and second back end hinge pins 11072, 11074 (FIGS. 53A-B) inserted into the first and second back end apertures 11012, 11014 of the slope frame rear bracket (FIGS. 54A-B). Moreover, the first and second mounting frame front end projections 11081, 11083 (FIG. 53B) may be inserted between the front rail bracket 11500 (FIGS. 52A-C) and the slope frame front bracket (FIG. 54B) during assembly with the first and second front end hinge pins 11071, 11073 (FIG. 53B) inserted into the first and second front end hinge apertures 11011, 11013 of the slope frame front bracket 11025 (FIG. 54B). In this manner, the first and second mounting frames 11305, 11307 may each be pivotally coupled to the slope adjustment frame 11010 forming slope adjustment mechanisms between the first and second mounting frames 11305, 11307 and the slope adjustment frame 11010.

In some embodiments, a slope adjustment mechanism is configured to pivotally couple a mounting frame to a slope adjustment frame by adjusting a slope of a saddle half base or mounting frame relative to the slope adjustment frame via pivotal motion of the saddle half base relative to the slope adjustment frame about an axis extending along a longitudinal direction of the adjustable saddle.

In some embodiments, the slope adjustment mechanism comprises a discrete slope adjustment mechanism configured to adjust the slope of a saddle half base to any of a plurality of discrete angles.

In some embodiments, a first discrete slope adjustment mechanism may include a first mounting frame front end projection 11081 comprising a first front end hinge pin 11071 and a first mounting frame back end projection 11082 comprising a first back end hinge pin 11072. The first mounting frame back end projection 11082 may also comprise a first plurality of slope adjustment apertures 11061 configured to receive a first slope adjustment fastener 11001 securable with a first slope adjustment fastener nut 11003. The first discrete slope adjustment mechanism may also include a first front end hinge aperture 11011 configured to receive the first front end hinge pin 11071, a first back end aperture 11012 configured to receive the first back end hinge pin 11072, a first slope adjustment fastener aperture 11021 and a first slope frame bracket aperture 11091 each configured to receive the first slope adjustment fastener 11001 therethrough. In this manner, the first discrete slope adjustment mechanism may be configured to pivotally couple a first mounting frame 11305 to a slope adjustment frame 11010 at any of a plurality of different discrete angles to adjust a slope of a first saddle half base 11114 relative to the slope adjustment frame 11010.

In some embodiments, a second discrete slope adjustment mechanism may include a second mounting frame front end projection 11083 comprising a second front end hinge pin 11073 and a second mounting frame back end projection 11084 comprising a second back end hinge pin 11074. The second mounting frame back end projection 11084 may also comprise a second plurality of slope adjustment apertures 11062 configured to receive a second slope adjustment fastener 11002 securable with a second slope adjustment fastener nut 11004. The second discrete slope adjustment mechanism may also include a second front end hinge aperture 11013 configured to receive the second front end hinge pin 11073, a second back end aperture 11012 configured to receive the second back end hinge pin 11074, a second slope adjustment fastener aperture 11022 and a second slope frame bracket aperture 11093 each configured to receive the second slope adjustment fastener 11002 therethrough. In this manner, the second discrete slope adjustment mechanism may be configured to pivotally couple a second mounting frame 11307 to the slope adjustment frame 11010 at any of a plurality of different discrete angles to adjust a slope of a second saddle half base 11214 relative to the slope adjustment frame 11010.

In some embodiments, the slope adjustment mechanism comprises an analog slope adjustment mechanism configured to adjust the slope along a continuous range of angles.

In some embodiments, a first analog slope adjustment mechanism may include a first mounting frame front end projection 11081 comprising a first front end hinge pin 11071 and a first mounting frame back end projection 11082 comprising a first back end hinge pin 11072. The first mounting frame back end projection 11082 may also comprise a first slope adjustment slot (not shown) having an elongate, arcuate path. The first slope adjustment slot may be configured to receive a first slope adjustment fastener 11001 securable with a first slope adjustment fastener nut 11003. In some embodiments, a surface (not shown) proximate the first slope adjustment slot (and/or the first slope adjustment fastener 11001 and first slope adjustment fastener nut 11003) may each include structures that promote a friction fit between these part (e.g., serrations, teeth, etc.) in order to prevent loosening over time. The first analog slope adjustment mechanism may also include a first front end hinge aperture 11011 configured to receive the first front end hinge pin 11071, a first back end aperture 11012 configured to receive the first back end hinge pin 11072, a first slope adjustment fastener aperture 11021 and a first slope frame bracket aperture 11091 each configured to receive the first slope adjustment fastener 11001 therethrough. In this manner, the first analog slope adjustment mechanism may be configured to pivotally couple a first mounting frame 11305 to a slope adjustment frame 11010 along a continuous range of angles to adjust a slope of a first saddle half base 11114 relative to the slope adjustment frame 11010.

In some embodiments, a second analog slope adjustment mechanism may include a second mounting frame front end projection 11083 comprising a second front end hinge pin 11073 and a second mounting frame back end projection 11084 comprising a second back end hinge pin 11074. The second mounting frame back end projection 11084 may also comprise a second slope adjustment slot (not shown) having an elongate, arcuate path. The second slope adjustment slot may be configured to receive a second slope adjustment fastener 11002 securable with a second slope adjustment fastener nut 11004. In some embodiments, a surface (not shown) proximate the second slope adjustment slot (and/or the second slope adjustment fastener 11002 and second slope adjustment fastener nut 11004) may each include structures that promote a friction fit between these parts (e.g., serrations, teeth, etc.) in order to prevent loosening over time. The second analog slope adjustment mechanism may also include a second front end hinge aperture 11013 configured to receive the second front end hinge pin 11073, a second back end aperture 11012 configured to receive the second back end hinge pin 11074, a second slope adjustment fastener aperture 11022, and a second slope frame bracket aperture 11093, each configured to receive the second slope adjustment fastener 11002 therethrough. In this manner, the second analog slope adjustment mechanism may be configured to pivotally couple a second mounting frame 11307 to a slope adjustment frame 11010 along a continuous range of angles to adjust a slope of a second saddle half base 11214 relative to the slope adjustment frame 11010.

Referring to FIG. 49, the first and second mounting frames 11305, 11307 may include a first plurality of front end channels 11311 configured to receive the first front end fastener 11301 to attach the first saddle half base front end 11112 to the first mounting frame front end 11321, and a second plurality of front end channels 11312 configured to receive the second front end fastener 11302 to attach the second saddle half base front end 11212 to the second mounting frame front end 11322.

Referring to FIG. 50, the adjustable saddle 11000 may generally be described in relation to reference frame 11090, having a longitudinal direction 11092, a lateral direction 11094, and a transverse direction 11096.

In some embodiments, the first and second plurality of front end channels 11311, 11312 may comprise a plurality of longitudinal slots formed through the first and second mounting frame front ends 11321, 11322 and configured to receive the first and second front end fasteners 11301, 11302.

In some embodiments, the first and second plurality of front end channels 11311, 11312 may be substantially parallel to the longitudinal direction 11092 and extend along rectilinear paths, allowing pivotal and/or translational adjustment of the front ends 11101, 11201 of the saddle halves 11100, 11200 relative to the first and second mounting frame front ends 11321, 11322.

In some embodiments, the first and second plurality of front end channels 11311, 11312 may be angled non-parallel to the longitudinal and/or lateral directions 11092, 11094 and extend along rectilinear paths, allowing pivotal and/or translational adjustment of the front ends 11101, 11201 of the saddle halves 11100, 11200 relative to the first and second mounting frame front ends 11321, 11322.

In some embodiments, the first and second plurality of front end channels 11311, 11312 may be configured to pivotally attach each of the first and second saddle half base front ends 11112, 11212 to the first and second mounting frame front ends 11321, 11322 in at least two different pivot points corresponding to a plurality of discrete front end locations defined by the first and second plurality of front end channels 11311, 11312.

However, it will also be understood that in some embodiments the first and second plurality of front end channels 11311, 11312 may comprise any of the holes, slots, grooves, structures, shapes, etc., described herein for receiving any of the fasteners described herein to couple a saddle half base to the first and second mounting frame front ends 11321, 11322. Moreover, the first and second plurality of front end channels 11311, 11312 may include any number of front end channels, including a single front end channel.

The first and second mounting frame back ends 11331, 11332 may also include a first plurality of back end channels 11333 configured to receive the first back end fastener 11303 to attach the back end 11103 of the first saddle half 11100 to the first mounting frame back end 11331, and a second plurality of back end channels 11334 configured to receive the second back end fastener 11304 to attach the back end 11203 of the second saddle half 11200 to the second mounting frame back end 11332.

In some embodiments, the first and second plurality of back end channels 11333, 11334 may comprise a plurality of key slots formed in the first and second mounting frame back ends 11331, 11332, which may be shaped to receive the first and second movable back end keys 11313, 11315.

In some embodiments, the first and second plurality of back end channels 11333, 11334 and the first and second movable back end keys 11313, 11315 may comprise complementary diamond or parallelogram shapes, such that the first and second movable back end keys 11313, 11315 may each fit within one of the first and second plurality of back end channels 11333, 11334 to couple the back ends of the first and second saddle half bases 11114, 11214 to the first and second mounting frame back ends 11331, 11332.

However, it will be understood that the first and second plurality of back end channels 11333, 11334 and the first and second movable back end keys 11313, 11315 may comprise any suitable shape including, but not limited to: circles, ovals, squares, rectangles, triangles, pentagons, hexagons, octagons, crescents, stars, chevrons, etc.

In some embodiments, the first and second plurality of back end channels 11333, 11334 may be arranged in succession along a rectilinear path that may be substantially parallel to the lateral direction 11094, allowing pivotal and/or translational adjustment of the back ends 11103, 11203 of the saddle halves 11100, 11200 relative to the first and second mounting frame back ends 11331, 11332.

In some embodiments, the first and second plurality of back end channels 11333, 11334 may be arranged in succession along a rectilinear path that may be angled non-parallel to the longitudinal and/or lateral directions 11092, 11094, allowing pivotal and/or translational adjustment of the back ends 11103, 11203 of the saddle halves 11100, 11200 relative to the first and second mounting frame back ends 11331, 11332.

In some embodiments, the first and second plurality of back end channels 11333, 11334 may be arranged in succession along an arcuate path, allowing pivotal and/or translational adjustment of the back ends 11103, 11203 of the saddle halves 11100, 11200 relative to the first and second mounting frame back ends 11331, 11332.

It will also be understood that in some embodiments the first and second plurality of front end channels 11311, 11312 may comprise any of the holes, slots, grooves, structures, shapes, etc., described herein for receiving any of the fasteners described herein to couple a saddle half base to the first and second mounting frame front ends 11321, 11322. Moreover, the first and second plurality of back end channels 11333, 11334 may include any number of back end channels, including a single back end channel.

In some embodiments, the first and second plurality of front and back end channels 11311, 11312, 11333, 11334 may together comprise a saddle half adjustment mechanism configured to adjust an orientation of the first and second saddle half bases 11114, 11214 relative to the first and second mounting frames 11305, 11307 via pivotal motion of the first and second saddle half bases 11114, 11214 relative to the first and second mounting frames 11305, 11307.

In some embodiments, the saddle half adjustment mechanism may comprise a discrete adjustment mechanism with the first and second plurality of front end channels 11311, 11312 configured to receive the first and second front end fasteners 11301, 11302 at a plurality of discrete front end locations, and the first and second plurality of back end channels 11333, 11334 configured to receive the first and second back end fasteners 11303, 11304 at a plurality of discrete back end locations. In this manner, the first and second saddle half base front ends 11112, 11212 can receive the first and second front end fasteners 11301, 11302 to pivotally attach each of the first and second saddle half base front ends 11112, 11212 to the first and second mounting frame front ends 11321, 11322 in at least two different pivot points corresponding to the plurality of discrete front end locations. Likewise, the first and second saddle half base back ends 11110, 11210 can receive the first and second back end fasteners 11303, 11304 to position the first and second saddle half base back ends 11110, 11210 relative to the first and second mounting frame back ends 11331, 11332 at the plurality of discrete back end locations to allow discrete pivotal attachment of the first and second saddle half base back ends 11110, 11210 to the first and second mounting frame back ends 11331, 11332.

Referring to FIGS. 51B, 51E, 53A-B, and 56, the first and second mounting frames 11305, 11307 may also include adjustment markings 11340. The adjustment markings 11340 may generally indicate the degree to which each saddle half base 11114, 11214 is positionally adjusted with respect to the first and second mounting frame front ends 11321, 11322 and/or the first and second mounting frame back ends 11331, 11332.

In the embodiments shown in FIGS. 51B, 51E, 53A-B, and 56, the adjustment markings 11340 include numbering spaced apart at regular intervals. However, in some embodiments the adjustment markings 11340 may include simple line markings or other symbols that indicate various information, such as angular or translational displacement of the saddle halves 11100, 11200 with respect to the first and second mounting frame front and back ends 11321, 11322, 11331, 11332, preferred saddle half positions based on riding style, a rider's personal position preference, etc. The adjustment markings 11340 may be formed by any known process including, but not limited to: laser etching, stamping, integral formation during molding/casting, and the like. In addition to the adjustment markings 11340, the first rail 11350 and/or the second rail 11370 may also include additional adjustment markings (not shown) to indicate translational displacement of the chassis 11300 with respect to a seat post and/or a seat post mounting bracket (not shown).

Referring to FIG. 49, the first and second rails 11350, 11370 may be coupled to each other via a front rail portion 11390. The slope adjustment frame 11010 may be coupled to the first and second rails 11350, 11370 via one or more rail retaining features 11884 (e.g., see FIGS. 51E, 54C-D, and 55A-B), and the first and second mounting frames 11305, 11307 may also be coupled to the front rail portion 11390 via the front rail bracket 11500.

In some embodiments, the front rail bracket 11500 may be formed as a discrete component configured to releasably couple the front rail portion 11390 to the slope adjustment frame 11010 to.

In some embodiments, the front rail bracket 11500 may be formed as a discrete component configured to releasably couple the front rail portion 11390 to the slope adjustment frame 11010 in conjunction with the lock member 11501 of the slope adjustment frame 11010.

In some embodiments, the front rail bracket 11500 may be integrally formed with the slope adjustment frame 11010 and configured to releasably couple the front rail portion 11390 to the slope adjustment frame 11010.

In some embodiments, the front rail bracket 11500 may be integrally formed with the slope adjustment frame 11010 and configured to fixedly couple the slope adjustment frame 11010 to the front rail portion 11390.

Figure 52A:
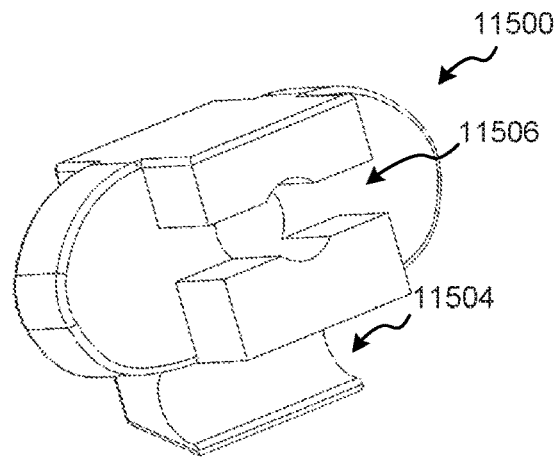
FIG. 52A illustrates a perspective view of the front rail bracket shown in FIG. 49.
Figure 52B:
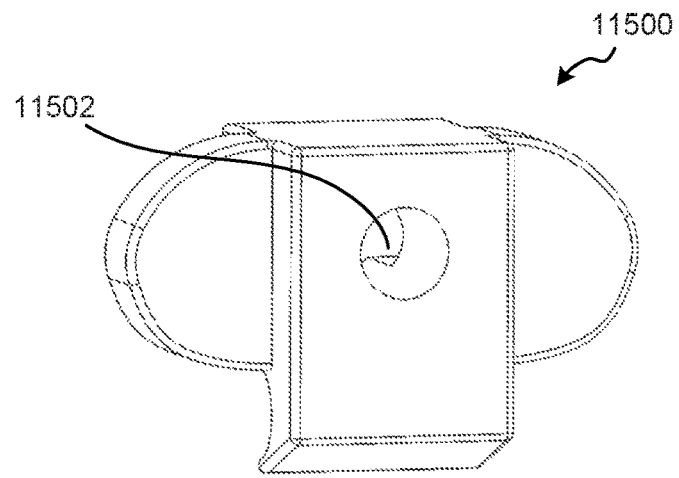
FIG. 52B illustrates a rear perspective view of the front rail bracket.
Figure 52C:
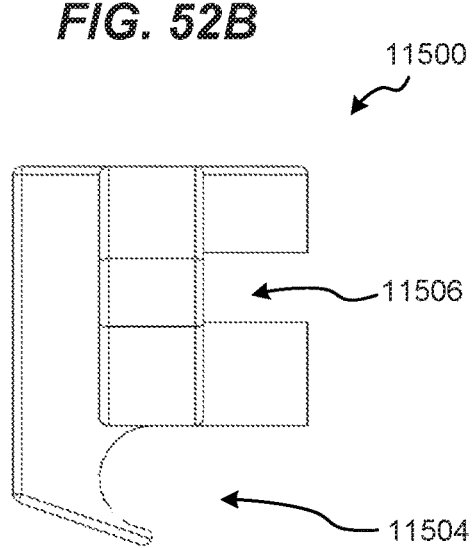
FIG. 52C illustrates a side view of the front rail bracket.

FIGS. 52A-C illustrate perspective views and a side view of a front rail bracket 11500 that is discrete, according to an embodiment of the present disclosure. The front rail bracket 11500 may include a front rail bracket aperture 11502 to receive the front rail bracket fastener 11510 (see FIG. 49) to couple the front rail bracket 11500 to the slope adjustment frame 11010 via the front attachment aperture 11314 of the slope adjustment frame 11010. The front rail bracket 11500 may include a front rail portion recess 11504 configured to receive the front rail portion 11390. The front rail bracket 11500 may also include one or more recesses 11506 configured to receive one or more slope adjustment frame projections 11306 to couple the slope adjustment frame 11010 to the front rail portion 11390.

Figure 56:
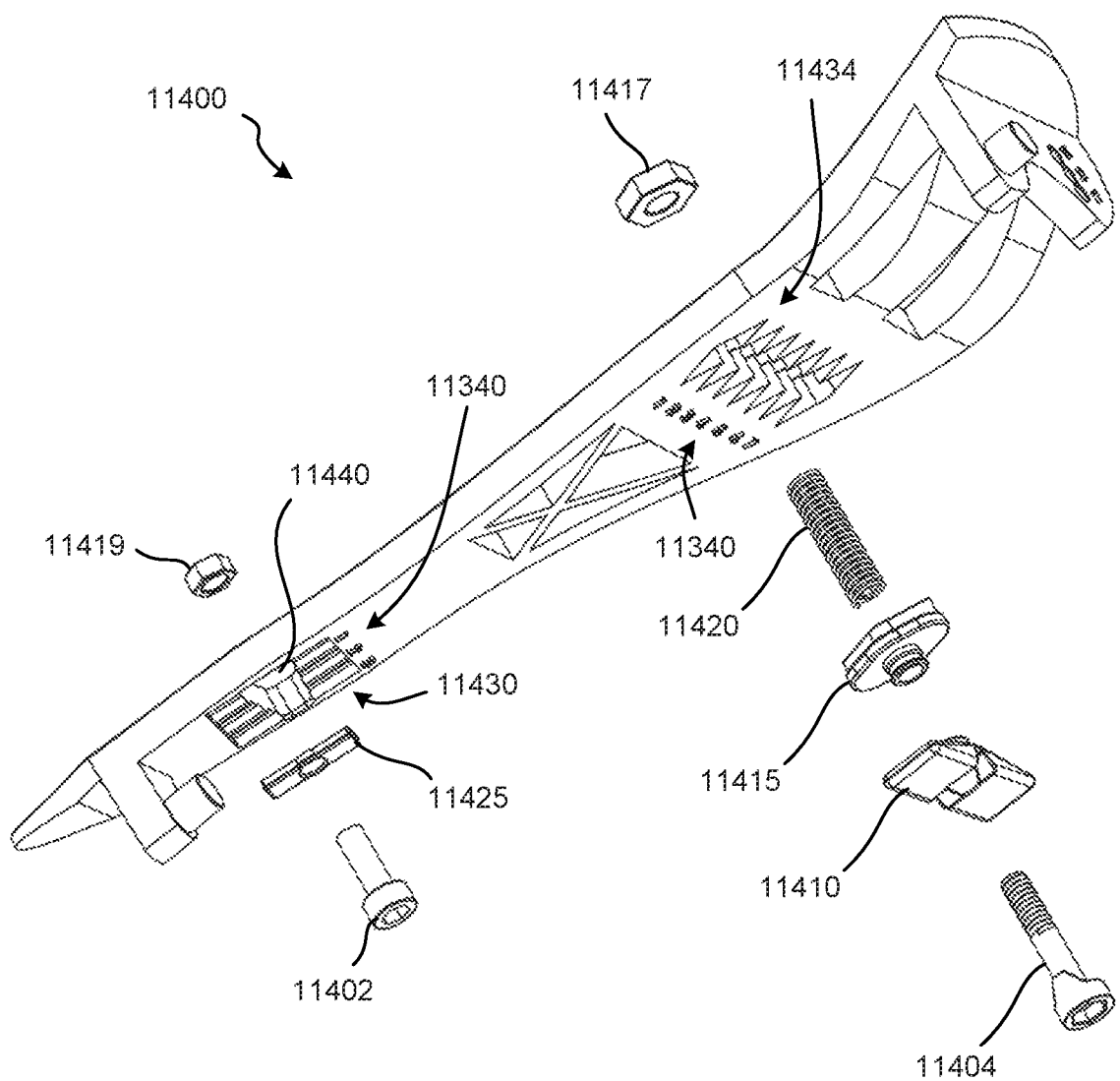
FIG. 56 illustrates an exploded view of a mounting frame with movable fasteners, according to another embodiment of the present disclosure.
Figure 57:
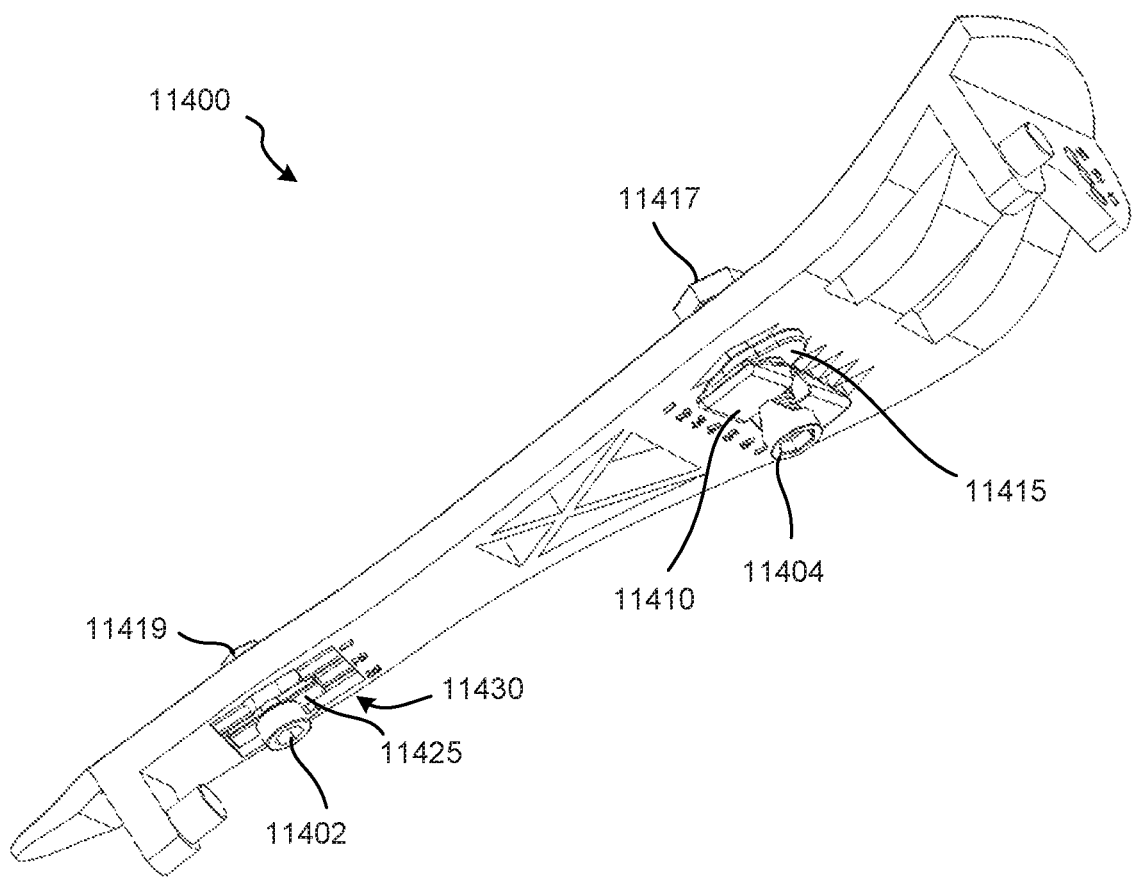
FIG. 57 illustrates the mounting frame and movable fasteners of FIG. 56 in assembled form.
Figure 60:
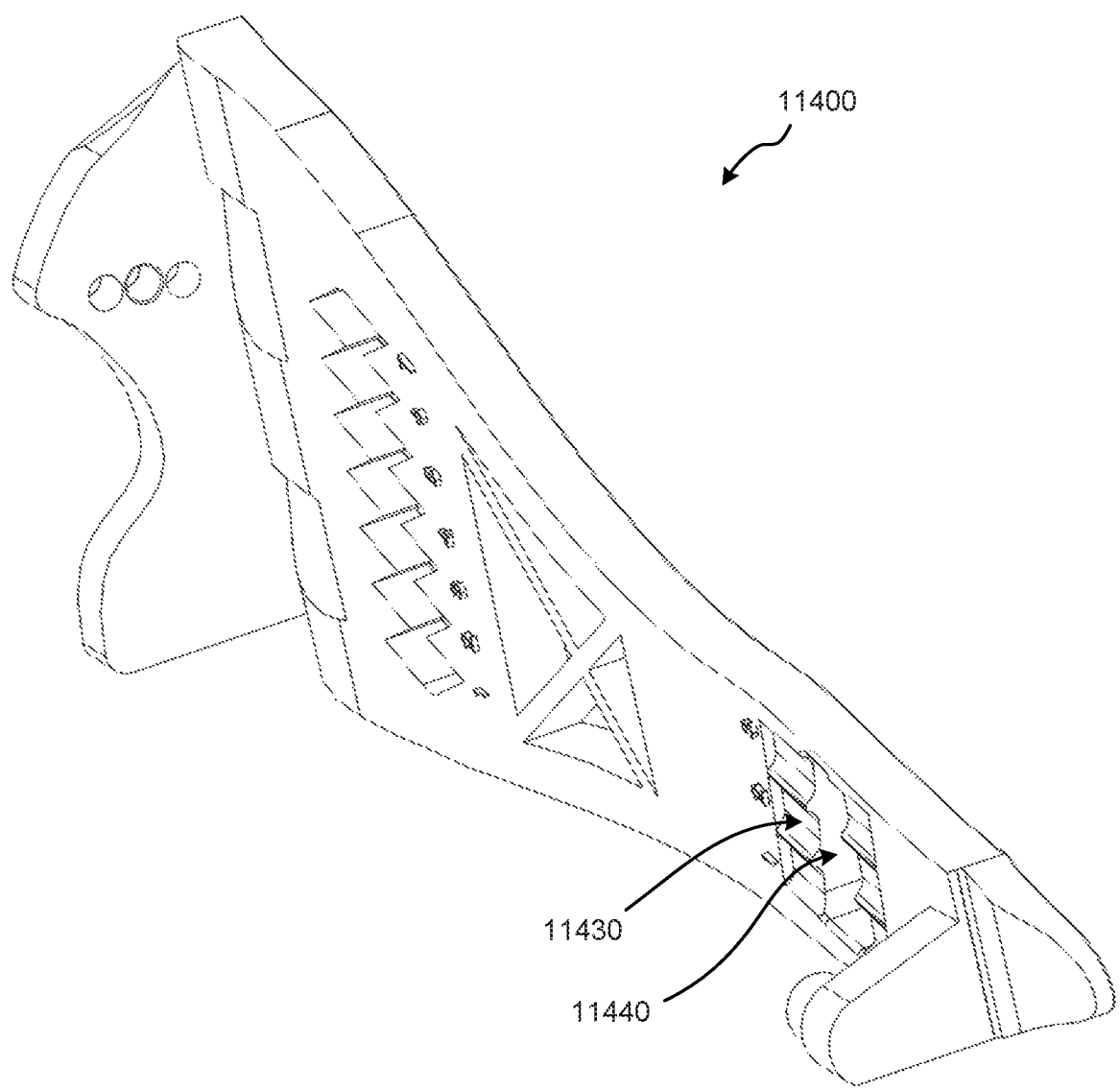
FIG. 60 illustrates a bottom perspective view of the mounting frame shown in FIG. 56.

FIGS. 56-60 illustrate various views of a mounting frame 11400 with fastener assemblies, according to other embodiments of the present disclosure. Specifically, FIG. 56 shows an exploded view of the mounting frame 11400 and fastener assemblies; FIG. 57 shows the mounting frame and fastener assemblies in assembled form; FIGS. 58A-59B show perspective views of portions of a fastener assembly; and FIG. 60 illustrates a bottom perspective view of the mounting frame 11400. Any of the adjustable saddles disclosed herein may utilize one or more features of the mounting frame 11400 and fasteners illustrated in FIGS. 56-60.

The mounting frame 11400 may be similar to the first and second mounting frames 11305, 11307 shown in FIGS. 49 and 53A-B, except that the first and second plurality of front end channels 11311, 11312 may comprise a plurality of longitudinal grooves 11430 and a transverse slot 11440 formed in the front end of the mounting frame 11400 (see FIGS. 56, 57, and 60).

The transverse slot 11440 may be configured to receive the front end fastener 11402 therethrough for coupling with the front end nut 11419. The front end fastener assembly may also comprise a movable front end key 11425. The plurality of longitudinal grooves 11430 may be configured to receive the movable front end key 11425 in a selected one of the plurality of longitudinal grooves 11430 in order to couple a saddle half base (not shown) to the mounting frame 11400 front end at a plurality of discrete front end locations defined by the plurality of longitudinal grooves 11430. The mounting frame 11400 may also include adjustment markings 11340 to indicate a translational displacement of the saddle half base relative to the mounting frame 11400.

The plurality of back end channels 11434 formed in the mounting frame 11400 may be configured to receive the back end fastener 11404 therethrough for coupling with the back end nut 11417, similar to FIGS. 41 and 49 described above. However, the back end fastener assembly may also comprise a bias spring 11420, a movable back end key 11415, and a wing nut 11410 configured to couple with the back end fastener 11404 to form a quick change mechanism. In this manner, a user may quickly rotate the wing nut 11410 to loosen the back end fastener assembly sufficiently to enable removal of the movable back end key 11415 from a first one of the plurality of back end channels 11434 in order to move the saddle half base to a new desired location, and then reinsert the movable back end key 11415 into a second one of the plurality of back end channels 11434 at the desired location and retighten the back end fastener assembly.

It will be understood that any of the adjustable saddles disclosed herein may utilize one or more features of the mounting frame 11400 and fastener assemblies described in FIGS. 56-60 at any location, or in any combination.

Figure 61:
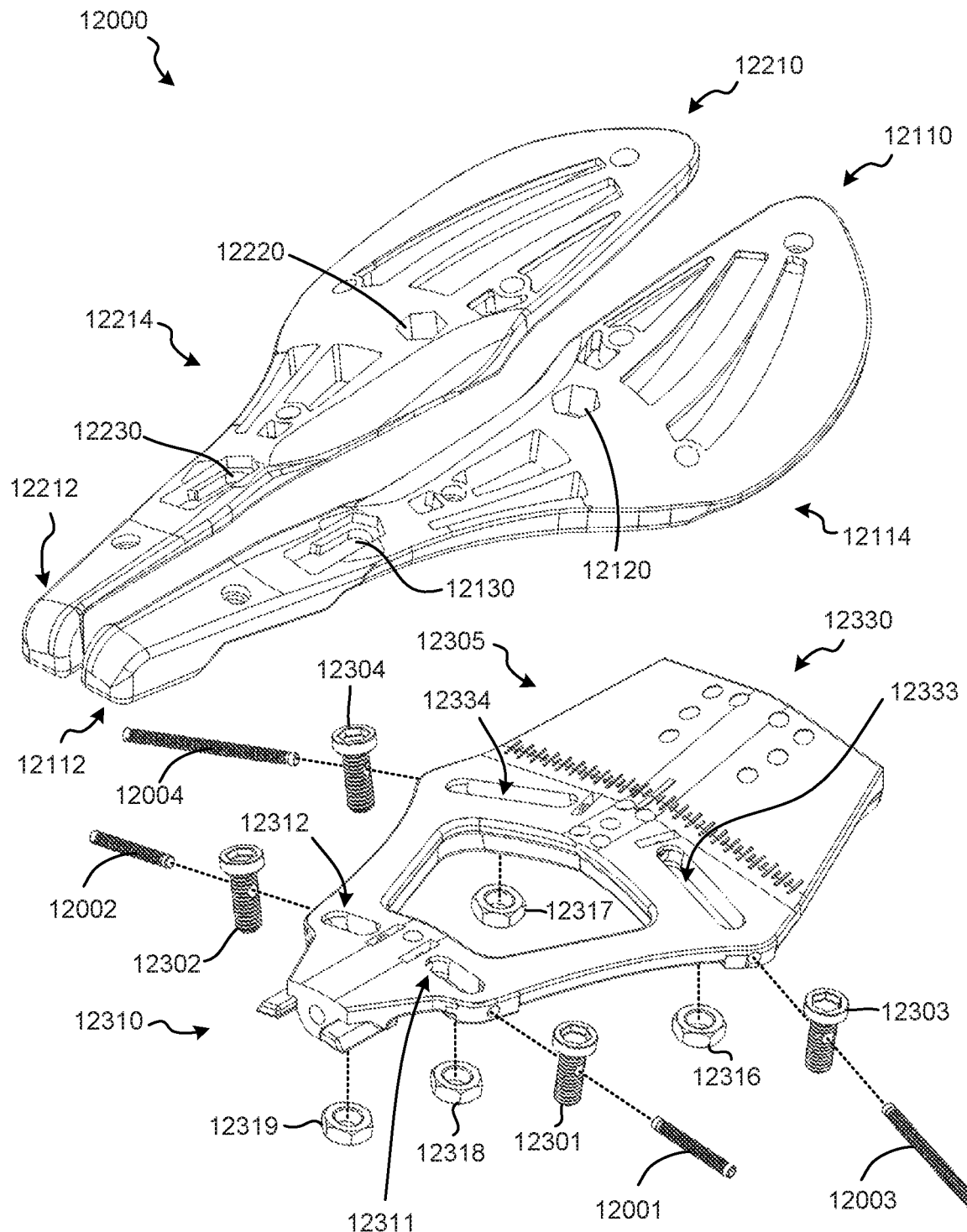
FIG. 61 illustrates an exploded view of an adjustable saddle, according to another embodiment of the present disclosure.
Figure 62:
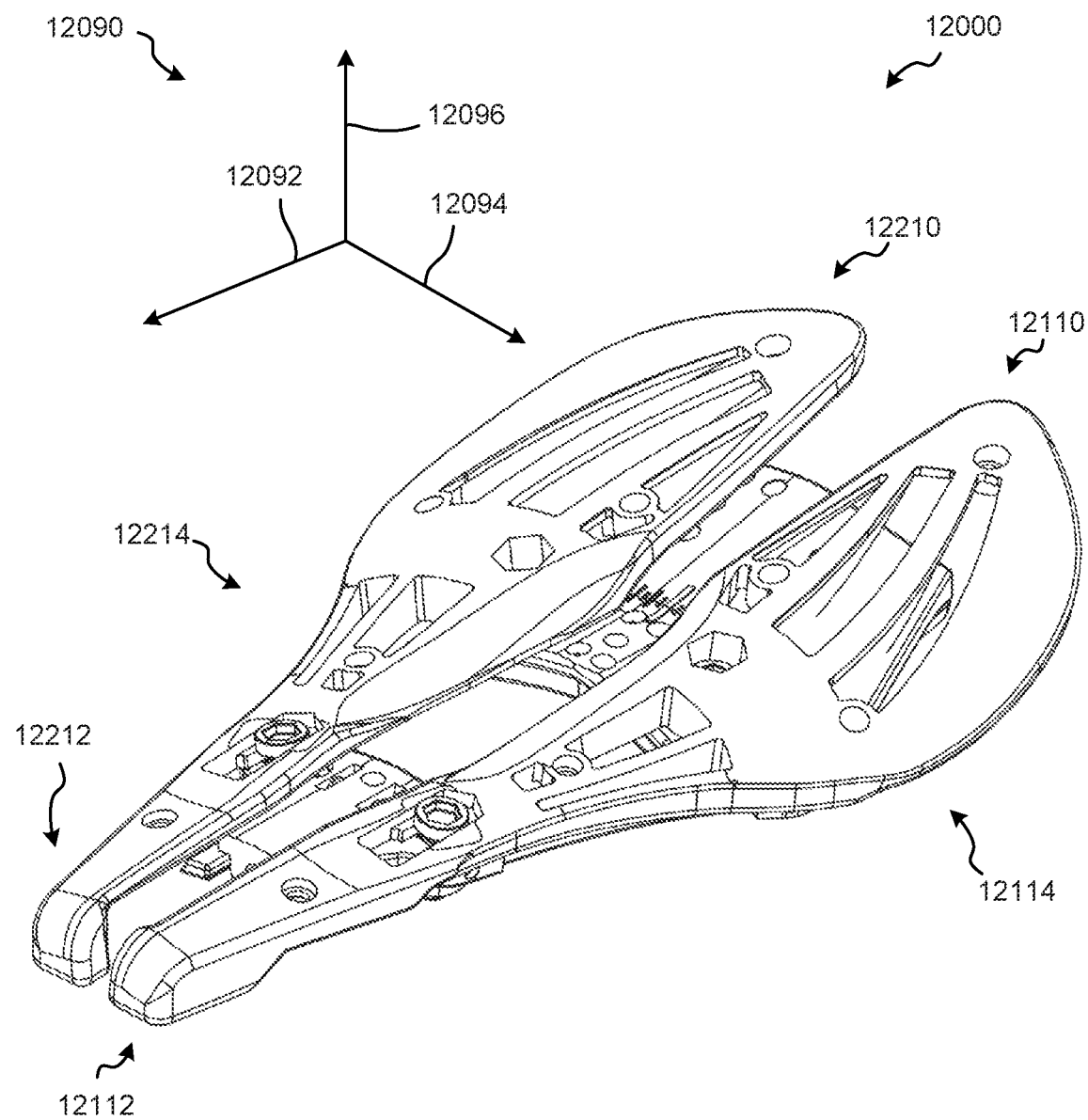
FIG. 62 illustrates a perspective view of the adjustable saddle of FIG. 61 in assembled form.
Figure 63A:
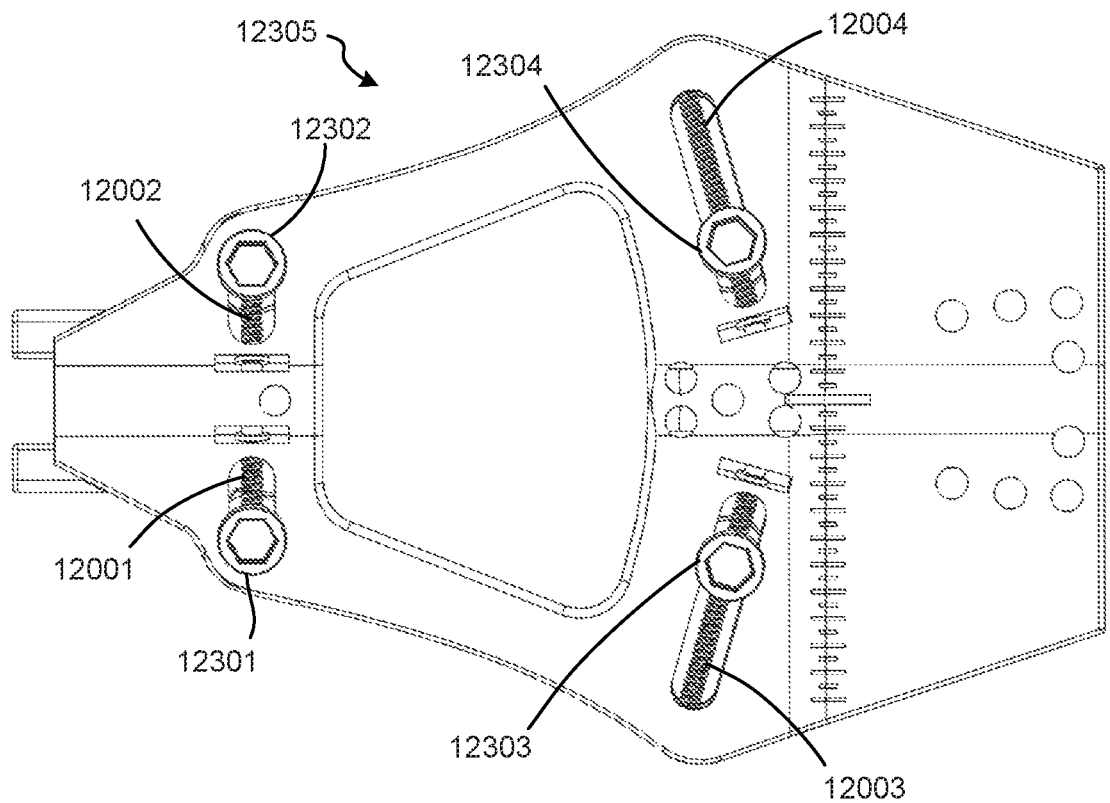
FIG. 63A illustrates a top view of the mounting frame in assembled form for the adjustable saddle shown in FIG. 61.
Figure 63B:
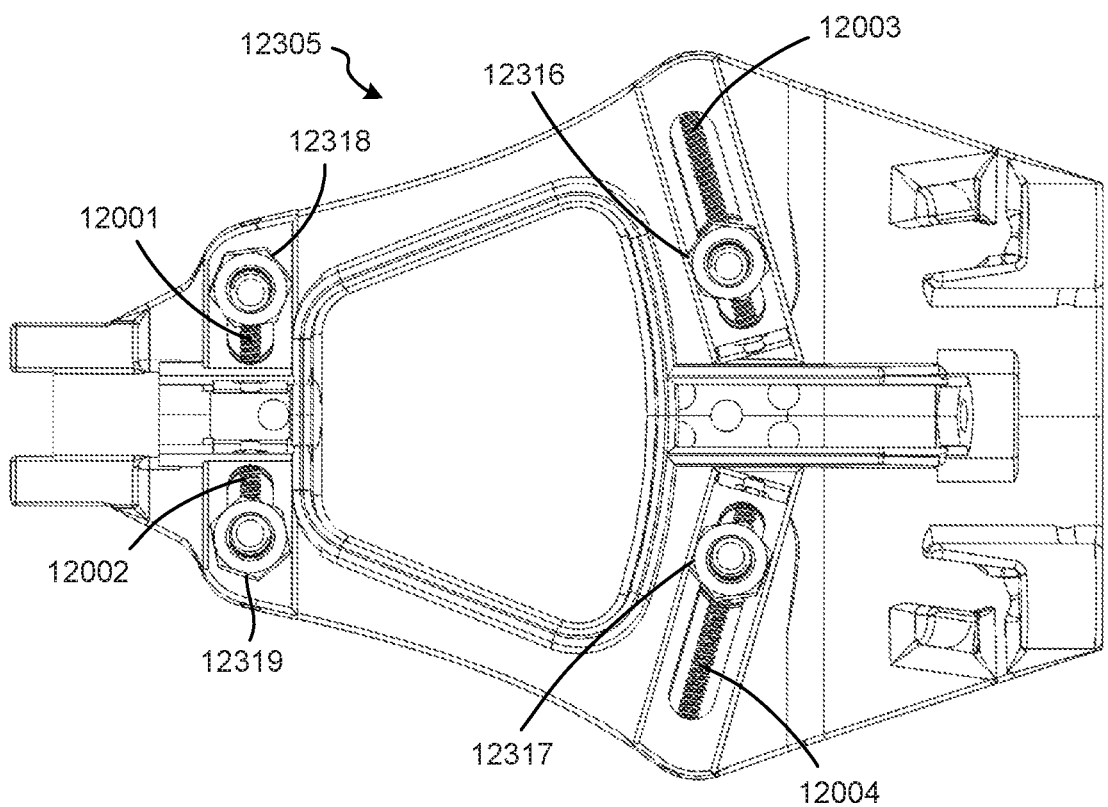
FIG. 63B illustrates a bottom view of the mounting frame.
Figure 63C:
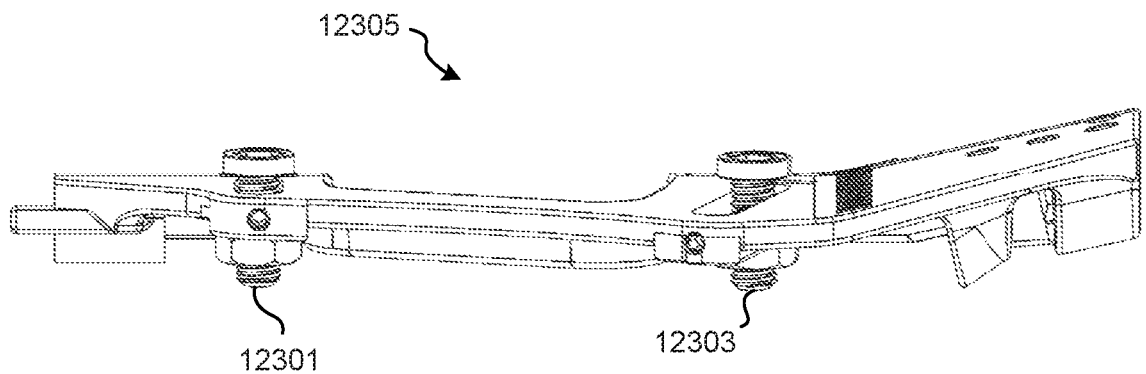
FIG. 63C illustrates a side view of the mounting frame.
Figure 63D:
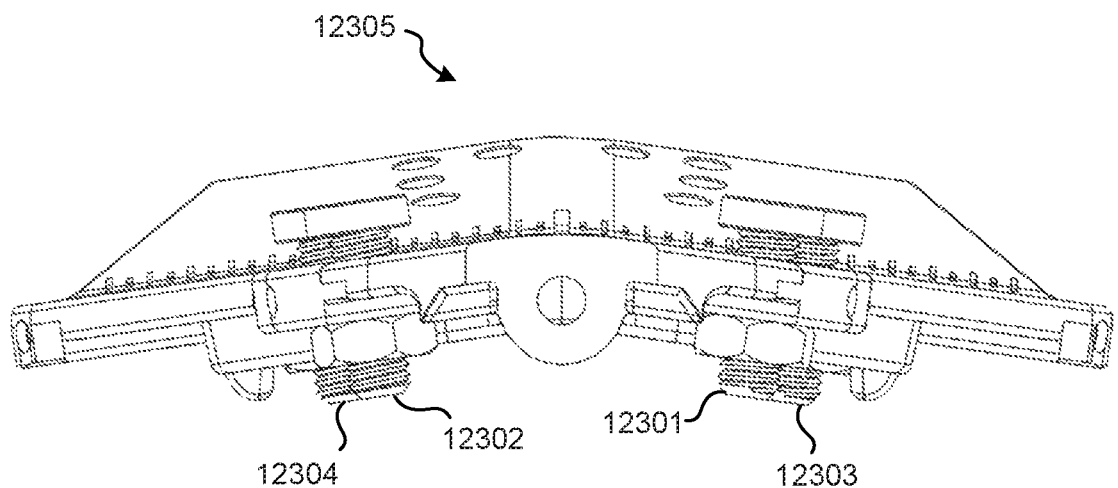
FIG. 63D illustrates a front view of the mounting frame.
Figure 63E:
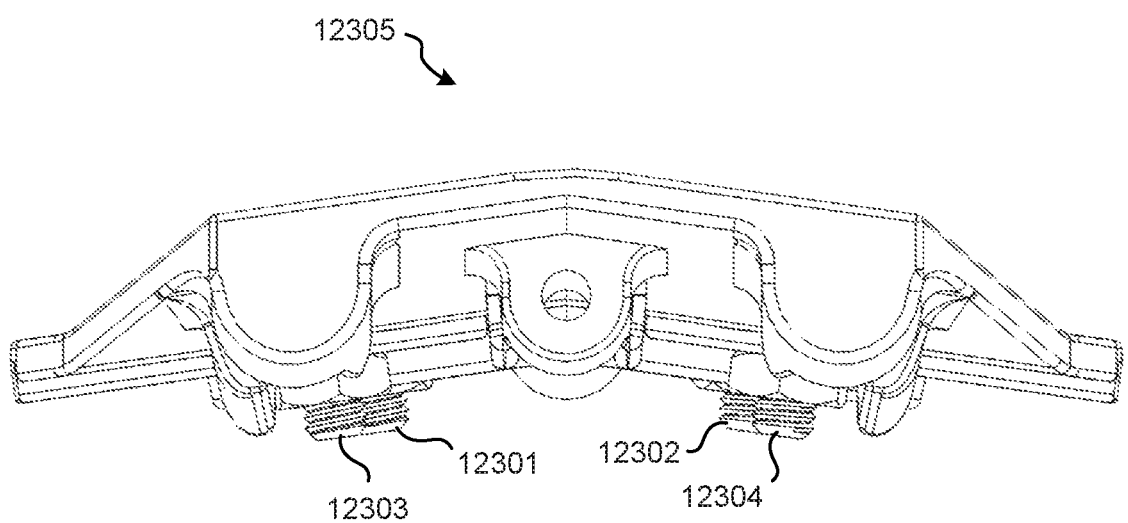
FIG. 63E illustrates a rear view of the mounting frame.
Figure 64:
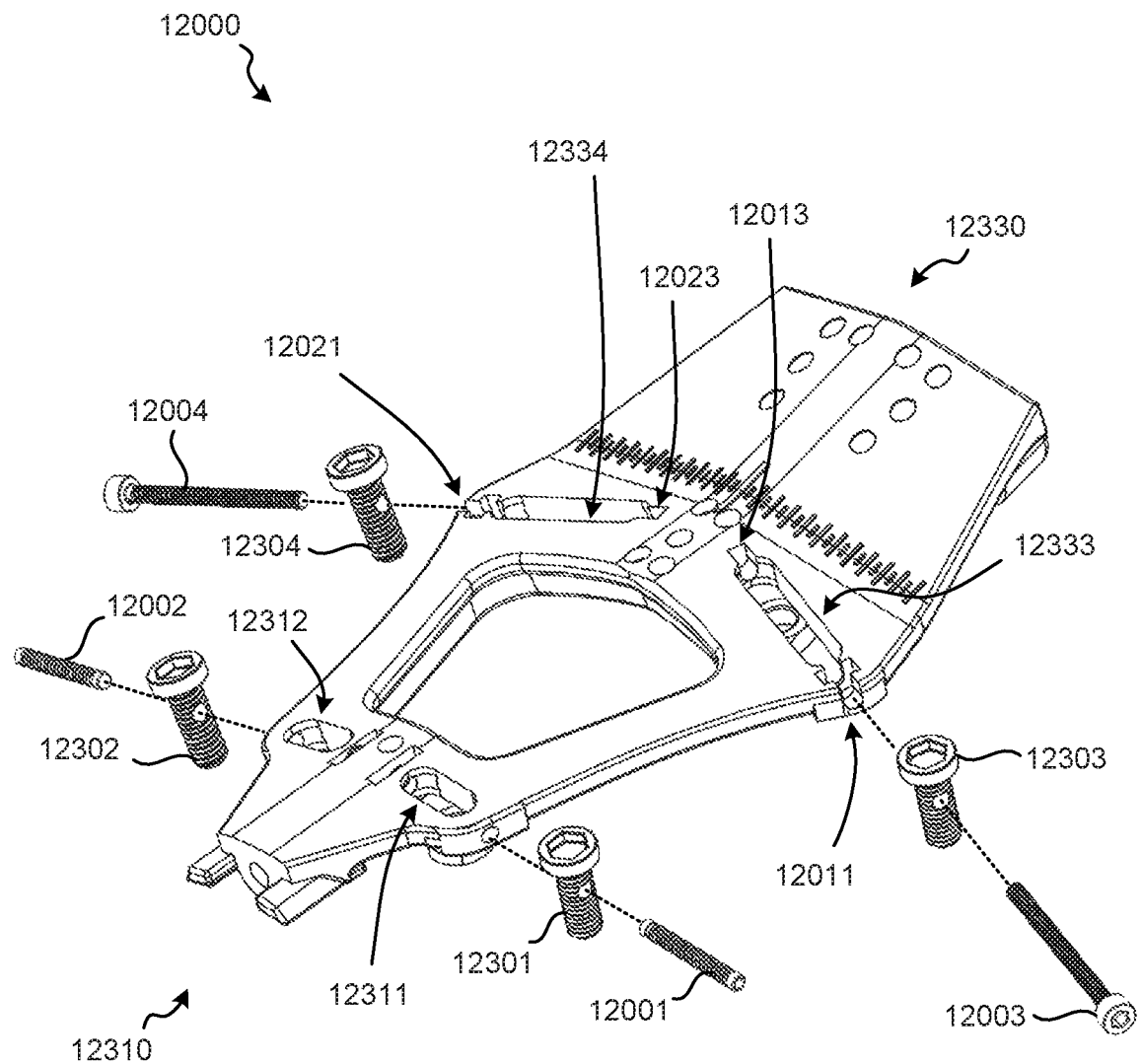
FIG. 64 illustrates an exploded view of an adjustable saddle, according to another embodiment of the present disclosure.
Figure 65:
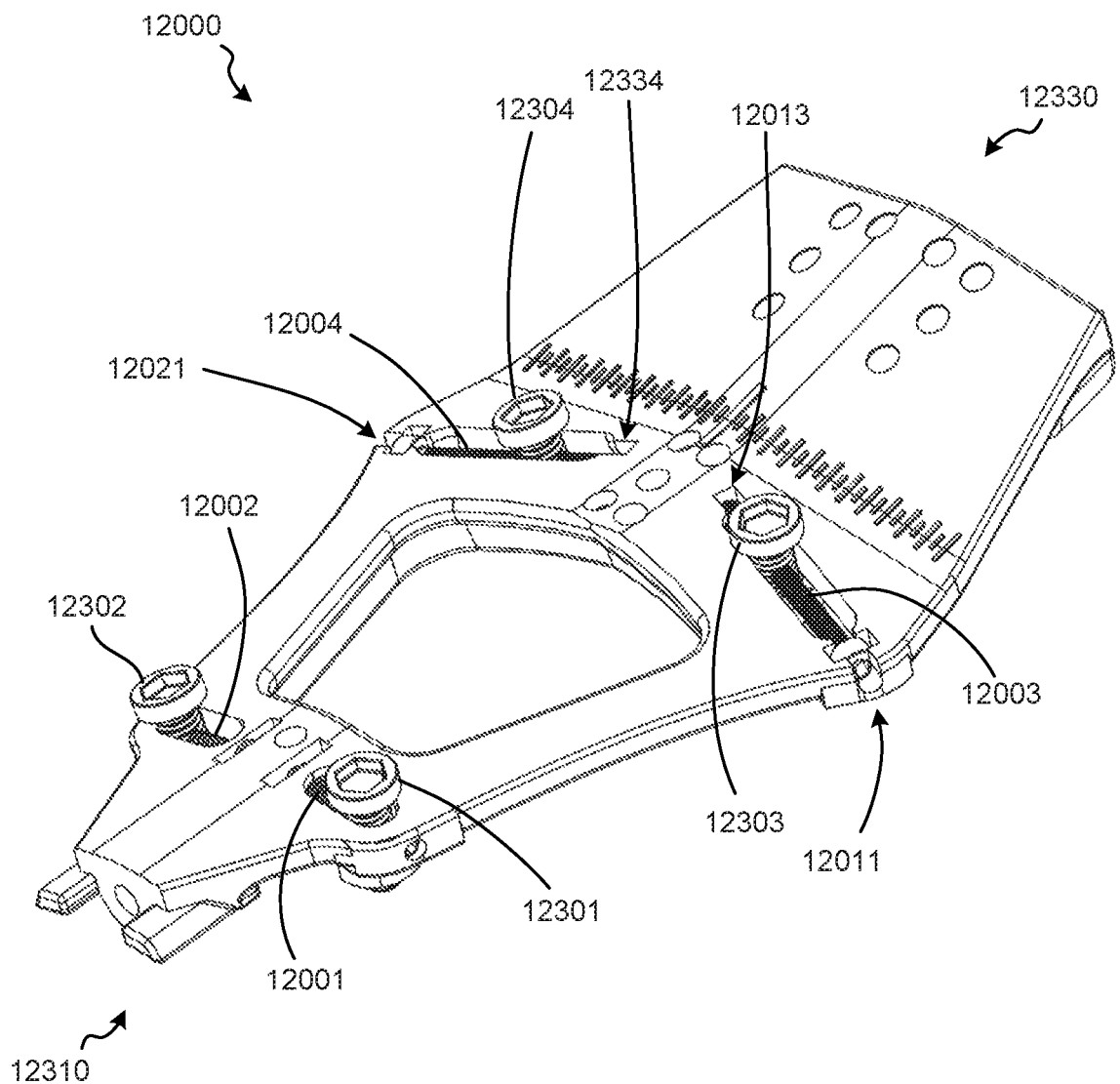
FIG. 65 illustrates a perspective view of the adjustable saddle of FIG. 64 in assembled form.
Figure 66A:
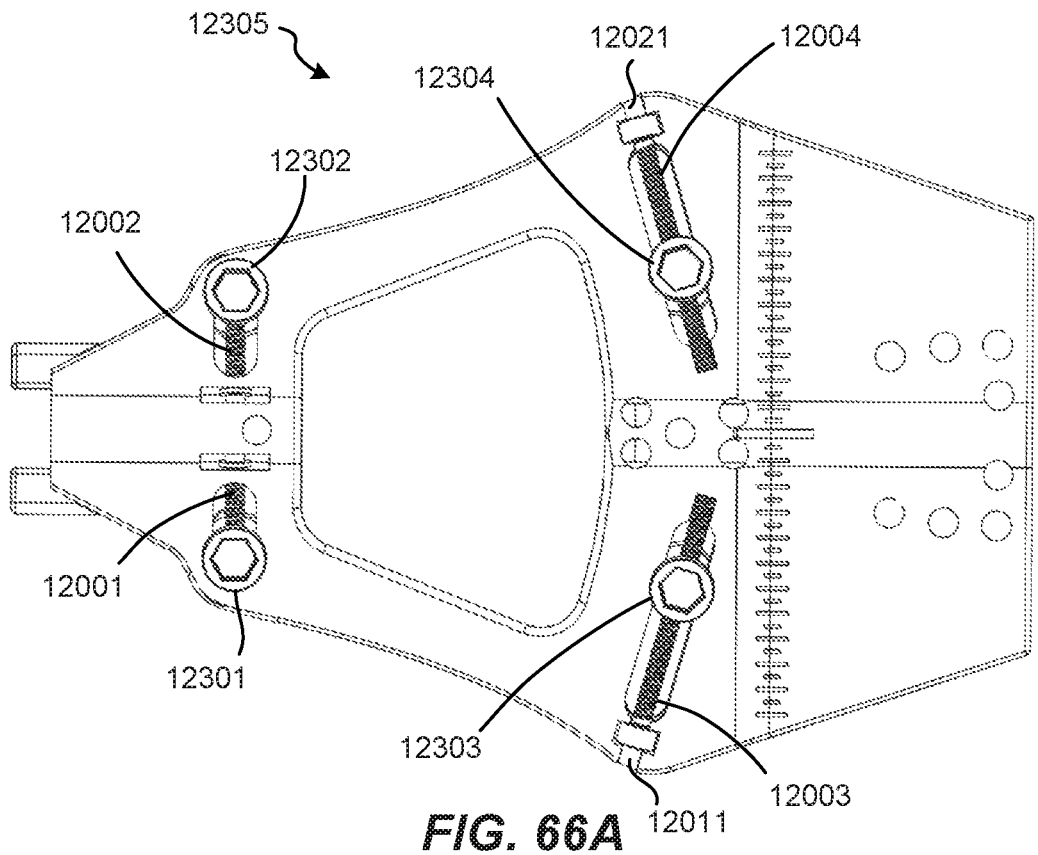
FIG. 66A illustrates a top view of the mounting frame in assembled form for the adjustable saddle shown in FIG. 64.
Figure 66B:
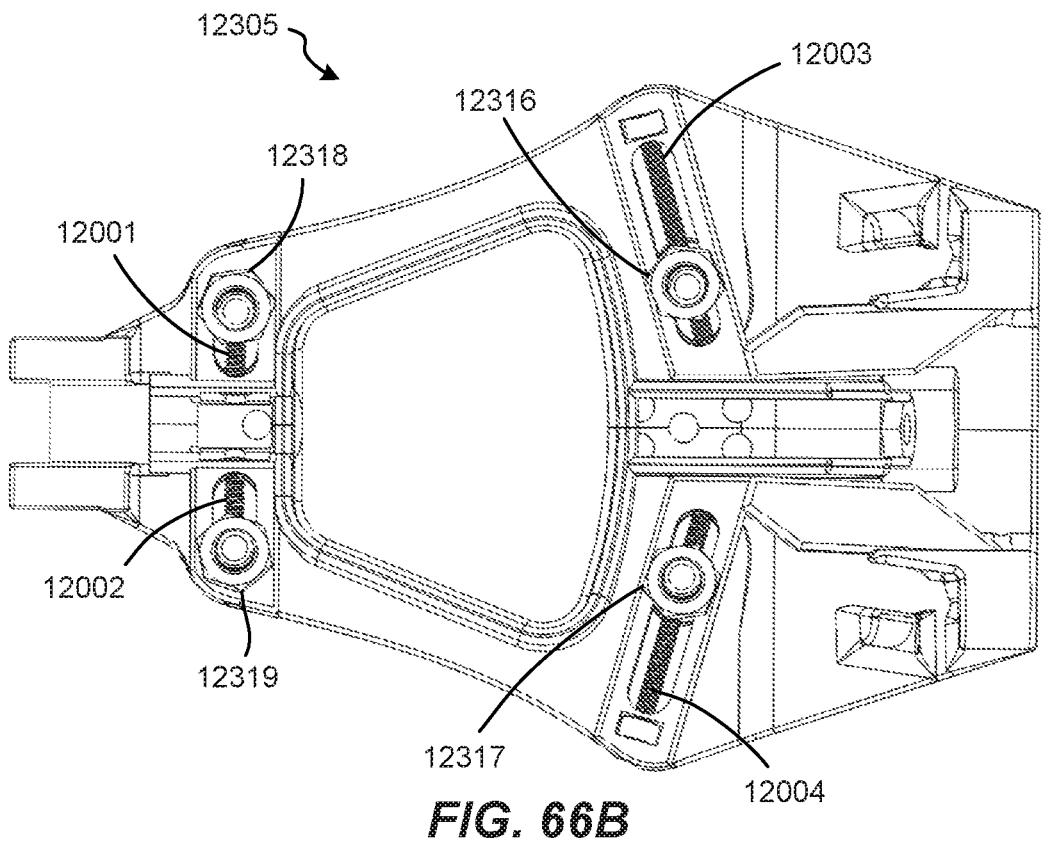
FIG. 66B illustrates a bottom view of the mounting frame.
Figure 66C:
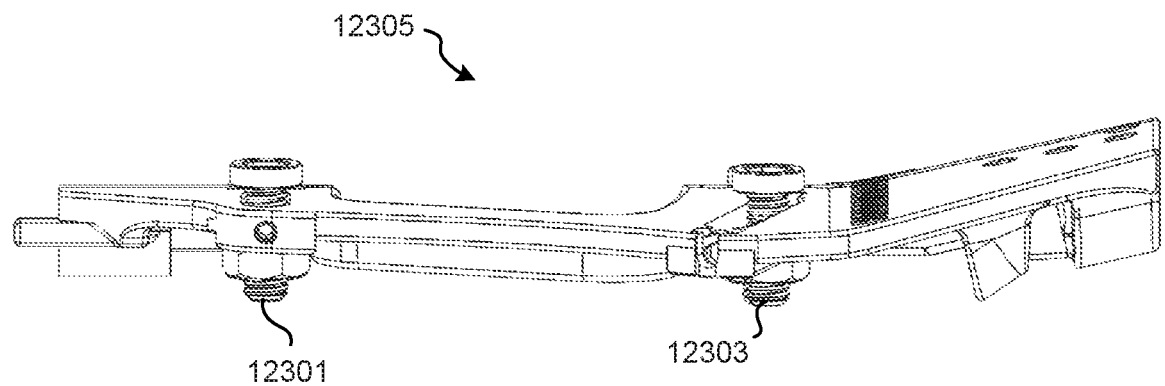
FIG. 66C illustrates a side view of the mounting frame.
Figure 66D:
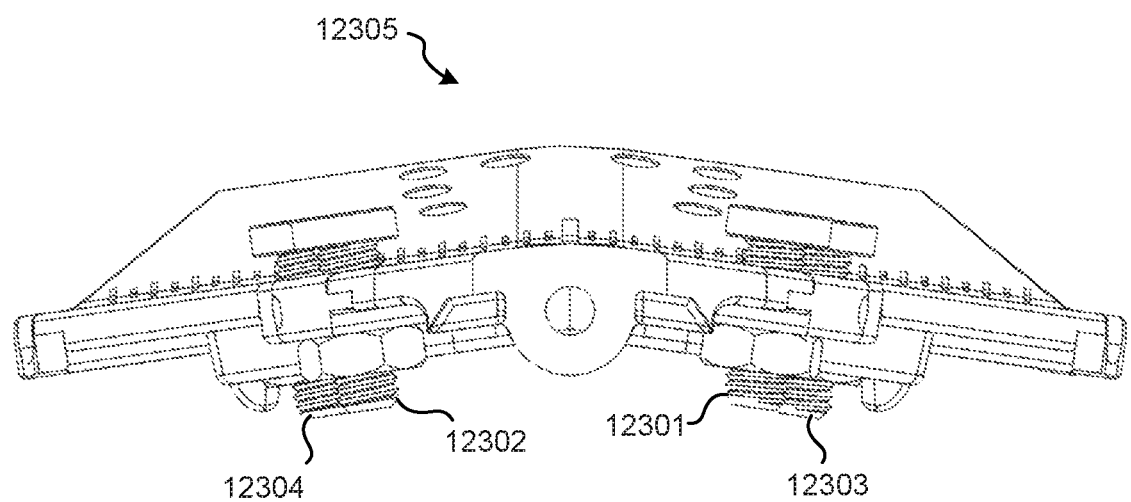
FIG. 66D illustrates a front view of the mounting frame.
Figure 66E:
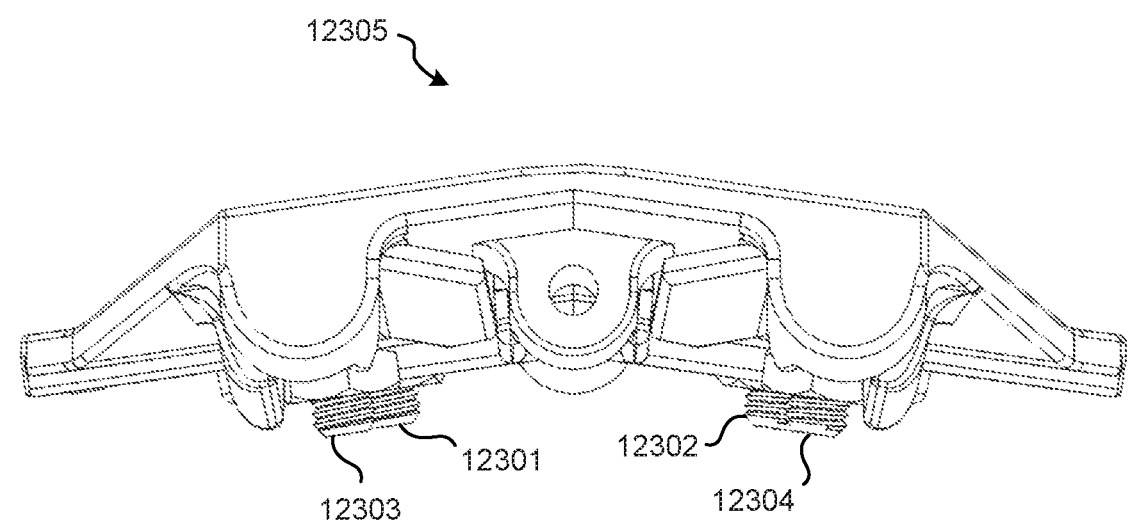
FIG. 66E illustrates a rear view of the mounting frame.

FIGS. 61-63E illustrate various views of an adjustable saddle 12000, according to another embodiment of the present disclosure. Specifically, FIG. 61 illustrates an exploded view of the adjustable saddle 12000; FIG. 62 illustrates a perspective view of the adjustable saddle 12000 in assembled form; and FIGS. 63A-E illustrate various views of a mounting frame 12305 of the adjustable saddle 12000. The adjustable saddle 12000 may incorporate, or omit, any feature that is described in connection with other adjustable saddles presented herein.

The adjustable saddle 12000 may generally include a first saddle half base 12114, a second saddle half base 12214, and the mounting frame 12305. The first and second saddle half bases 12114, 12214 may be adjustably attached to the mounting frame 12305 via a first front end fastener 12301, a second front end fastener 12302, a first back end fastener 12303, and a second back end fastener 12304. The first and second front end fasteners 12301, 12302 may adjustably attach the front ends 12112, 12212 of the saddle half bases 12114, 12214 to a front end 12310 of the mounting frame 12305. Likewise, the first and second back end fasteners 12303, 12304 may adjustably attach the back ends 12110, 12210 of the saddle half bases 12114, 12214 to a back end 12330 of the mounting frame 12305.

Assembly of the adjustable saddle 12000 will now be described with reference to FIGS. 61-63E. The first front end fastener 12301 may be inserted through a first front end retainer housing 12130 formed in the first saddle half base 12114 and into a first front end channel 12311 of the mounting frame 12305. A first front end worm screw 12001 may then be transversely inserted into the first front end channel 12311 through a small hole proximate the first front end channel 12311 (see FIG. 61) and then threaded into a threaded passageway formed through the first front end fastener 12301. A translational position of the first front end fastener 12301 within the first front end channel 12311 may then be selected via rotation of the first front end worm screw 12001 to translate the first front end fastener 12301 to any desired position within the first front end channel 12311. Once a desired translational position of the first front end fastener 12301 within the first front end channel 12311 has been reached, a first front end nut 12318 may be secured on the first front end fastener 12301 to hold it in place.

The first back end fastener 12303 may be inserted through a first back end retainer housing 12120 formed in the first saddle half base 12114 and into a first back end channel 12333 of the mounting frame 12305. A first back end worm screw 12003 may then be transversely inserted into the first back end channel 12333 through a small hole proximate the first back end channel 12333 and then threaded into a threaded passageway formed through the first back end fastener 12303. A translational position of the first back end fastener 12303 within the first back end channel 12333 may then be selected via rotation of the first back end worm screw 12303 to translate the first back end fastener 12303 to any desired position within the first back end channel 12333. Once a desired translational position of the first back end fastener 12303 within the first back end channel 12333 has been reached, a first back end nut 12316 may be secured on the first back end fastener 12303 to hold it in place.

The second front end fastener 12302 may be inserted through a second front end retainer housing 12230 formed in the second saddle half base 12214 and into a second front end channel 12312 of the mounting frame 12305. A second front end worm screw 12002 may then be transversely inserted into the second front end channel 12312 through a small hole proximate the second front end channel 12312, and then threaded into a threaded passageway formed through the second front end fastener 12302. A translational position of the second front end fastener 12302 within the second front end channel 12312 may then be selected via rotation of the second front end worm screw 12002 to translate the second front end fastener 12302 to any desired position within the second front end channel 12312. Once a desired translational position of the second front end fastener 12302 within the second front end channel 12312 has been reached, a second front end nut 12319 may be secured on the second front end fastener 12302 to hold it in place.

The second back end fastener 12304 may be inserted through a second back end retainer housing 12220 formed in the second saddle half base 12214 and into a second back end channel 12334 of the mounting frame 12305. A second back end worm screw 12004 may then be transversely inserted into the second back end channel 12334 through a small hole proximate the second back end channel 12334 and then threaded into a threaded passageway formed through the second back end fastener 12304. A translational position of the second back end fastener 12304 within the second back end channel 12334 may then be selected via rotation of the second back end worm screw 12304 to translate the second back end fastener 12304 to any desired position within the second back end channel 12334. Once a desired translational position of the second back end fastener 12304 within the second back end channel 12334 has been reached, a second back end nut 12317 may be secured on the second back end fastener 12304 to hold it in place.

Referring to FIG. 62, the adjustable saddle 12000 may generally be described in relation to reference frame 12090, having a longitudinal direction 12092, a lateral direction 12094, and a transverse direction 12096.

In some embodiments, a saddle half adjustment mechanism comprises an analog saddle half adjustment mechanism. The analog saddle half adjustment mechanism may be configured to position the first and second saddle half base front ends 12112, as well as the first and second saddle half base back ends 12110, 12210 relative to the mounting frame 12305 along a continuous range of pivot points. The analog saddle half adjustment mechanism may have a mechanical advantage sufficiently high to substantially prevent migration of a selected orientation of the first and second saddle half bases 12114, 12214 relative to the mounting frame 12305 in response to use of the adjustable saddle 12000 by a user seated on the adjustable saddle 12000.

In some embodiments, the analog saddle half adjustment mechanism may comprise a worm drive. The worm drive may include a worm screw and a worm fastener. The a worm screw may include a worm screw head, a worm screw shaft, and worm screw threading formed along the worm screw shaft. The a worm fastener may include a worm fastener shaft, a worm fastener passageway formed through the worm fastener shaft, and worm fastener threading formed within the worm fastener passageway. The worm fastener threading may be configured to receive the worm screw threading, such that, rotation of the worm screw head in a first direction causes the worm fastener to translate along the worm screw shaft away from the worm screw head, and rotation of the worm screw head in a second direction causes the worm fastener to translate along the worm screw shaft toward the worm screw head.

FIGS. 64-66E illustrate various views of the adjustable saddle 12000 with modifications, according to another embodiment of the present disclosure. The adjustable saddle 12000 may generally include all of the features and functionality described above with respect to FIGS. 61-63E.

However, the adjustable saddle 12000 of FIGS. 64-66E may also include a first opening 12011 and a second opening 12013 that can allow the first back end worm screw 12003 and the first back end fastener 12303 to be removed superiorly from the mounting frame 12305, without the need to unthread the first back end worm screw 12003 from the first back end fastener 12303 in order to remove the first back end worm screw 12003 from the mounting frame 12305 in a transverse or lateral direction with respect to the mounting frame 12305.

Likewise, the adjustable saddle 12000 of FIGS. 64-66E may also include a third opening 12021 and a fourth opening 12023 that can allow the second back end worm screw 12004 and the second back end fastener 12304 to be removed superiorly from the mounting frame 12305, without the need to unthread the second back end worm screw 12004 from the second back end fastener 12304 in order to remove the second back end worm screw 12004 from the mounting frame 12305 in a transverse or lateral direction with respect to the mounting frame 12305.

This may allow a worm drive mechanism to be quickly removed from the mounting frame 12305 and replaced with a different worm drive mechanism and/or replaced with any of the other different fastening systems that are described herein.

In some embodiments (not shown), the first and second front end channels 12311, 12312 may also include similar openings to allow the first and second front end worm screws 12001, 12002 and the first and second front end fasteners 12301, 12302 to be removed superiorly from the mounting frame 12305.

Figure 67:
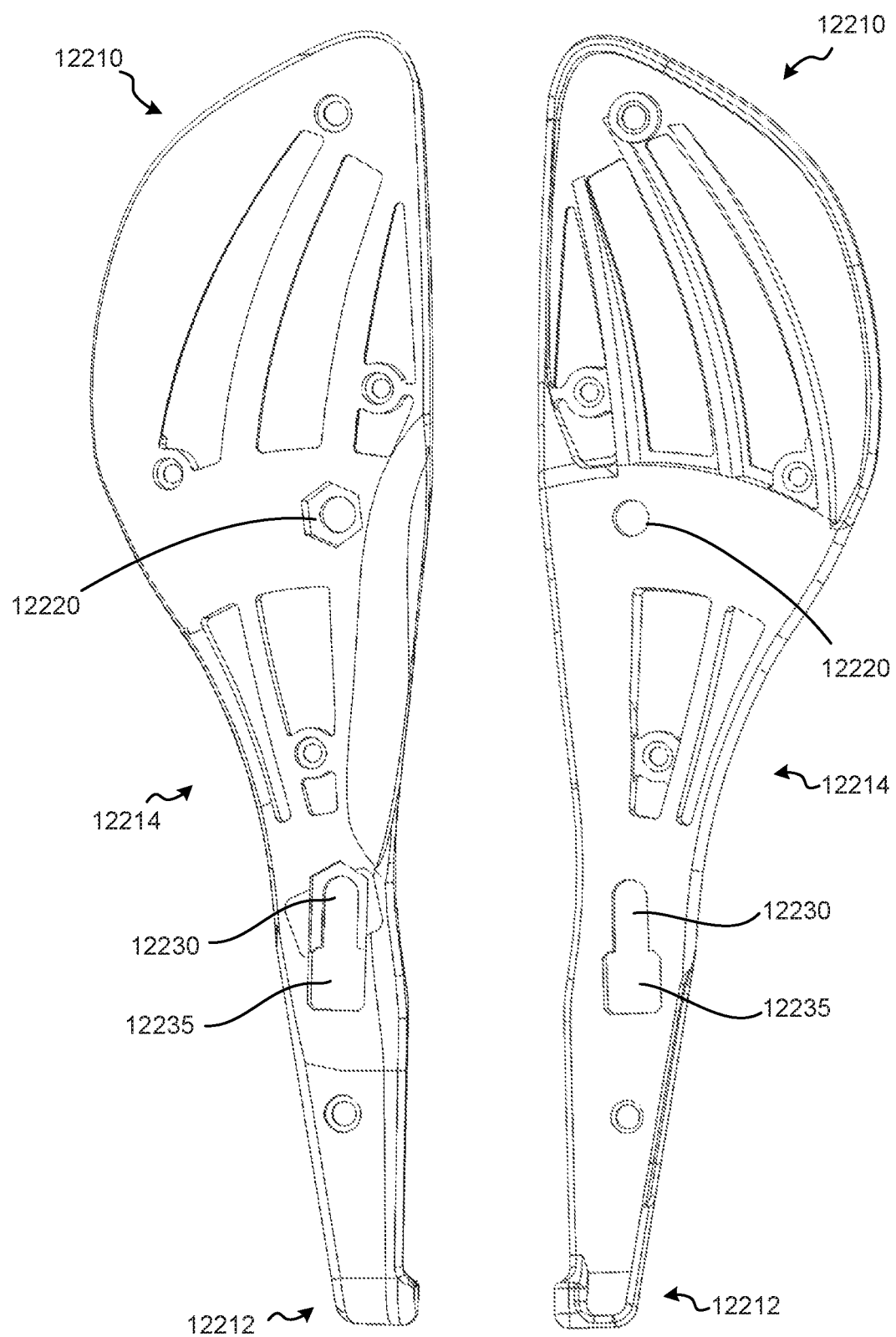
FIG. 67 illustrates top and bottom views of a saddle half base from FIG. 61.
Figure 68:
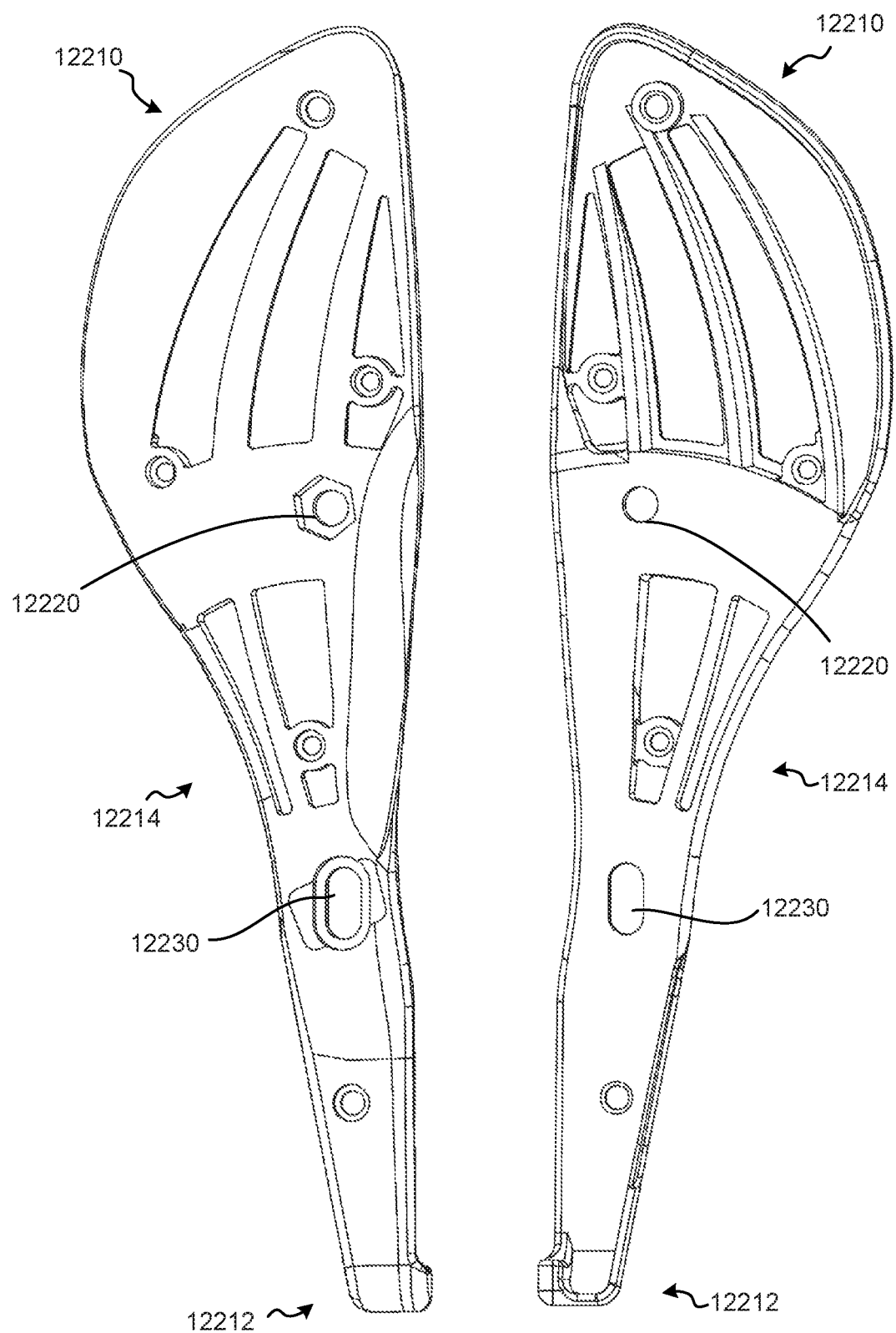
FIG. 68 illustrates top and bottom views of a saddle half base, according to another embodiment of the present disclosure.

FIG. 67 illustrates top and bottom views of the second saddle half base 12214 from FIGS. 61 and 62 (previously discussed), and FIG. 68 illustrates top and bottom views of the second saddle half base 12214 from FIGS. 61 and 62 with modifications to the second front end retainer housing 12230. Any of the adjustable saddles disclosed herein may utilize saddle half bases similar to those shown in FIGS. 67 and 68.

With reference to FIG. 67, the second saddle half base 12214 may include an enlarged opening 12235 adjacent to the second front end retainer housing 12230. The enlarged opening 12235 may be configured to receive an enlarged portion of a fastener (e.g., a head of a fastener, a nut, etc.) in order to allow the second saddle half base 12214 to be coupled/decoupled from the mounting frame 12305 by inserting a fastener inferiorly from below the mounting frame 12305 and into the enlarged opening 12235.

This design can allow the second saddle half base 12214 to achieve a lower profile with a lower profile fastener configured to couple the second saddle half base 12214 to the mounting frame 12305. Moreover, this can also allow a skin (not shown) to be eliminated from the design by joining a foam padding (not shown) directly to the second saddle half base 12214, instead of to the skin. This can be achieved because the fastener can now be inserted inferiorly from below the mounting frame 12305 and into the enlarged opening 12235. A seat cover (not shown) can then be placed over the foam padding and secured directly to the second saddle half base 12214.

In some embodiments, a stud or bolt (not shown) may be over molded, or otherwise integrally formed, in place of the second back end retainer housing 12220 of the second saddle half base 12214. This can also allow the second saddle half base 12214 to achieve a lower profile through an over molding design, while also allowing the front fastener to be inserted inferiorly from below the mounting frame 12305 and into the enlarged opening 12235 to eliminate the need for a skin to provide an even lower profile and a more simplified design. The over molded stud/bolt may be utilized with one or more slots formed in the mounting frame and a nut to secure the stud/bolt to the mounting frame.

With reference to FIG. 67, the second saddle half base 12214 may not include an enlarged opening adjacent to the second front end retainer housing 12230. In this embodiment, a front fastener may be placed in the second front end retainer housing 12230 before adding a skin/foam padding (not shown) on top of the second saddle half base 12214. However, a lower profile fastener may be placed in the second front end retainer housing 12230 in order to achieve an overall lower profile design for the second saddle half base 12214.

It will be understood that any of the adjustable saddles disclosed herein may utilize one or more features shown in FIGS. 67 and 68.

Any methods disclosed herein may comprise one or more steps or actions for performing the described method. The method steps and/or actions may be interchanged with one another. In other words, unless a specific order of steps or actions is required for proper operation of the embodiment, the order and/or use of specific steps and/or actions may be modified, interchanged, omitted, or supplemented.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Similarly, it will be appreciated that in the above description of embodiments, various features are sometimes grouped together in a single embodiment, figure, or description for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Only elements recited in means-plus-function format are intended to be construed in accordance with 35 U.S.C. § 112 Para. 6. It will be apparent to those having skill in the art that changes may be made to the details of the above-described embodiments without departing from the underlying principles of the disclosure.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure herein without departing from the spirit and scope of the disclosure.

What is claimed is:

1. An adjustable saddle for a cycle, the adjustable saddle comprising:
   a saddle half base comprising:
      a cushioned seat;
      a saddle half base front end; and
      a saddle half base back end;
   a mounting frame couplable with the saddle half base, the mounting frame comprising:
      a mounting frame front end; and
      a mounting frame back end;
   a discrete adjustment mechanism comprising:
      a front end fastener;
      a back end fastener;
      a plurality of front end channels on the mounting frame front end, configured to receive the front end fastener at a plurality of discrete front end locations, wherein the saddle half base front end is configured to receive the front end fastener to pivotally attach the saddle half base front end to the mounting frame front end in at least two different pivot points corresponding to the plurality of discrete front end locations; and a plurality of back end channels on the mounting frame back end, configured to receive the back end fastener at a plurality of discrete back end locations, wherein the saddle half base back end is configured to receive the back end fastener to couple the saddle half base back end to the mounting frame back end and the saddle half base back end is positionable relative to the mounting frame back end at the plurality of discrete back end locations to allow discrete pivotal attachment of the saddle half base back end to the mounting frame back end; and a slope adjustment mechanism comprising:
  a mounting frame front end projection comprising a first hinge pin;
  a mounting frame back end projection comprising:
    a second hinge pin; and
    at least one slope adjustment aperture configured to receive a slope adjustment fastener; and
  a slope adjustment frame comprising:
    a first aperture configured to receive the first hinge pin;
    a second aperture configured to receive the second hinge pin; and
    a third aperture configured to receive the slope adjustment fastener,
    wherein the slope adjustment mechanism is configured to pivotally couple the mounting frame to the slope adjustment frame at a plurality of different discrete angles to digitally adjust a slope of the mounting frame relative to the slope adjustment frame.

2. The adjustable saddle of claim 1, wherein the plurality of front end channels comprise a plurality of longitudinal grooves formed in the mounting frame front end.

3. The adjustable saddle of claim 2, wherein the front end fastener comprises a movable front end key, and wherein the plurality of longitudinal grooves are configured to receive the movable front end key to couple the saddle half base front end to the mounting frame front end at the plurality of discrete front end locations.

4. The adjustable saddle of claim 3, wherein the mounting frame front end further comprises a transverse slot configured to receive a shaft of the front end fastener.

5. The adjustable saddle of claim 1, wherein the plurality of front end channels comprise a plurality of longitudinal slots formed in the mounting frame front end and configured to receive the front end fastener.

6. The adjustable saddle of claim 1, wherein the plurality of back end channels comprise a plurality of key slots formed in the mounting frame back end.

7. The adjustable saddle of claim 6, wherein the back end fastener comprises a movable back end key, and wherein the plurality of key slots are configured to receive the movable back end key to couple the saddle half base back end to the mounting frame back end at the plurality of discrete back end locations.

8. The adjustable saddle of claim 1, wherein the saddle half base front end comprises a slot with an enlarged opening configured to receive a head of the front end fastener.

9. An adjustable saddle for a cycle, the adjustable saddle comprising:
  a saddle half base comprising a cushioned seat;
  a mounting frame couplable with the saddle half base; and
  a saddle half adjustment mechanism configured to adjust an orientation of the saddle half base relative to the mounting frame via pivotal motion of the saddle half base relative to the mounting frame;
  wherein the saddle half adjustment mechanism
    comprises a discrete saddle half adjustment mechanism configured to pivotally attach the saddle half base to the mounting frame in at least two different discrete pivot points, and wherein the discrete saddle half adjustment mechanism comprises a plurality of longitudinal grooves formed in the mounting frame that are configured to pivotally attach the saddle half base to the mounting frame in the at least two different discrete pivot points.

10. The adjustable saddle of claim 9, wherein the discrete saddle half adjustment mechanism further comprises:
  a front end fastener receivable in a saddle half base front end of the saddle half base;
  a back end fastener receivable in a saddle half base back end of the saddle half base;
  a plurality of front end channels comprising the plurality of longitudinal grooves formed in a mounting frame front end of the mounting frame and configured to receive the front end fastener at a plurality of discrete front end locations to pivotally attach the saddle half base front end to the mounting frame front end in the at least two different discrete pivot points corresponding to the plurality of discrete front end locations; and
  a plurality of back end channels formed in a mounting frame back end of the mounting frame and configured to receive the back end fastener at a plurality of discrete back end locations, wherein the saddle half base back end is positionable relative to the mounting frame back end at the plurality of discrete back end locations to allow discrete pivotal attachment of the saddle half base back end to the mounting frame back end.

11. The adjustable saddle of claim 10, wherein the front end fastener comprises a movable front end key, and wherein the plurality of longitudinal grooves are configured to receive the movable front end key to couple the saddle half base front end to the mounting frame front end at the plurality of discrete front end locations.

12. The adjustable saddle of claim 11, wherein the mounting frame front end further comprises a transverse slot configured to receive a shaft of the front end fastener.

13. The adjustable saddle of claim 10, wherein the plurality of back end channels comprise a plurality of key slots formed in the mounting frame back end.

14. The adjustable saddle of claim 13, wherein the back end fastener comprises a movable back end key, and wherein the plurality of key slots are configured to receive the movable back end key to couple the saddle half base back end to the mounting frame back end at the plurality of discrete back end locations.

15. An adjustable saddle for a cycle, the adjustable saddle comprising:
  a saddle half base comprising a cushioned seat;
  a mounting frame couplable with the saddle half base;
  a slope adjustment frame; and
  a slope adjustment mechanism configured to pivotally couple the mounting frame to the slope adjustment frame by adjusting a slope of the saddle half base relative to the slope adjustment frame via pivotal motion of the saddle half base relative to the slope adjustment frame about an axis extending along a longitudinal direction of the adjustable saddle, wherein the slope adjustment mechanism is configured to maintain a selected angle for the saddle half base relative to the slope adjustment frame when a rider is seated on the saddle half base;

wherein the slope adjustment mechanism comprises a discrete slope adjustment mechanism configured to adjust the slope to any of a plurality of discrete angles, the discrete slope adjustment mechanism comprising:

a mounting frame front end projection comprising a first hinge pin;

a mounting frame back end projection comprising:

a second hinge pin; and at least one slope adjustment aperture configured to receive a slope adjustment fastener;

a first aperture configured to receive the first hinge pin;

a second aperture configured to receive the second hinge pin; and a third aperture configured to receive the slope adjustment fastener;

wherein the discrete slope adjustment mechanism is configured to pivotally couple the mounting frame to the slope adjustment frame at any of a plurality of different discrete angles to adjust a slope of the saddle half base relative to the slope adjustment frame.

16. An adjustable saddle for a cycle, the adjustable saddle comprising:

a saddle half base comprising a cushioned seat;
a mounting frame couplable with the saddle half base;
a slope adjustment frame; and
a slope adjustment mechanism configured to pivotally couple the mounting frame to the slope adjustment frame by adjusting a slope of the saddle half base relative to the slope adjustment frame via pivotal motion of the saddle half base relative to the slope adjustment frame about an axis extending along a longitudinal direction of the adjustable saddle, wherein the slope adjustment mechanism is configured to maintain a selected angle for the saddle half base relative to the slope adjustment frame when a rider is seated on the saddle half base;

wherein the slope adjustment mechanism comprises an analog slope adjustment mechanism configured to adjust the slope along a continuous range of angles, the analog slope adjustment mechanism comprising:

a mounting frame front end projection comprising a first hinge pin; and a mounting frame back end projection comprising:
a second hinge pin; and
a slope adjustment slot configured to receive a slope adjustment fastener;

a first aperture configured to receive the first hinge pin;

a second aperture configured to receive the second hinge pin; and a third aperture configured to receive the slope adjustment fastener;

wherein the analog slope adjustment mechanism is configured to pivotally couple the mounting frame to the slope adjustment frame along a continuous range of angles to adjust a slope of the saddle half base relative to the slope adjustment frame.

17. An adjustable saddle for a cycle, the adjustable saddle comprising:

a saddle half base comprising a cushioned seat;
a mounting frame couplable with the saddle half base; and
a saddle half adjustment mechanism configured to adjust an orientation of the saddle half base relative to the mounting frame via pivotal motion of the saddle half base relative to the mounting frame;

wherein the saddle half adjustment mechanism comprises a discrete saddle half adjustment mechanism configured to pivotally attach the saddle half base to the mounting frame in at least two different discrete pivot points, and wherein the discrete saddle half adjustment mechanism comprises a movable front end key that is configured to be received in at least two longitudinal grooves formed in the mounting frame to pivotally attach the saddle half base to the mounting frame in the at least two different discrete pivot points.

18. An adjustable saddle for a cycle, the adjustable saddle comprising:

a saddle half base comprising a cushioned seat;
a mounting frame couplable with the saddle half base;
a slope adjustment frame; and
a discrete slope adjustment mechanism configured to pivotally couple the mounting frame to the slope adjustment frame by adjusting a slope of the saddle half base relative to the slope adjustment frame via pivotal motion of the saddle half base relative to the slope adjustment frame about an axis extending along a longitudinal direction of the adjustable saddle, wherein the discrete slope adjustment mechanism comprises:

a slope adjustment fastener aperture formed in the slope adjustment frame;

a plurality of slope adjustment apertures formed in the mounting frame; and a slope adjustment fastener receivable through the slope adjustment fastener aperture and a selected one of the plurality of slope adjustment apertures to selectively maintain a desired discrete angle for the saddle half base relative to the slope adjustment frame.

* * * * *